United States Patent [19]

Tsutsui et al.

[11] Patent Number: 4,596,754

[45] Date of Patent: Jun. 24, 1986

[54] ELECTROPHOTOGRAPHIC PRINTING ORIGINAL PLATE AND ELECTROPHOTOGRAPHIC PLATE MAKING PROCESS USING THE PRINTING ORIGINAL PLATE

[75] Inventors: Kyoji Tsutsui, Mishima; Mitsuru Hashimoto, Numazu; Masafumi Ohta; Masaomi Sasaki, both of Susono, all of Japan

[73] Assignee: Ricoh Company, Ltd., Tokyo, Japan

[21] Appl. No.: 726,363

[22] Filed: Apr. 23, 1985

[30] Foreign Application Priority Data

| | | | |
|---|---|---|---|
| Apr. 27, 1984 | [JP] | Japan | 59-85891 |
| Apr. 27, 1984 | [JP] | Japan | 59-85892 |
| Apr. 27, 1984 | [JP] | Japan | 59-85893 |
| Apr. 27, 1984 | [JP] | Japan | 59-85894 |
| Apr. 27, 1984 | [JP] | Japan | 59-85895 |
| Apr. 27, 1984 | [JP] | Japan | 59-85896 |
| May 8, 1984 | [JP] | Japan | 59-91243 |
| May 8, 1984 | [JP] | Japan | 59-91244 |
| May 8, 1984 | [JP] | Japan | 59-91245 |
| May 8, 1984 | [JP] | Japan | 59-91246 |
| May 8, 1984 | [JP] | Japan | 59-91247 |
| May 14, 1984 | [JP] | Japan | 59-95851 |
| May 14, 1984 | [JP] | Japan | 59-95852 |
| May 14, 1984 | [JP] | Japan | 59-95853 |
| May 14, 1984 | [JP] | Japan | 59-95854 |
| May 14, 1984 | [JP] | Japan | 59-95855 |
| May 14, 1984 | [JP] | Japan | 59-95856 |
| May 14, 1984 | [JP] | Japan | 59-95857 |
| May 14, 1984 | [JP] | Japan | 59-95858 |
| May 14, 1984 | [JP] | Japan | 59-95859 |
| May 14, 1984 | [JP] | Japan | 59-95860 |
| May 14, 1984 | [JP] | Japan | 59-95861 |
| May 17, 1984 | [JP] | Japan | 59-99365 |
| May 17, 1984 | [JP] | Japan | 59-99366 |
| May 17, 1984 | [JP] | Japan | 59-99367 |
| May 17, 1984 | [JP] | Japan | 59-99368 |
| May 17, 1984 | [JP] | Japan | 59-99369 |
| May 18, 1984 | [JP] | Japan | 59-99888 |
| May 18, 1984 | [JP] | Japan | 59-99889 |
| May 18, 1984 | [JP] | Japan | 59-99890 |
| May 18, 1984 | [JP] | Japan | 59-99891 |
| May 18, 1984 | [JP] | Japan | 59-99892 |
| May 21, 1984 | [JP] | Japan | 59-102066 |
| May 21, 1984 | [JP] | Japan | 59-102067 |
| May 21, 1984 | [JP] | Japan | 59-102068 |
| May 21, 1984 | [JP] | Japan | 59-102069 |
| May 21, 1984 | [JP] | Japan | 59-102071 |
| May 21, 1984 | [JP] | Japan | 59-102072 |
| May 21, 1984 | [JP] | Japan | 59-102073 |
| Nov. 19, 1984 | [JP] | Japan | 59-243580 |
| Nov. 19, 1984 | [JP] | Japan | 59-243581 |
| Dec. 12, 1984 | [JP] | Japan | 59-262271 |
| Dec. 12, 1984 | [JP] | Japan | 59-262272 |
| Dec. 12, 1984 | [JP] | Japan | 59-262273 |

[51] Int. Cl.[4] .................... G03G 5/14

[52] U.S. Cl. .................... 430/58; 430/49; 430/302; 430/72

[58] Field of Search .................... 430/57, 58, 49, 302

[56] References Cited

U.S. PATENT DOCUMENTS

| | | | |
|---|---|---|---|
| 3,104,169 | 9/1963 | Metcalfe et al. | 430/49 |
| 4,427,754 | 1/1984 | Uchida et al. | 430/49 X |

*Primary Examiner*—J. David Welsh

*Attorney, Agent, or Firm*—Oblon, Fisher, Spivak, McClelland & Maier

[57] ABSTRACT

An electrophotographic printing original plate is disclosed, which comprises an electroconductive support material and an electrophotographic photosensitive layer formed thereon, which electrophotographic photosensitive layer comprises (i) a charge generation layer consisting essentially of a particular azo pigment serving as a charge generating material and (ii) a charge transport layer consisting essentially of a charge transporting material and an alkali-soluble resin; and an electrophotographic printing plate making process using the above printing original plate is also disclosed, which comprises the steps of electrically charging uniformly the above printing original plate, exposing the charged printing original plate to optical images to form latent electrostatic images thereon, developing the latent electrostatic images with toner, fixing the toner images to the printing original plate, and removing the electrophotographic photosensitive layer portions corresponding to the non-image areas of the printing original plate by dissolving the photosensitive layer portions in a dissolving liquid, thereby making a printing plate.

12 Claims, 3 Drawing Figures

ELECTROPHOTOGRAPHIC PRINTING ORIGINAL PLATE AND ELECTROPHOTOGRAPHIC PLATE MAKING PROCESS USING THE PRINTING ORIGINAL PLATE

BACKGROUND OF THE INVENTION

The present invention relates to an electrophotographic printing original plate and an electrophotographic printing plate making process of making a printing plate by use of the electrophotographic original printing plate. More particularly, the present invention relates to an electrophotographic printing original plate comprising an electroconductive support material and an electrophotographic photosensitive layer formed thereon, which electrophotographic photosensitive layer comprises (i) a charge generation layer essentially consisting of a particular azo pigment serving as charge generating material, and (ii) a charge transport layer consisting essentially of a charge transporting material and an alkali-soluble resin, and the present invention also relates to an electrophotographic printing plate making process comprising the steps of charging uniformly the above printing original plate, exposing the charged printing original plate to optical images to form latent electrostatic images thereon, developing the latent electrostatic images with toner to visible toner images, fixing the toner images to the printing original plate, and removing the electrophotographic photosensitive layer portions corresponding to the non-image areas of the printing original plate by dissolving the non-image areas in a dissolving liquid, thereby making a printing plate.

As conventional lithographic printing plates, printing plates using photosensitive resins and printing plates using silver halide photosensitive materials are known.

A lithographic printing plate using a photosensitive resin has a high printing durability, but has the shortcomings that the photosensitivity is low, direct plate making cannot be done, a positive or negative film must be prepared from the original, using a silver halide film, therefore a large-scale apparatus is necessary and the plate making process is very time consuming.

A printing plate for the silver salt diffusion transfer process and a printing plate for the tanning development allow direct plate making. However, they have the shortcomings that the printing durability is poor and printing cost per sheet is very high.

As the printing plate for direct plate making utilizing electrophotography, for instance, printing plates of a zinc oxide-resin dispersion type are known as disclosed in Japanese Patent Publications No. 47-47610, No. 48-40002, No. 48-18325, No. 51-15766 and No. 51-25761. A printing plate of this type is treated with an acidic aqueous solution containing, for instance, a ferrocyanide, in order to make the non-image areas of the printing plate hydrophilic after the formation of toner images by electrophotography on the printing plate. The thus prepared printing plate has a low printing durability of about 5,000 to 10,000 sheets, since the photosensitive layer and the electroconductive layer of the printing plate peel off the support material of the printing plate due to the mechanical pressure applied thereto and penetration of dampening water or solution into those layers during the course of printing, so that the hydrophilic surface layer of the printing plate is damaged.

Further, in such a zinc oxide—resin dispersion type printing plate, dye sensitization is carried out in order to cause the printing plate to have photosensitivity in the visible range. This sensitization, however, is not sufficient for practical use in a long wave range of 600 nm or more. Therefore, inexpensive low power He-Ne laser and semi-conductor laser cannot be employed for formation of latent images on this printing plate.

For instance, Japanese Patent Publications No. 37-17162, No. 38-7758, No. 46-39405, and Japanese Laid-open Patent Applications No. 52-2437, No. 56-107246, No. 55-105254, No. 55-153948, No. 55-16125, No. 57-147656, No. 56-146145 and No. 57-161863 disclose electrophotographic printing plates comprising a hydrophilic electroconductive support material such as a grained aluminum plate, a layer comprising an organic photoconductive compound and a alkali-soluble resin formed on the support material, or a layer comprising a charge generating pigment layer such as a phthalocyanine-type pigment which is dispersed in an alkali-soluble resin, or a more sensitized layer comprising a charge generating pigment such as a phthalocyanine-type pigment which is dispersed in an alkali-soluble resin by addition thereto of by an electron acceptor or an electron donor. The printing plates of this kind are prepared by removing the photosensitive layer in the non-image areas using an alkaline solution after electrophotographic formation of toner images on the printing plates. These printing plates have the advantage over other conventional printing plates that they have high printing durability, but have the shortcomings that the photosensitivity is low and therefore the plate making speed is significantly low, so that a high power light source is necessary for plate making.

SUMMARY OF THE INVENTION

It is therefore an object of the present invention to provide an electrophotographic printing original plate having high photosensitivity and high printing durability, which comprises an electroconductive support material and an electrophotographic photosensitive layer formed thereon, which electrophotographic photosensitive layer comprises (i) a charge generation layer consisting essentially of a particular azo pigment serving as a charge generating material and (ii) a charge transport layer consisting essentially of a charge transporting material and an alkali-soluble resin.

Another object of the present invention is to provide an electrophotographic printing plate making process comprising the steps of electrically charging uniformly the above printing original plate, exposing the charged printing original plate to optical images to form latent electrostatic images thereon, developing the latent electrostatic images with toner, fixing the toner images to the printing original plate, and removing the electrophotographic photosensitive layer portions corresponding to the non-image portions of the printing original plate by dissolving the photosensitive layer portions in a dissolving liquid, thereby making a printing plate.

In the present invention, as the particular azo pigment serving as charge generating material, the following can be employed, in which A represents a coupler moiety which will be explained in detail later:

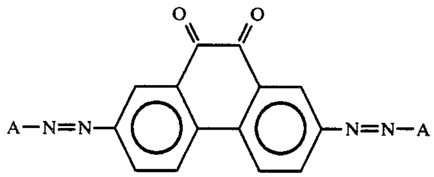
(1)
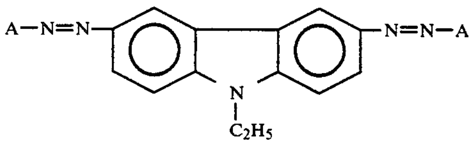
(2)
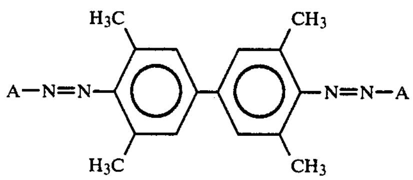
(3)
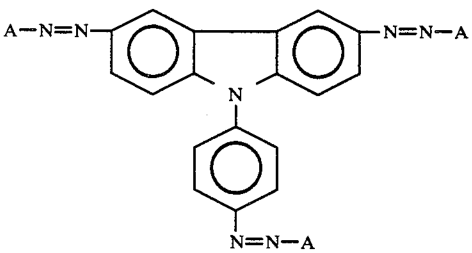
(4)
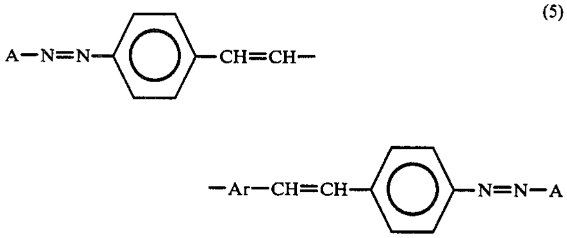
(5)
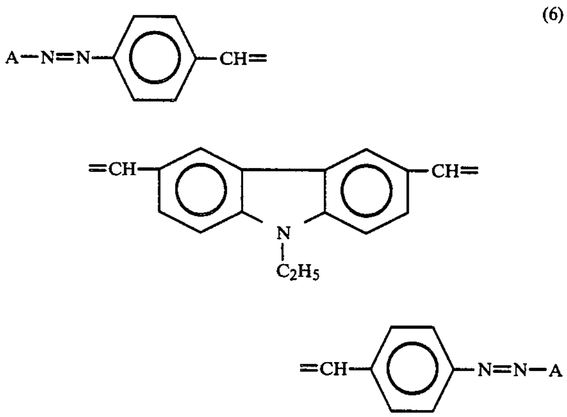
(6)
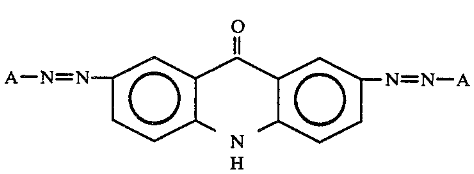
(7)
-continued
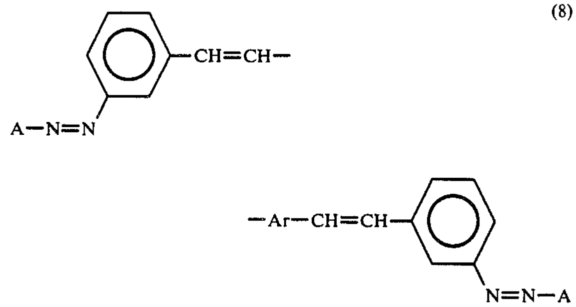
(8)
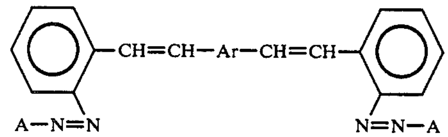
(9)
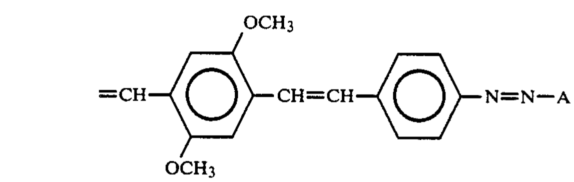
(10)
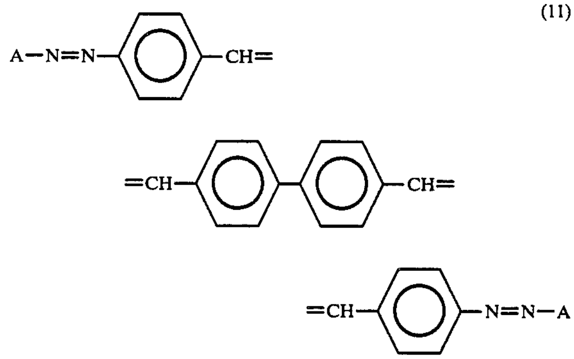
(11)
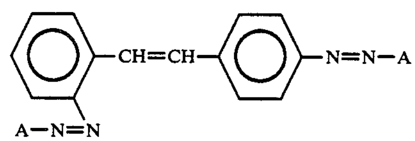
(12)
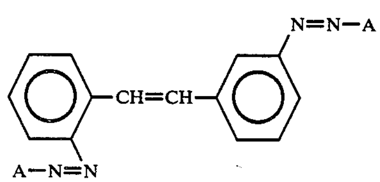
(13)
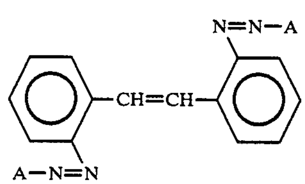
(14)

-continued
(15)
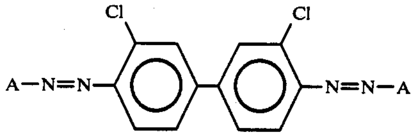
(16)
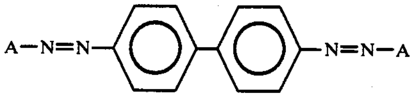
(17)
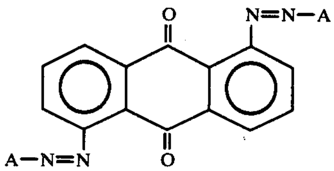
(18)
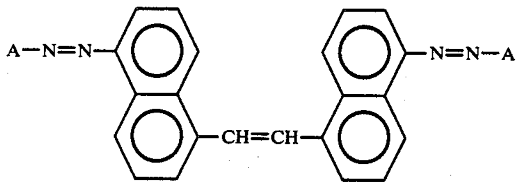
(19)
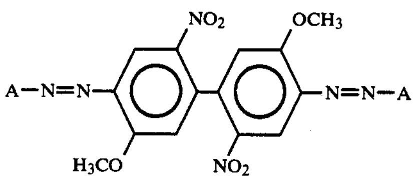
(20)
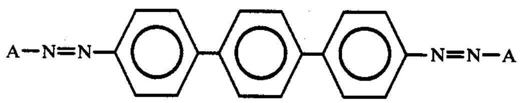
(21)
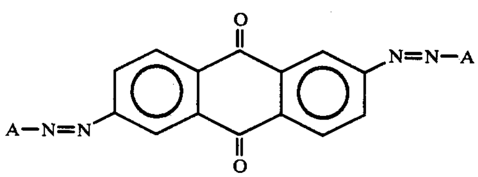
(22)
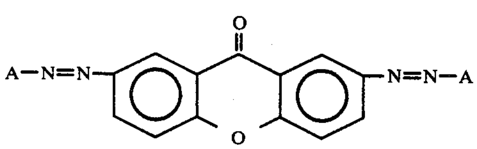
(23)
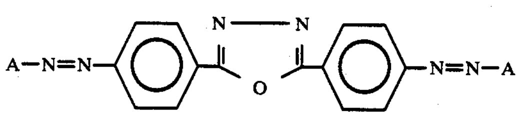
(24)
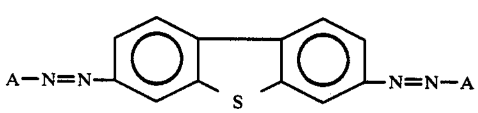
(25)
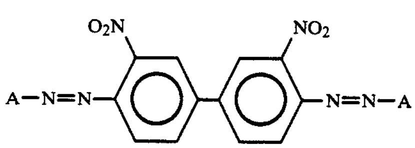
-continued
(26)
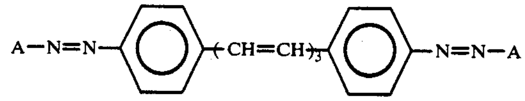
(27)
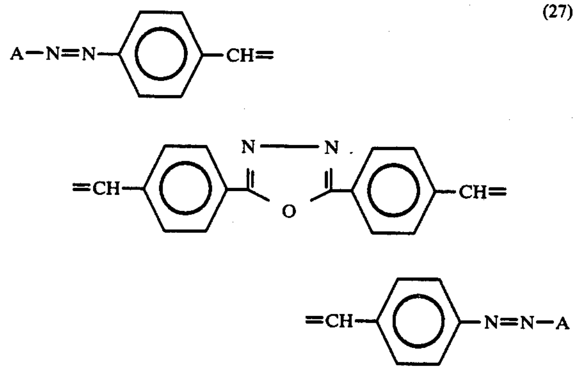
(28)
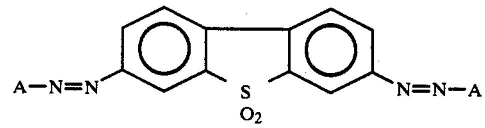
(29)
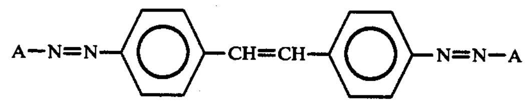
(30)
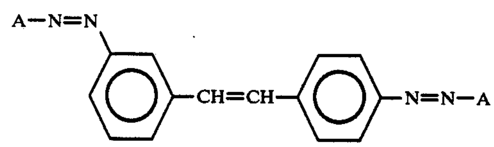
(31)
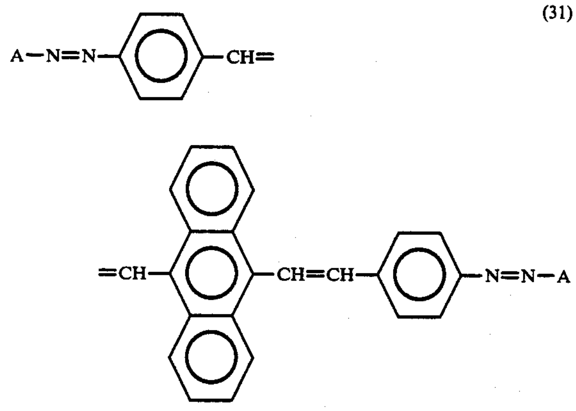
(32)
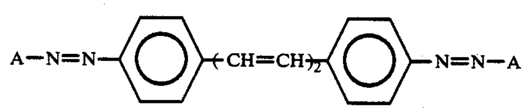
(33)
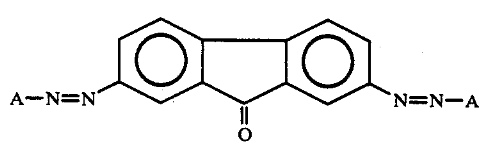

-continued

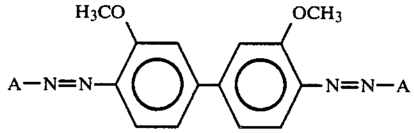
(34)

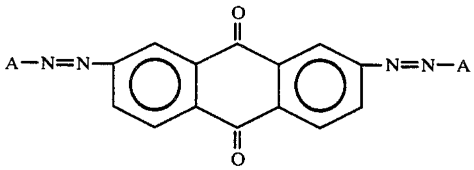
(35)

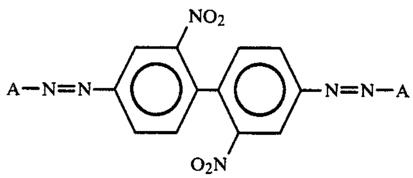
(36)

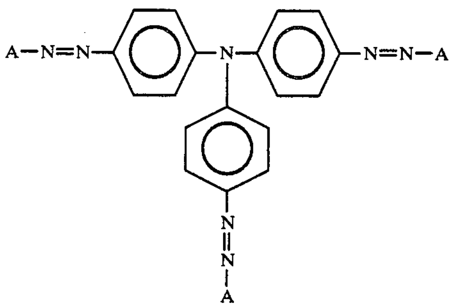
(37)

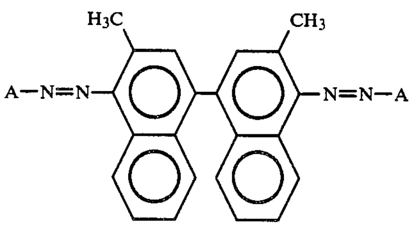
(38)

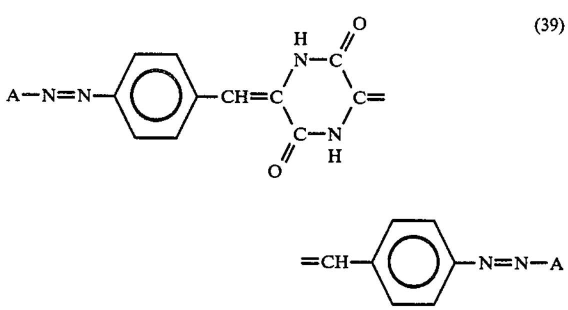
(39)

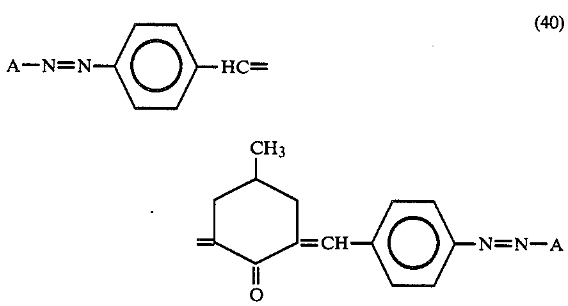
(40)

-continued

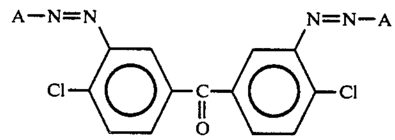
(41)

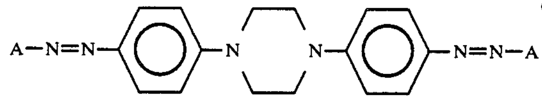
(42)

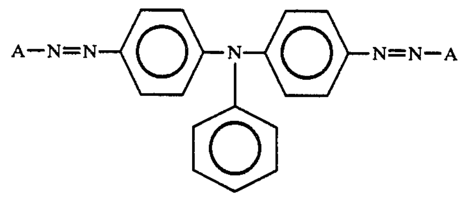
(43)

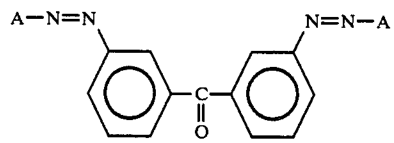
(44)

BRIEF DESCRIPTION OF THE DRAWINGS

In the drawings,

FIGS. 2 and 3 show a printing plate making process according to the present invention, in which FIG. 2 shows the step of forming a toner image on the printing original plate, and FIG. 3 shows the printing original plate from which the electrophotographic photosensitive layer portions corresponding to the non-image areas have been removed by dissolving the layer portions in a dissolving liquid, thereby making a printing plate.

DETAILED DESCRIPTION OF THE PREFERRED EMBODIMENTS

Figure 1:
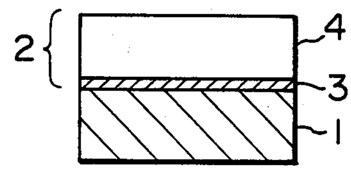
FIG. 1 is a schematic cross-sectional view of an electrophotographic printing original plate according to the present invention.

By referring to FIG. 1, the basic structure of an electrophotographic printing original plate according to the present invention will now be explained.

In the figure, reference numeral 1 indicates an electroconductive support material. On the electroconductive support material 1, there are successively over-laid a charge generation layer 3 and a charge transport layer 4, which constitute an electrophotographic photosensitive layer 2. In the electrophotographic photosensitive layer 2, the overlaying order of the charge generation layer 3 and the charge transport layer 4 can be reversed.

As the coupler of the azo pigment which serves as charge generating material and is contained in the charge generation layer 3, the following can be preferably employed: compounds having phenolic hydroxyl groups, such as phenols and naphthols, aromatic amines having amino group, aminonaphthols having amino group and phenolic hydroxyl group, and compounds having aliphatic or aromatic enolic ketone groups (active methylene group).

In the previously given formulas (1) through (44), the coupler residue A is preferably selected from the group consisting of the residues represented by the formula (A-1), (A-2), (A-3), (A-4), (A-5) or (A-6).

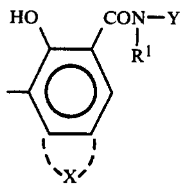

(A-1)

wherein $R^1$ is hydrogen, an alkyl group, an unsubstituted or substituted phenyl group; X is an unsubstituted or substituted cyclic hydrocarbon group, or an unsubstituted or substituted heterocyclic group; Y is an unsubstituted or substituted cyclic hydrocarbon group, an unsubstituted or substituted heterocyclic group, or

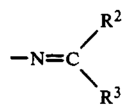

(in which $R^2$ is an unsubstituted or substituted cyclic hydrocarbon group, an unsubstituted or substituted heterocyclic group, an unsubstituted or substituted styryl group; $R^3$ is hydrogen, an alkyl group, an unsubstituted or substituted phenyl group; or $R^2$ and $R^3$ can form a ring in combination with carbon atoms bonded to $R^2$ and $R^3$):

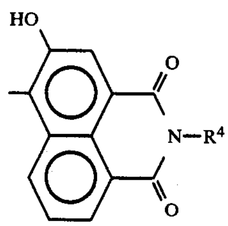

(A-2)

wherein $R^4$ is an unsubstituted or substituted hydrocarbon group:

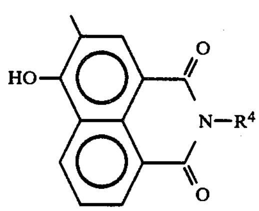

(A-3)

wherein $R^4$ is an unsubstituted or substituted hydrocarbon group:

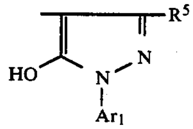

(A-4)

wherein $R^5$ is an alkyl group, a carbamoyl group, a carboxyl group or an ester group thereof; $Ar_1$ is an unsubstituted or substituted cyclic hydrocarbon group:

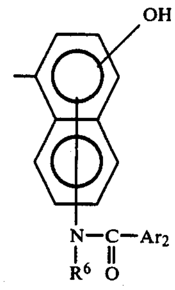

(A-5)

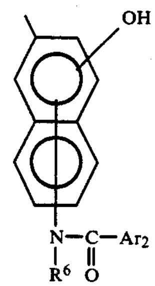

(A-6)

wherein $R^6$ is an unsubstituted or substituted hydrocarbon group and $Ar_2$ is an unsubstituted or substituted cyclic hydrocarbon group.

In the above formula (A-1), examples of the cyclic hydrocarbon group represented by X are a benzene ring and a naphthalene ring.

Examples of the heterocyclic group represented by X are an indole ring, a carbazole ring and a benzofuran ring.

Examples of the cyclic hydrocarbon group represented by Y and $R^2$ are a phenyl group, a naphthyl group, an anthryl group and a pyrenyl group.

Examples of the heterocyclic group represented by Y and $R^2$ are a pyridyl group, a thienyl group, a furyl group, an indolyl group, a benzofuranyl group, a carbazolyl group and a debenzofuranyl group.

An example of the ring formed by $R^2$ and $R^3$ in combination with carbon atoms bonded thereto is a fluorene ring.

Examples of the hydrocarbon group represented by $R^4$ and $R^6$ are an alkyl group such as a methyl group, an ethyl group, a propyl group and a butyl group, an aralkyl group such as a benzyl group, and an unsubstituted or substituted aryl group such as a phenyl group.

Examples of a substituent of the hydrocarbon group represented by $R^4$ and $R^6$ are an alkyl group such as a methyl group, an ethyl group, a propyl group and a butyl group, an alkoxy group such as a methoxy group, an ethoxy group, a propoxy group and butoxy group, a halogen such as chlorine and bromine, a hydroxyl group, and a nitro group.

Examples of a substitutent of the phenyl group represented by $R^1$ and examples of a substituent of the cyclic hydrocarbon group represented by X are a halogen, such as chlorine and bromine.

Examples of a substituent of the cyclic hydrocarbon group and the heterocyclic group represented by Y and $R^2$, and examples of a substituent of the ring formed by $R^2$ and $R^3$ are an alkyl group such as a methyl group, an ethyl group, a propyl group and a butyl group, an alkoxy group such as a methoxy group, an ethoxy group, a propoxy group, a butoxy group, a halogen such as chlorine and bromine, a dialkyl amino group such as a dimethylamino group and a diethylamino group, a diaralkylamino group such as a dibenzylamino group, a halomethyl group such as a trifluoromethyl group, a nitro group, a cyano group, a carboxyl group and an ester group thereof, a hydroxyl group, and a sulfonic group such as $—SO_3Na$.

Examples of the cyclic hydrocarbon group represented by $Ar_1$ and $Ar_2$ are a phenyl group and a naphthyl group.

Substituents of $Ar_1$ and $Ar_2$ are, for example, an alkyl group such as a methyl group, an ethyl group, a propyl group and a butyl group, an alkoxy group such as a methoxy group, an ethoxy group, a propoxy group and a butoxy group, a nitro group, a halogen such as chlorine and bromine, a cyano group, and a dialkyl amino group such as a dimethylamino group and a diethylamino group.

The charge generation layer 3 essentially consists of one of azo pigments represented by the previously described general formulas (1) through (44). It is preferable that the charge generation layer 3 contain an azo pigment serving as charge generating material in an amount of 30 wt.% or more.

When necessary, a binder agent can be contained in the charge generation layer 3. In the printing original plate according to the present invention, since the non-image areas are removed by dissolving, it is preferable to use as the binder agent for the charge generation layer 3 an alkali-soluble resin such as a styrene-maleic anhydride copolymer and a novolak-type phenolic resin as will be described in detail later. Other resins can also be employed if the employed amount is small.

As to the thickness of the charge generation layer 3, it is preferable that the thickness be in the range of from 0.01 μm to 5 μm, more preferably in the range of from 0.05 μm to 2 μm. When the thickness of the charge generation layer 3 is less than 0.01 μm, charge generation cannot be effected sufficiently, while when the thickness is more than 5 μm, the residual potential of the printing original plate become too high to be used in practice.

The charge transport layer 4 comprises as the main components a charge transporting material and an alkali-soluble resin. As charge transporting materials, there are a positive hole transporting material and an electron transporting material.

Specific examples of a positive hole transporting material for use in the present invention are as follows:

(1) oxadiazole compounds:
2,5-bis(4-diethylaminophenyl)-1,3,4-oxadiazole,
2,5-bis[4-(4-diethylaminostyryl)phenyl]-1,3,4-oxadiazole,
2-(9-ethylcarbazolyl-3-)-5-(4-diethylaminophenyl)-1,3,4-oxadiazole
(2) oxazole compounds:
2-vinyl-4-(2-chlorophenyl)-5-(4-diethylamino)oxazole,
2-(4-diethylaminophenyl)-4-phenyloxazole
(3) pyrazoline compounds:
1-phenyl-3-(4-diethylaminostyryl)-5-(4-diethylaminophenyl)pyrazoline,
1-phenyl-3-(4-dimethylaminostyryl)-5-(4-dimethylaminophenyl)pyrazoline
(4) diphenylmethane compounds:
2,2'-dimethyl-4,4'-bis(diethylamino)triphenylmethane,
1,1-bis(4-dibenzylaminophenyl)propane,
tris(4-diethylaminophenyl)methane
(5) fluorene compounds:
9-(4-dimethylaminobenzylidene)fluorene,
3-(9-fluorenylidene)-9-ethylcarbazole
(6) styrylanthracene compounds:
9-(4-diethylaminostyryl)anthracene,
9-bromo-10-(4-diethylaminostyryl)anthracene
(7) distyrylbenzene compounds:
1,2-bis(4-diethylaminostyryl)benzene,
1,2-bis(2,4-dimethoxystyryl)benzene
(8) hydrazone compounds:
9-ethylcarbazole-3-aldehyde 1-methyl-1-phenylhydrazone,
9-ethylcarbazole-3-aldehyde 1-benzyl-1-phenylhydrazone,
4-diethylaminobenzaldehyde 1,1-diphenylhydrazone,
2,4-dimethoxybenzaldehyde 1-benzyl-1-phenylhydrazone,
4-diphenylaminobenzaldehyde 1-methyl-1-phenylhydrazone,
(9) stilbene compounds:
4-diphenylaminostilbene,
4-dibenzylaminostilbene,
4-ditolylaminostilbene
(10) styrylnaphthalene compounds:
1-(4-diphenylaminostyryl)naphthalene,
1-(4-dibenzylaminostyryl)naphthalene
(11) α-phenylstilbene compounds:
4'-diphenylamino-α-phenylstilbene,
4'-methylphenylamino-α-phenylstilbene
(12) styrylcarbazole compounds:
3-styryl-9-ethylcarbazole,
3-(4-diethylamino)styryl-9-ethylcarbazole Specific examples of an electron transporting material for use in the present invention are, for example, chloranil, bromanil, tetracyanoethylene, tetracyanoquinonedimethane, 2,4,7-trinitro-9-fluorenone, 2,4,5,7-tetranitro-9-fluorenone, 2,4,5,7-tetranitroxanthone, 2,4,8-trinitrothioxanthone, 2,6,8-trinitro-4H-indeno[2,4-b]thiophene-4-one, and 1,3,7-trinitrodibenzothiophene-5,5-dioxide.

The alkali-soluble resin employed in the charge transport layer 4 is such a resin that is soluble in an aqueous or alcoholic solvent containing an alkali. In view of the object of the present invention, it is necessary that the alkali-soluble resins for use in the present invention be excellent in the film formation property, electric properties, adhesion to the support material and the above mentioned alkali-solubility.

Appropriate alkali-soluble resins for use in the present invention are, for example, styrene-maleic anhydride copolymer, styrene-methacrylic acid-methacrylate copolymer, methacrylic acid-methacrylate copolymer, and phenolic resin.

As the phenolic rein, novolak-type resins are suitable for use in the present invention, which are prepared by condensation under an acidic condition of at least phenol or a substituted phenol with an aldehyde derivative such as formaldehyde, acetaldehyde, acrolein, crotonaldehyde and furfural.

Examples of the substituted phenol for the above condensation are o-cresol, m-cresol, p-cresol, ethylphenol, isopropylphenol, t-butylphenol, t-amylphenol, hexylphenol, t-octylphenol, cyclohexylphenol, 3-methyl-4-chloro-6-t-butylphenol, isopropylcresol, t-butylcresol, t-amylcresol, hexylcresol, t-octylcresol and cyclohexylcresol.

As mentioned previously, the charge transport layer 4 comprises as the main components a charge transporting material and an alkali-soluble resin.

It is preferable that the content of the charge transporting material in the charge transport layer 4 be in the range of from 10 wt.% to 70 wt.%, more preferably in the range of from 20 wt.% to 60 wt.%.

When the content of the charge transporting material is less than 10 wt.%, charge transportation cannot be sufficiently effected for the object of the present invention, while when the content of the charge transporting material is more than 70 wt.%, the mechanical strength of the charge transport layer 4 decreases so much that it cannot be used in practice.

As to the thickness of the charge transport layer 4, it is preferable that the thickness be in the range of from 2 μm to 50 μm, more preferably in the range of from 3 μm to 20 μm. When the thickness is less than 2 μm, electric charging of the charge transport layer becomes insufficient for practical use, while when the thickness is more than 50 μm, the residual potential of the printing original plate increases too high for practical use and it takes too much time to use in practice to remove the non-image areas by dissolving.

To the charge transport layer 4, there can be added a plasticizer. Specific examples of such plasticizers for use in the charge transport layer 4 are, for example, phthalic acid esters such as dimethyl phthalate, diethyl phthalate and dibutyl phthalate, and glycol esters such as dimethyl glycol phthalate and ethyl phthalyl ethyl glycolate.

The above plasticizers can be added to the charge transport layer 4 in such an amount that it does not have adverse effects on the electrostatic properties and alkali-solubility of the photoconductive layer.

As the electroconductive support material 1 for use in the present invention, a support material having a hydrophilic surface layer is preferable for use. Examples of the material for such surface layer are aluminum plate, zinc plate, bimetal plate such as copper-aluminum plate, copper-stainless steel plate, chrome-copper plate, trimetal plate such as chrome-copper-aluminum plate, chrome-lead-iron plate, and chrome-copper-stainless steel plate. It is preferable that the thickness of the plate be in the range of from 0.1 mm to 1 mm.

When a support material having a surface layer made of aluminum is employed, it is preferable that the aluminum surface layer be treated by graining, immersing the surface into an aqueous solution of sodium silicate, potassium fluorozirconate or phosphate, or subjecting the surface to anodic oxidation.

As disclosed in U.S. Pat. No. 2,714,066, an aluminum plate which is grained and immersed into an aqueous solution of sodium silicate is preferable for use. Furthermore, an aluminum plate which is treated by anodic oxidation and then by immersing into an aqueous solution of an alkali metal silicate is also preferable for use as disclosed in Japanese Laid-open Patent Application No. 47-5125.

The above mentioned anodic oxidation is carried out by causing electric current to flow through an electrolyte solution of an inorganic acid, such as phosphoric acid, chromic acid, sulfuric acid or boric acid, or an organic acid such as oxalic acid or sulfamic acid, or a salt of any of the above acids, using an aluminum plate as anode.

When preparing an electrophotographic printing original plate according to the present invention, one of the azo pigments having the previously described formulas (1) through (44) is uniformly dispersed in a dispersing apparatus such as a ball mill or an ultrasonic dispersing apparatus, if necessary, with addition of a binder agent thereto, together with an organic solvent such as tetrahydrofuran, dioxane, dimethylformamide, acetone, methyl ethyl ketone, ethylene glycol monomethyl ether, ethylene glycol monoethyl ether, ethyl acetate, butyl acetate, toluene, or a halogenated hydrocarbon, to prepare a charge generation layer formation liquid. The charge generation layer formation liquid is then coated on the previously mentioned electroconductive support material 1 and dried, whereby a charge generation layer 3 is formed on the electroconductive support material 1.

Likewise, a charge transport layer formation liquid is prepared by dispersing a charge transporting material, an alkali-soluble resin together with one of the above mentioned organic solvents. The charge transport layer formation liquid is coated on the charge generation layer 3 and dried, whereby a charge transport layer 4 is formed on the charge generation layer 3. Thus, a printing original plate according to the present invention is prepared.

Printing plate making according to the present invention is performed as follows.

Figure 2:
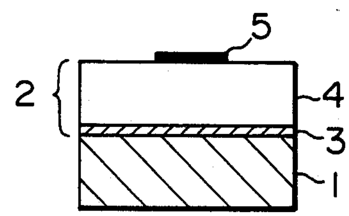

First, the above prepared printing original plate is electrically charged uniformly in the dark by a corona charger. The thus uniformly charged printing original plate is then exposed to an optical image, for instance, by being exposed to a reflected image formed by use of a light source such as a tungsten lamp, a halogen lamp, a xenon lamp or a fluorescent lamp, or through a positive film which is in close contact with the printing original plate and which is exposed to light, or by He-Ne laser, argon laser or semi-conductor laser, whereby a latent electrostatic image is formed on the printing original plate exactly in the same manner as in electrophotographic image formation. The thus formed latent electrostatic image is developed with toner and the developed toner image is fixed to the electrophotographic photosensitive layer by application of heat as illustrated in FIG. 2.

Figure 3:
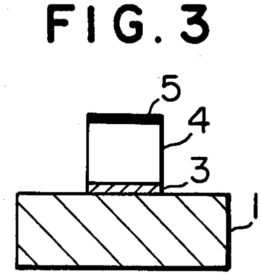

The toner-image-bearing printing original plate is then immersed in an alkaline dissolving liquid. By this immersing process, the electrophotographic photosensitive portions (including the charge generation layer 3 and the charge transport layer 4) corresponding to the non-image areas, which are not covered by the toner image, are dissolved in the alkaline dissolving liquid and removed therefrom. As a result, the hydrophilic surface of the electroconductive support material 1 is exposed and the toner image portion is left, whereby a printing plate as shown in FIG. 3 can be prepared.

As the dissolving liquid in the above, an alkaline aqueous solution of an inorganic salt such as sodium silicate, sodium phosphate, sodium carbonate, an aqueous solution of sodium hydroxide, an aqueous alkali solution containing an organic amine such as triethanolamine, ethylenediamine, and an aqueous alkali solution containing or organic solvent or surfactant such as ethanol, benzyl alcohol, ethylene glycol and glycerine in addition to the above organic amine, can be employed.

In the printing original plate according to the present invention, the non-image areas are dissolved in the above dissolving liquid and removed after formation of toner images on the printing original plate. Therefore, it is preferable that the toner contain a resin component having resisting properties. As such resin component, any resin can be employed, if it is insoluble in the dissolving liquid. Examples of such resin are acrylic resin made of methacrylic acid or methacrylic acid ester, vinyl acetate resin, vinyl acetate-ethylene copolymer, vinyl acetate-vinyl chloride copolymer, polyvinyl chloride, vinylidene chloride resin, vinyl acetal resin such as polyvinyl butyral, polystyrene, styrene-butadiene copolymer, styrene-methacrylic acid ester copolymer, polyethylene, polypropylene, polypropylene chloride, polycarbonate, polyester resin, polyamide resin, phenolic resin, xylene resin, alkyd resin, wax and polyolefin.

In order to increase the solubility of the electrophotographic photosensitive layer in the dissolving liquid by overall exposure to light after toner image formation, a quinone diazide compound such as o-naphthoquinone diazide, or a diazide compound can be added to the electrophotographic photosensitive layer in an effective amount.

In the present invention, the non-image areas of the printing plate consist of an exposed electroconductive support material having a hydrophilic surface, and the image areas are covered with an oleophilic toner. Therefore, in an ordinary lithography, an oil ink is deposited only on the image areas, so that clear printing with clear background can be obtained.

The printing original plate according to the present invention has higher photosensitivity as compared conventional printing original plates and therefore can be subjected to direct plate making by a variety of light sources such as He-Ne laser and semi-conductor laser. The thus prepared printing plate has excellent printing durability.

Specific examples of the azo pigments having the formulas (1) through (44) are as follows:

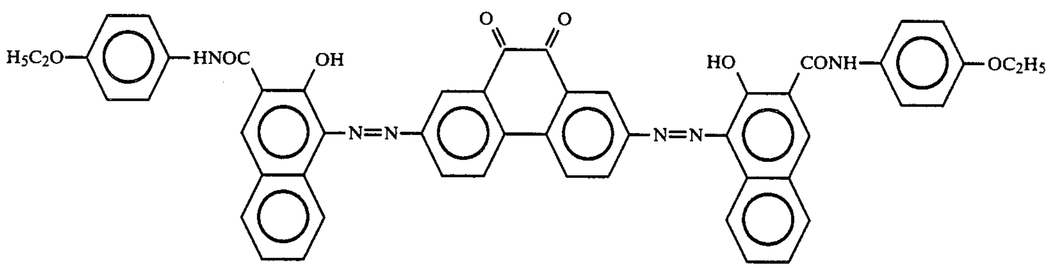

(1)-1

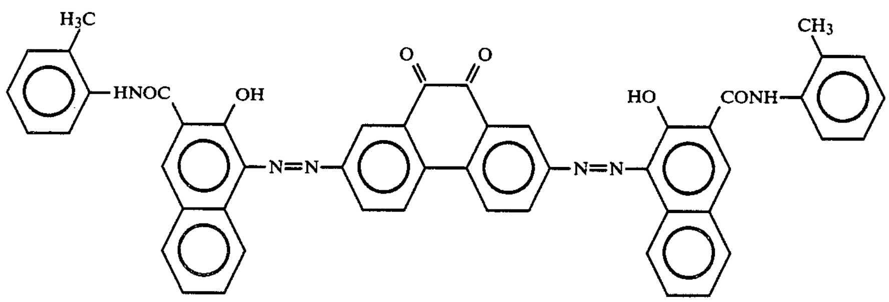

(1)-2

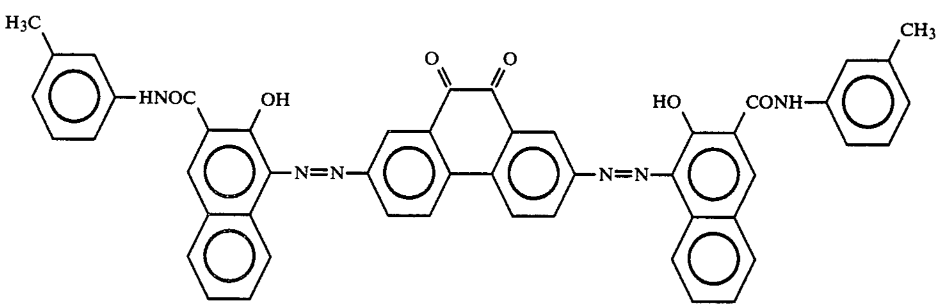

(1)-3

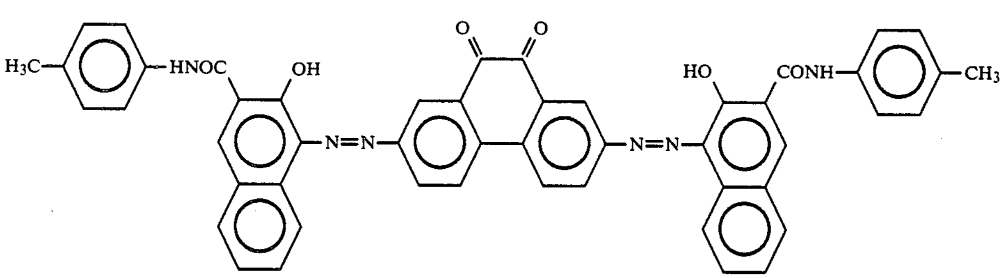

(1)-4

-continued
(1)-5
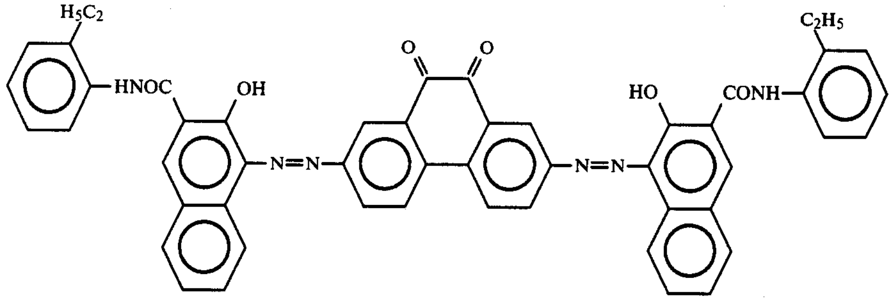
(1)-6
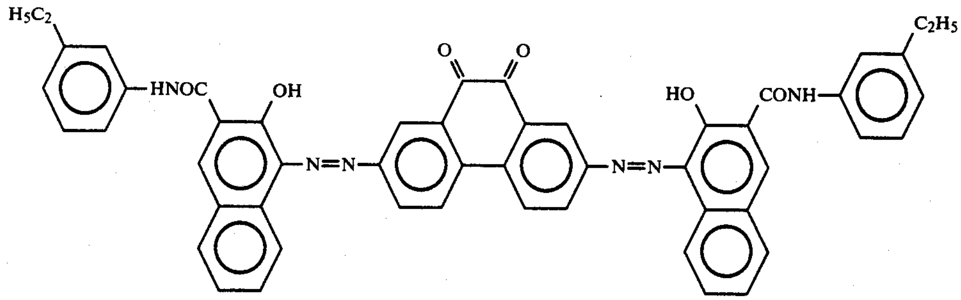
(1)-7
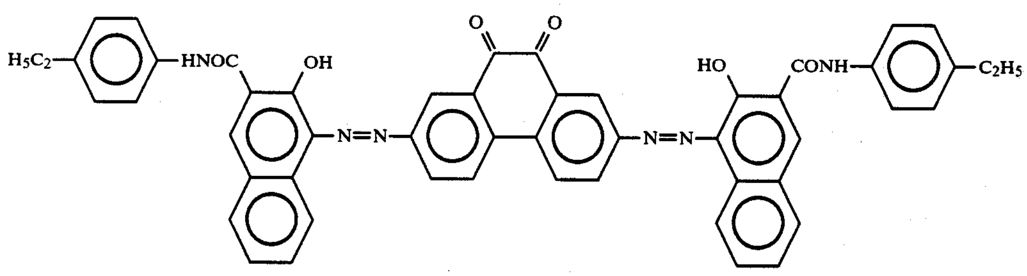
(1)-8
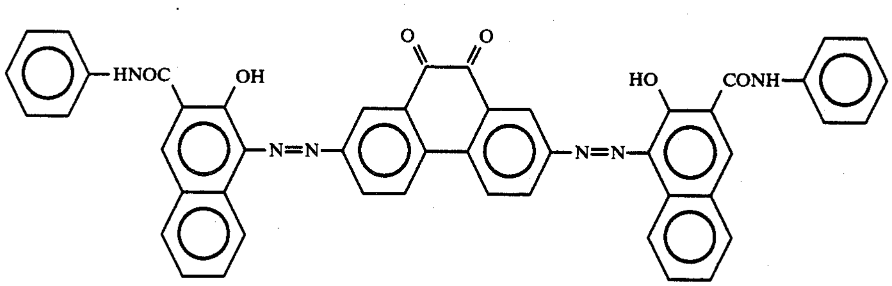
(1)-9
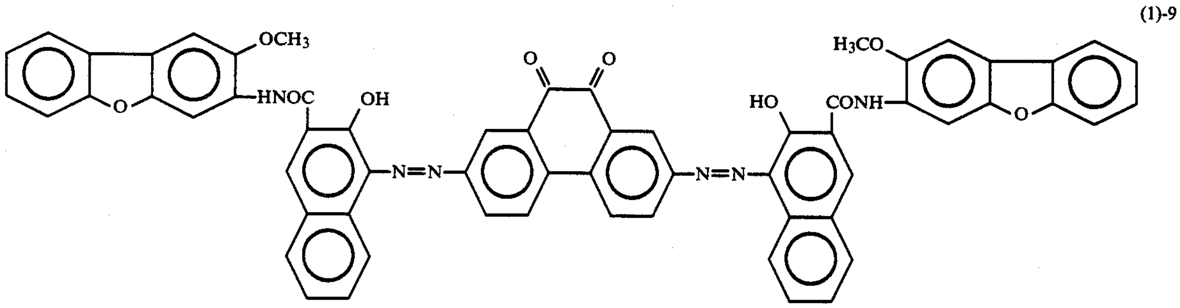

-continued
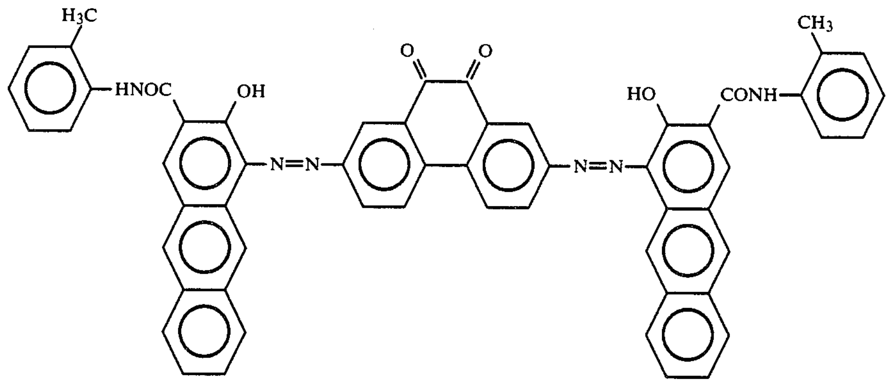
(1)-10
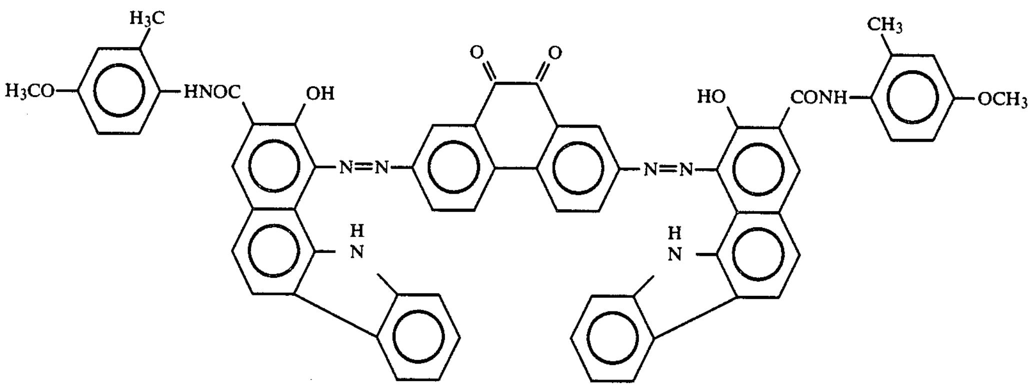
(1)-11
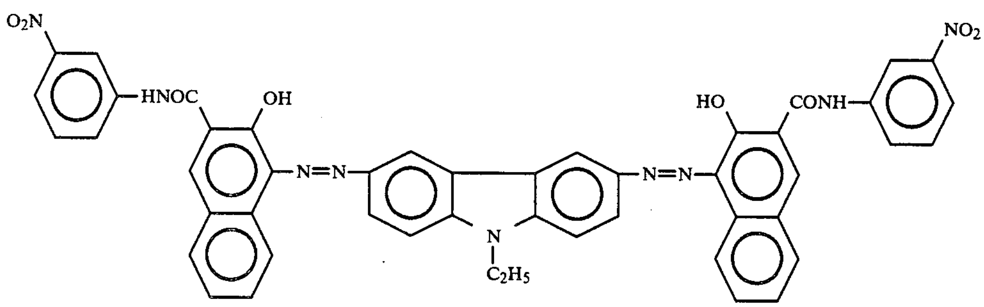
(2)-1
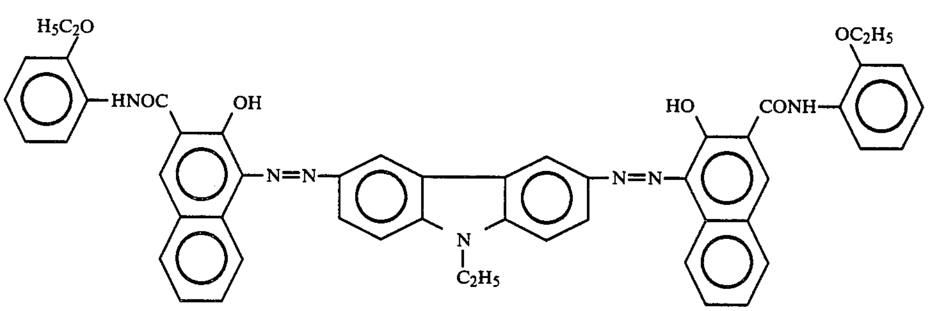
(2)-2
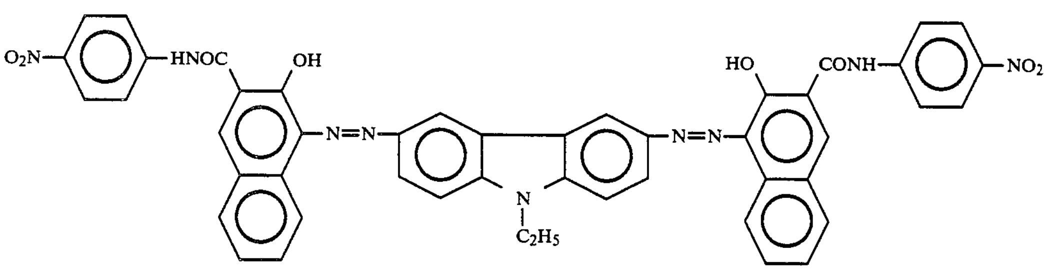
(2)-3

-continued
(2)-4
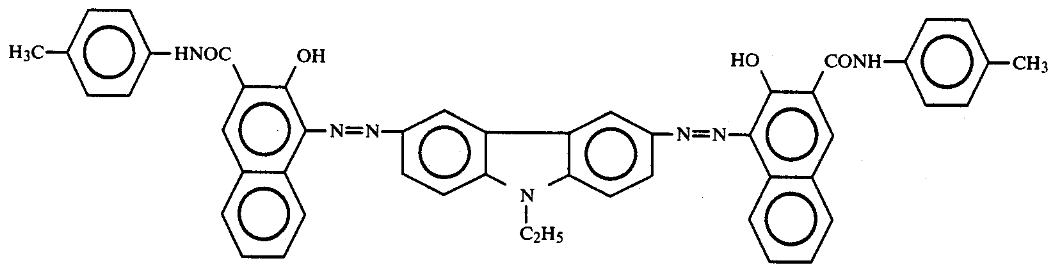
(2)-5
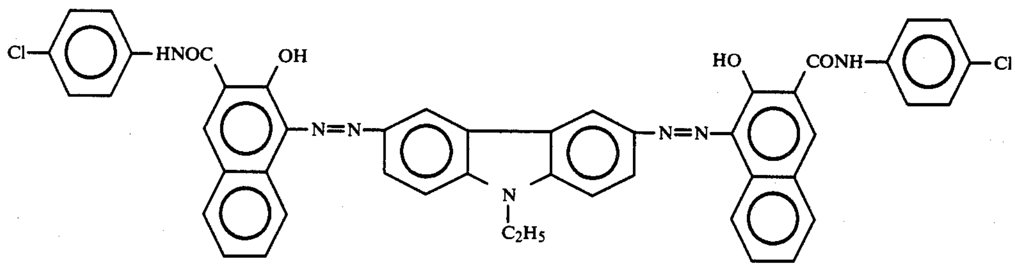
(2)-6
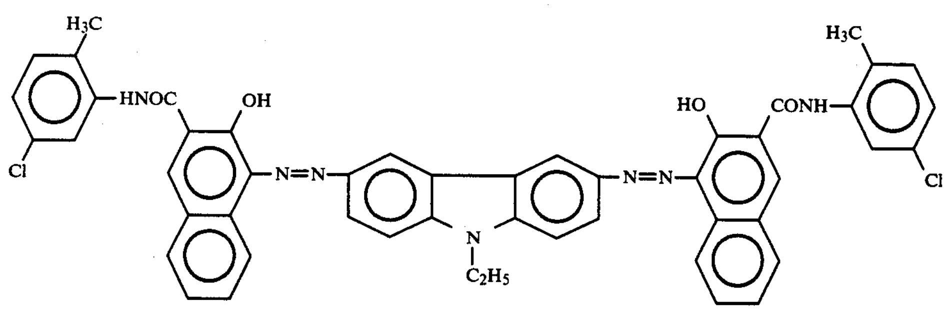
(2)-7
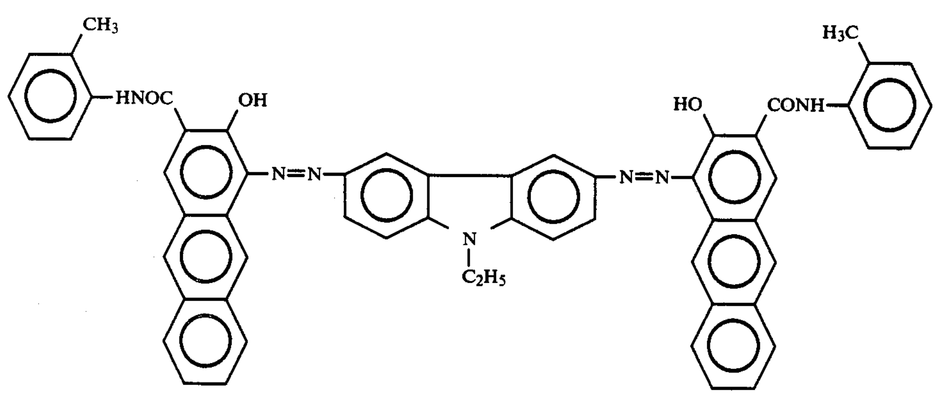
(2)-8
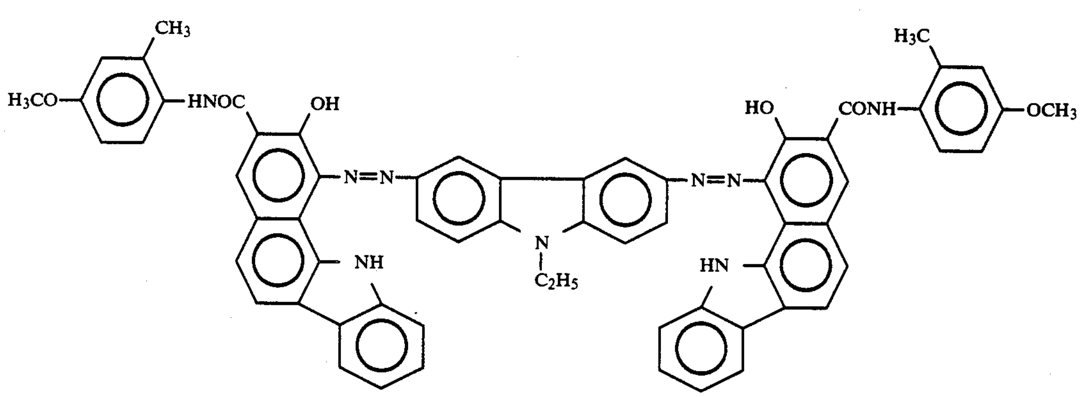

-continued
(2)-9
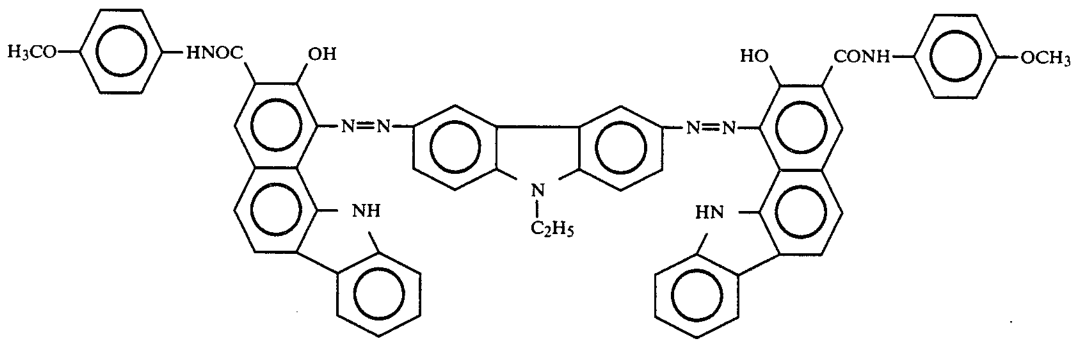
(2)-10
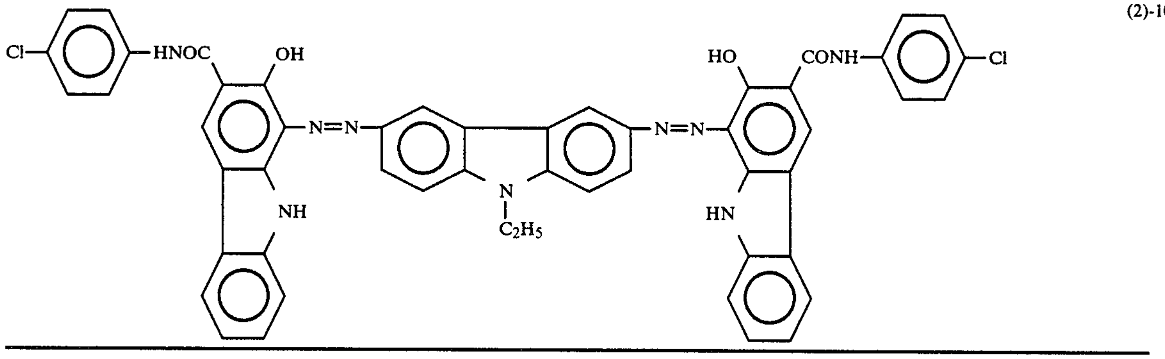
(3)
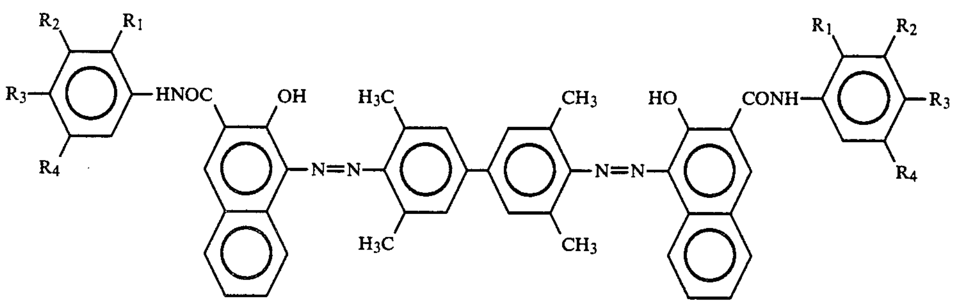
| No. | $R_1$ | $R_2$ | $R_3$ | $R_4$ |
|---|---|---|---|---|
| (3)-1 | H | H | H | H |
| (3)-2 | $OCH_3$ | H | H | H |
| (3)-3 | H | $OCH_3$ | H | H |
| (3)-4 | H | H | $OCH_3$ | H |
| (3)-5 | $CH_3$ | H | H | H |
| (3)-6 | H | $CH_3$ | H | H |
| (3)-7 | H | H | $CH_3$ | H |
| (3)-8 | Cl | H | H | H |
| (3)-9 | H | Cl | H | H |
| (3)-10 | H | H | Cl | H |
| (3)-11 | $NO_2$ | H | H | H |
| (3)-12 | H | $NO_2$ | H | H |
| (3)-13 | H | H | $NO_2$ | H |
| (3)-14 | $OCH_3$ | H | H | $OCH_3$ |
| (3)-15 | $CH_3$ | H | Cl | H |

-continued
(3)-16
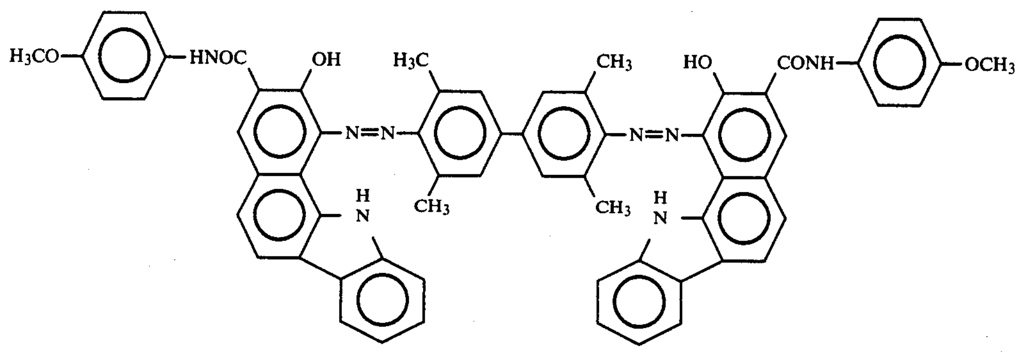
(4)-1
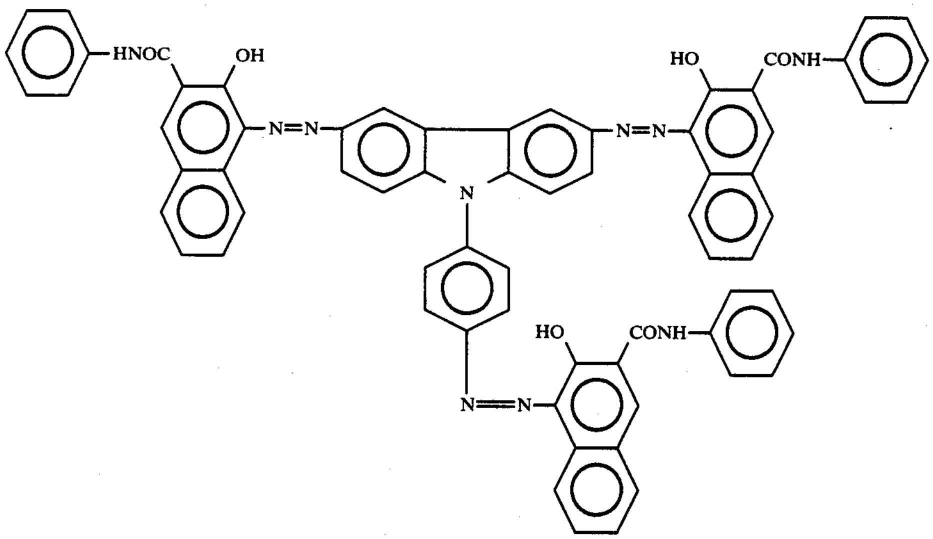
(4)-2
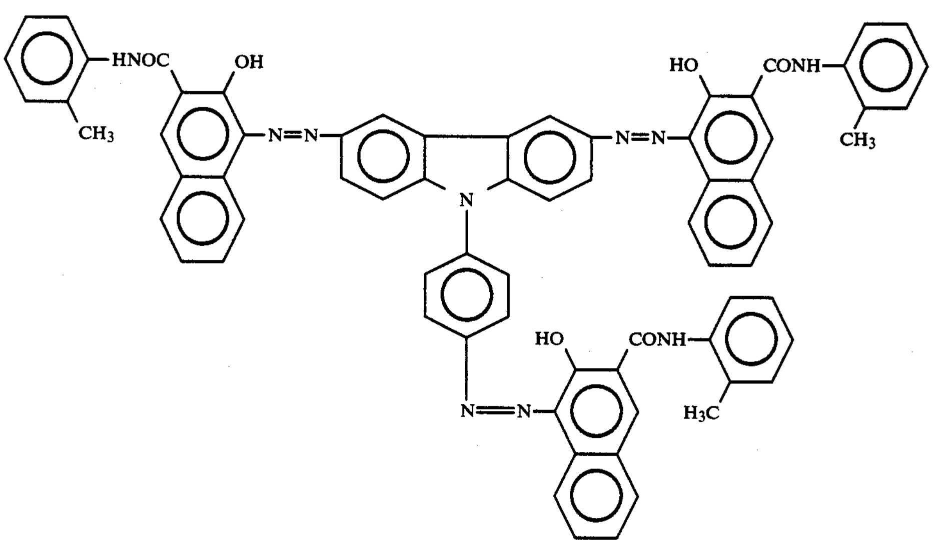

-continued
(4)-3
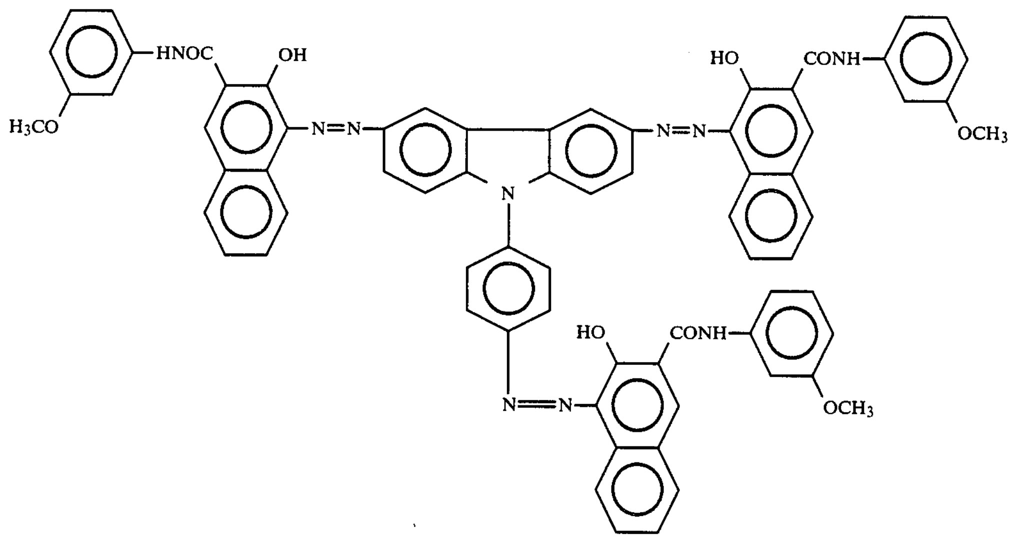
(4)-4
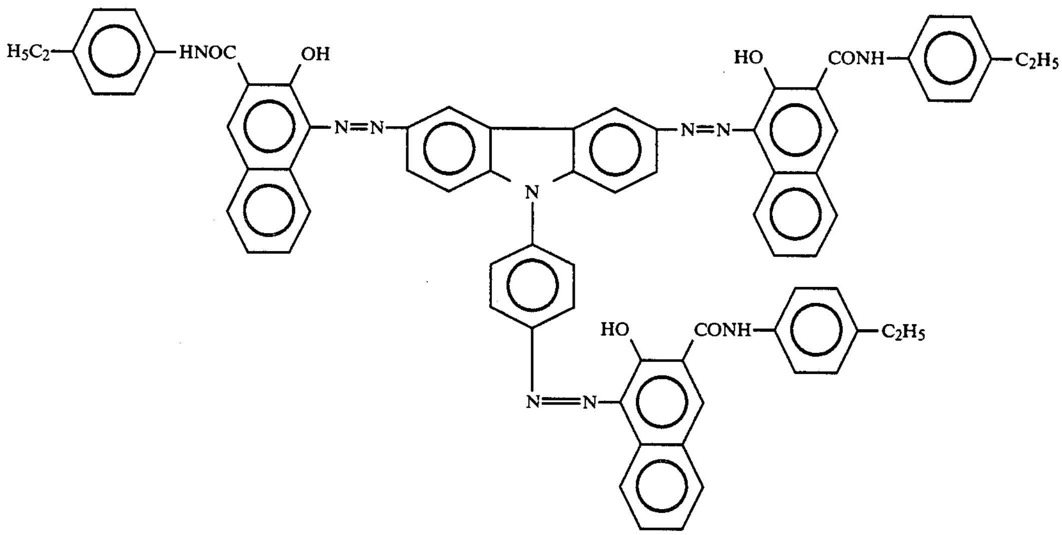
(4)-5
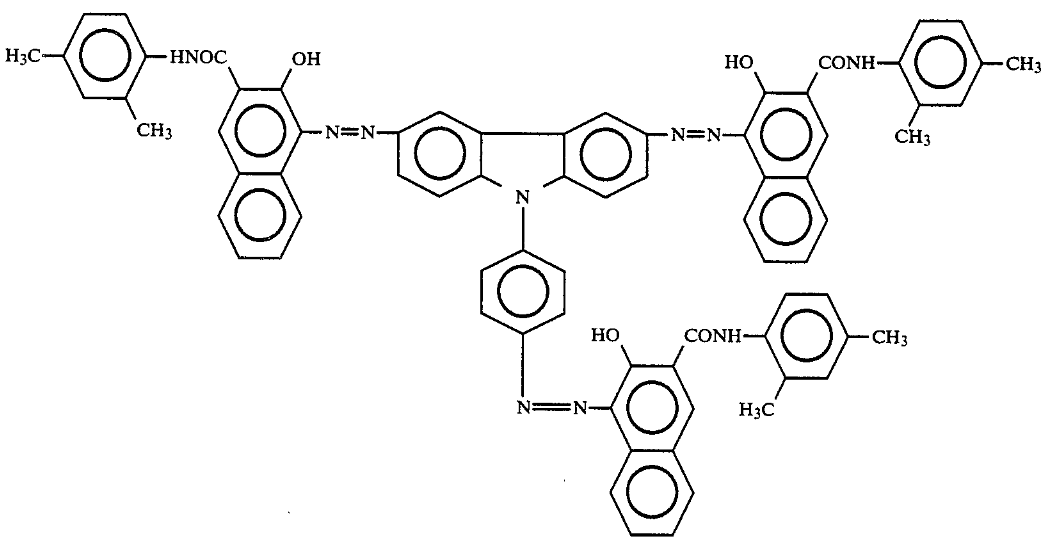

-continued
(4)-6
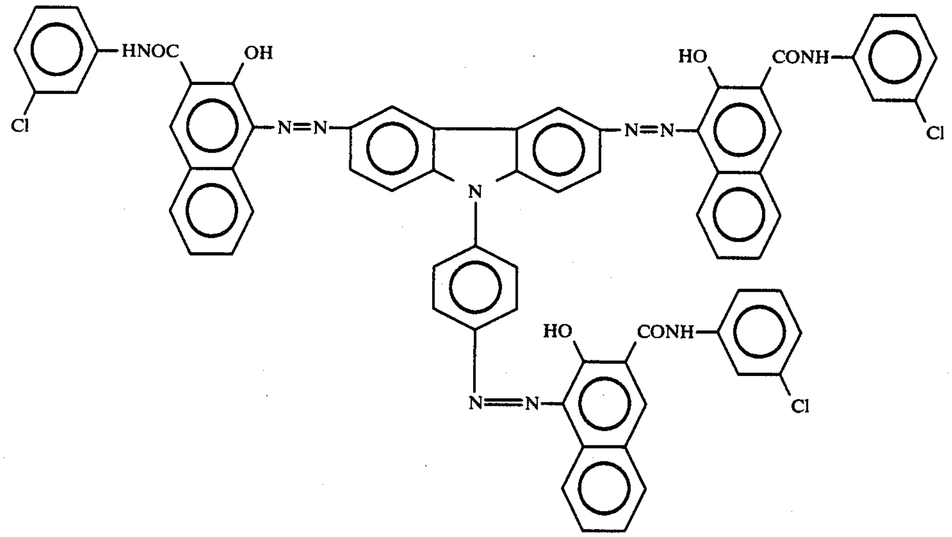
(4)-7
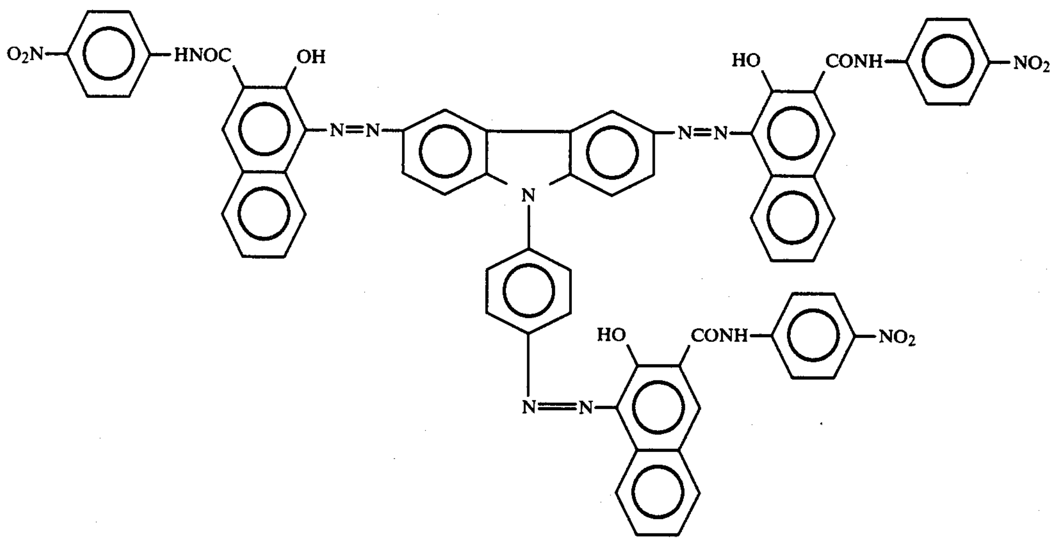
(4)-8
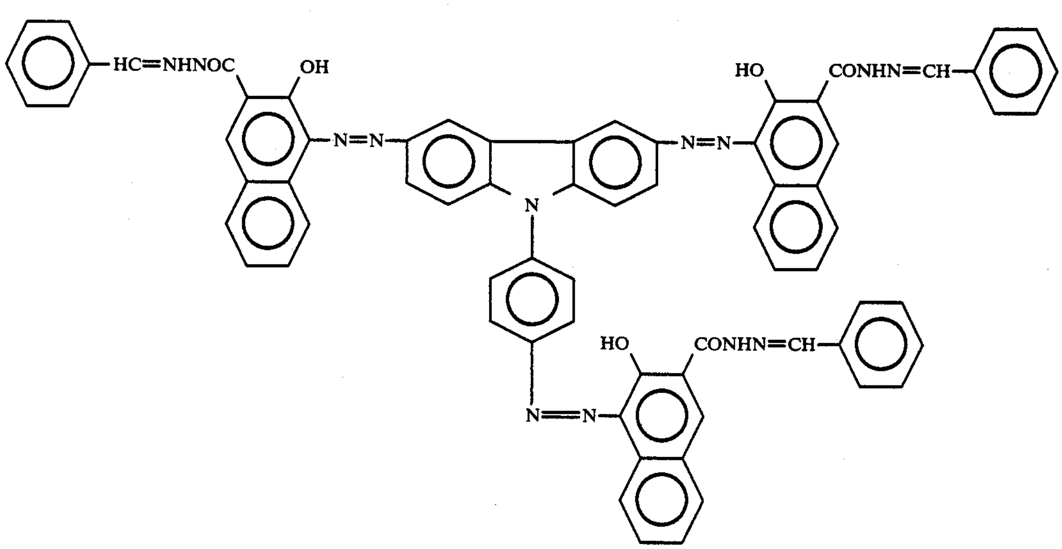

-continued
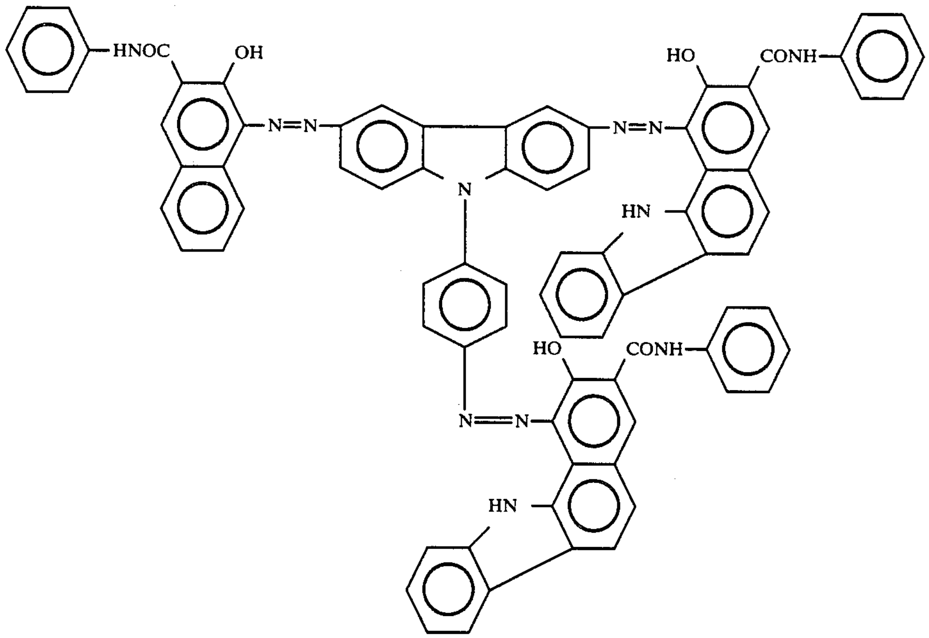
(4)-9
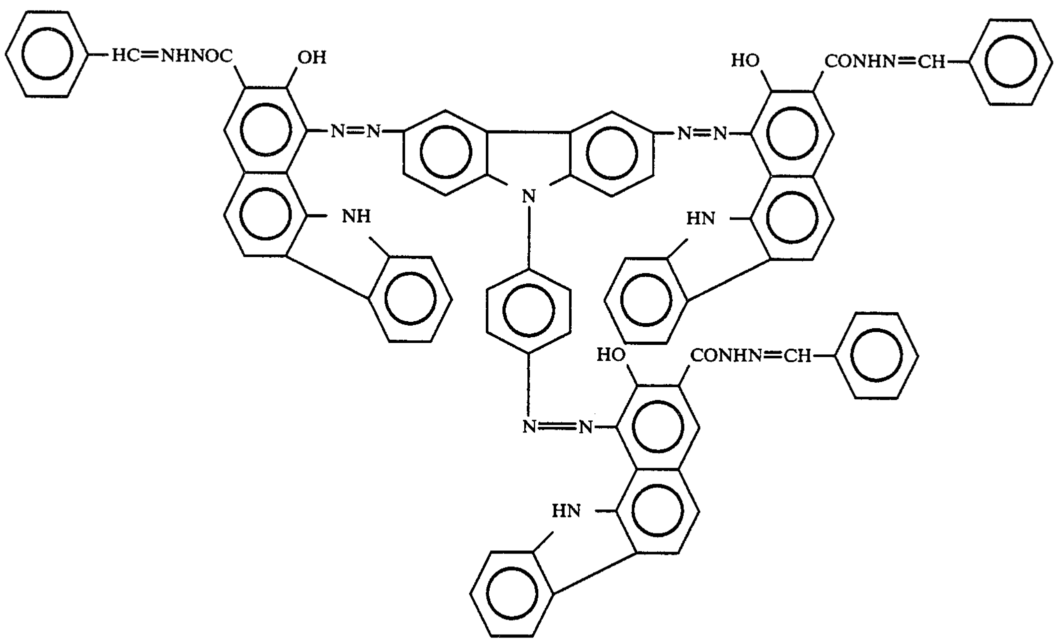
(4)-10

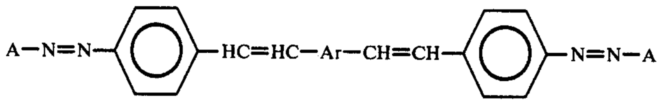
(5)
| Ar | A | | Ar | A | |
|---|---|---|---|---|---|
| 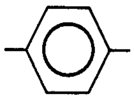 | 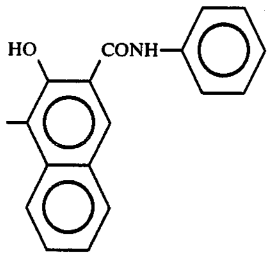 | (5)-1 | 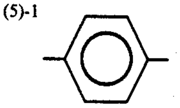 | 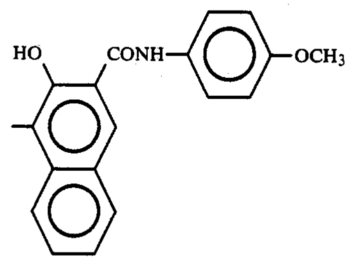 | (5)-2 |
| 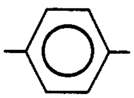 | 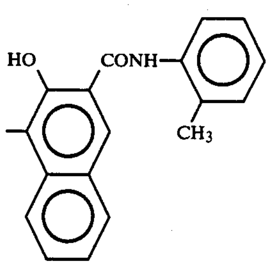 | (5)-3 | 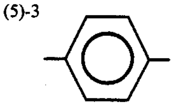 | 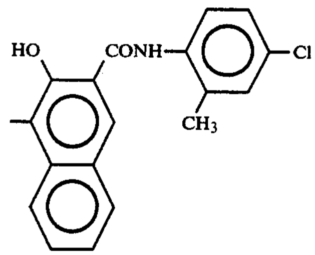 | (5)-4 |
| 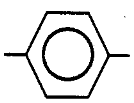 | 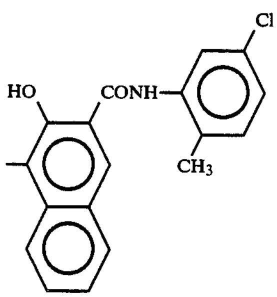 | (5)-5 | 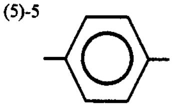 | 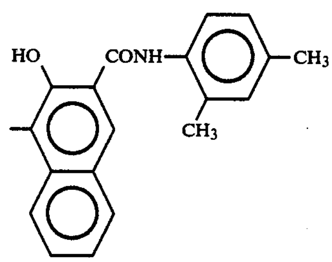 | (5)-6 |
| 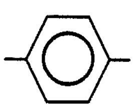 | 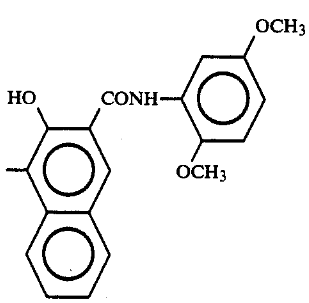 | (5)-7 | 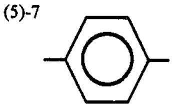 | 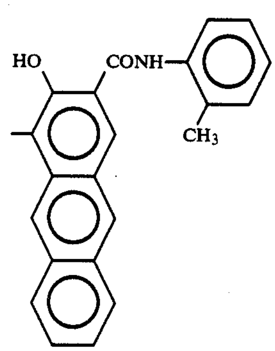 | (5)-8 |

-continued
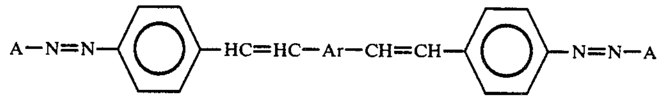
(5)
| Ar | A | | Ar | A | |
|---|---|---|---|---|---|
| 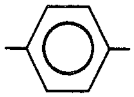 | 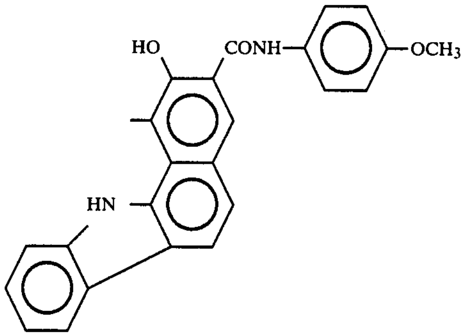 | | | | (5)-9 |
| 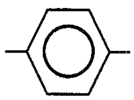 | 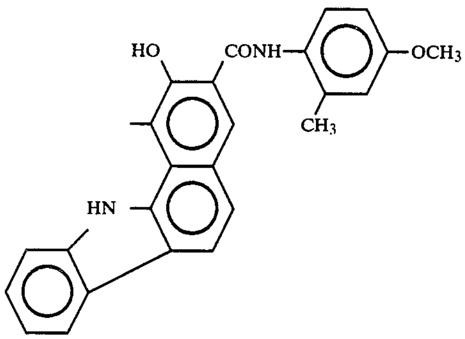 | | | | (5)-10 |
| 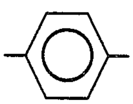 | 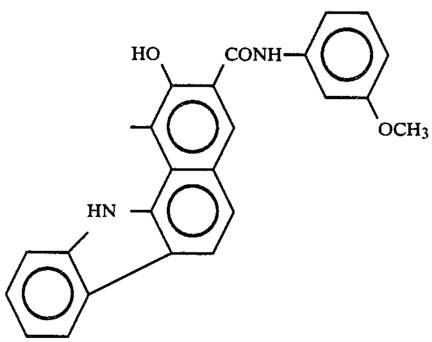 | | | | (5)-11 |
| 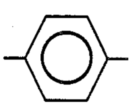 | 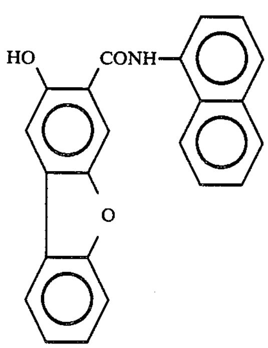 | (5)-12 | 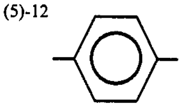 | 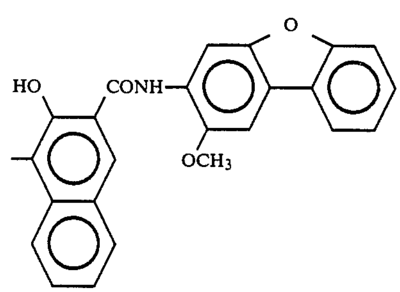 | (5)-13 |

-continued
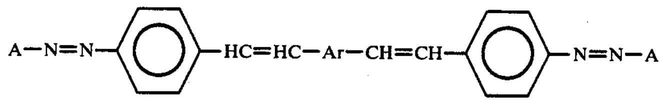
(5)
| Ar | A | | Ar | A | |
|---|---|---|---|---|---|
| 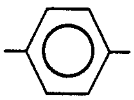 | 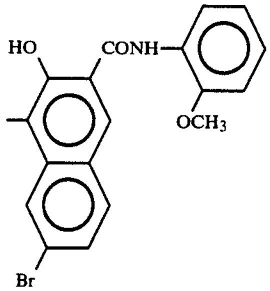 | (5)-14 | 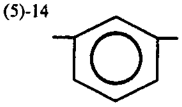 | 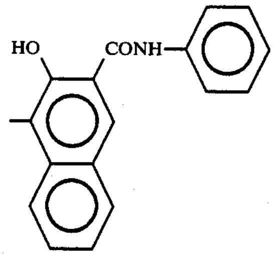 | (5)-15 |
| 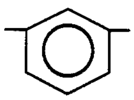 | 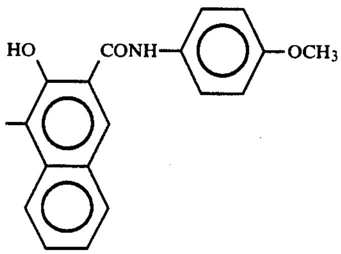 | (5)-16 | 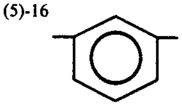 | 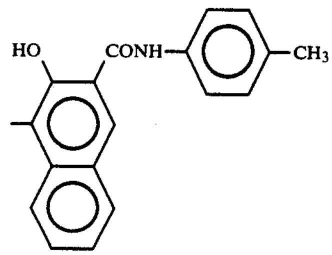 | (5)-17 |
| 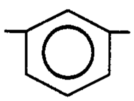 | 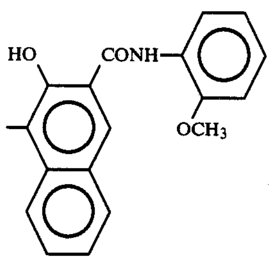 | (5)-18 | 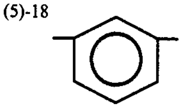 | 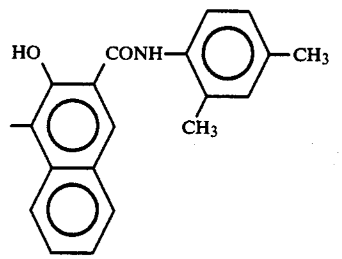 | (5)-19 |
| 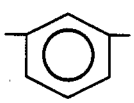 | 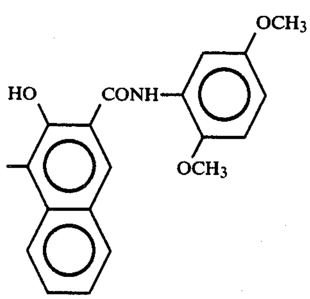 | (5)-20 | 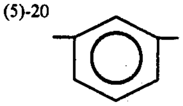 | 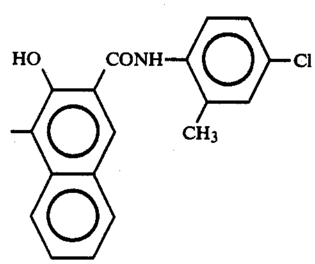 | (5)-21 |
| 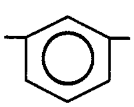 | 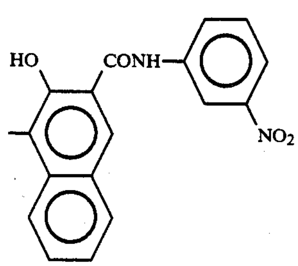 | (5)-22 | 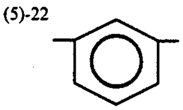 | 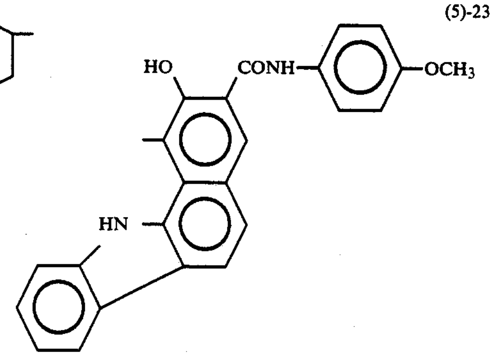 | (5)-23 |

-continued
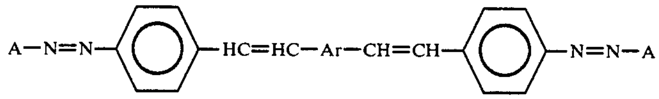
(5)
| Ar | A | | Ar | A | |
|---|---|---|---|---|---|
| 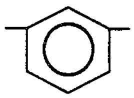 | 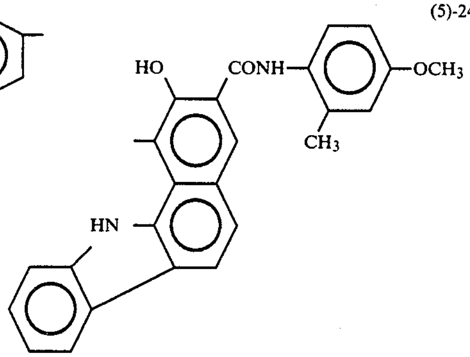 | (5)-24 | 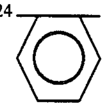 | 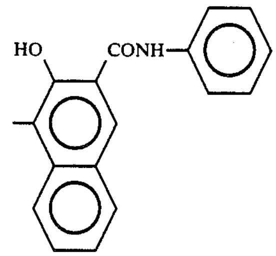 | (5)-25 |
| 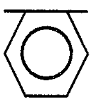 | 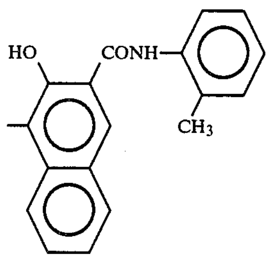 | (5)-26 | 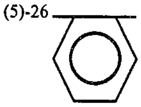 | 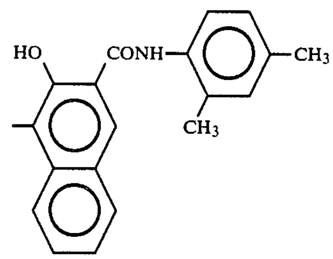 | (5)-27 |
| 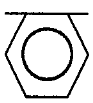 | 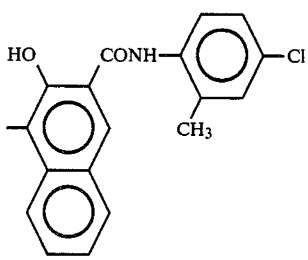 | (5)-28 | 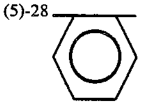 | 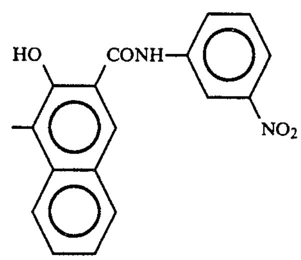 | (5)-29 |
| 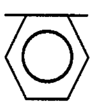 | 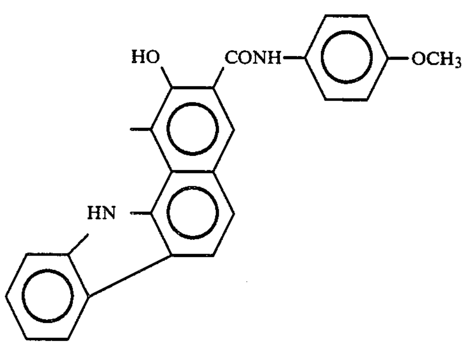 | | | | (5)-30 |
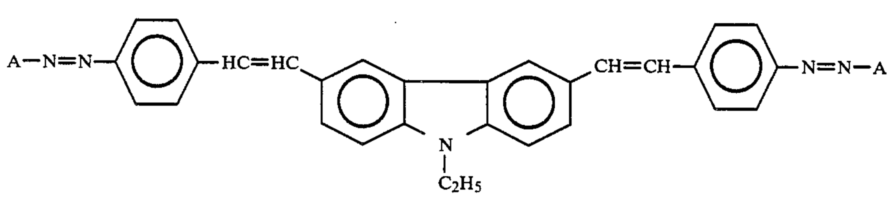
(6)

-continued
Hereinafter, only the moiety A in the above formula is shown.
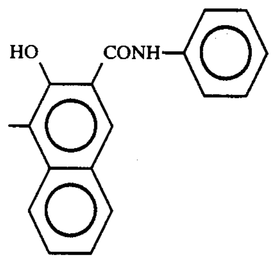
(6)-1
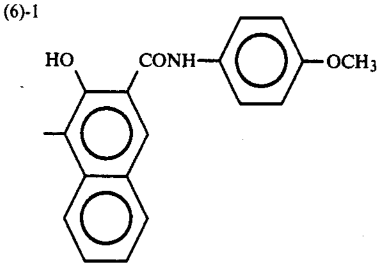
(6)-2
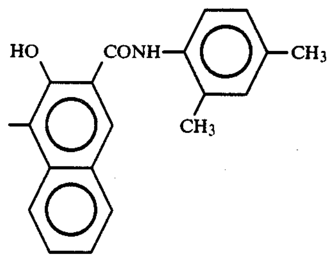
(6)-3
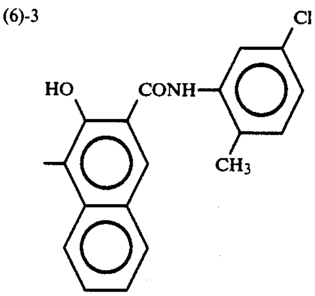
(6)-4
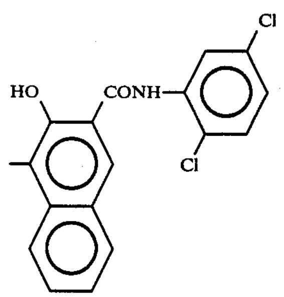
(6)-5
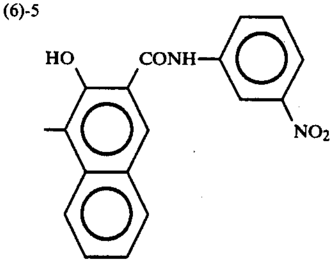
(6)-6
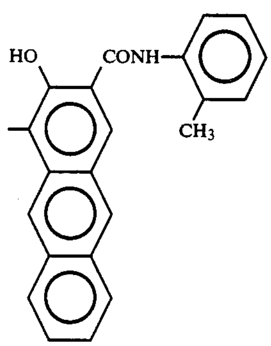
(6)-7
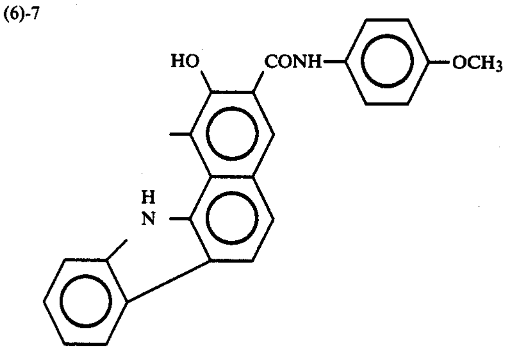
(6)-8
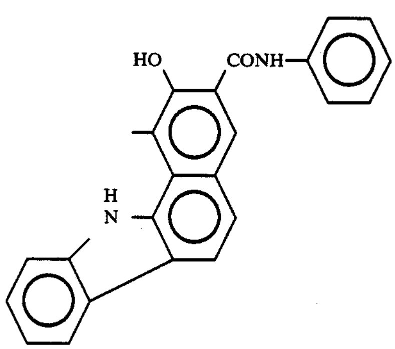
(6)-9
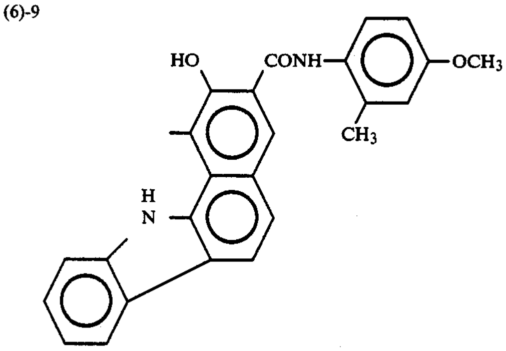
(6)-10

-continued
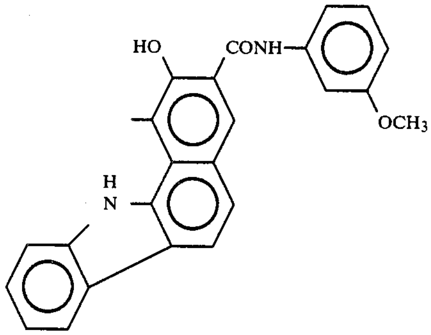
(6)-11
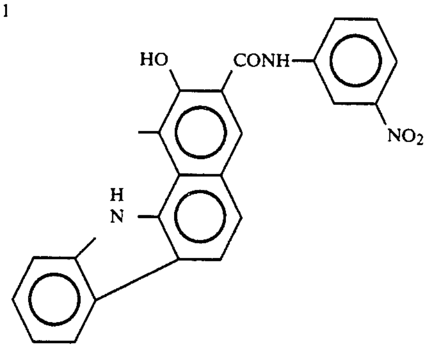
(6)-12
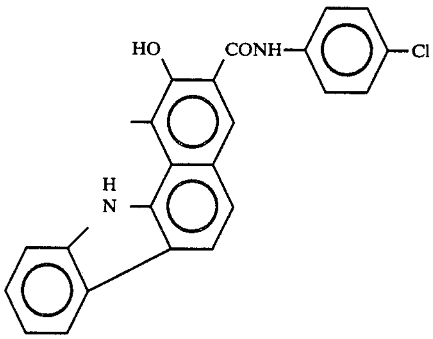
(6)-13
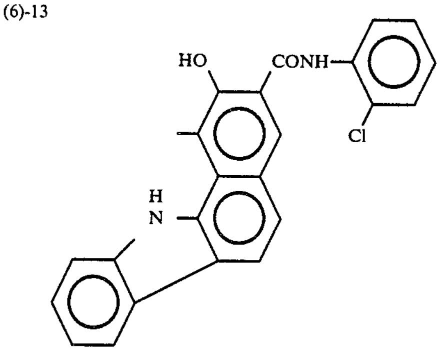
(6)-14
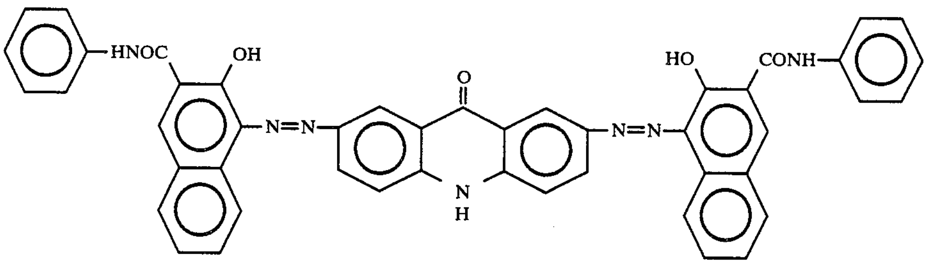
(7)-1
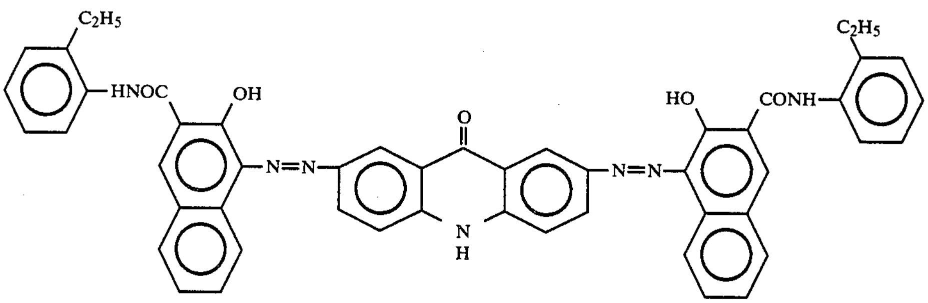
(7)-2
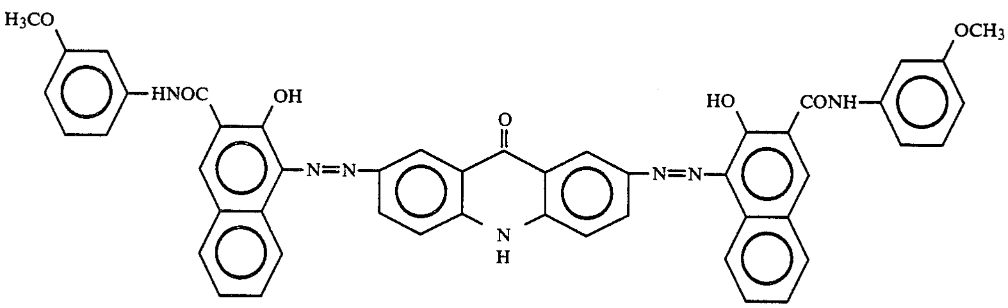
(7)-3

-continued
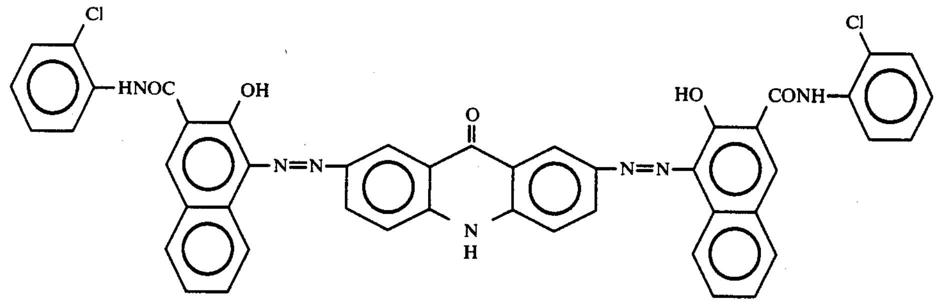
(7)-4
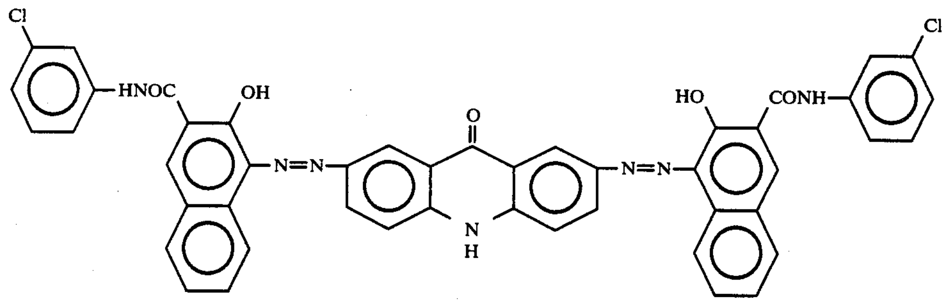
(7)-5
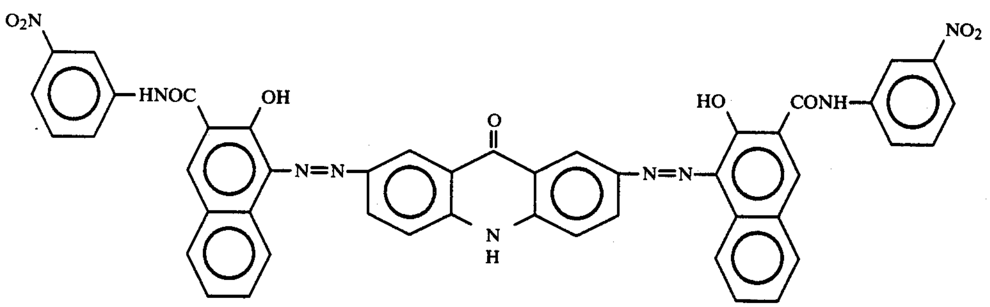
(7)-6
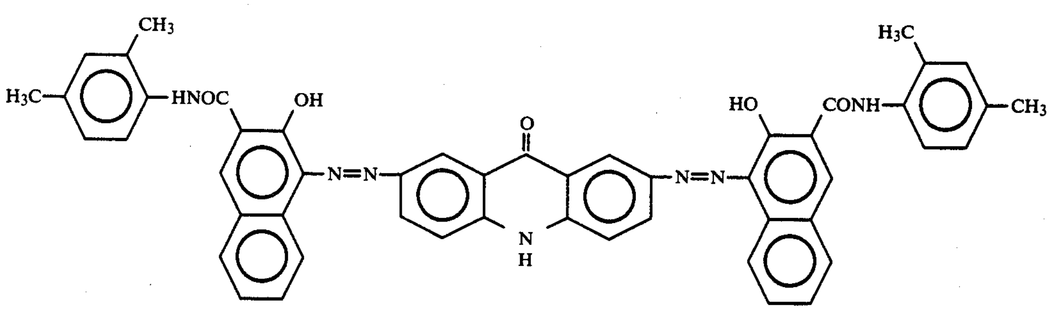
(7)-7
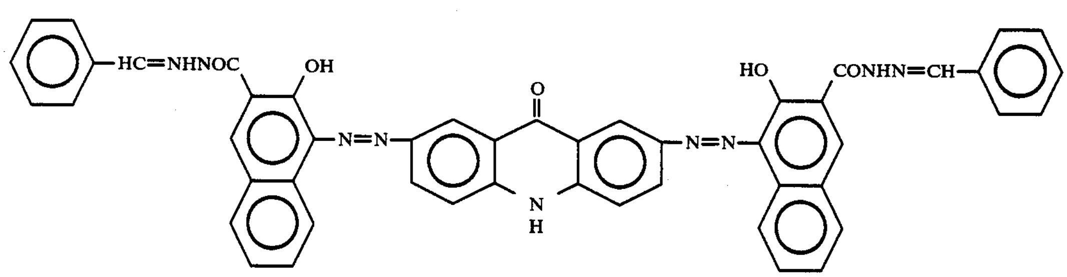
(7)-8

-continued
(7)-9
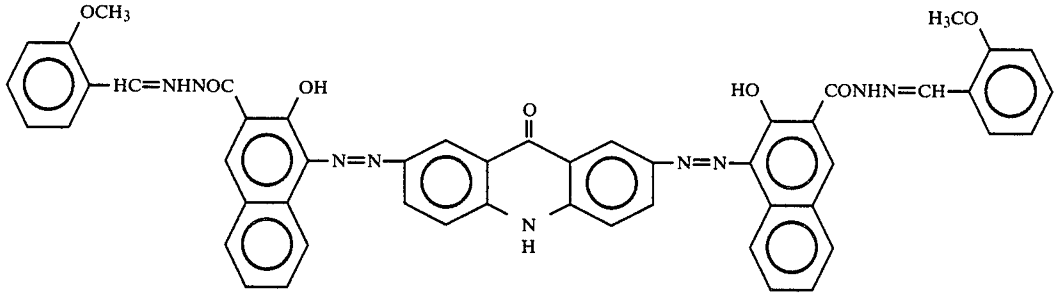
(7)-10
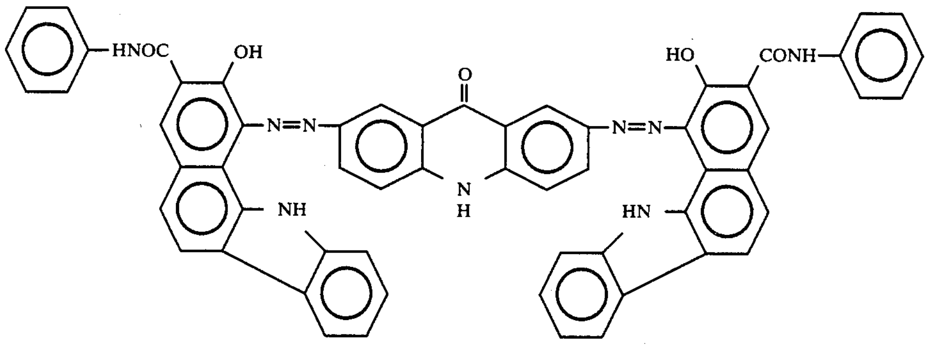
(7)-11
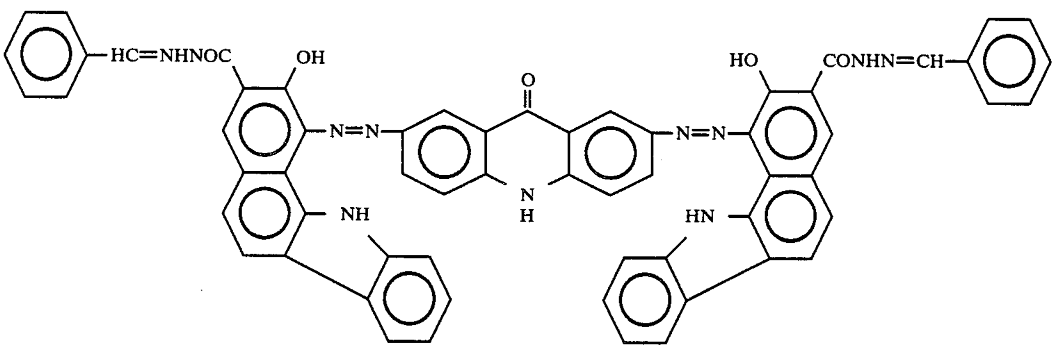
(8)
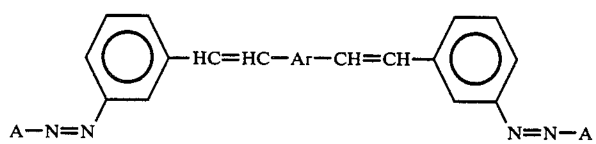
| Ar | A | Ar | A |
|---|---|---|---|
| 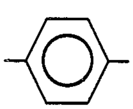 | 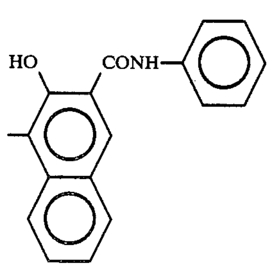 (8)-1 | 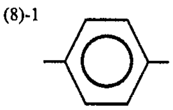 | 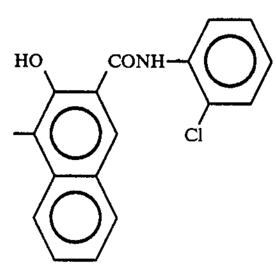 (8)-2 |

-continued
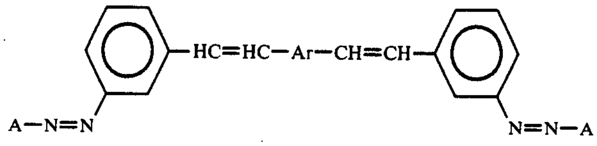
(8)
| Ar / A | | Ar / A | |
|---|---|---|---|
| 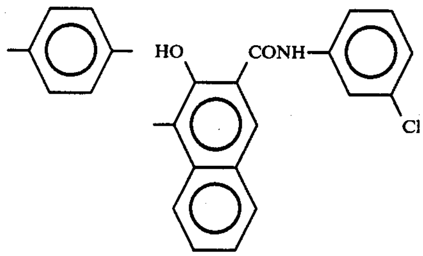 | (8)-3 | 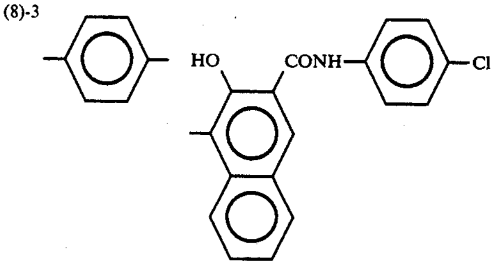 | (8)-4 |
| 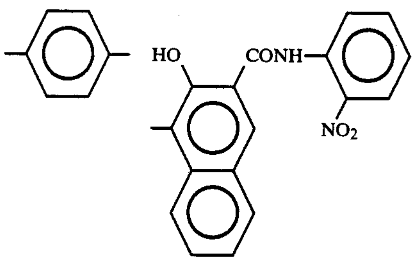 | (8)-5 | 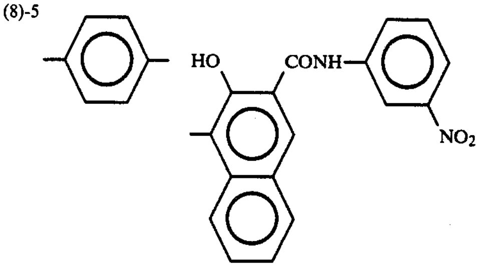 | (8)-6 |
| 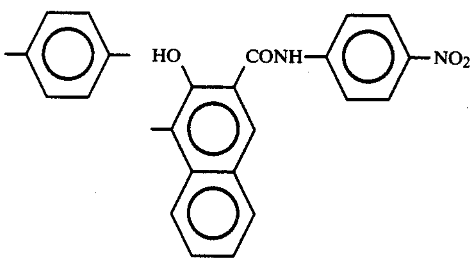 | (8)-7 | 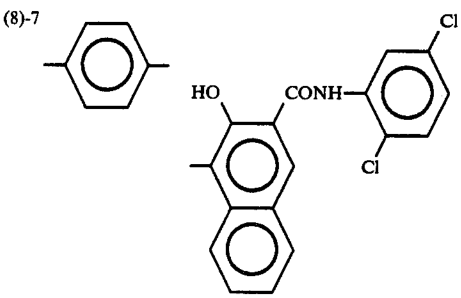 | (8)-8 |
| 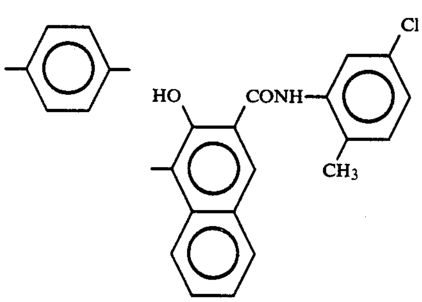 | (8)-9 | 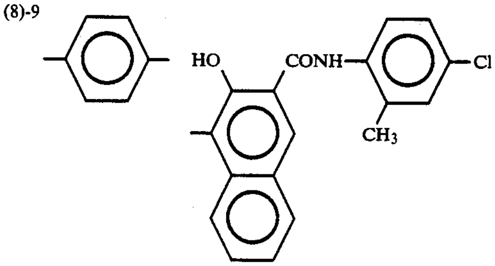 | (8)-10 |

-continued
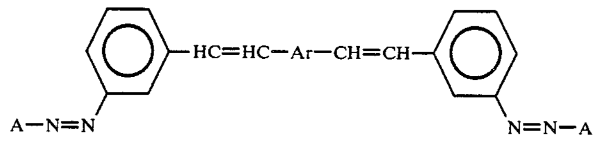
(8)
| Ar | A | | Ar | A | |
|---|---|---|---|---|---|
| 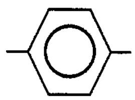 | 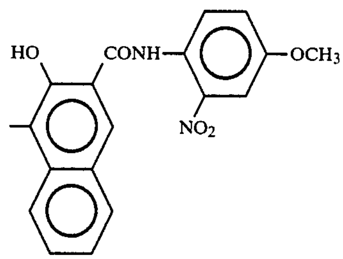 | (8)-11 | 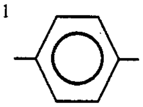 | 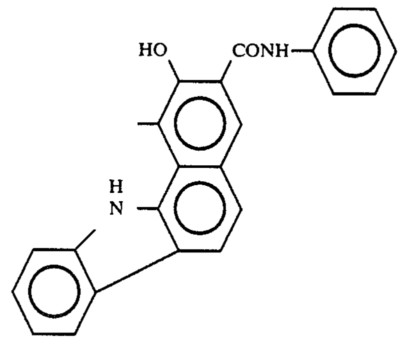 | (8)-12 |
| 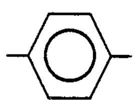 | 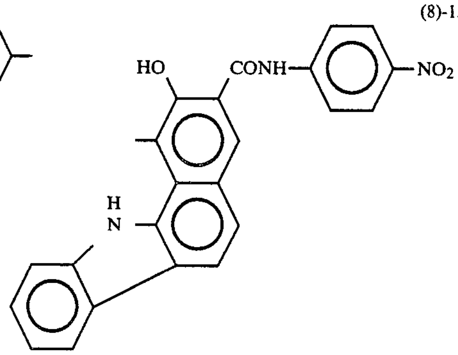 | (8)-13 | 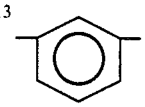 | 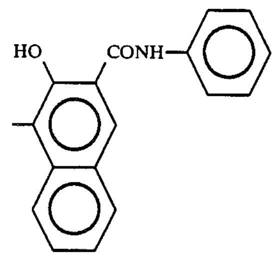 | (8)-14 |
| 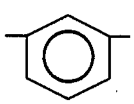 | 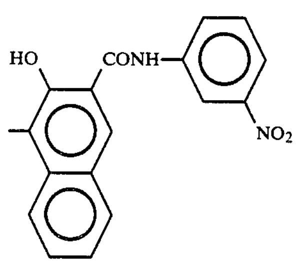 | (8)-15 | 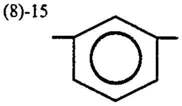 | 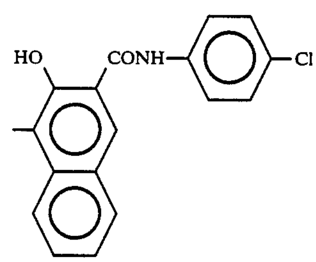 | (8)-16 |
| 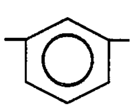 | 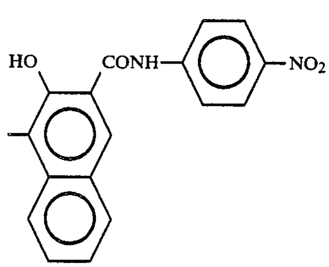 | (8)-17 | 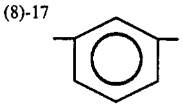 | 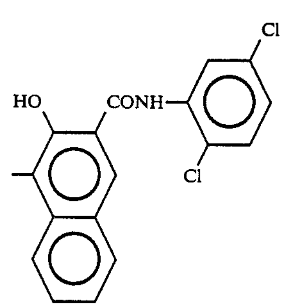 | (8)-18 |

-continued
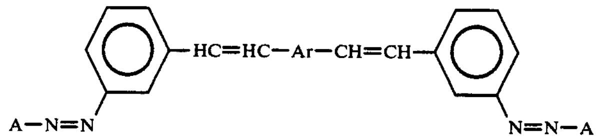
(8)
| Ar | A | | Ar | A | |
|---|---|---|---|---|---|
|  | 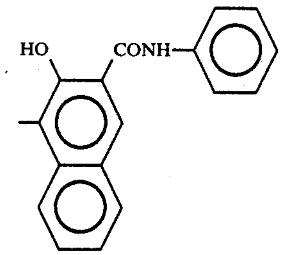 | (8)-19 | 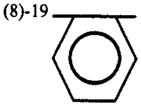 | 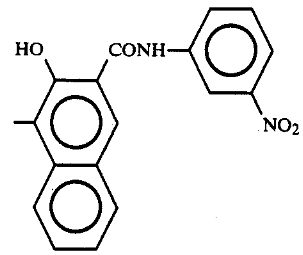 | (8)-20 |
|  | 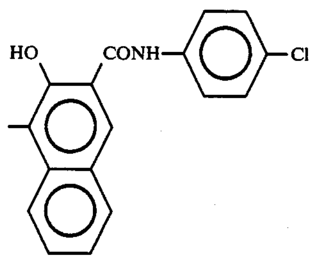 | (8)-21 | 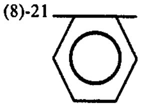 | 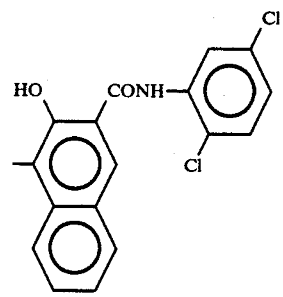 | (8)-22 |
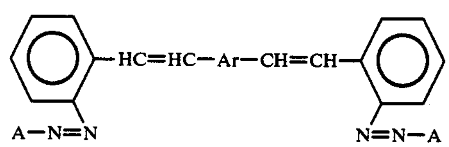
(9)
| Ar | A | | Ar | A | |
|---|---|---|---|---|---|
| 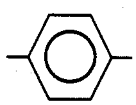 | 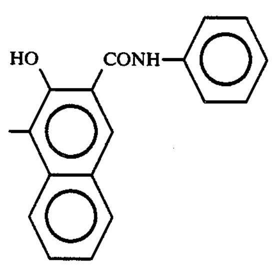 | (9)-1 | 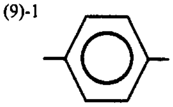 | 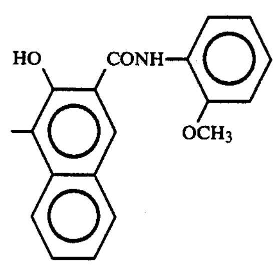 | (9)-2 |
| 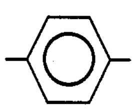 | 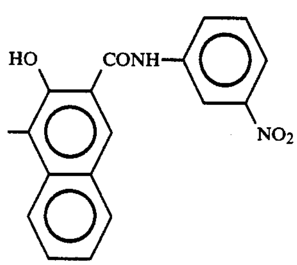 | (9)-3 | 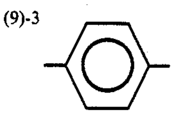 | 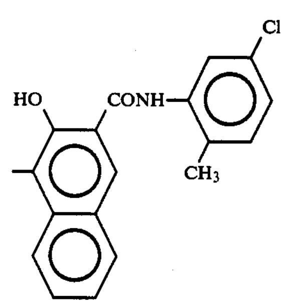 | (9)-4 |

-continued
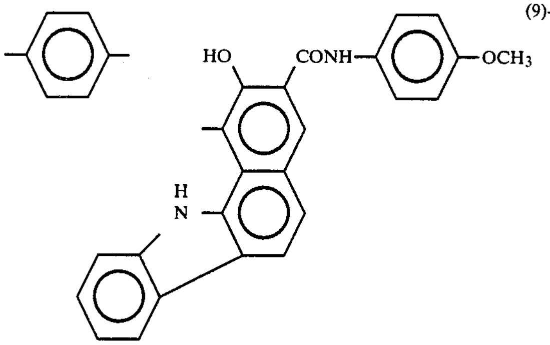
(9)-5
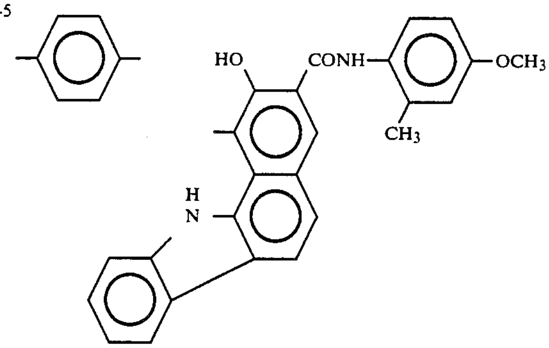
(9)-6
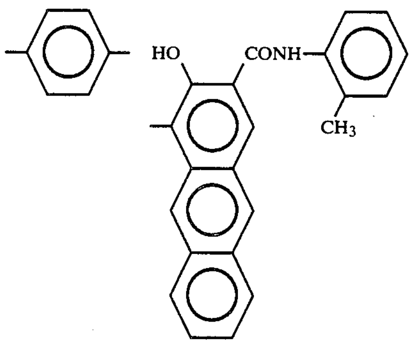
(9)-7
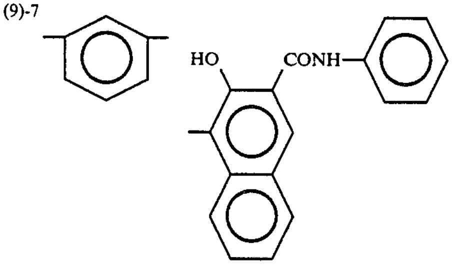
(9)-8
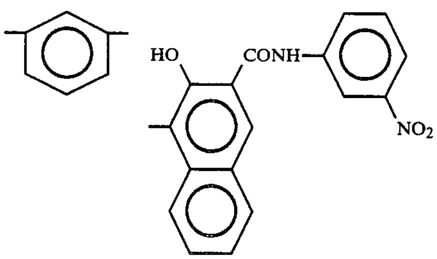
(9)-9
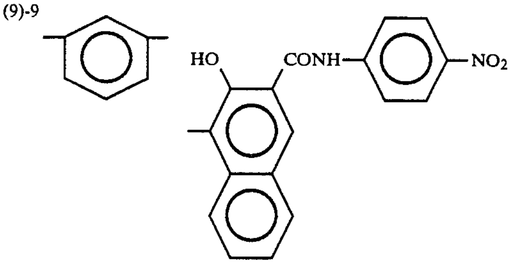
(9)-10
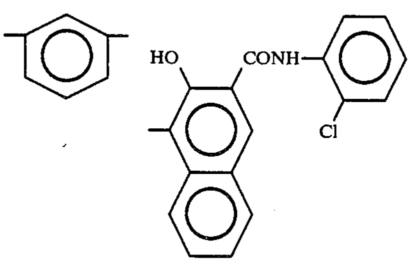
(9)-11
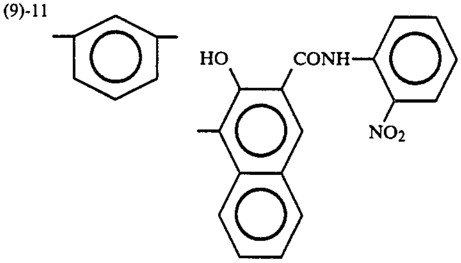
(9)-12
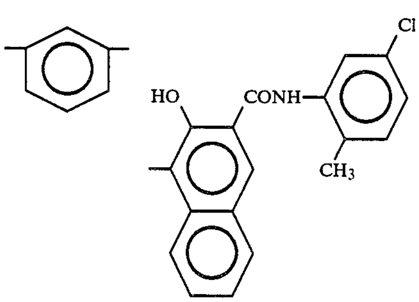
(9)-13
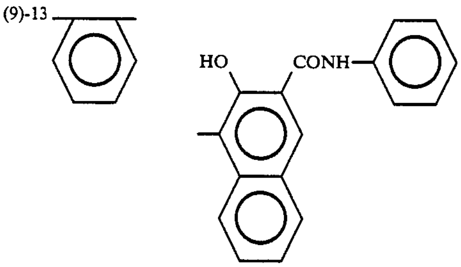
(9)-14

-continued
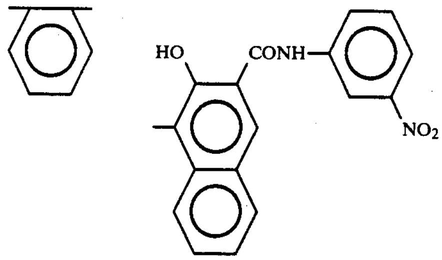
(9)-15
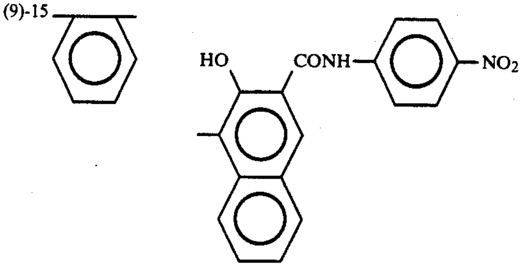
(9)-16
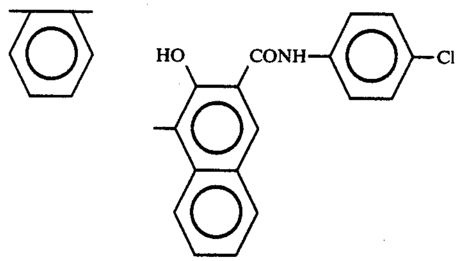
(9)-17
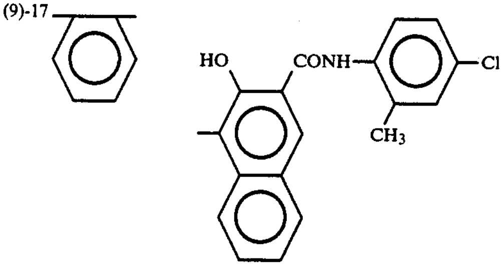
(9)-18
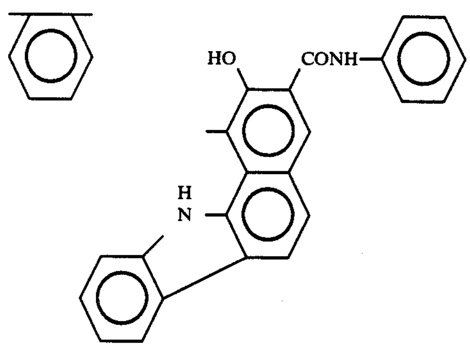
(9)-19
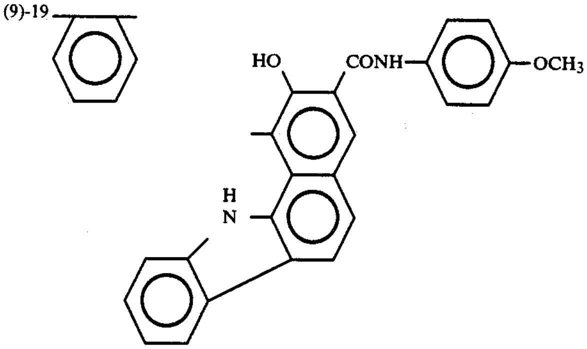
(9)-20
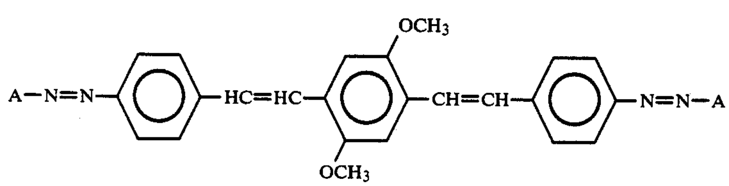
(10)
Hereinafter, only the moiety A in the above formula is shown.
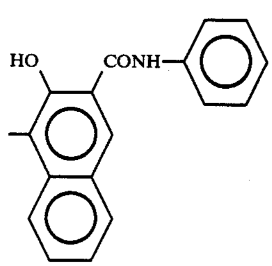
(10)-1
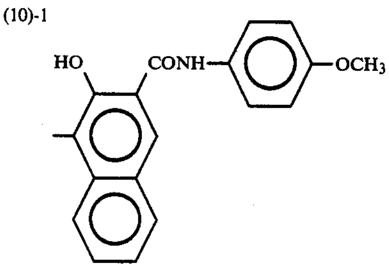
(10)-2

-continued
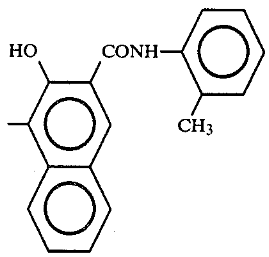
(10)-3
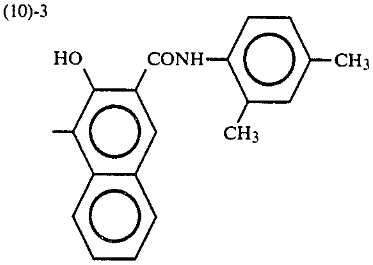
(10)-4
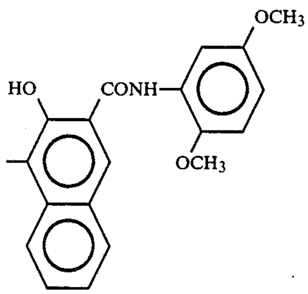
(10)-5
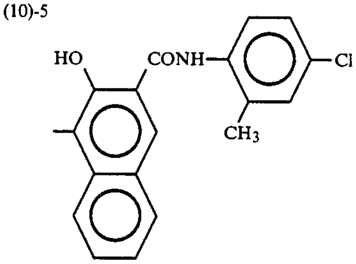
(10)-6
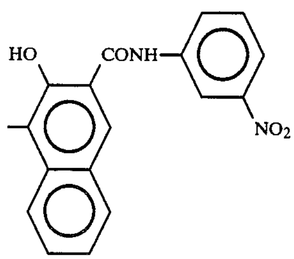
(10)-7
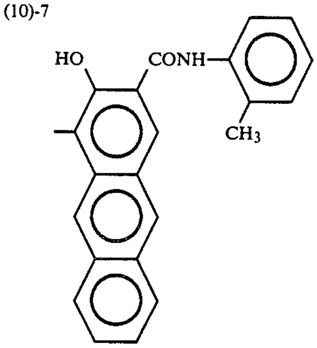
(10)-8
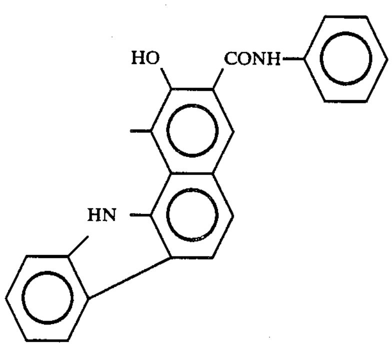
(10)-9
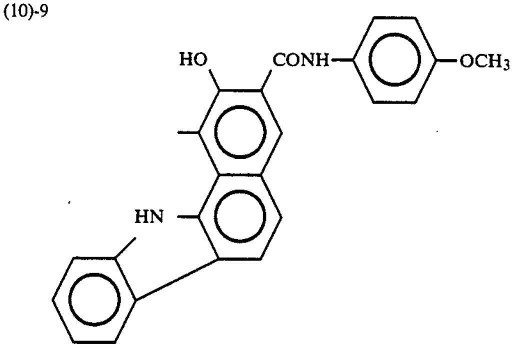
(10)-10
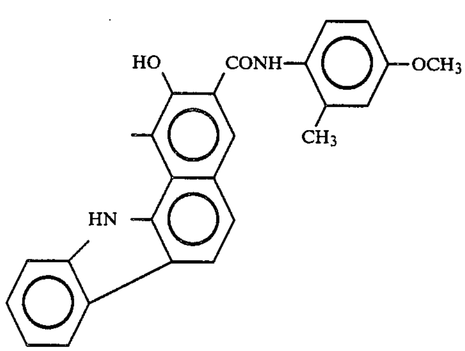
(10)-11
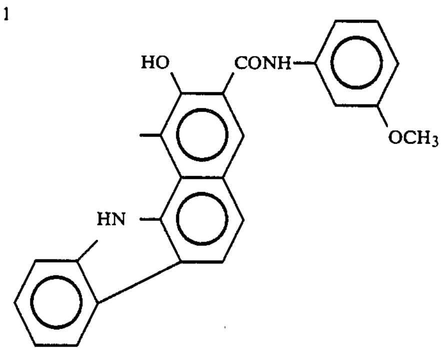
(10)-12

-continued
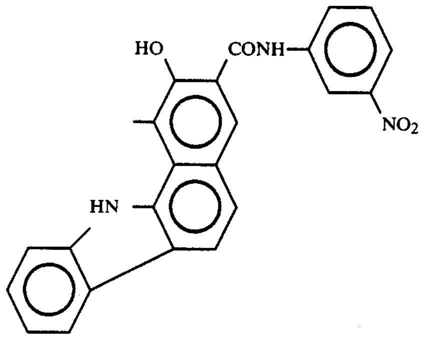
(10)-13
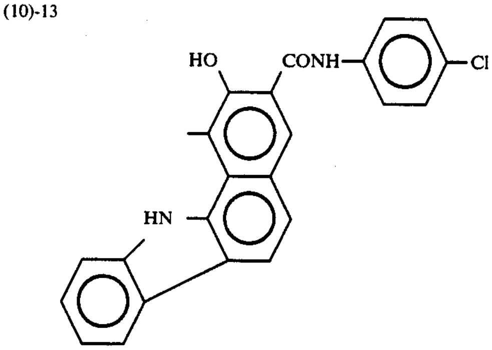
(10)-14
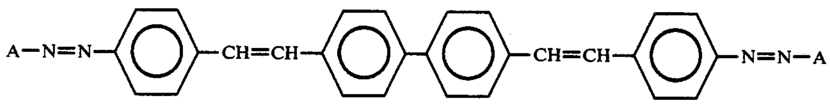
(11)
Hereinafter, only the moiety A in the above formula is shown.
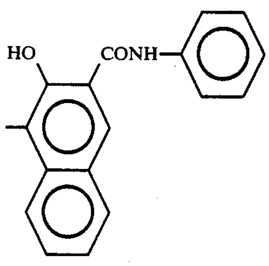
(11)-1
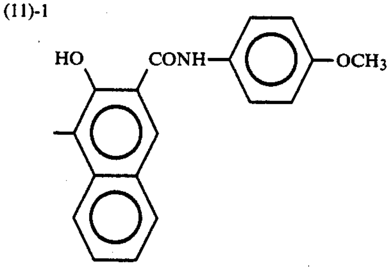
(11)-2
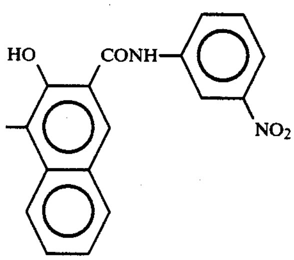
(11)-3
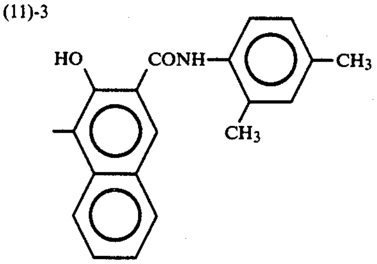
(11)-4
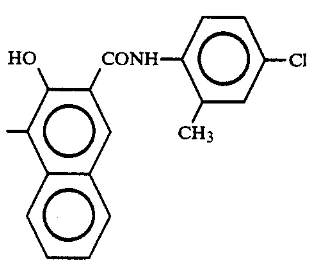
(11)-5
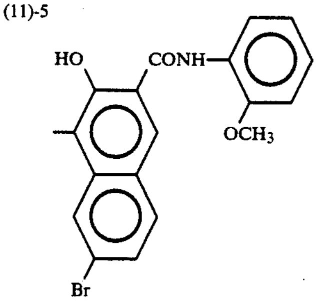
(11)-6

-continued
(11)-7
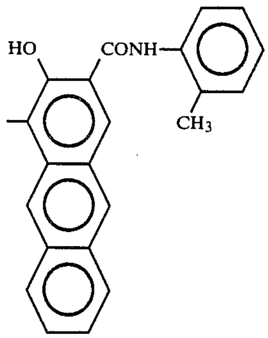
(11)-8
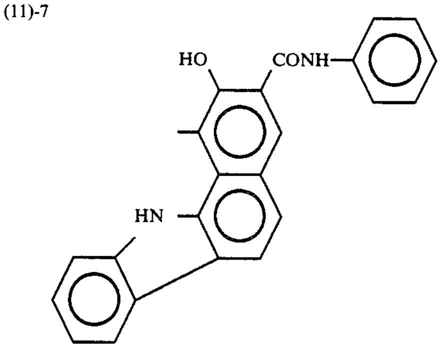
(11)-9
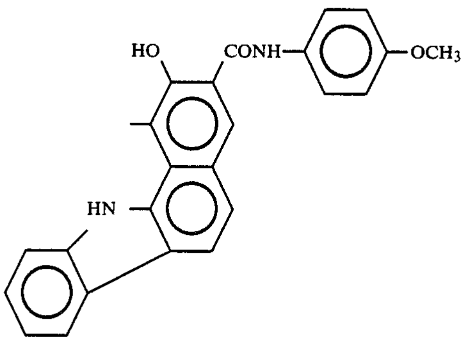
(11)-10
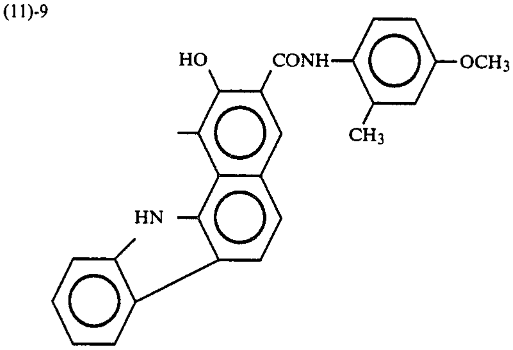
(11)-11
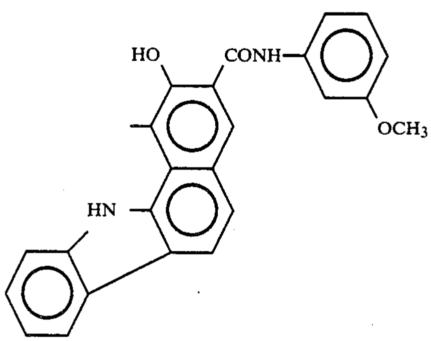
(11)-12
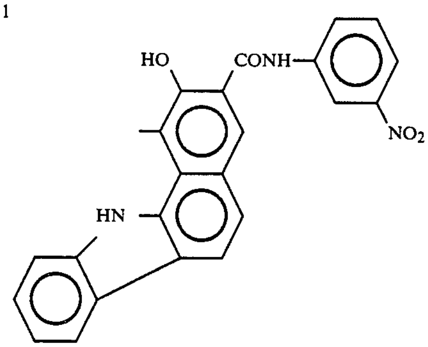
(11)-13
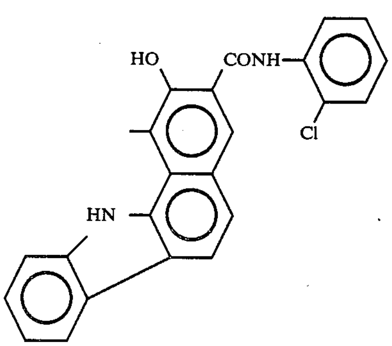

(12)-1
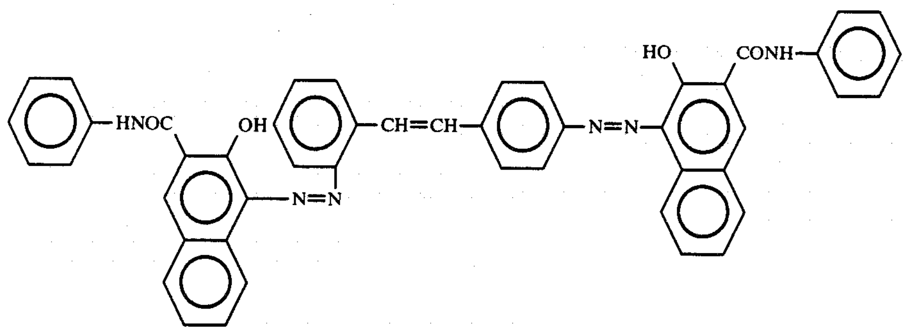
Hereinafter 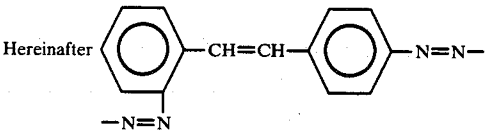 is represented by —Y—.
(12)-2
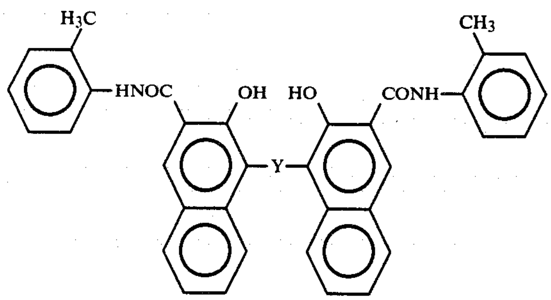
(12)-3
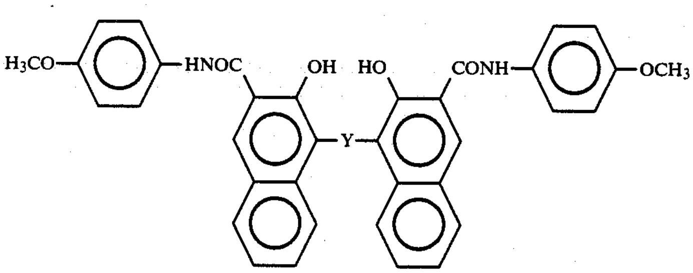
(12)-4
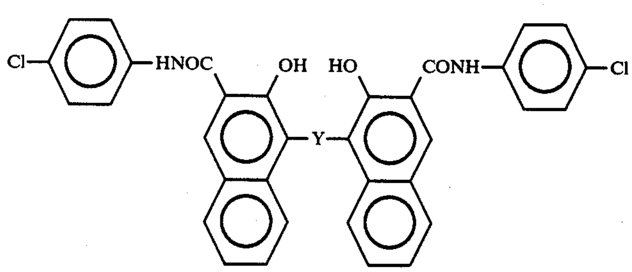
(12)-5
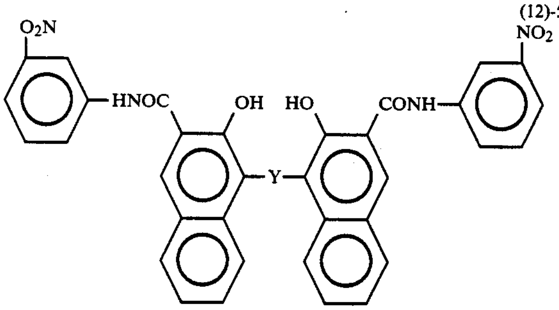
(12)-6
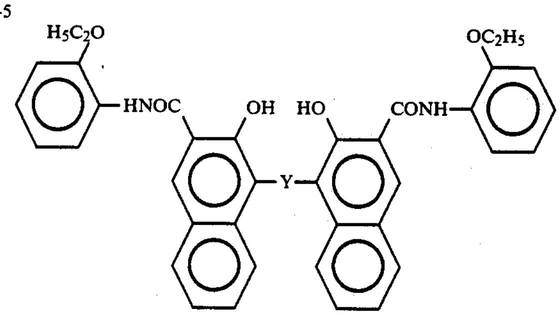

-continued
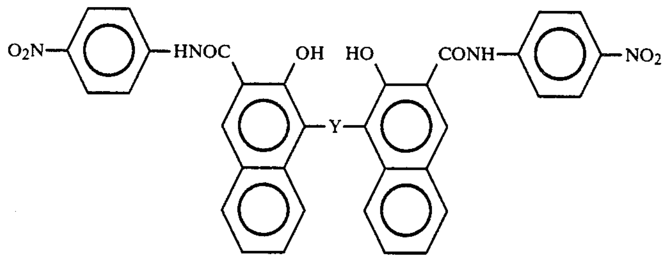
(12)-7
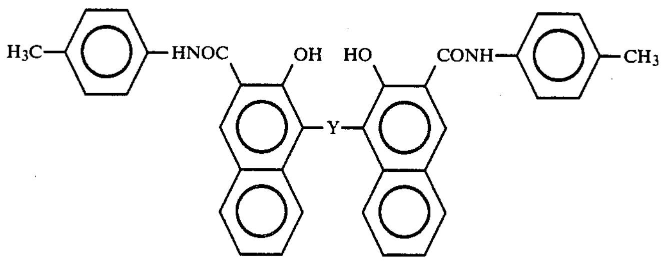
(12)-8
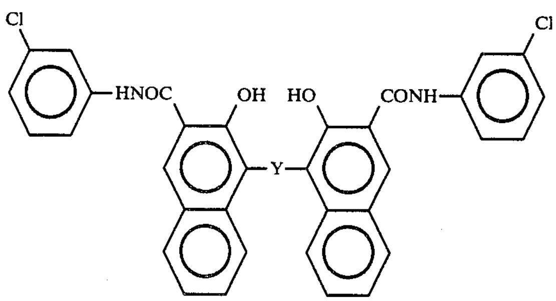
(12)-9
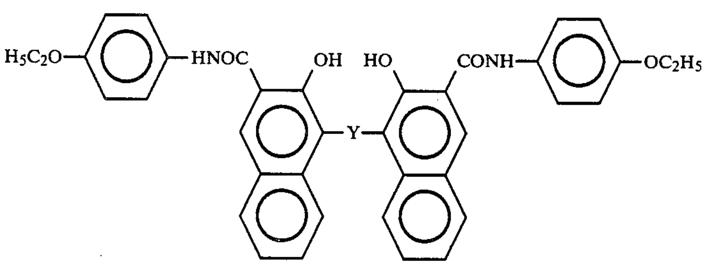
(12)-10
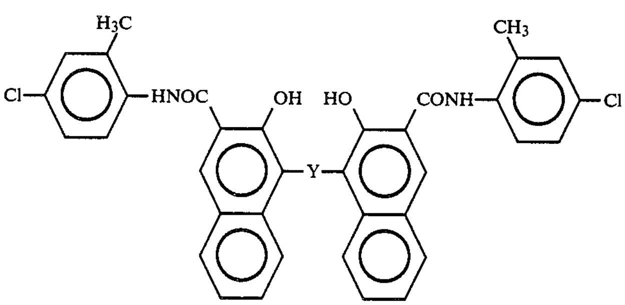
(12)-11

-continued
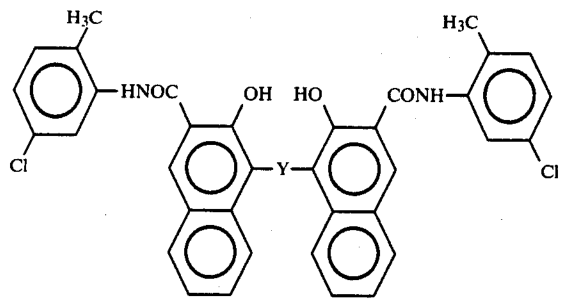
(12)-12
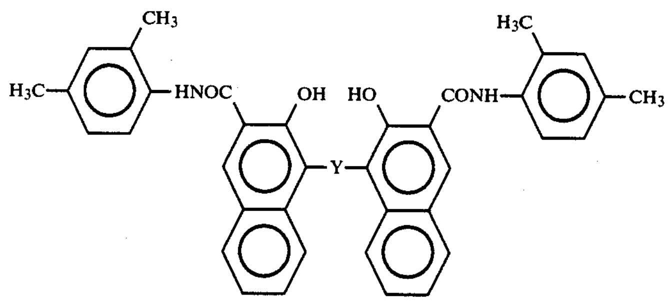
(12)-13
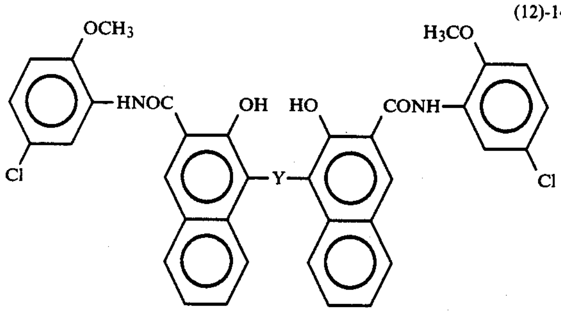
(12)-14
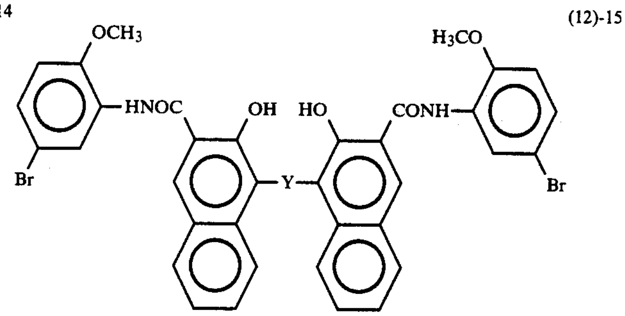
(12)-15
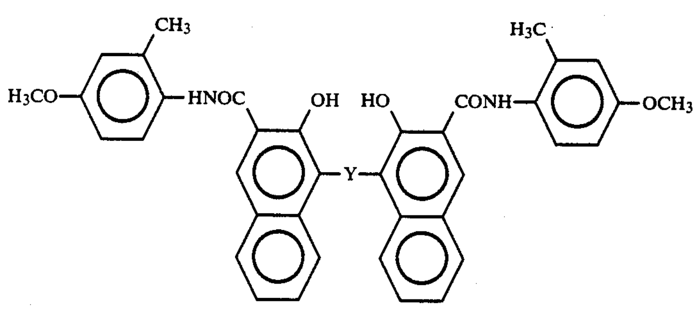
(12)-16
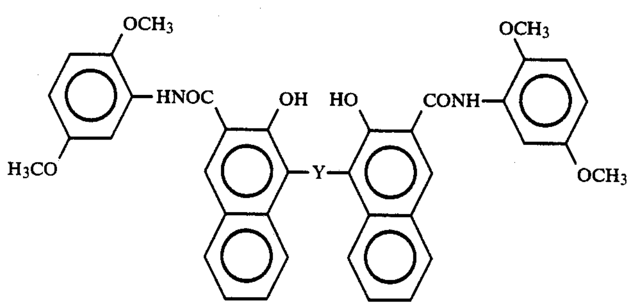
(12)-17

-continued
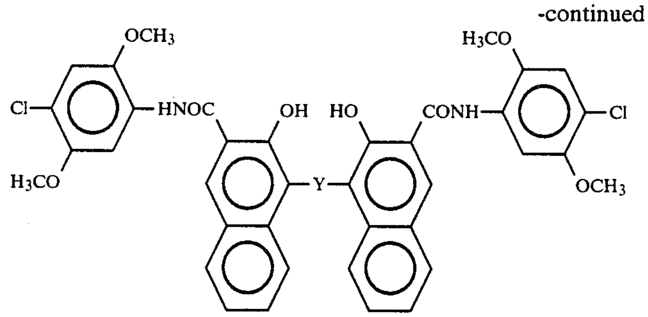
(12)-18
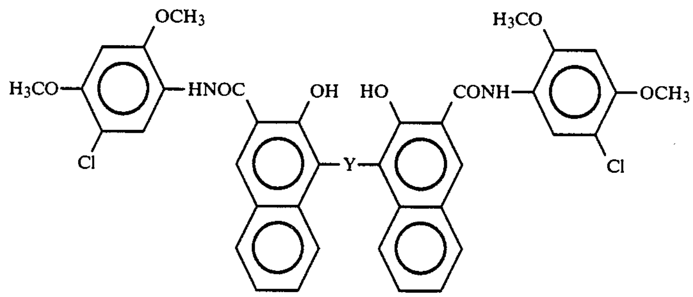
(12)-19
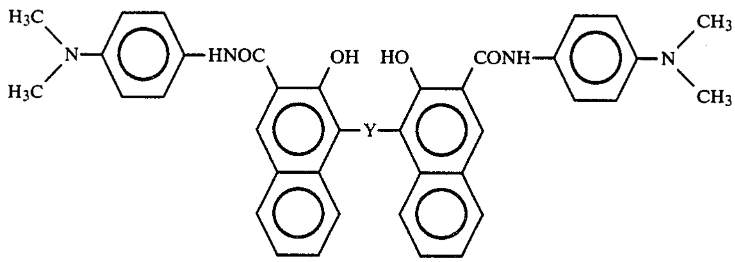
(12)-20
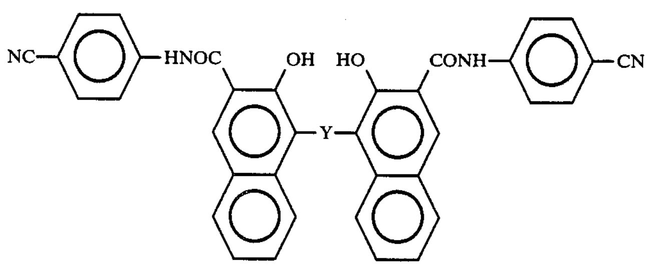
(12)-21
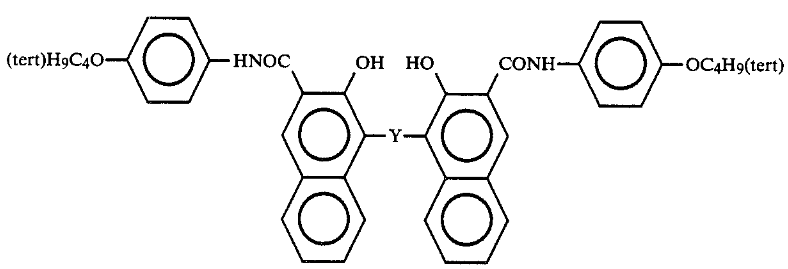
(12)-22
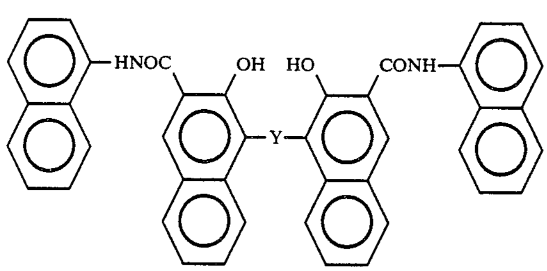
(12)-23

-continued
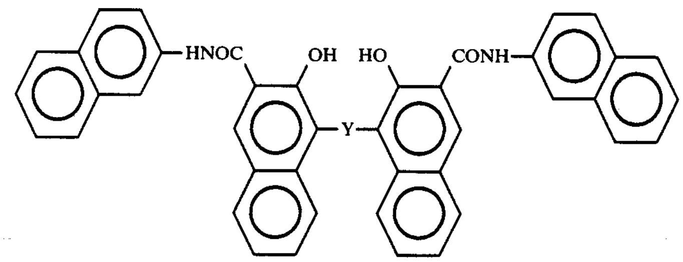
(12)-24
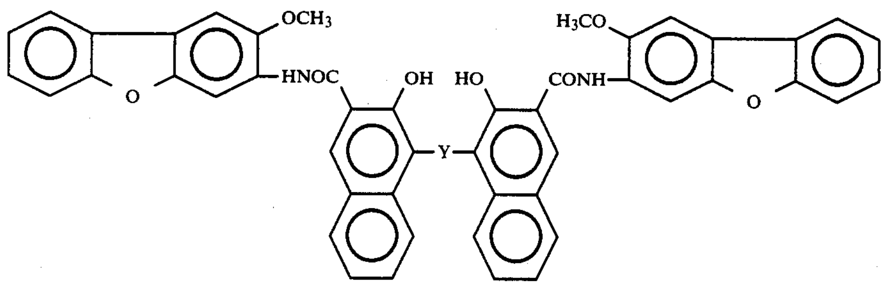
(12)-25
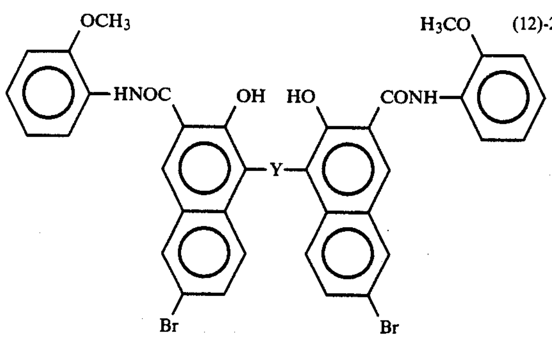
(12)-26
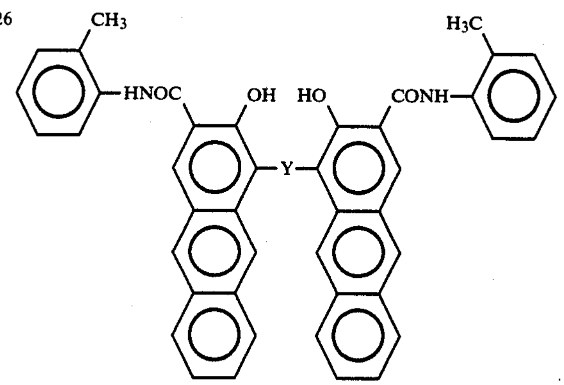
(12)-27
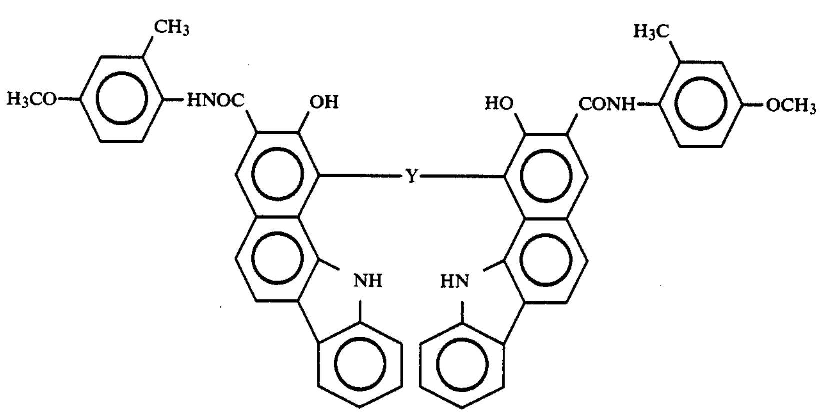
(12)-28

-continued
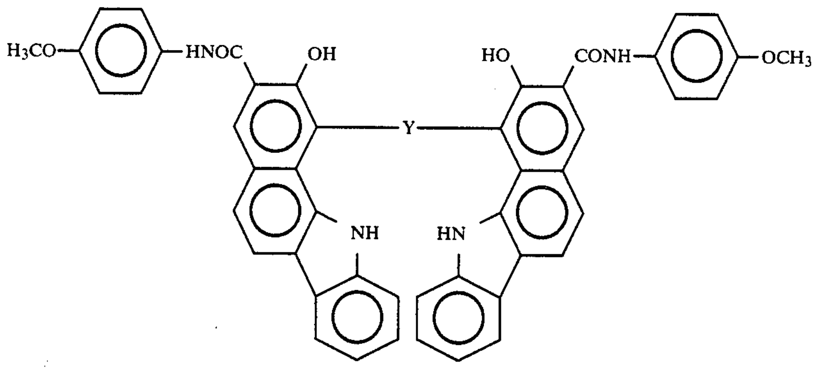
(12)-29
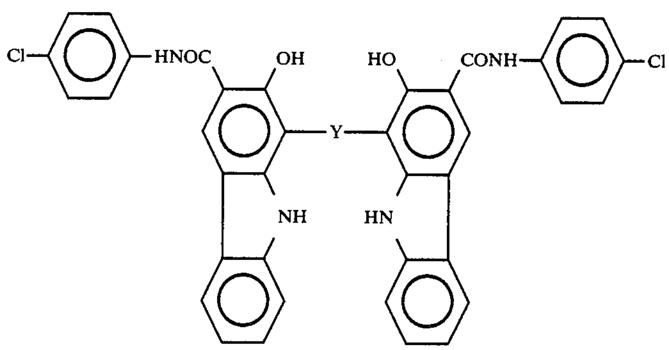
(12)-30
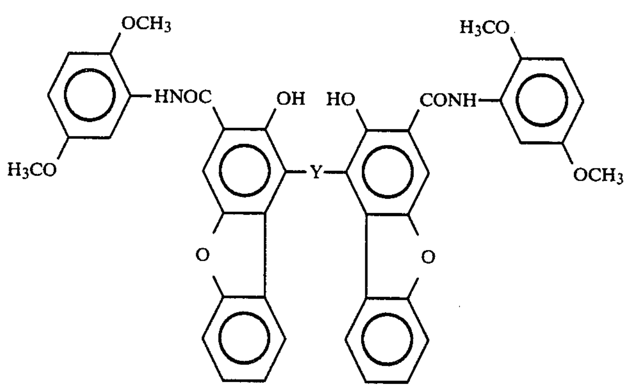
(12)-31
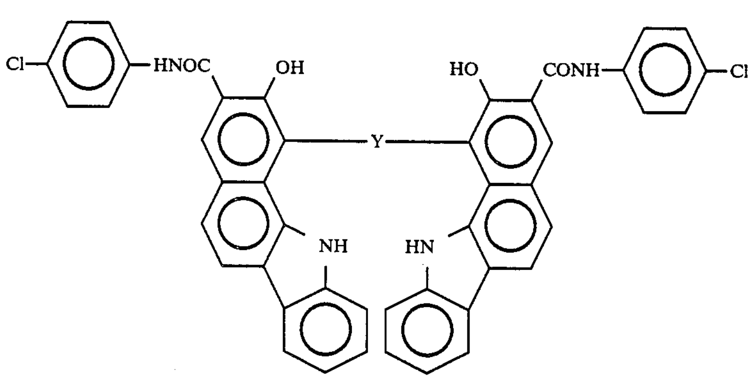
(12)-32

-continued
(12)-33
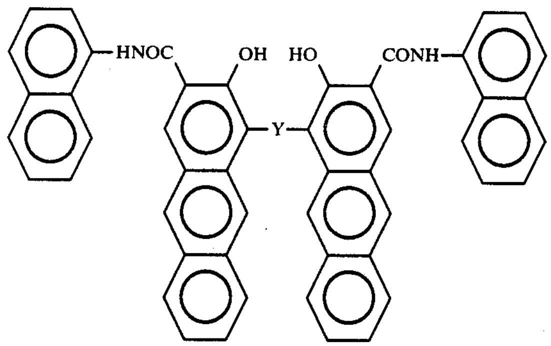
(13)-1
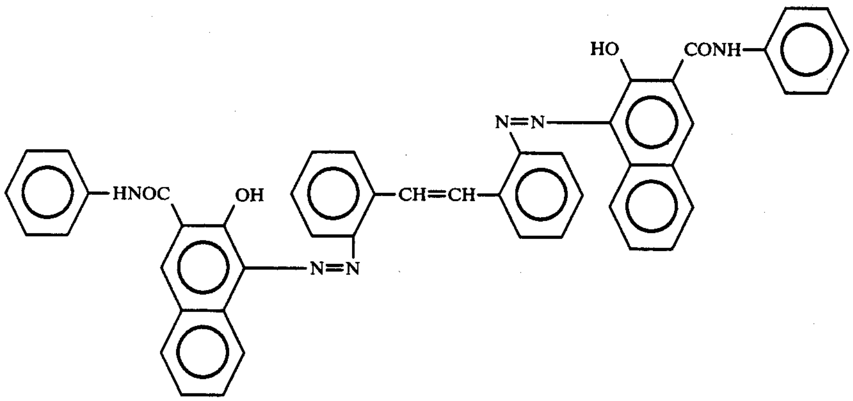
Hereinafter 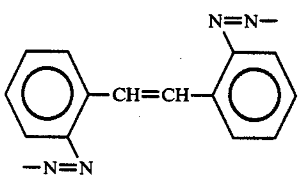 is represented by —Y—.
(13)-2
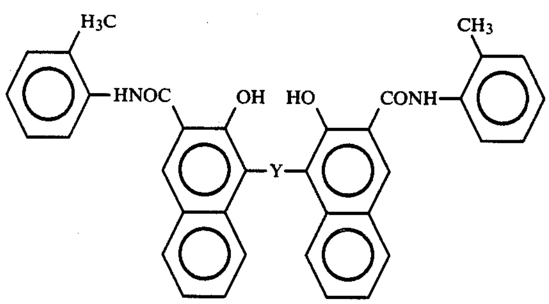
(13)-3
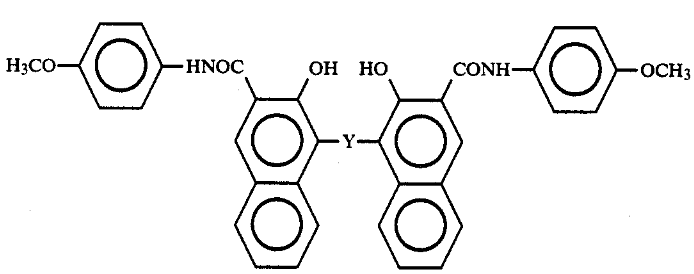

-continued
(13)-4
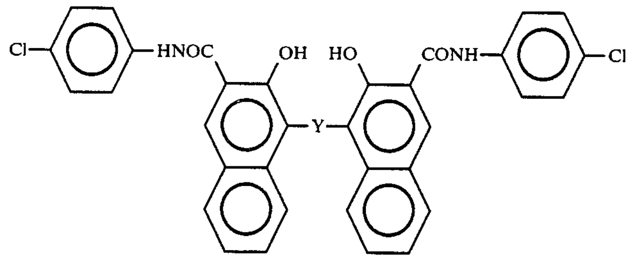
(13)-5
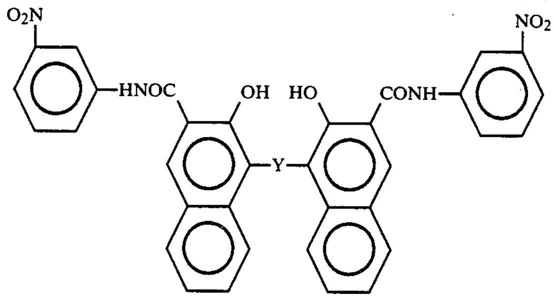
(13)-6
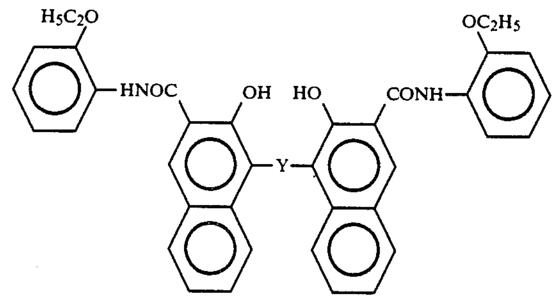
(13)-7
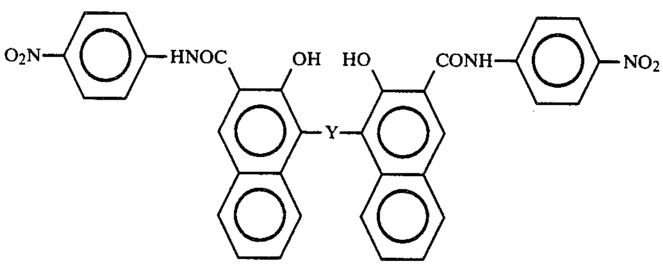
(13)-8
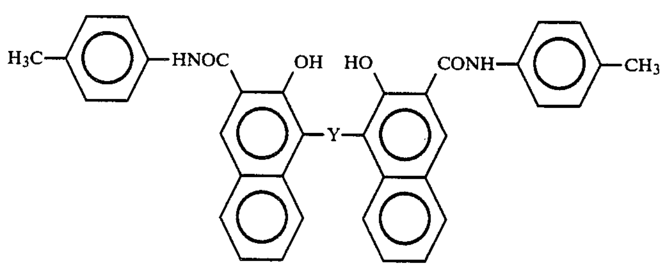
(13)-9
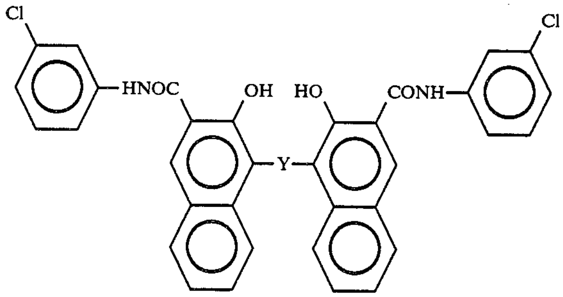

-continued
(13)-10
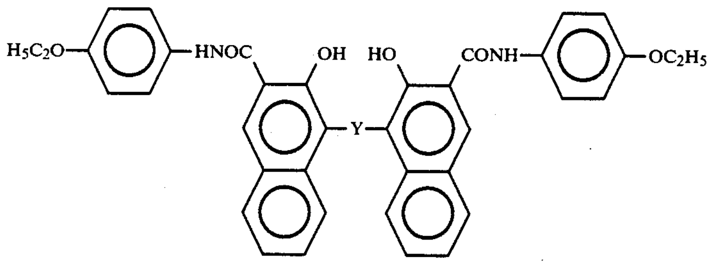
(13)-11
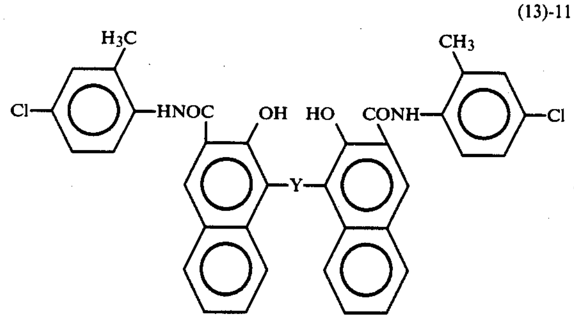
(13)-12
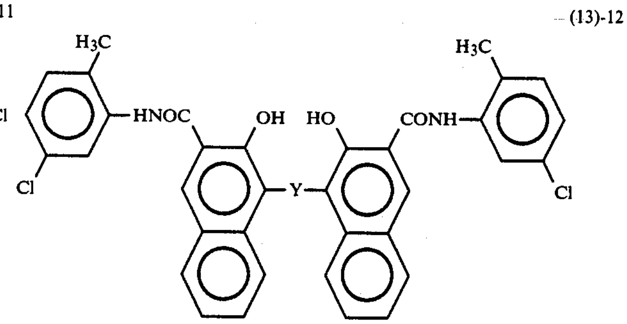
(13)-13
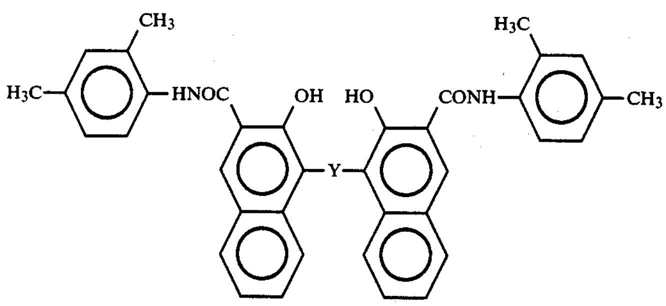
(13)-14
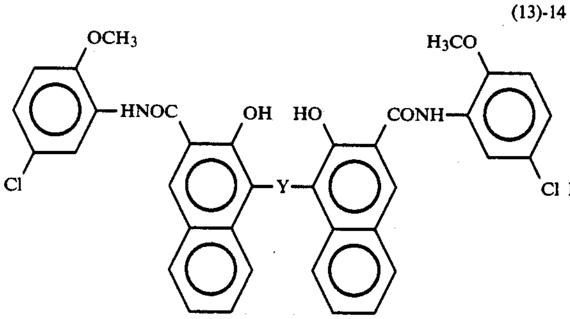
(13)-15
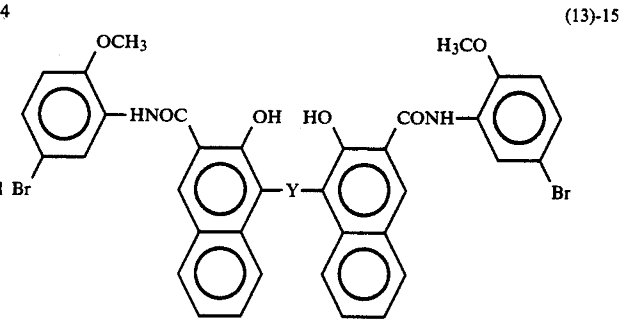
(13)-16
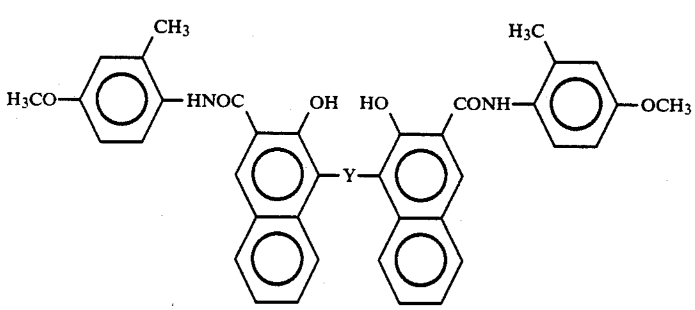

-continued
(13)-17
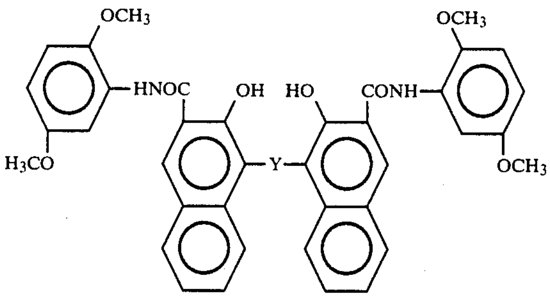
(13)-18
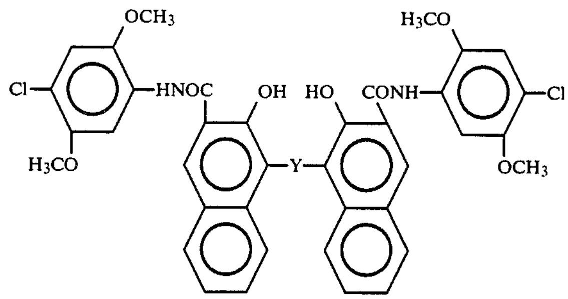
(13)-19
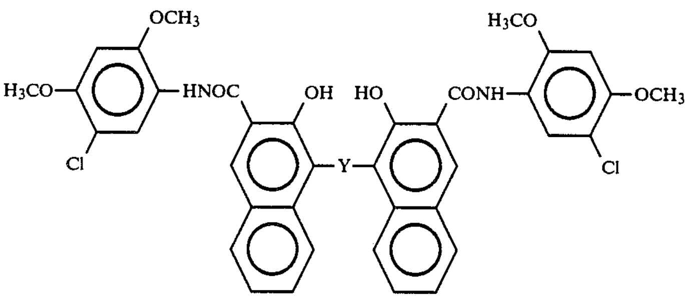
(13)-20
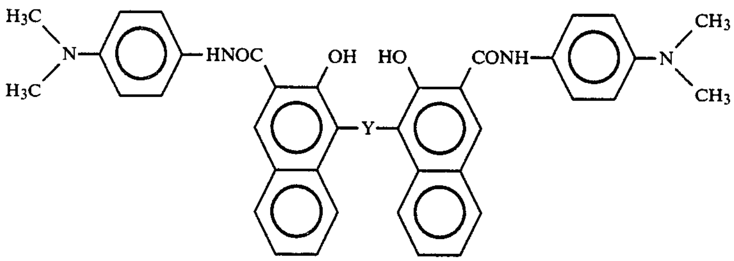
(13)-21
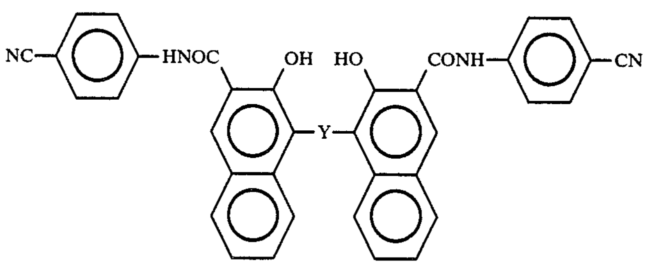
(13)-22
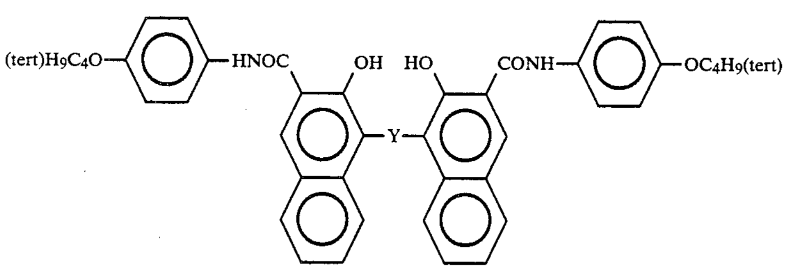

-continued
(13)-23
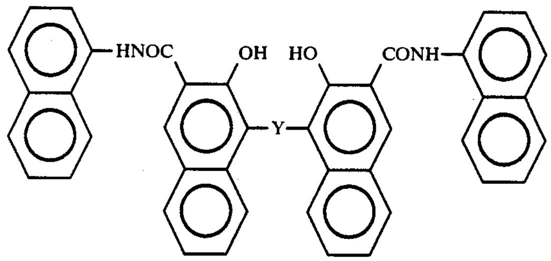
(13)-24
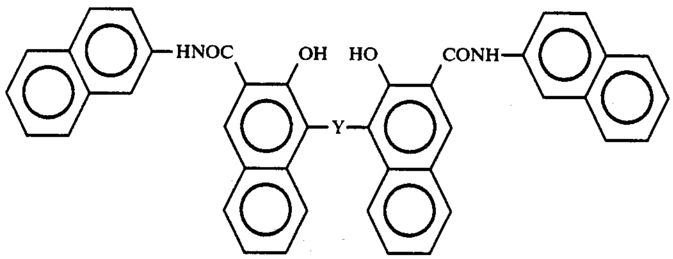
(13)-25
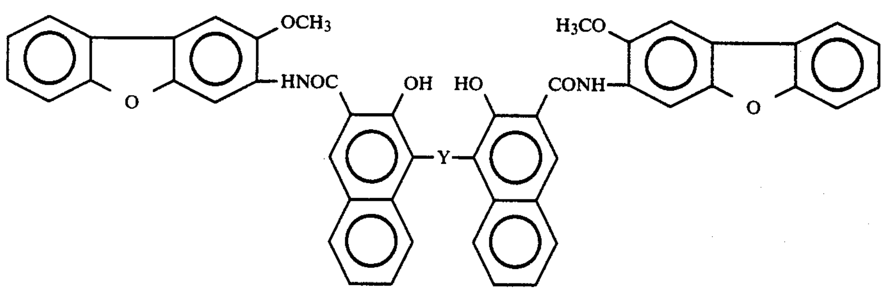
(13)-26
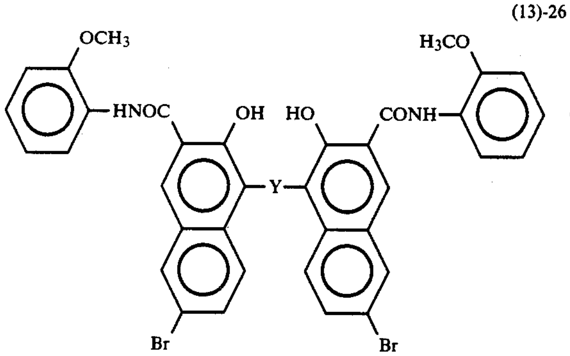
(13)-27
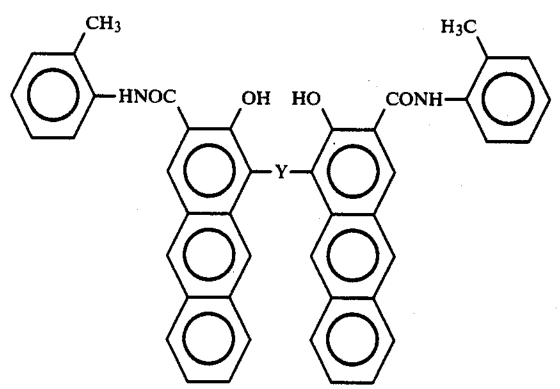
(13)-28
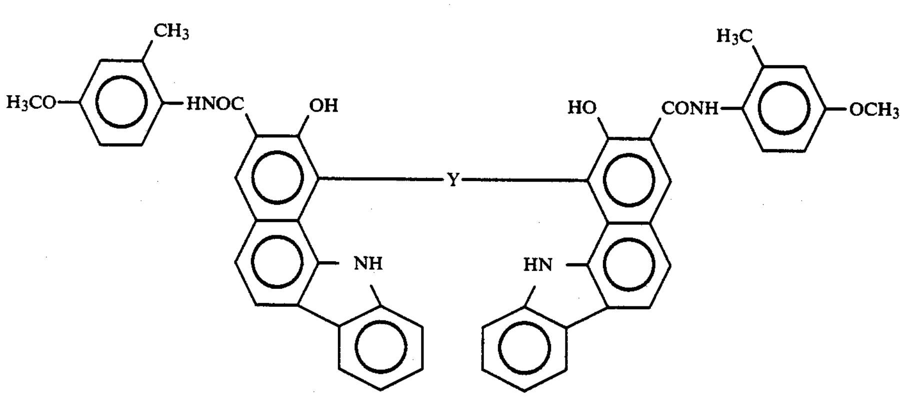

-continued
(13)-29
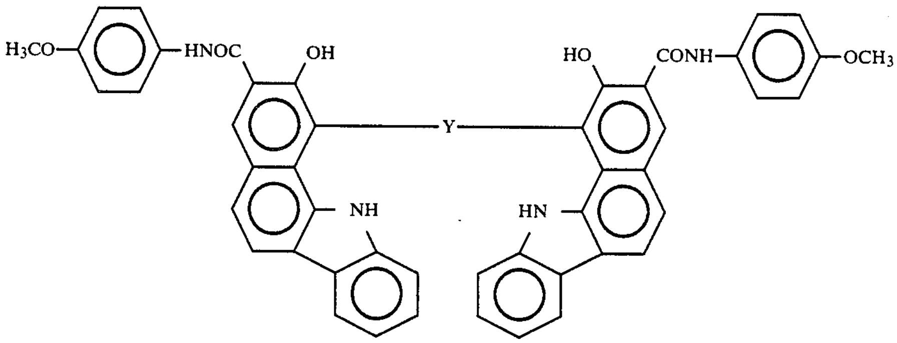
(13)-30
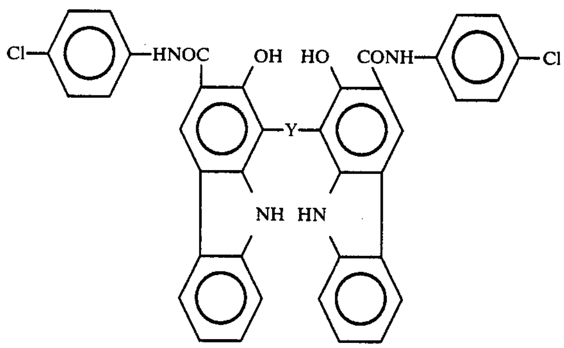
(13)-31
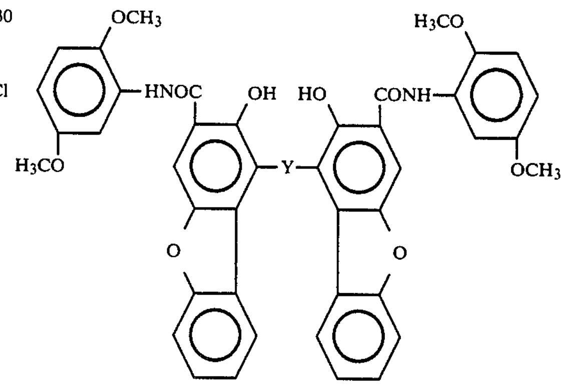
(13)-32
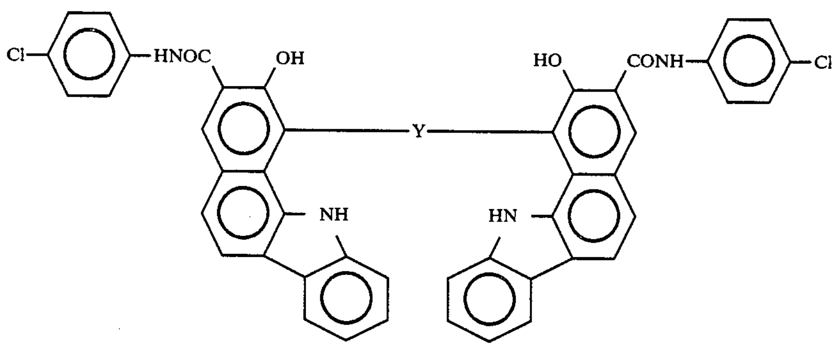
(13)-33
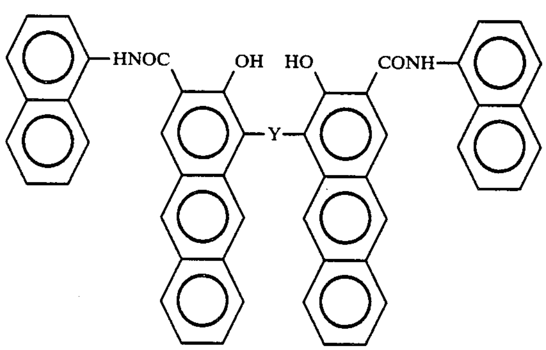

(14)-1
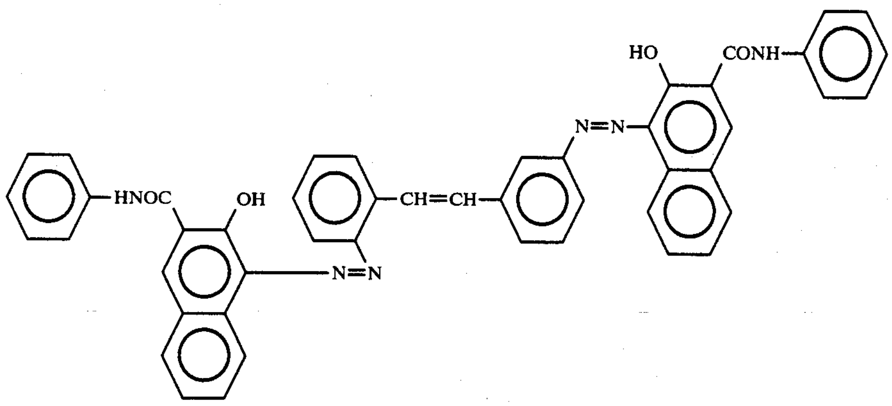
Hereinafter 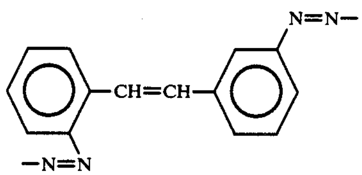 is represented by —Y—.
(14)-2
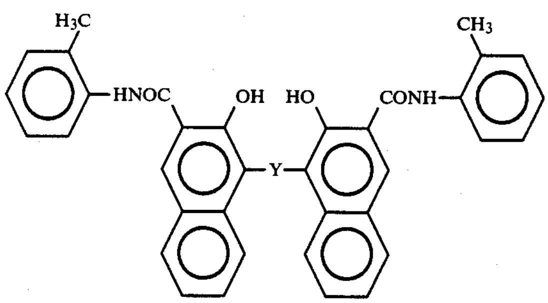
(14)-3
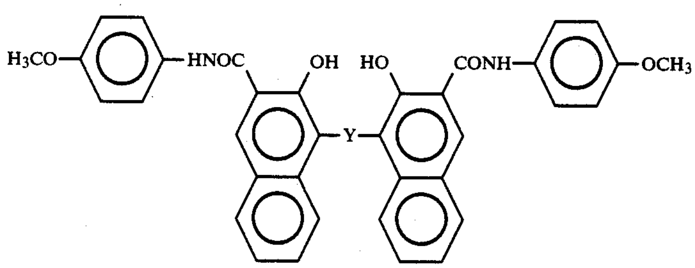
(14)-4
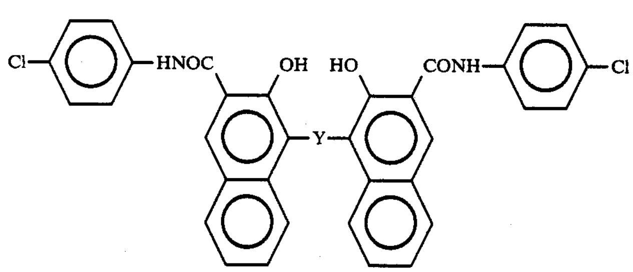

-continued
(14)-5
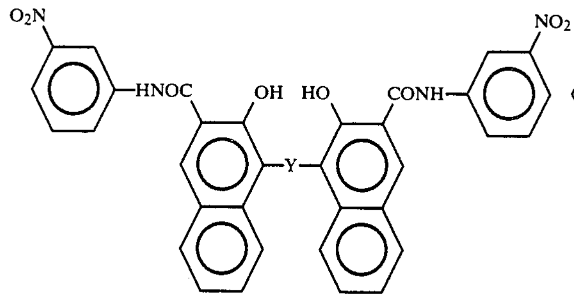
(14)-6
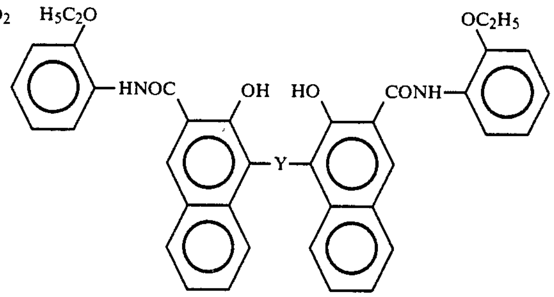
(14)-7
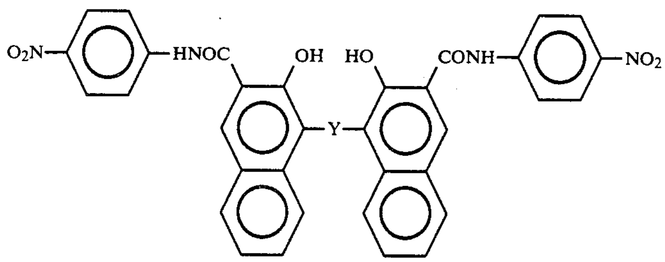
(14)-8
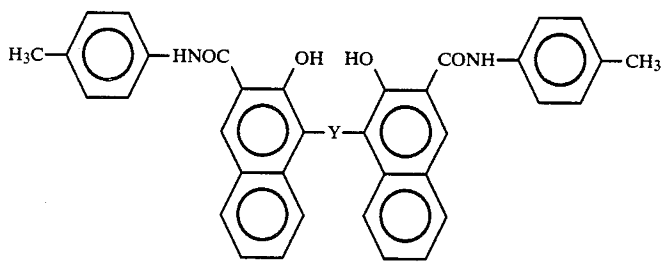
(14)-9
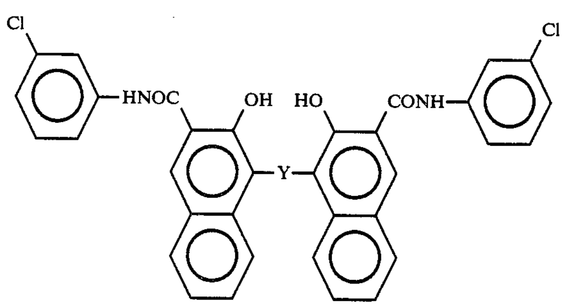
(14)-10
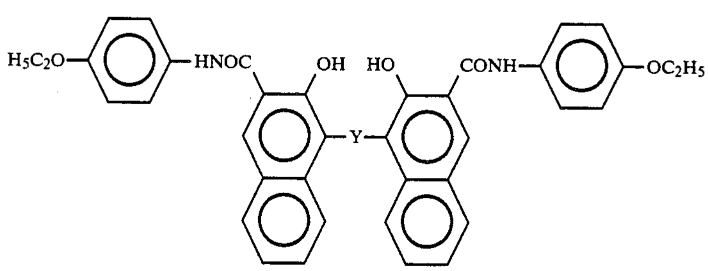

-continued
(14)-11
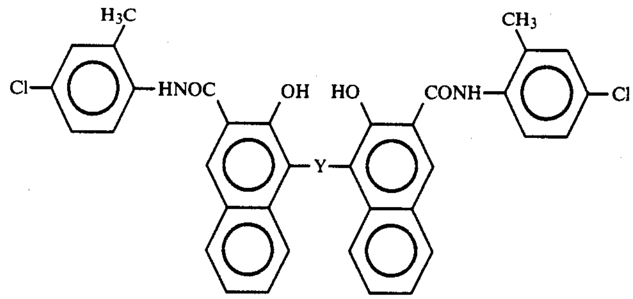
(14)-12
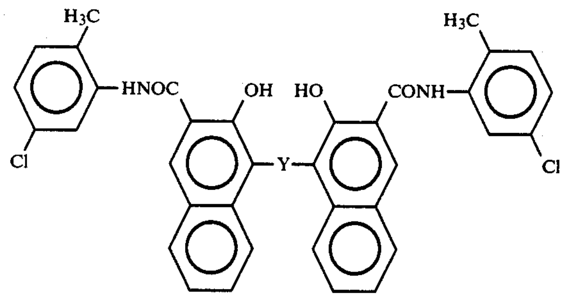
(14)-13
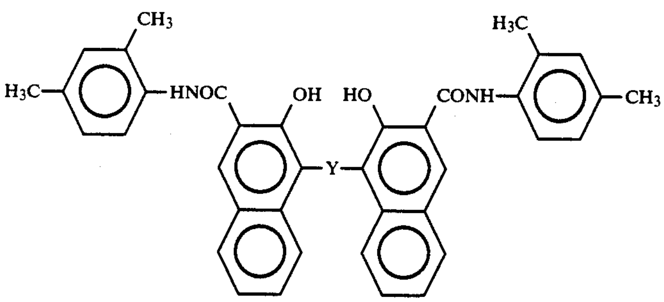
(14)-14
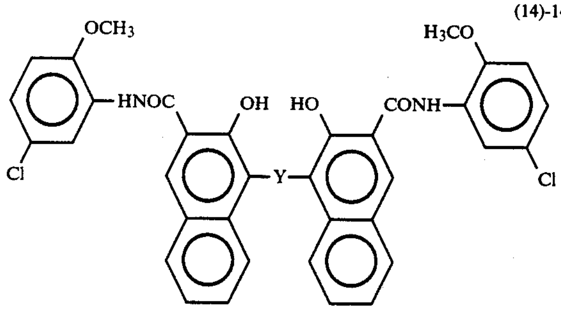
(14)-15
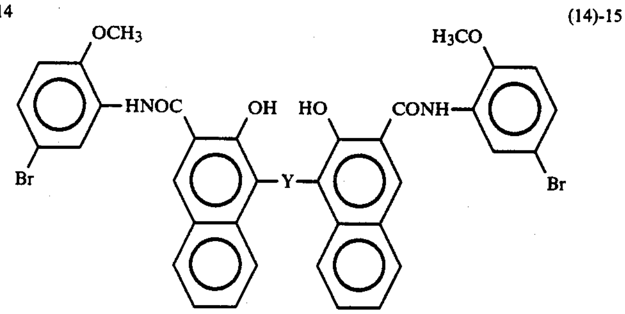
(14)-16
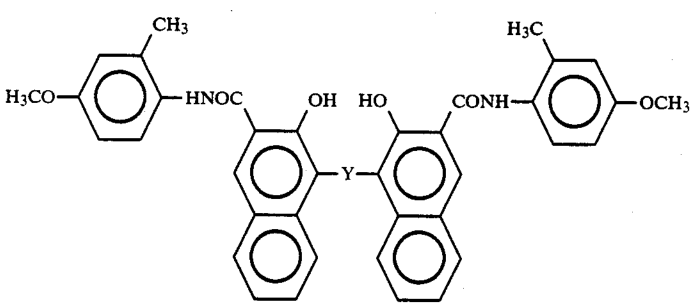

-continued
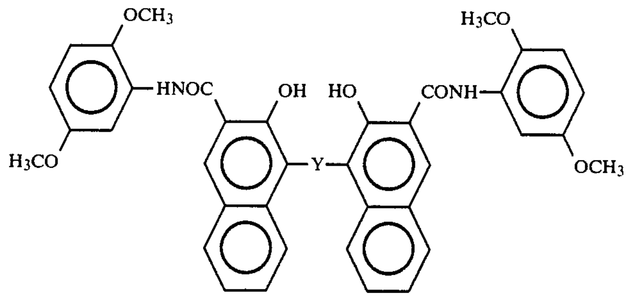
(14)-17
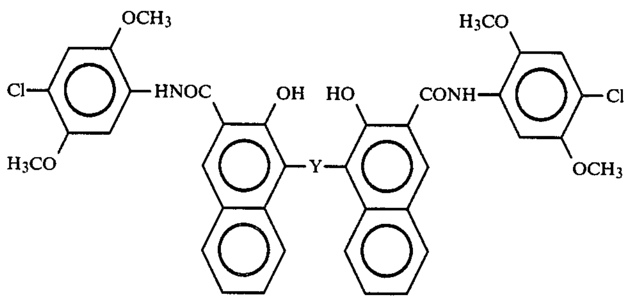
(14)-18
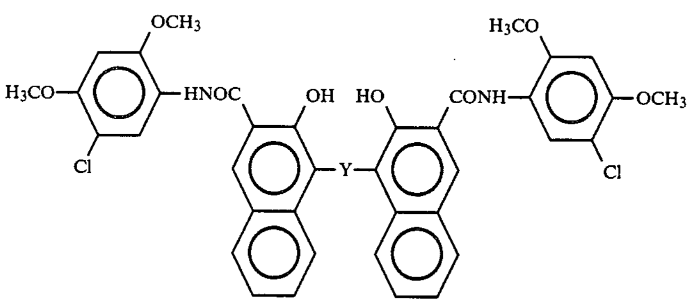
(14)-19
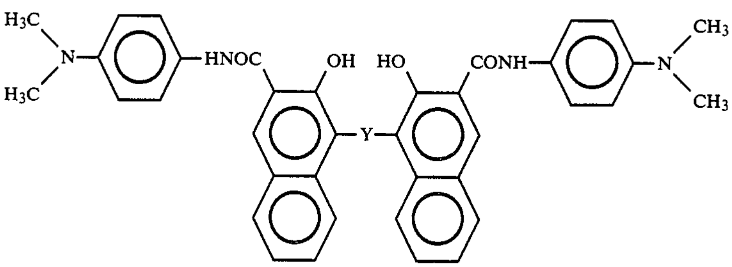
(14)-20
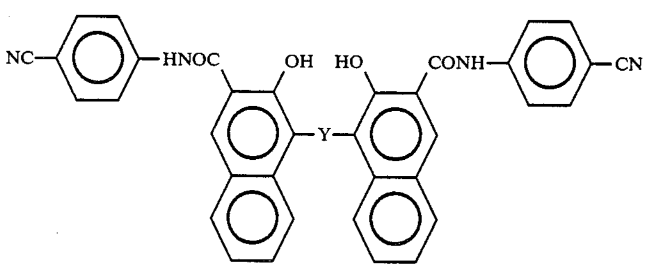
(14)-21

-continued
(14)-22
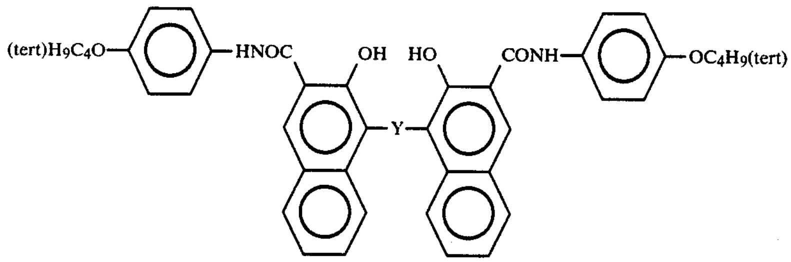
(14)-23
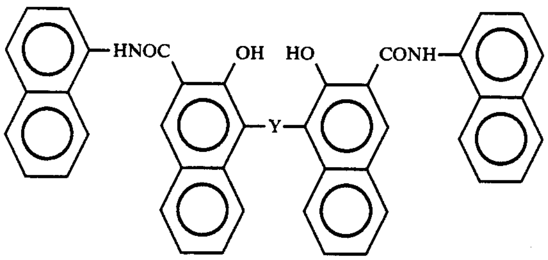
(14)-24
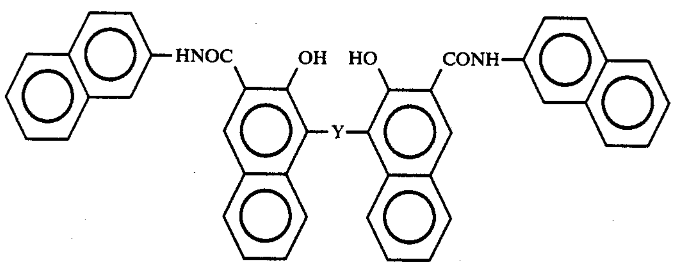
(14)-25
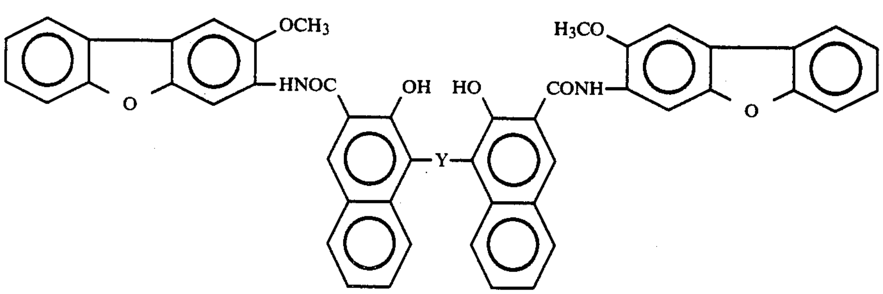
(14)-26
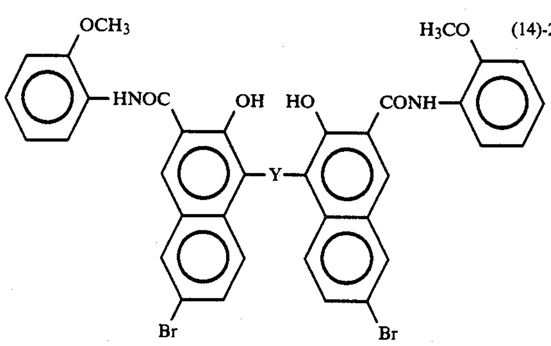
(14)-27
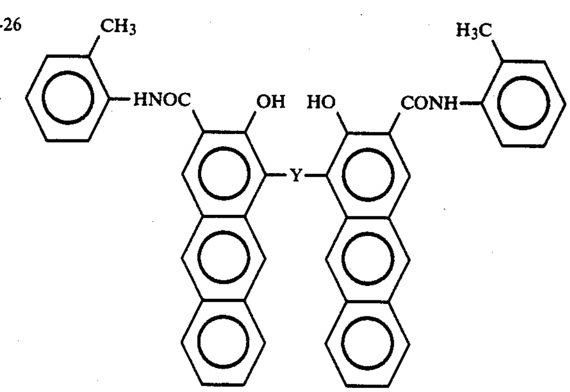

-continued
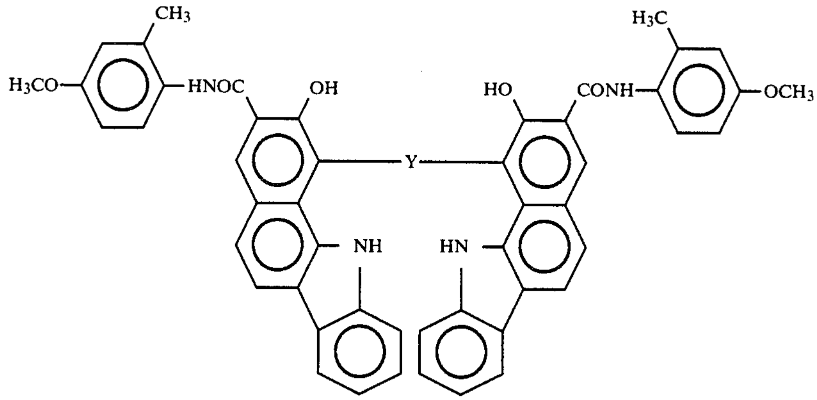
(14)-28
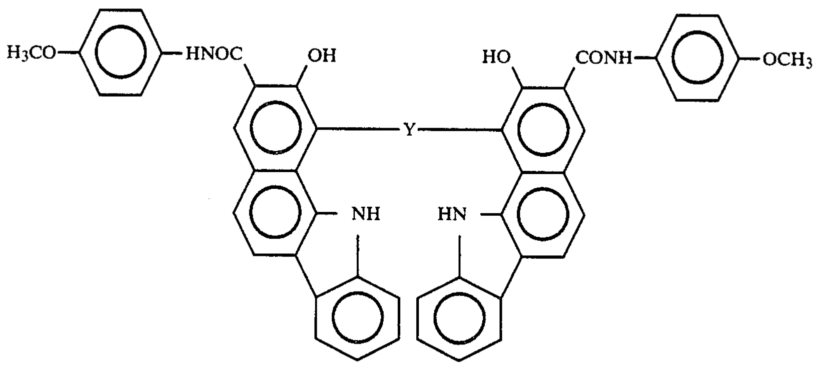
(14)-29
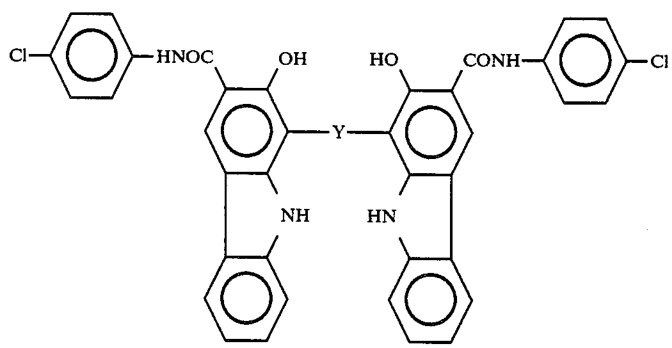
(14)-30
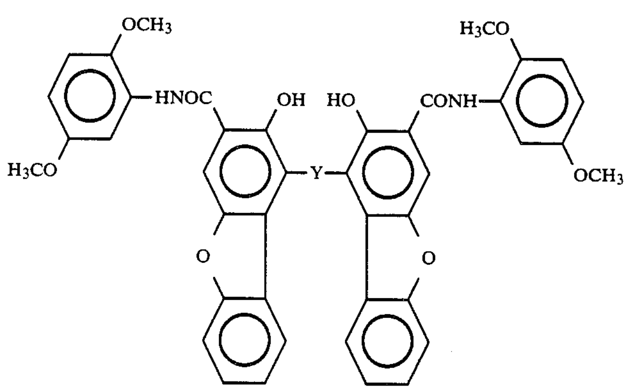
(14)-31

-continued
(14)-32
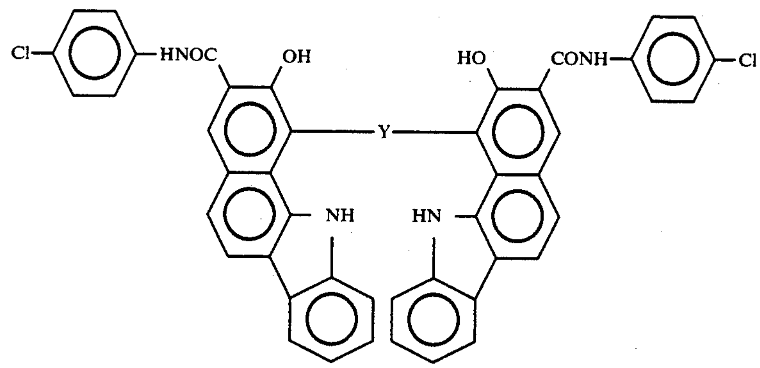
(14)-33
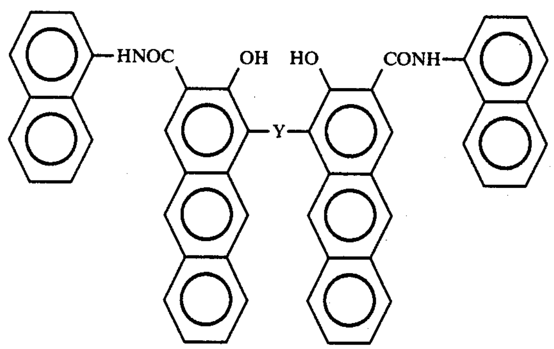
(15)-1
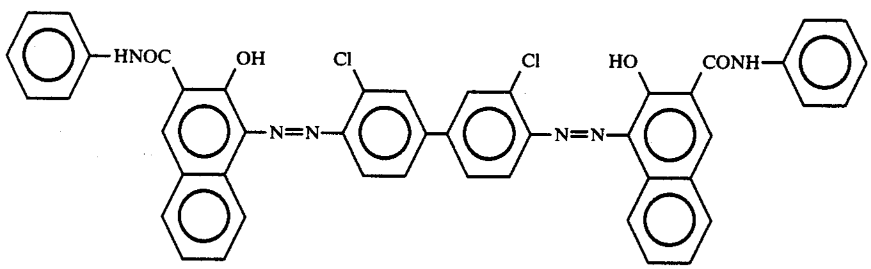
(15)-2
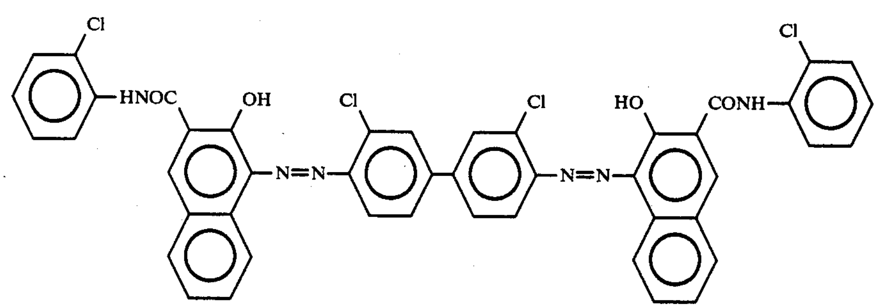
(15)-3
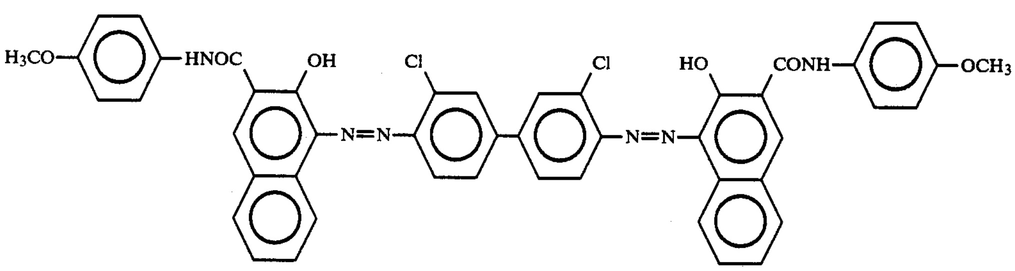

-continued
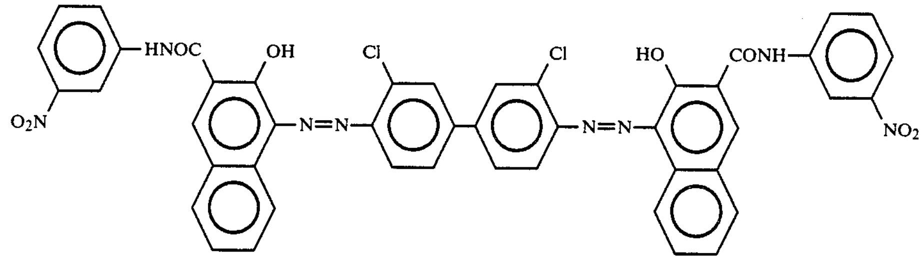
(15)-4
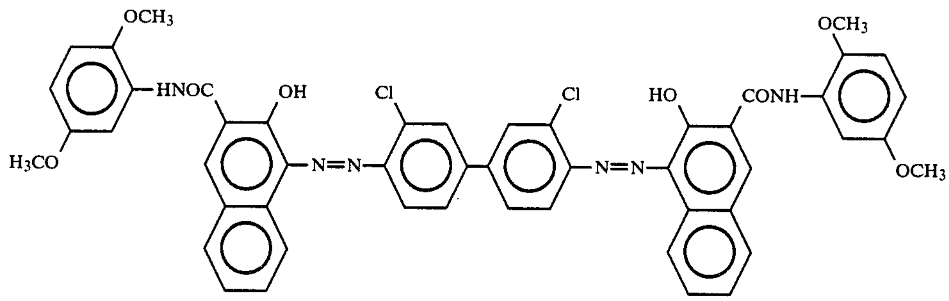
(15)-5
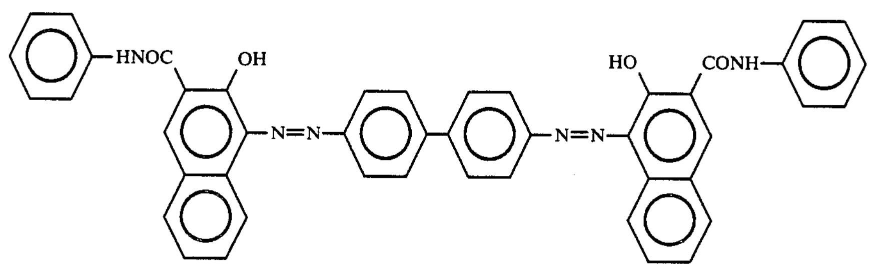
(16)-1
Hereinafter 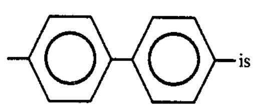 is represented by —X—.
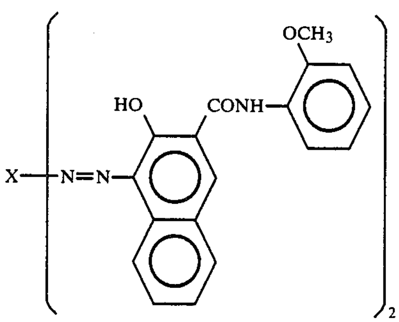
(16)-2
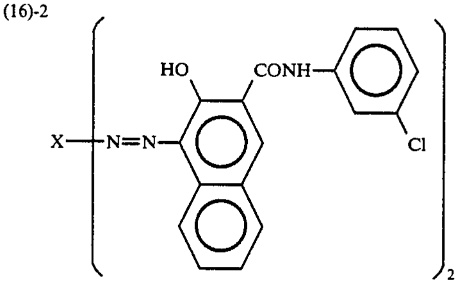
(16)-3
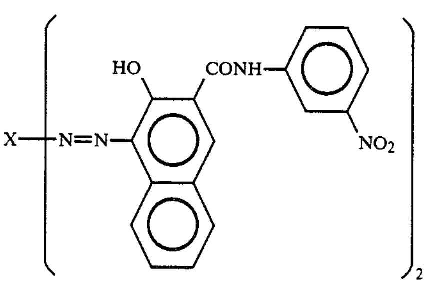
(16)-4
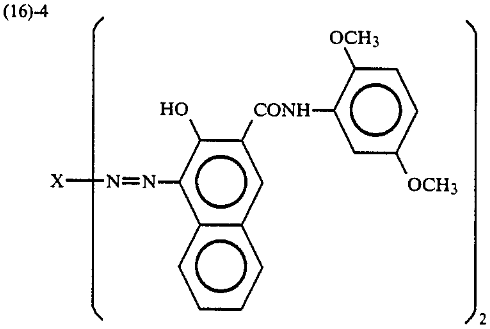
(16)-5

-continued
(16)-6
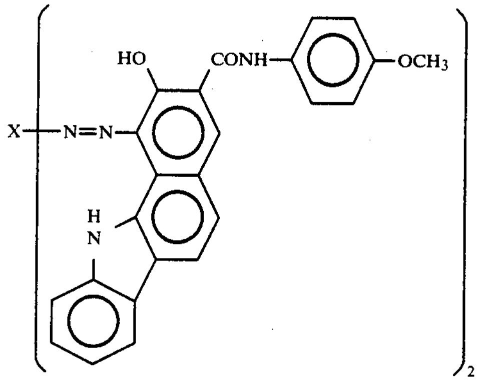
(17)-1
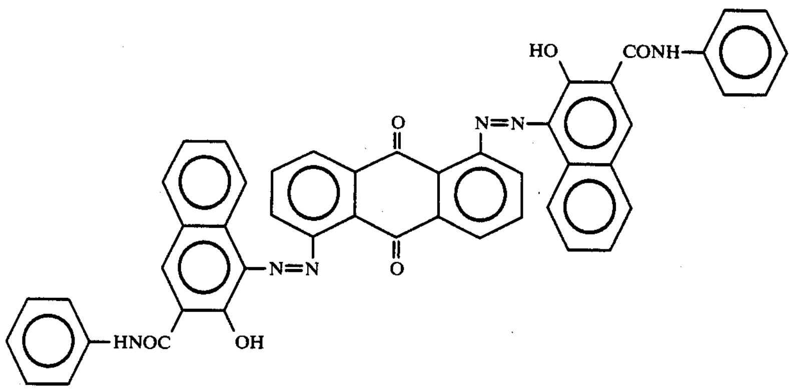
(17)-2
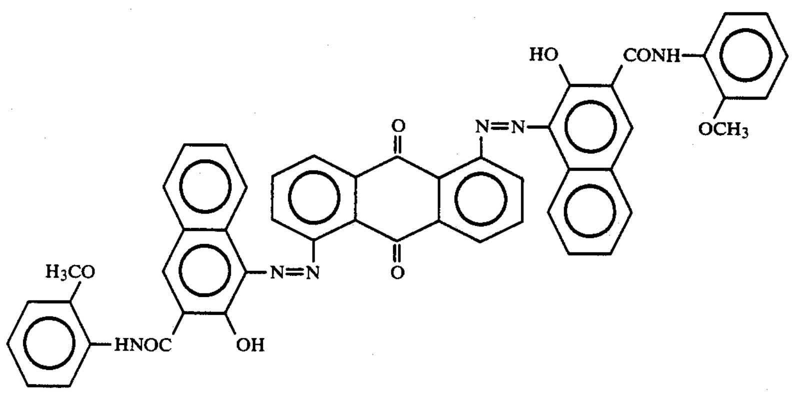
(17)-3
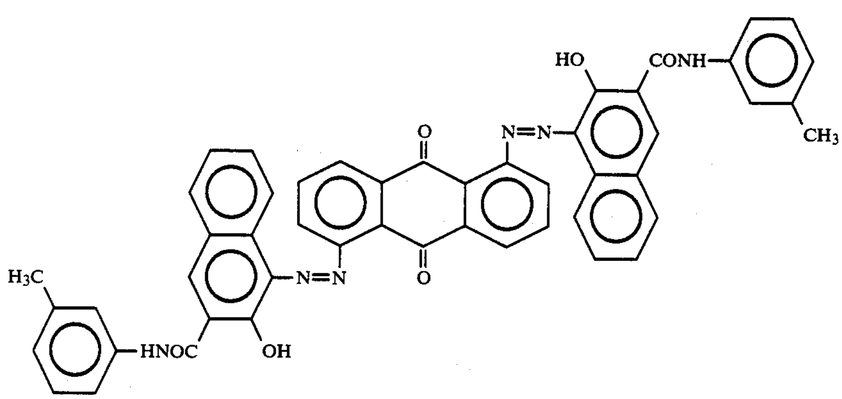

-continued
(17)-4
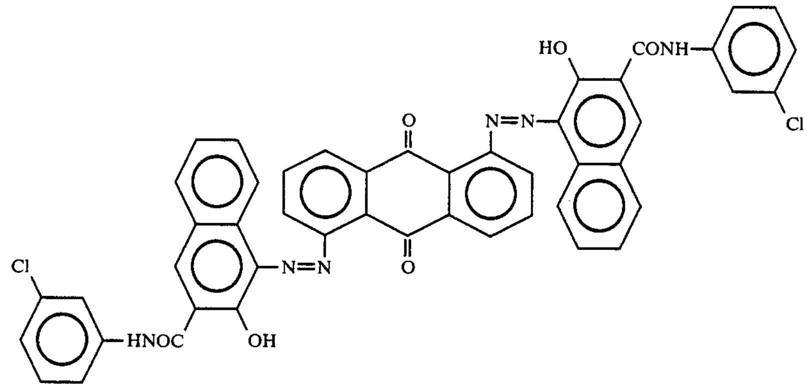
(17)-5
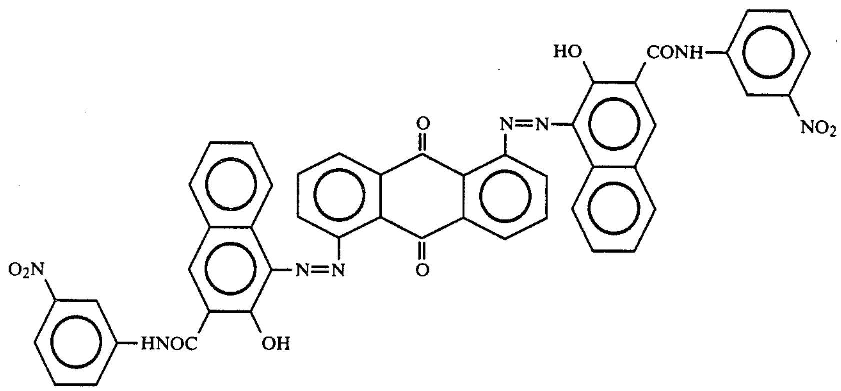
(17)-6
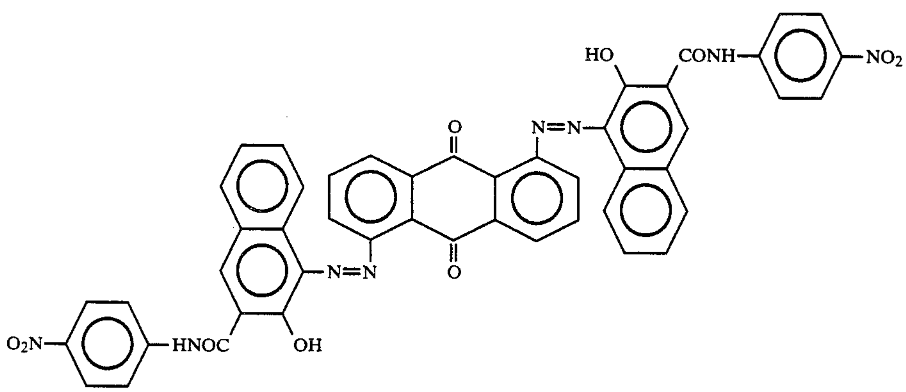
(17)-7
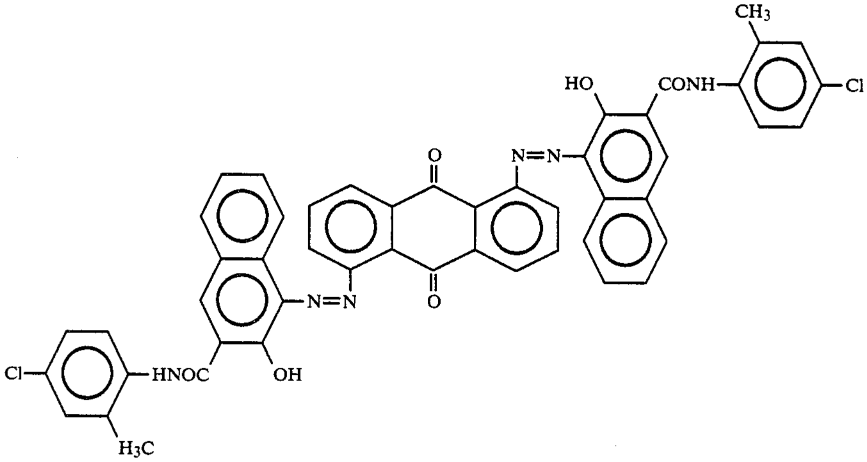

-continued
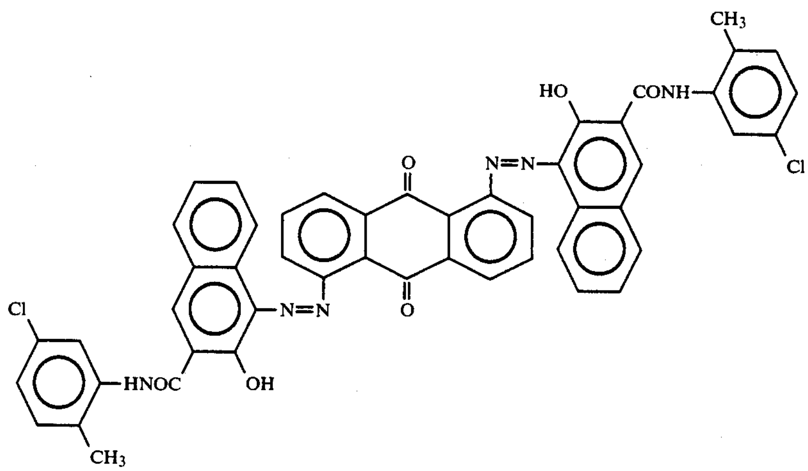
(17)-8
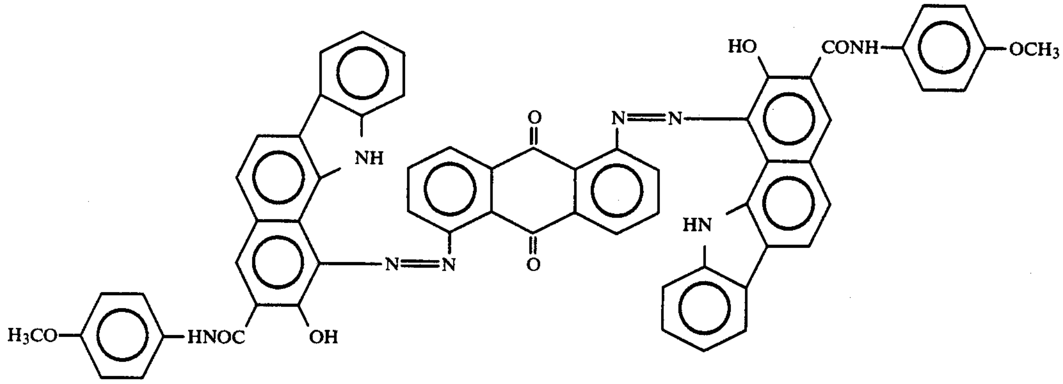
(17)-9
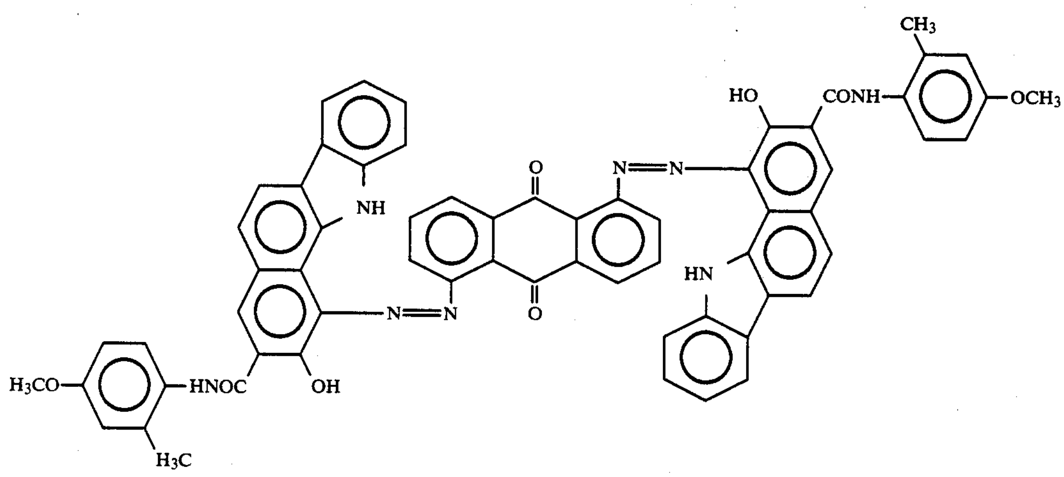
(17)-10

-continued
(17)-11
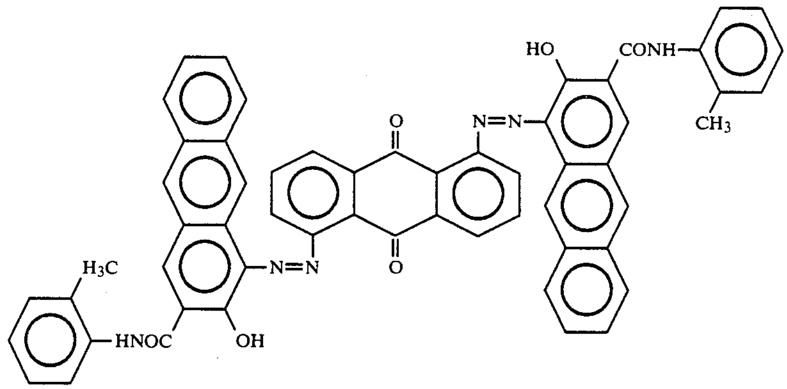
(18)-1
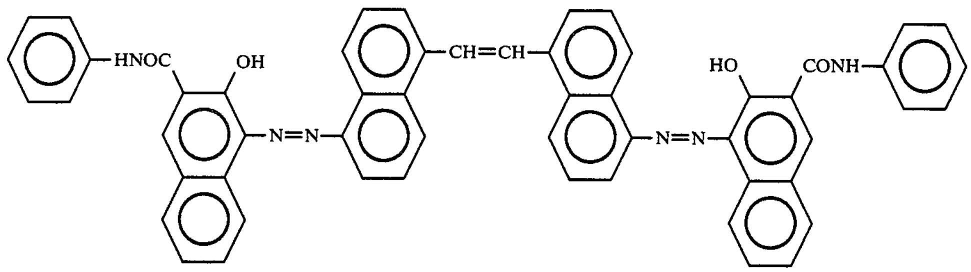
(18)-2
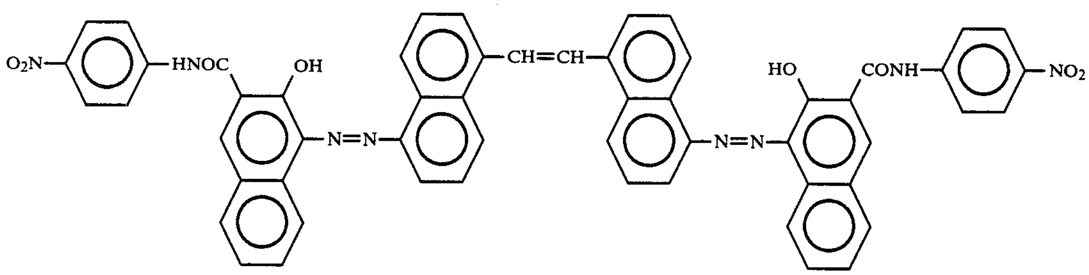
(18)-3
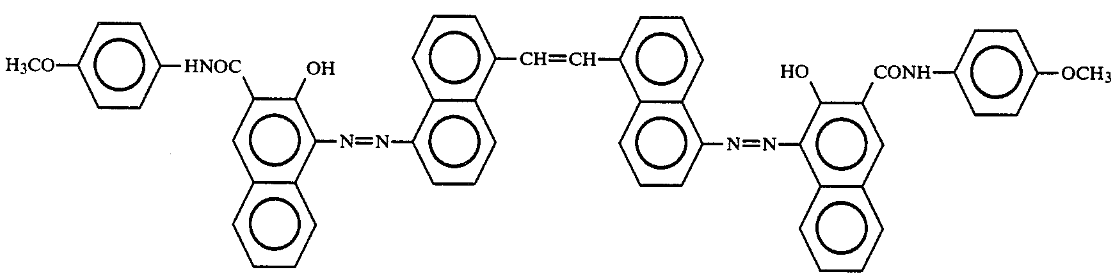
(18)-4
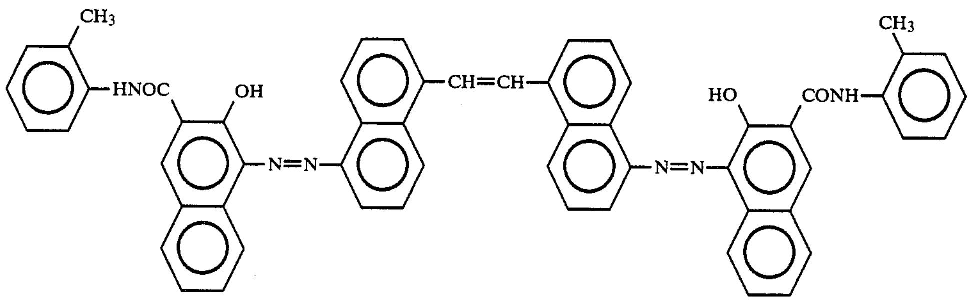

-continued
(18)-5
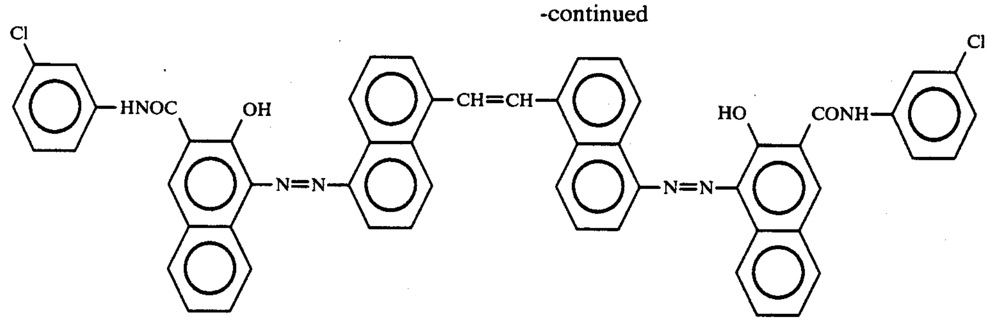
(18)-6
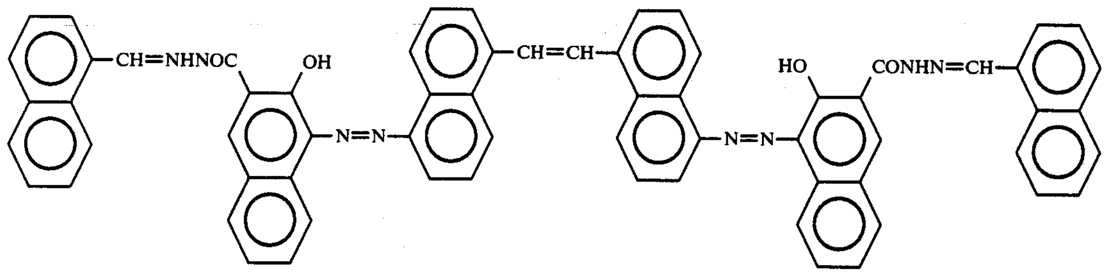
(18)-7
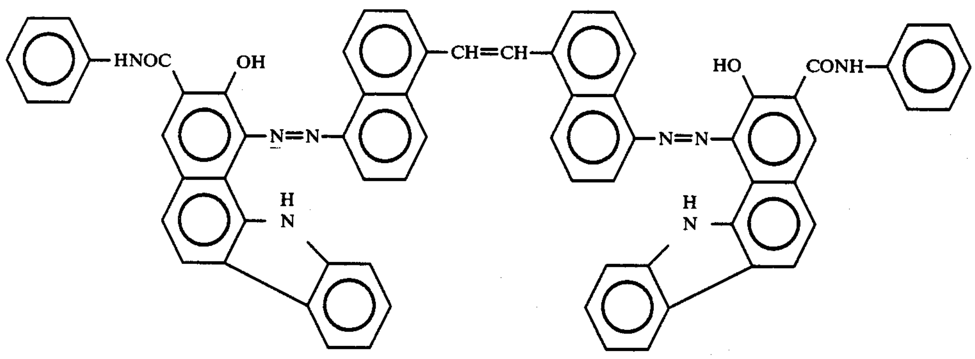
(18)-8
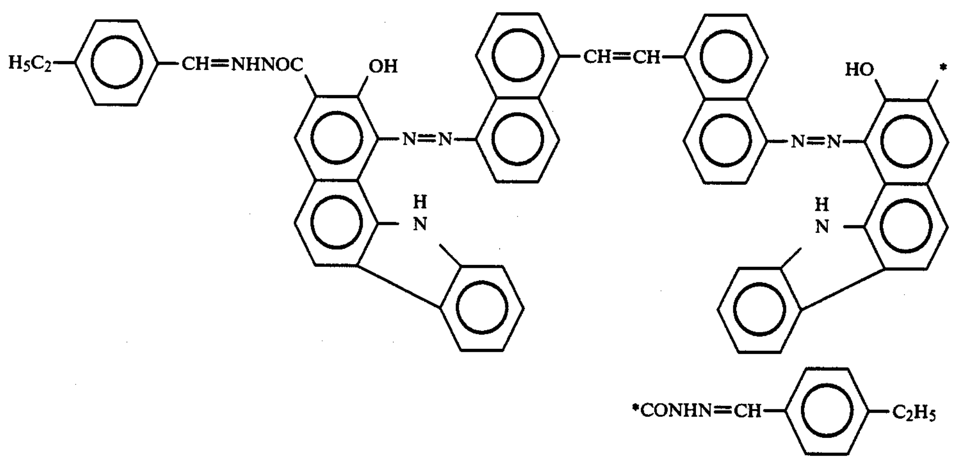
(19)-1
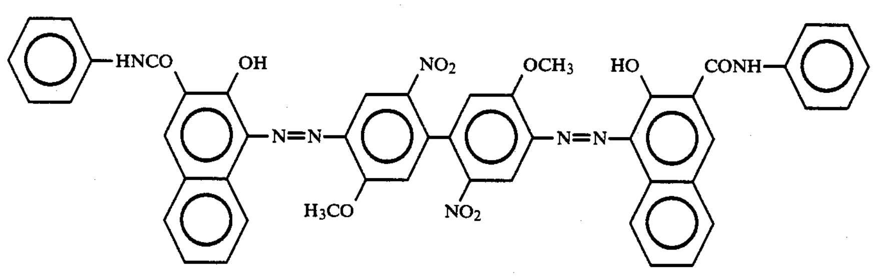

-continued
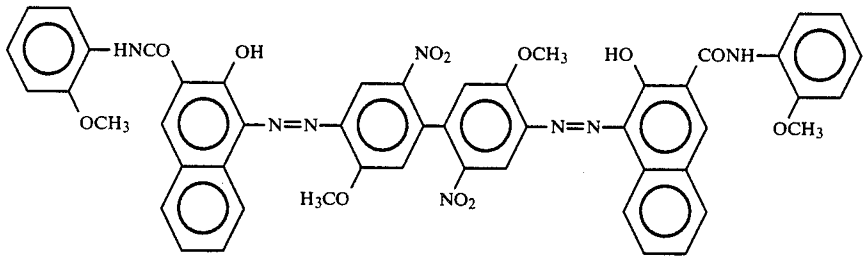
(19)-2
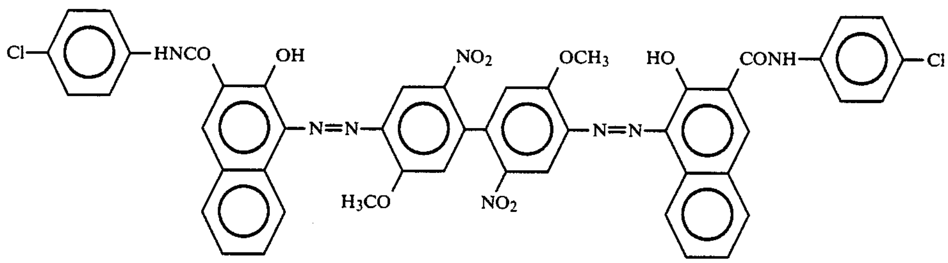
(19)-3
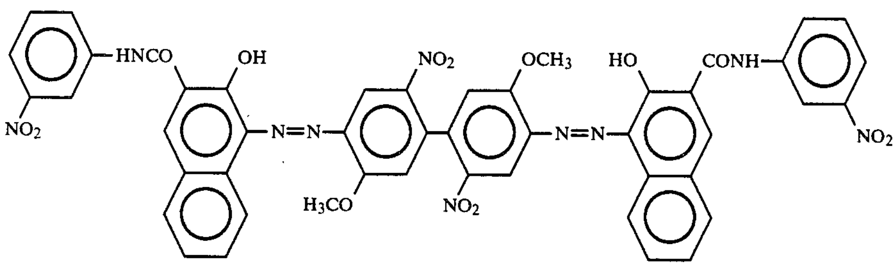
(19)-4
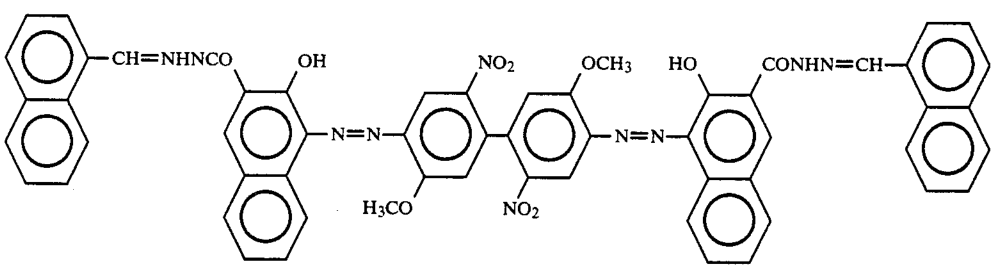
(19)-5
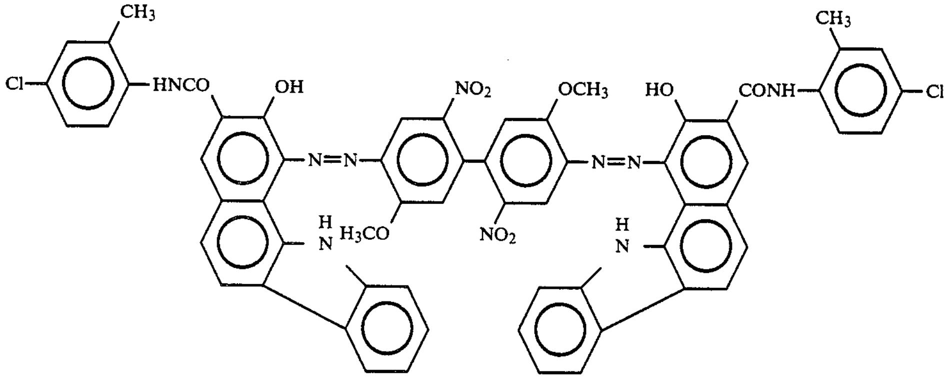
(19)-6

-continued
(19)-7
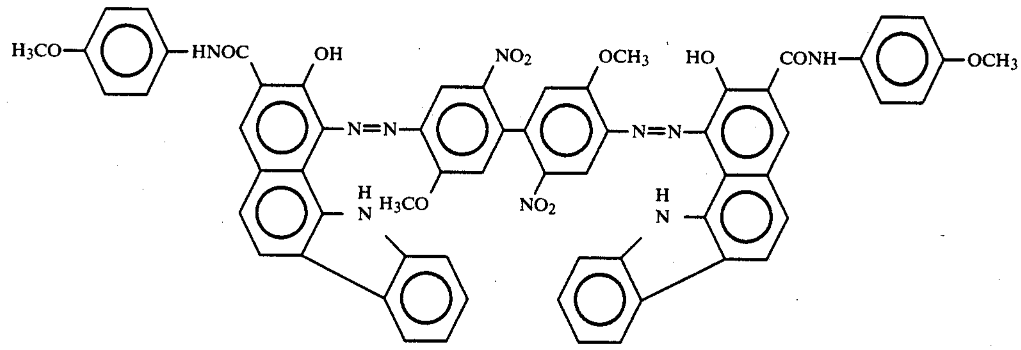
(20)-1
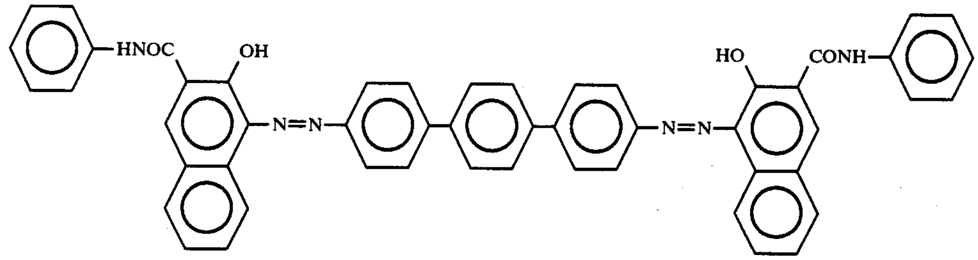
(20)-2
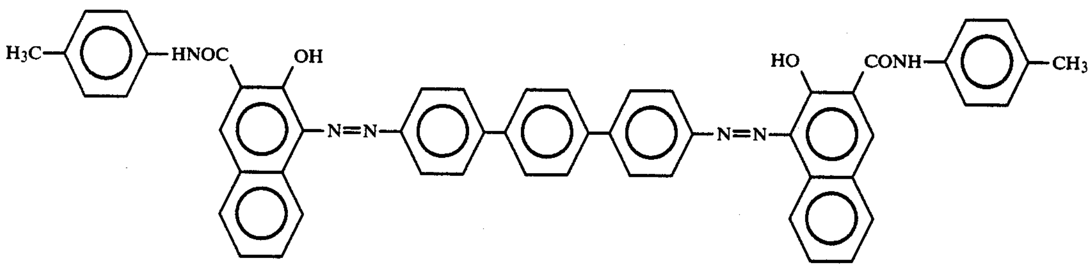
(20)-3
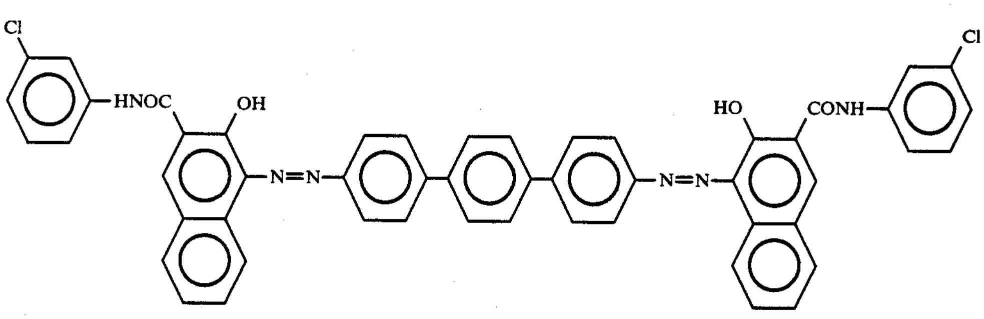
(20)-4
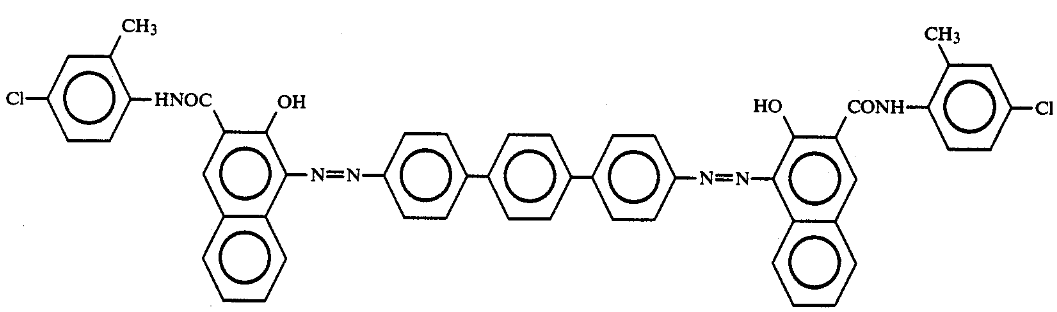

-continued
(20)-5
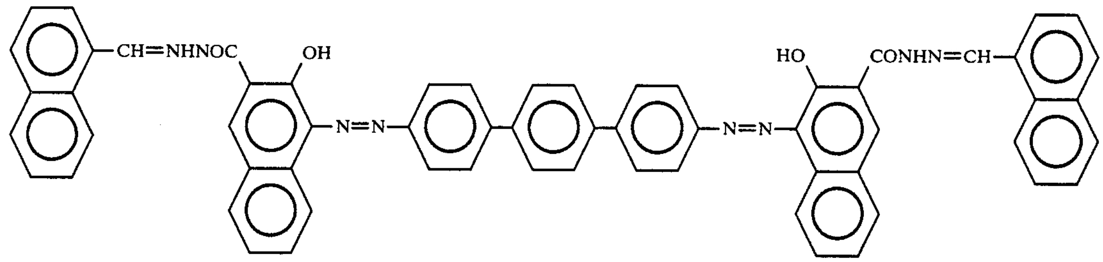
(20)-6
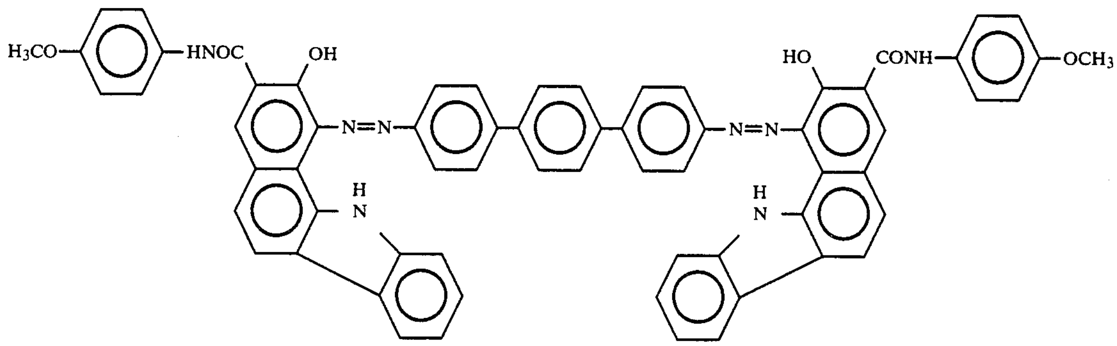
(20)-7
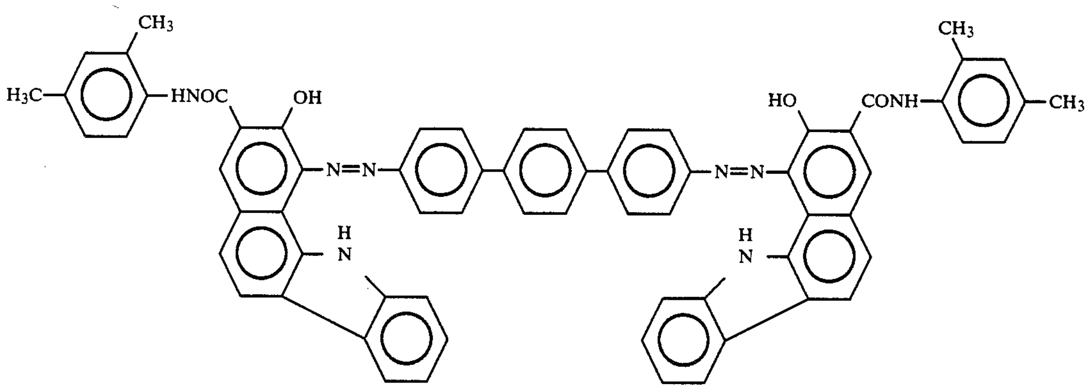
(20)-8
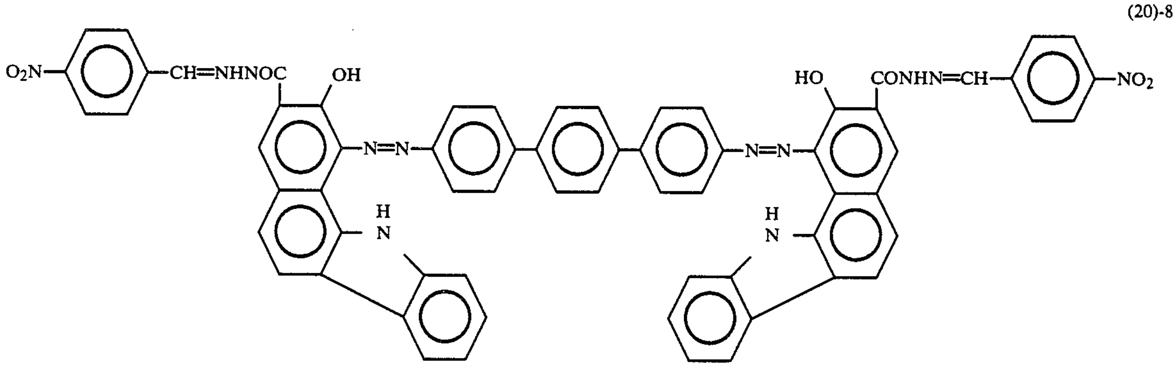

(21)
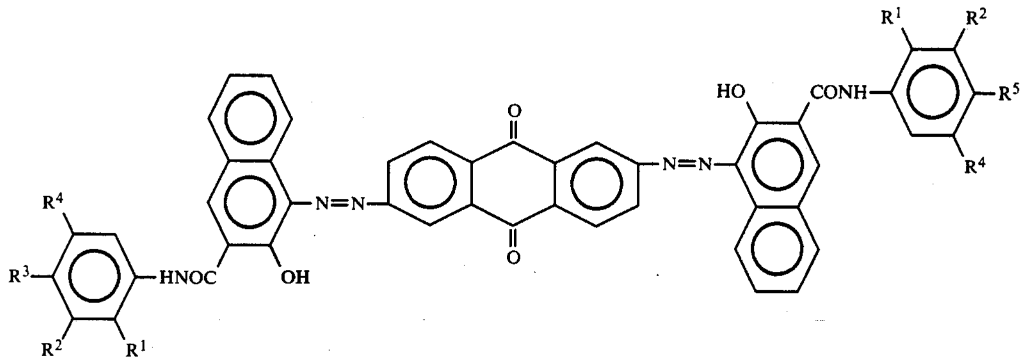
| No. | $R^1$ | $R^2$ | $R^3$ | $R^4$ |
|---|---|---|---|---|
| (21)-1 | H | H | H | H |
| (21)-2 | $OCH_3$ | H | H | H |
| (21)-3 | H | $OCH_3$ | H | H |
| (21)-4 | H | H | H | H |
| (21)-5 | H | H | $OCH_3$ | H |
| (21)-6 | Cl | H | H | H |
| (21)-7 | H | Cl | H | H |
| (21)-8 | H | H | Cl | H |
| (21)-9 | Br | H | H | H |
| (21)-10 | H | Br | H | H |
| (21)-11 | H | H | Br | H |
| (21)-12 | I | H | H | H |
| (21)-13 | H | I | H | H |
| (21)-14 | H | H | I | H |
| (21)-15 | $NO_2$ | H | H | H |
| (21)-16 | H | $NO_2$ | H | H |
| (21)-17 | H | H | $NO_2$ | H |
| (21)-18 | Cl | H | H | Cl |
(22)-1
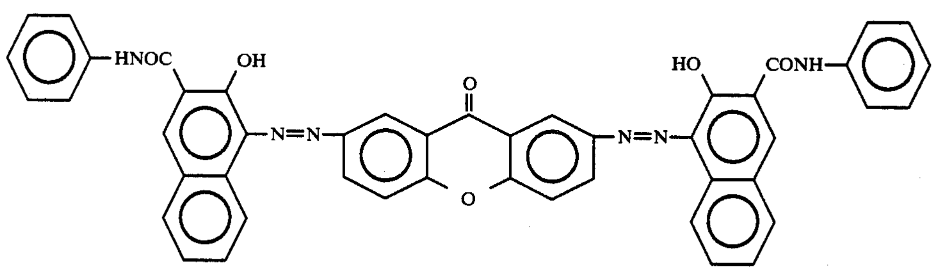
(22)-2
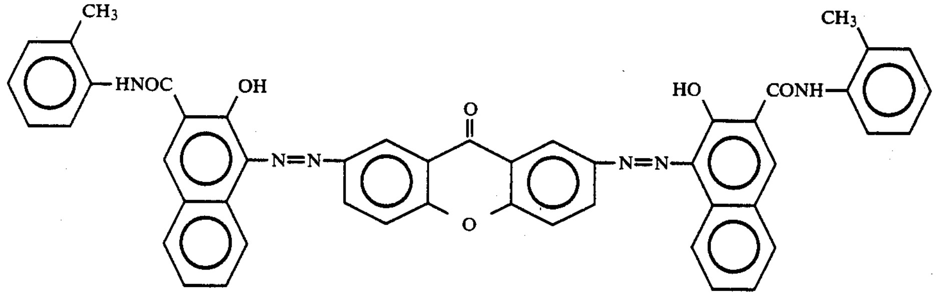

-continued
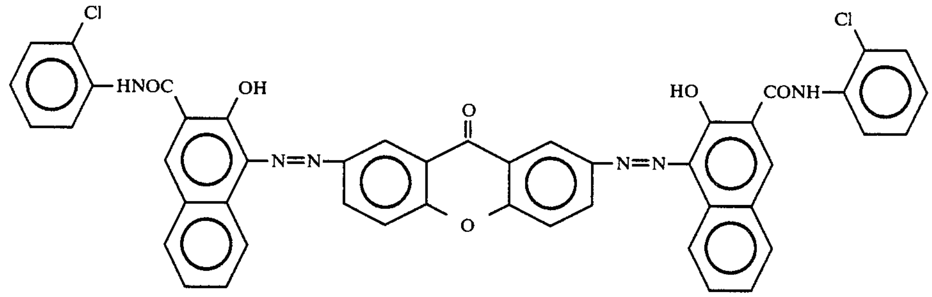
(22)-3
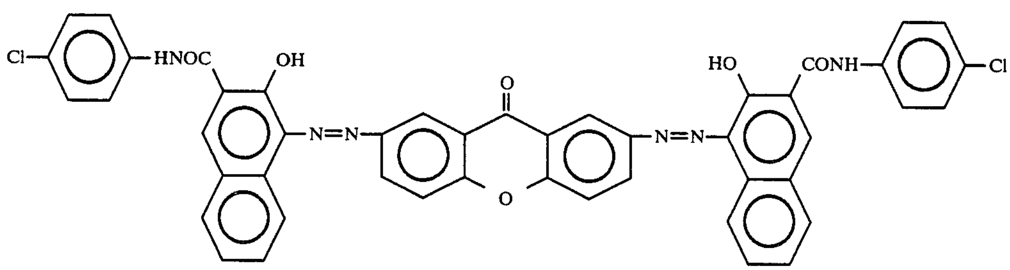
(22)-4
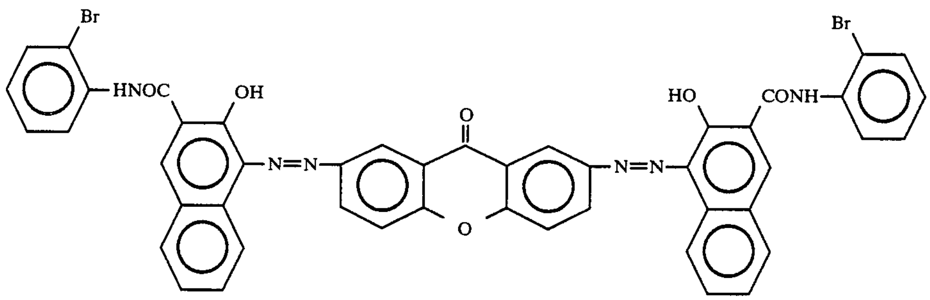
(22)-5
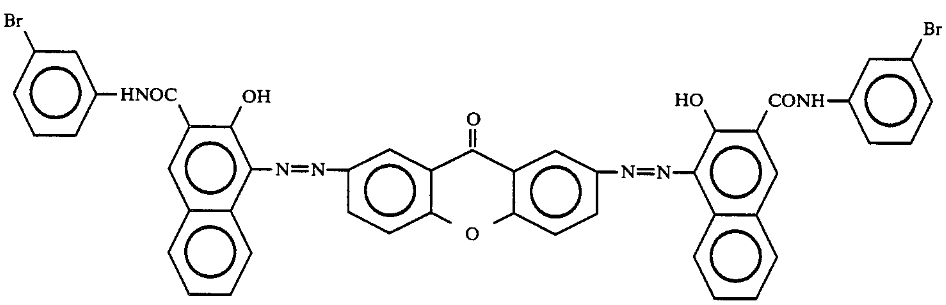
(22)-6
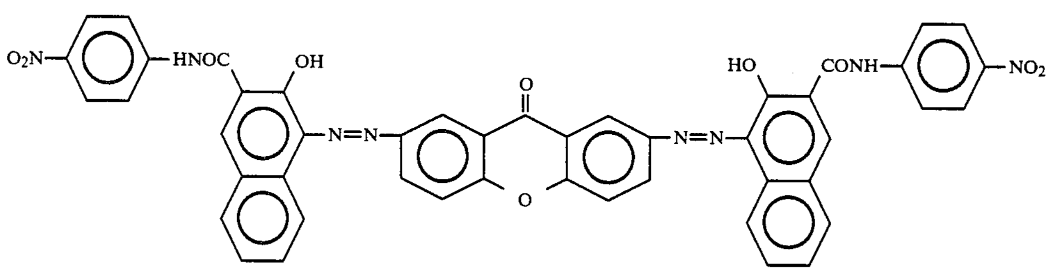
(22)-7

-continued
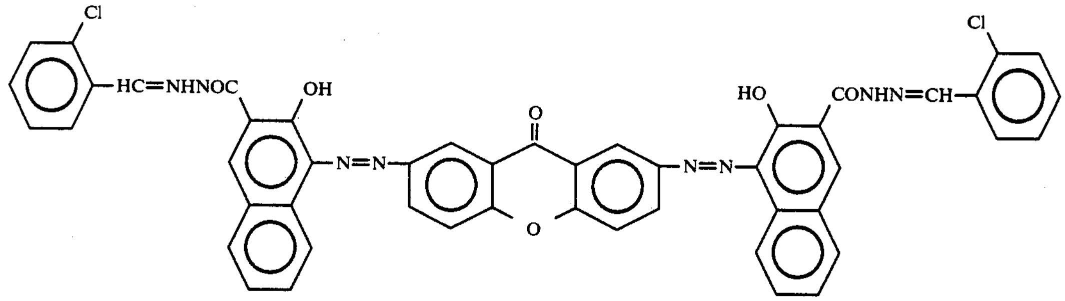
(22)-8
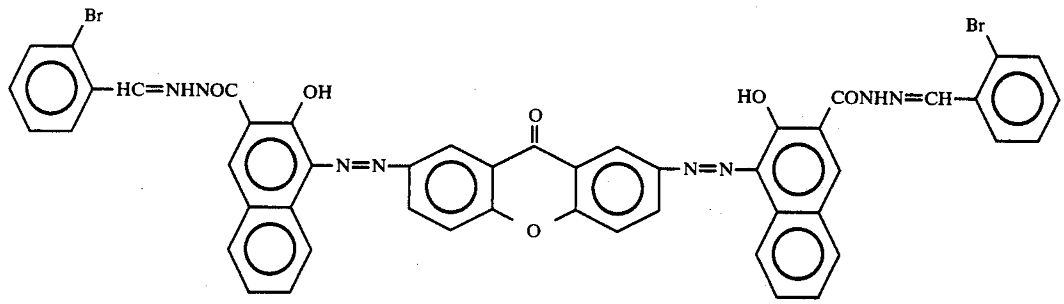
(22)-9
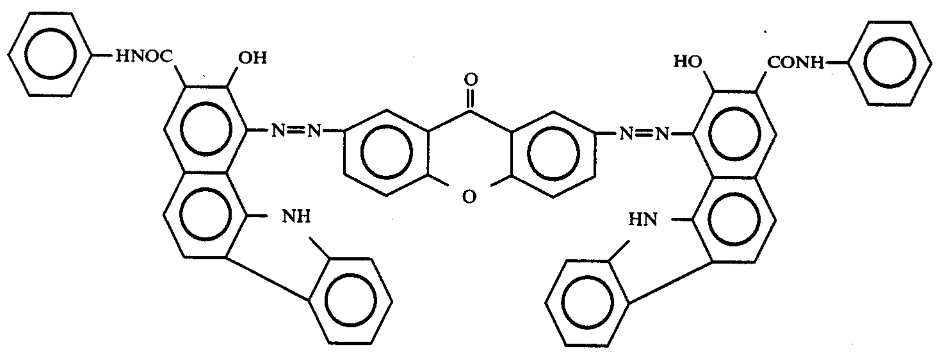
(22)-10
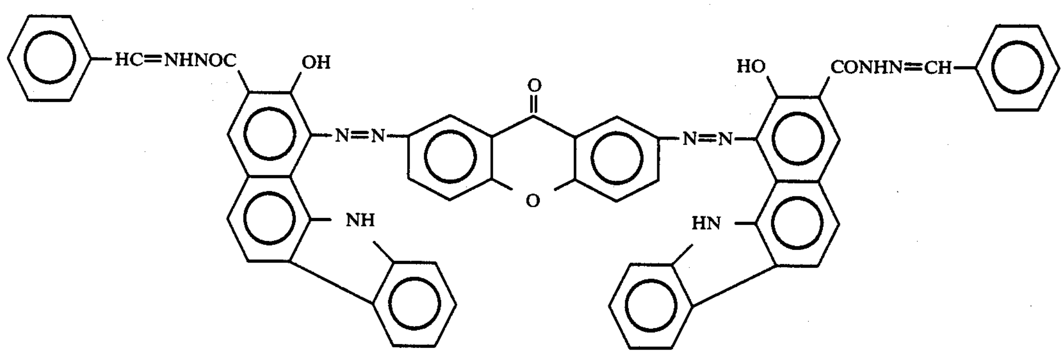
(22)-11
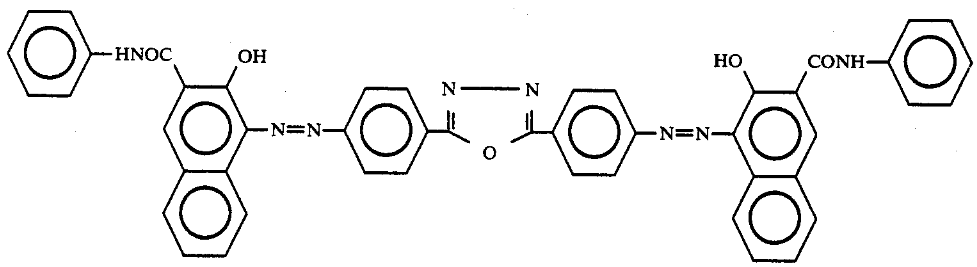
(23)-1

-continued
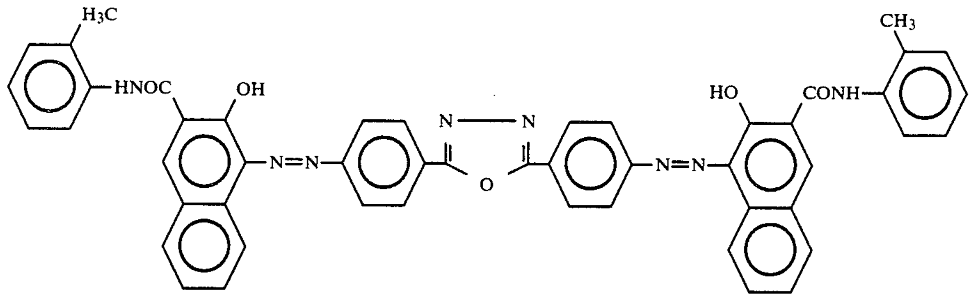
(23)-2
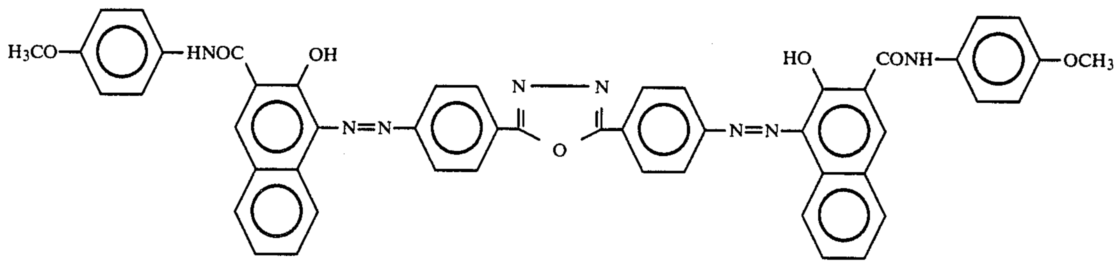
(23)-3
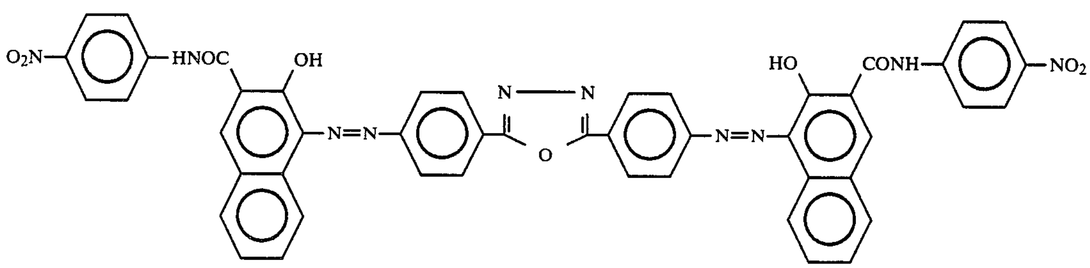
(23)-4
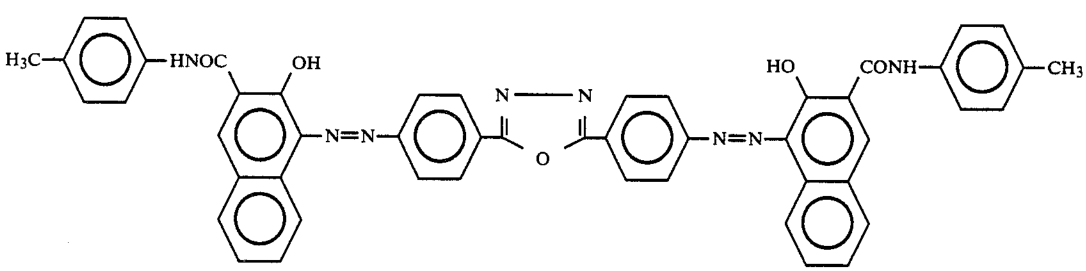
(23)-5
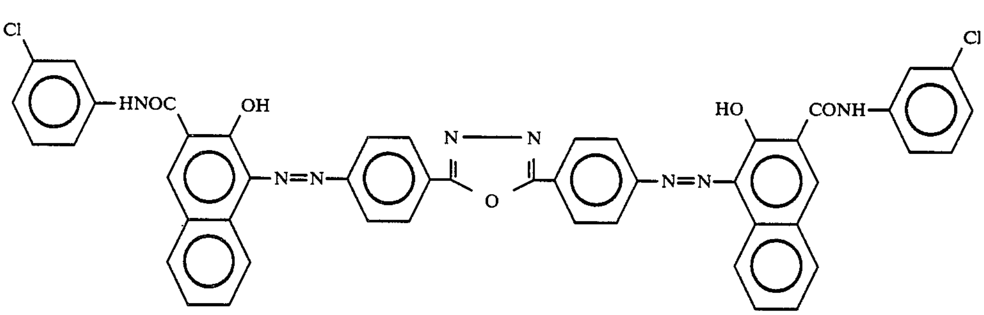
(23)-6

-continued
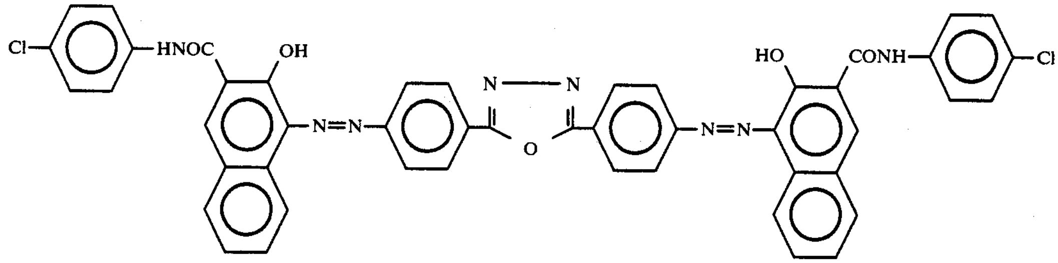
(23)-7
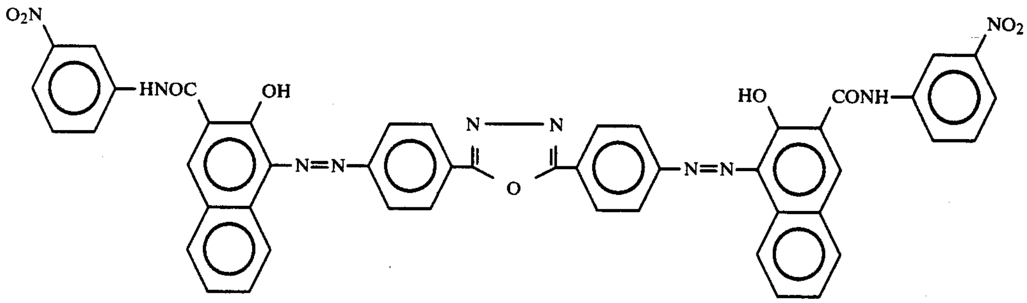
(23)-8
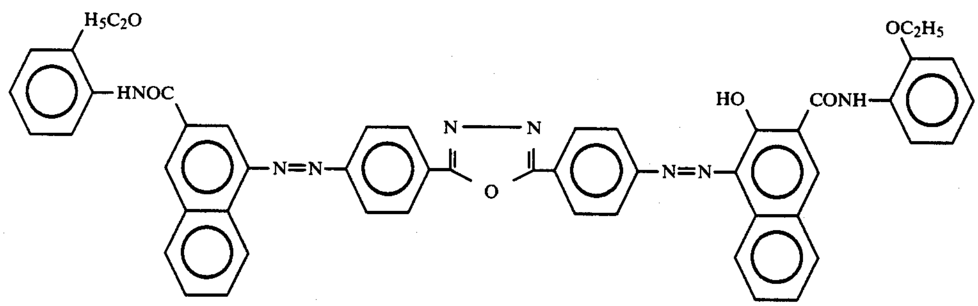
(23)-9
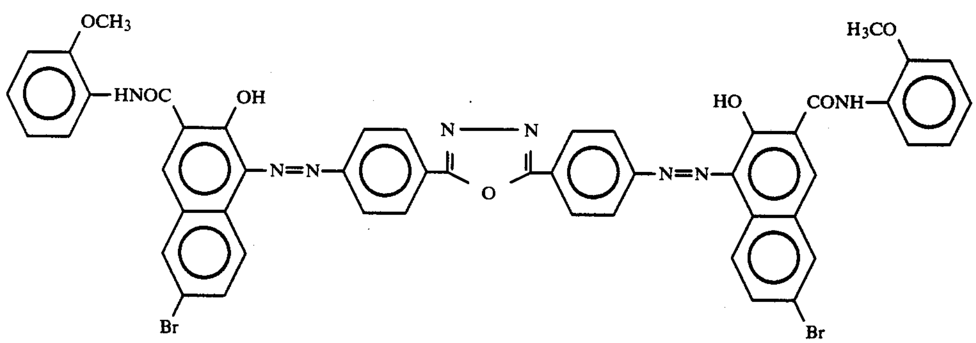
(23)-10
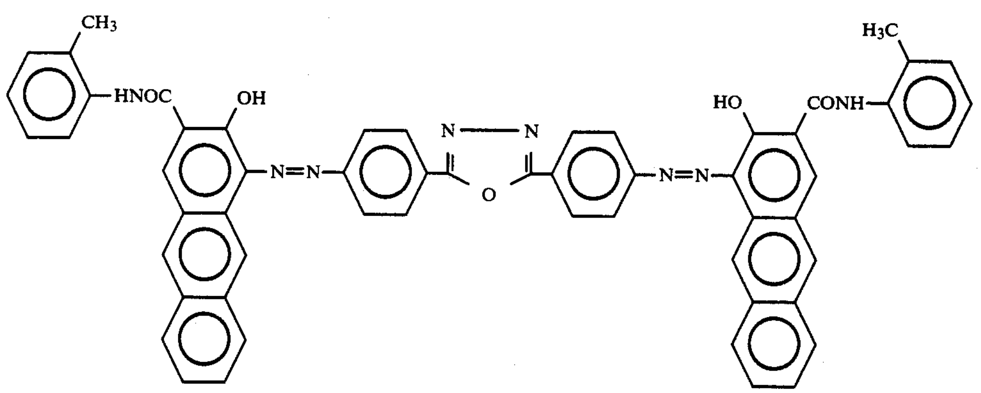
(23)-11

-continued
(23)-12
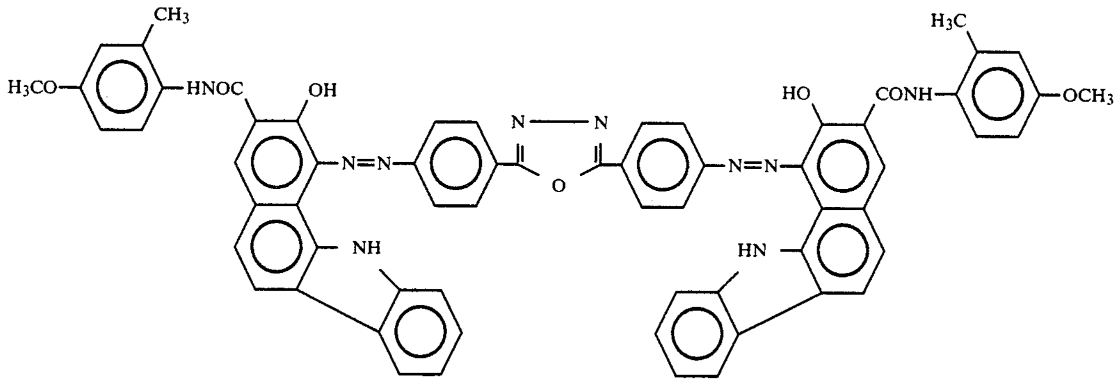
(24)-1
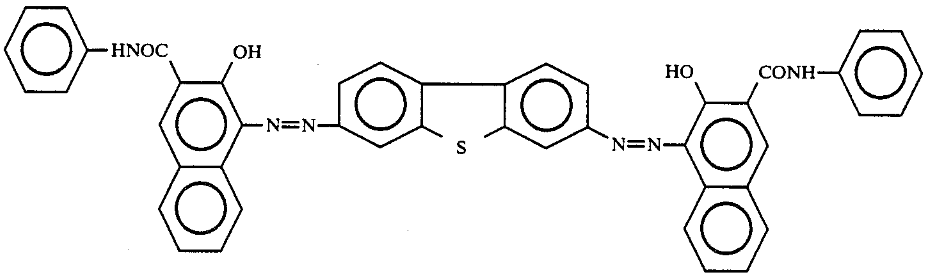
Hereinafter —N=N— 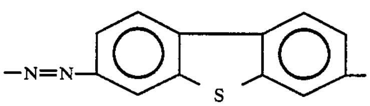 —N=N— is represented by —Y—.
(24)-2
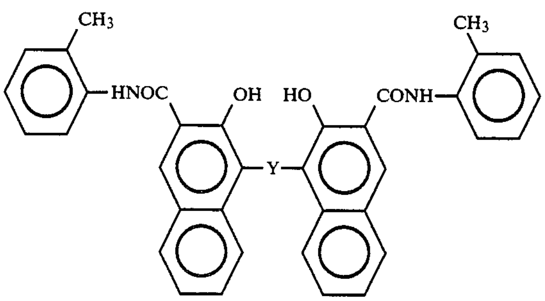
(24)-3
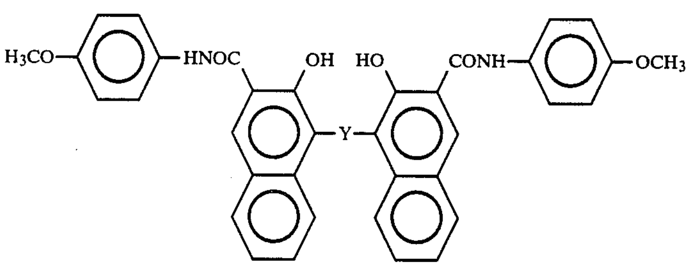
(24)-4
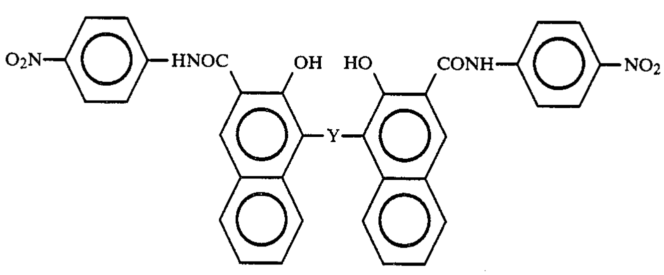

-continued
(24)-5
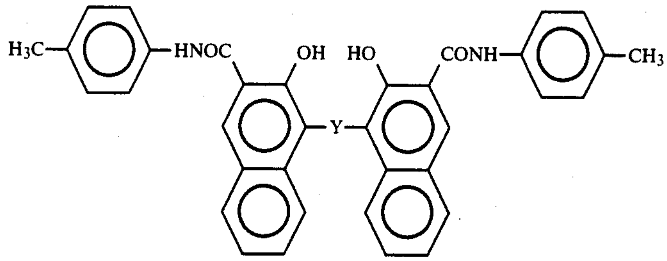
(24)-6
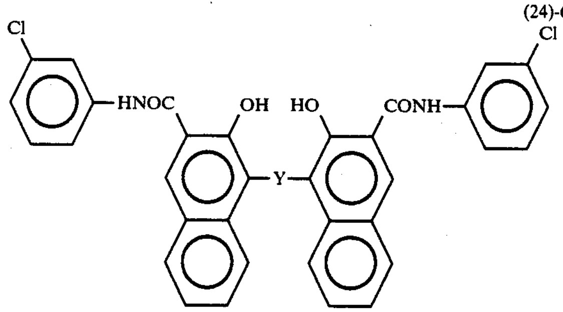
(24)-7
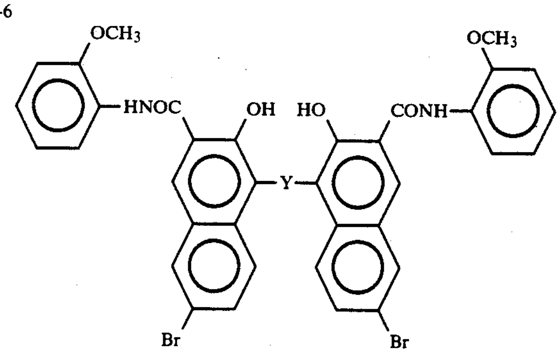
(24)-8
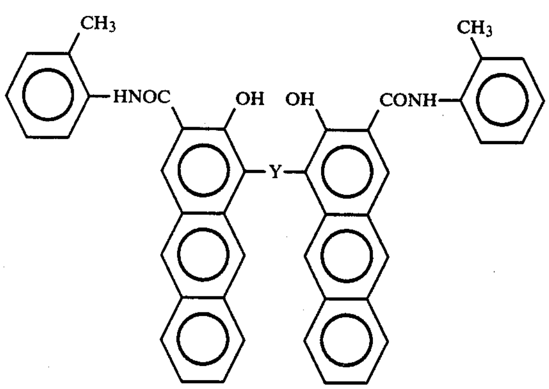
(24)-9
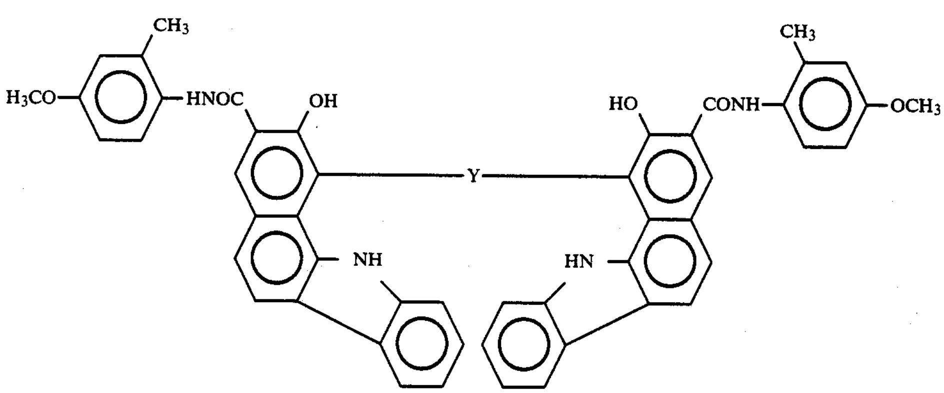

-continued
(24)-10
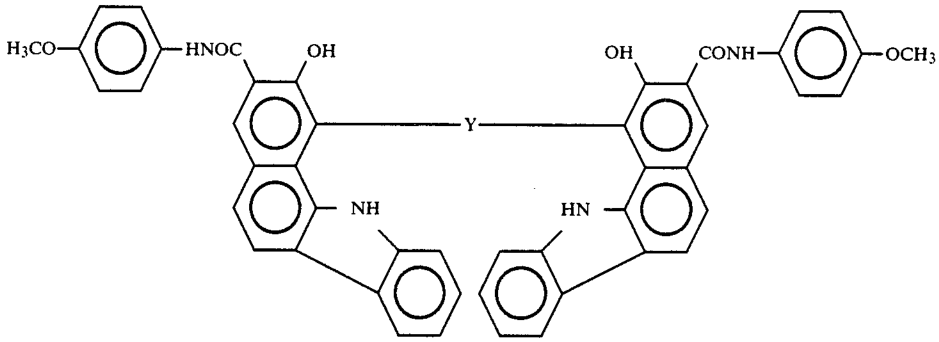
(24)-11
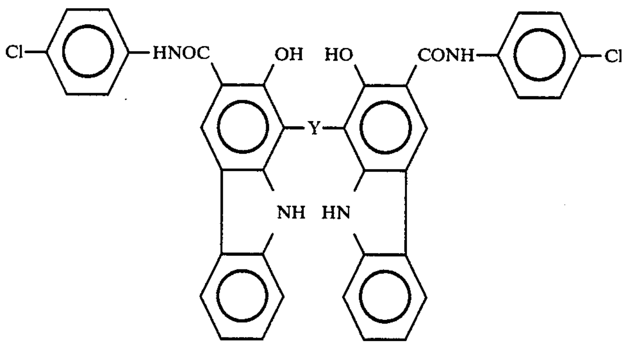
(24)-12
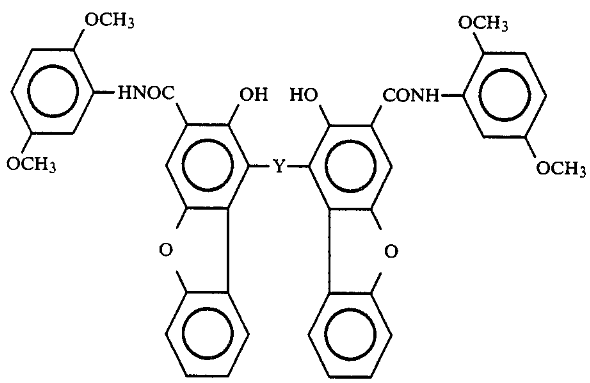
(25)
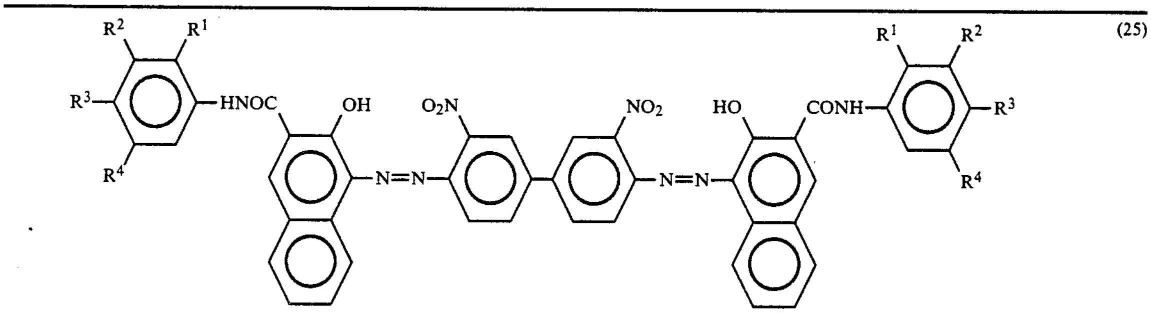
| No. | $R^1$ | $R^2$ | $R^3$ | $R^4$ |
|---|---|---|---|---|
| (25)-1 | H | H | H | H |
| (25)-2 | $OCH_3$ | H | H | H |
| (25)-3 | H | $OCH_3$ | H | H |
| (25)-4 | H | H | $OCH_3$ | H |
| (25)-5 | $CH_3$ | H | H | H |
| (25)-6 | H | $CH_3$ | H | H |
| (25)-7 | H | H | $CH_3$ | H |
| (25)-8 | Cl | H | H | H |
| (25)-9 | H | Cl | H | H |
| (25)-10 | H | H | Cl | H |

-continued
| | | | | |
|---|---|---|---|---|
| (25)-11 | H | $NO_2$ | H | H |
| (25)-12 | $OCH_3$ | H | H | $OCH_3$ |
| (25)-13 | $CH_3$ | H | Cl | H |
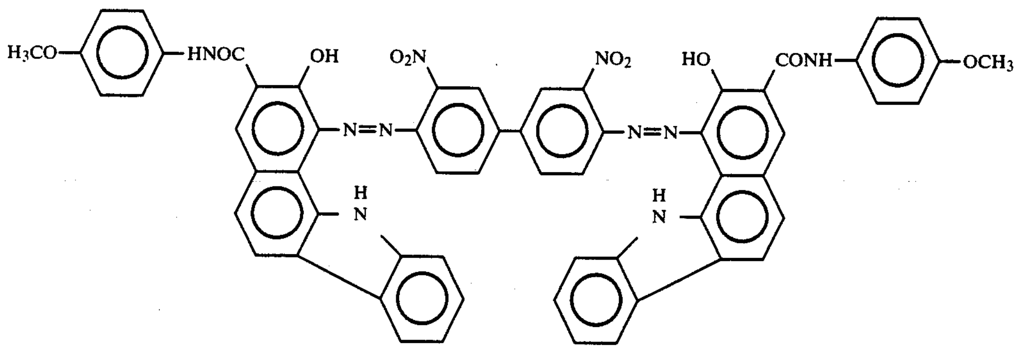
(25)-14
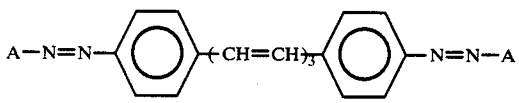
(26)
Hereinafter, only the moiety A in the above formula is shown.
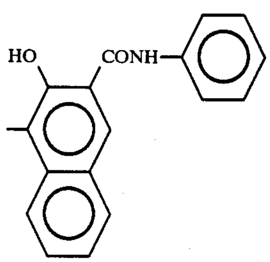
(26)-1
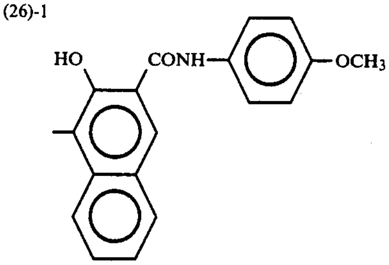
(26)-2
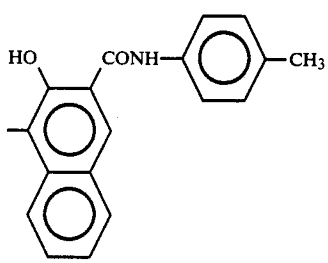
(26)-3
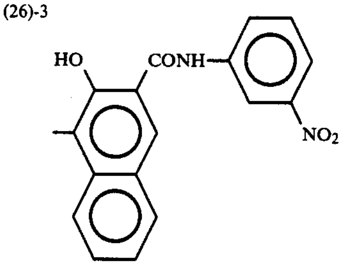
(26)-4
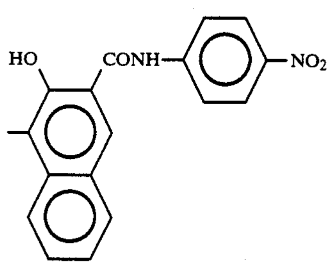
(26)-5
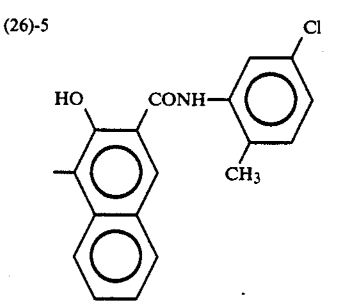
(26)-6

-continued
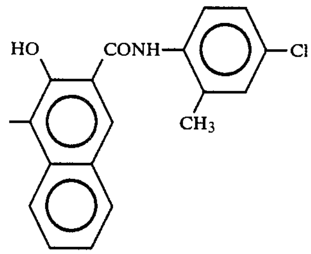
(26)-7
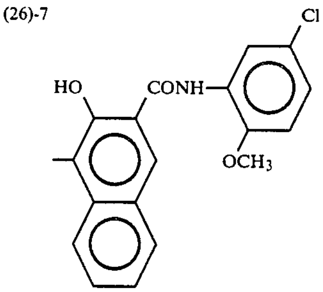
(26)-8
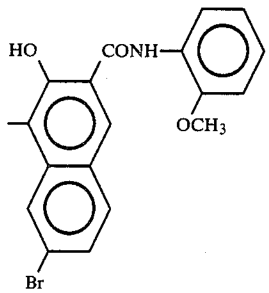
(26)-9
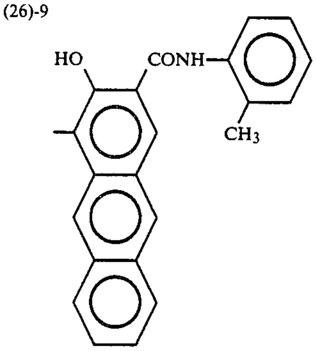
(26)-10
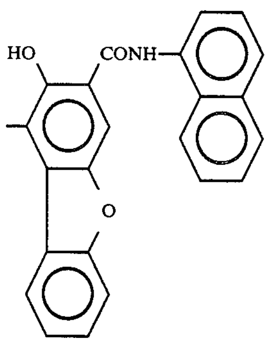
(26)-11
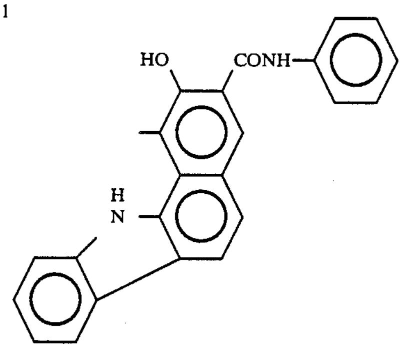
(26)-12
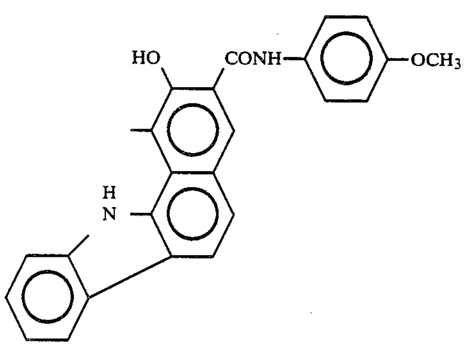
(26)-13
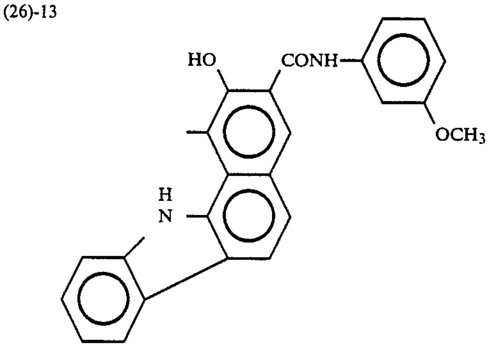
(26)-14

-continued
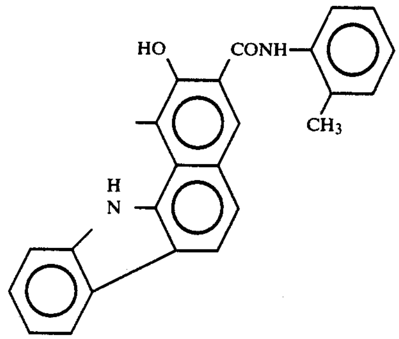
(26)-15
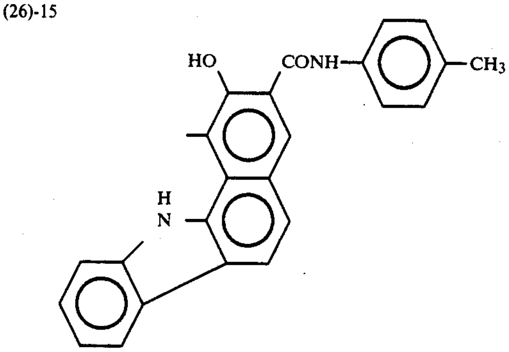
(26)-16
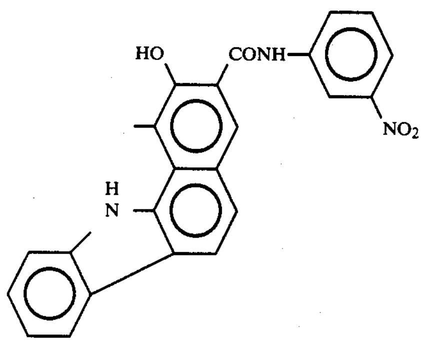
(26)-17
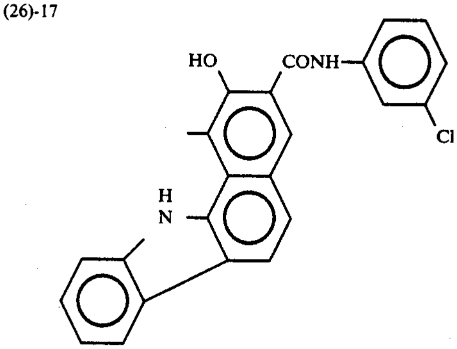
(26)-18
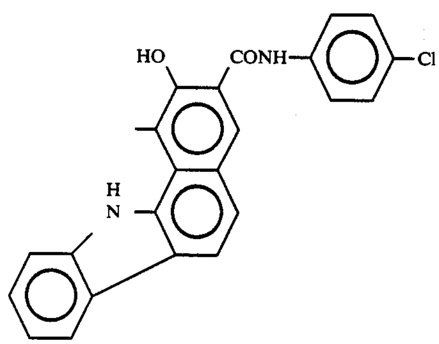
(26)-19
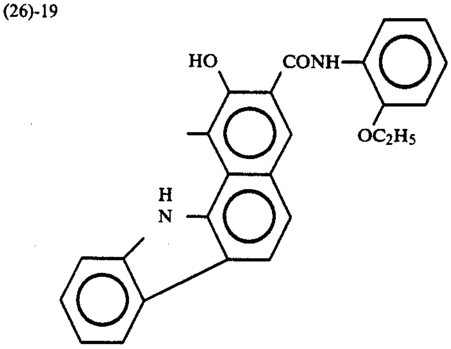
(26)-20
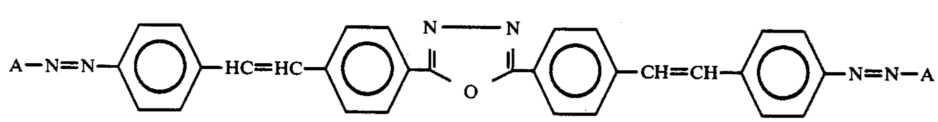
(27)
Hereinafter, only the moiety A in the above formula is shown.
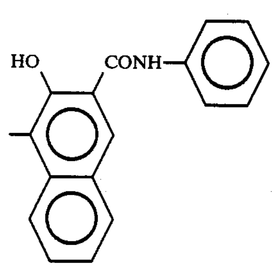
(27)-1
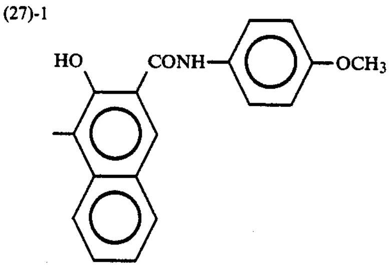
(27)-2

-continued
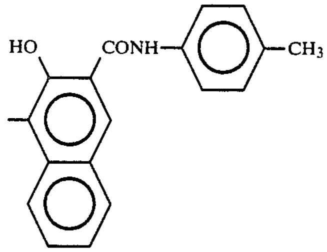
(27)-3
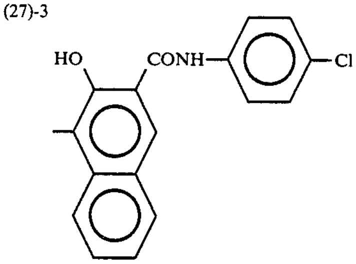
(27)-4
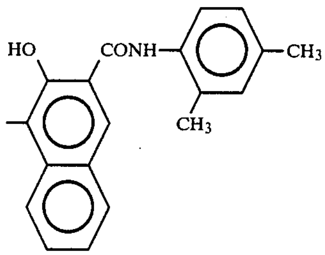
(27)-5
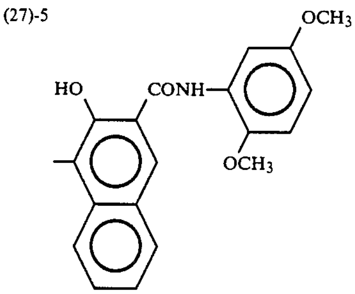
(27)-6
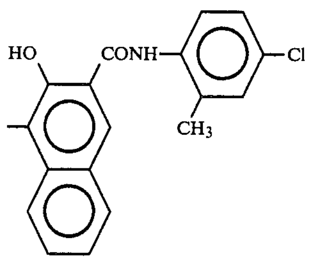
(27)-7
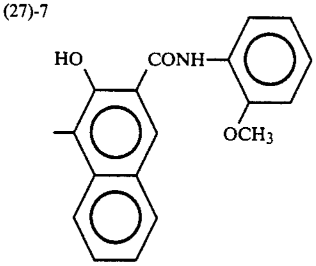
(27)-8
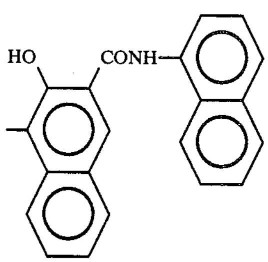
(27)-9
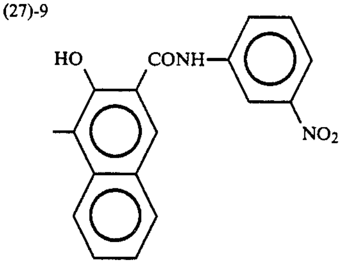
(27)-10
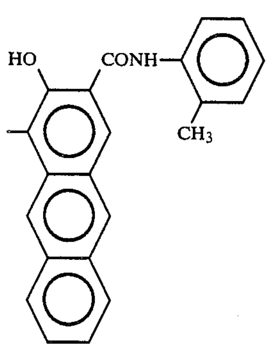
(27)-11
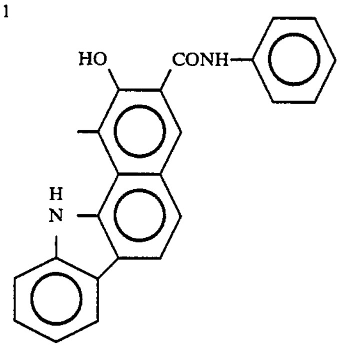
(27)-12

-continued
(27)-13
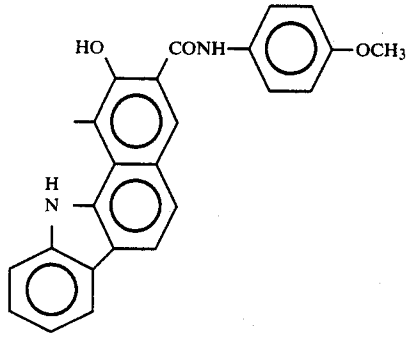
(27)-14
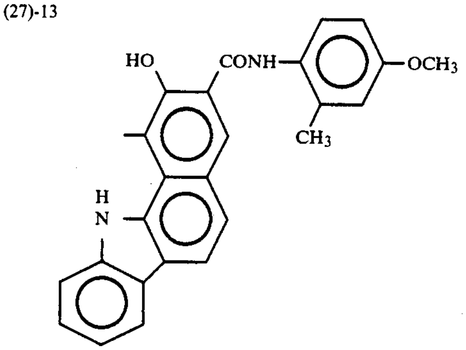
(27)-15
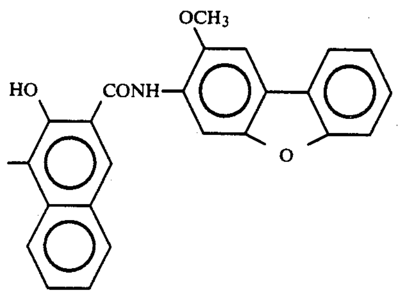
(28)-1
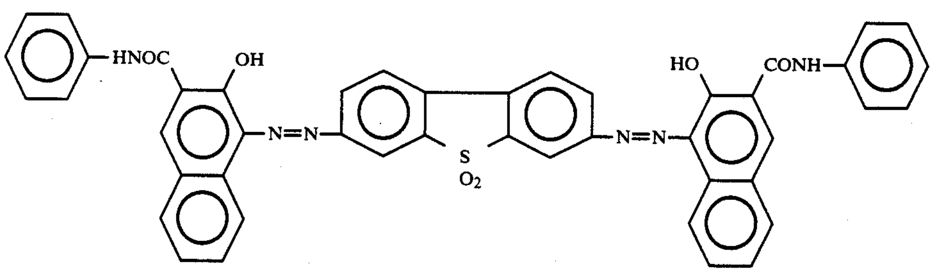
Hereinafter 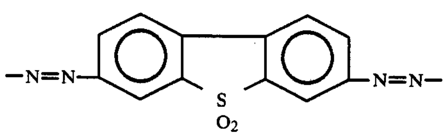 is represented by —Y—.
(28)-2
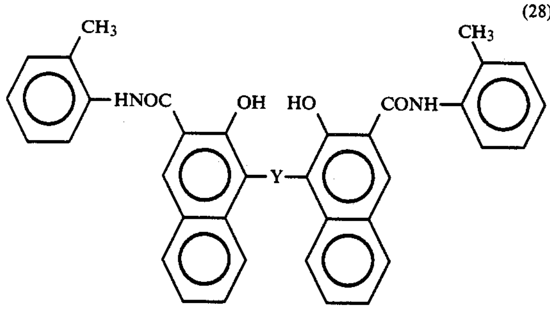
(28)-3
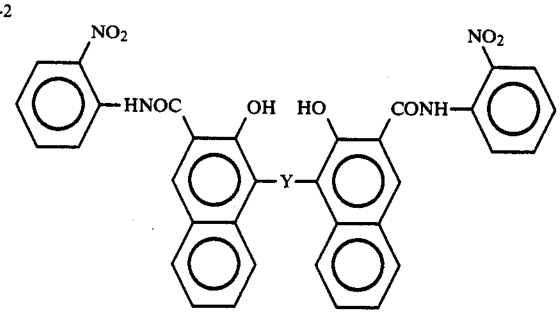
(28)-4
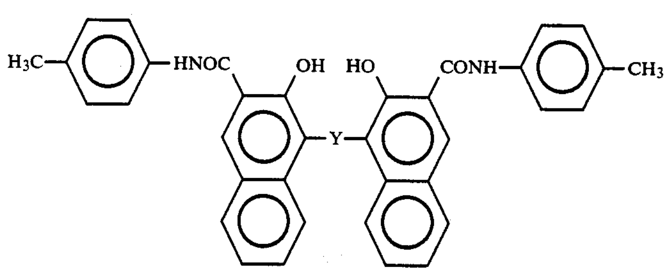

-continued
(28)-5
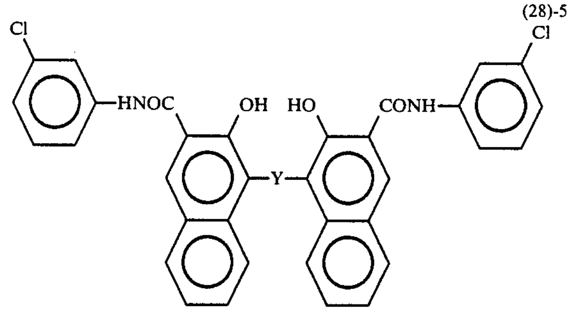
(28)-6
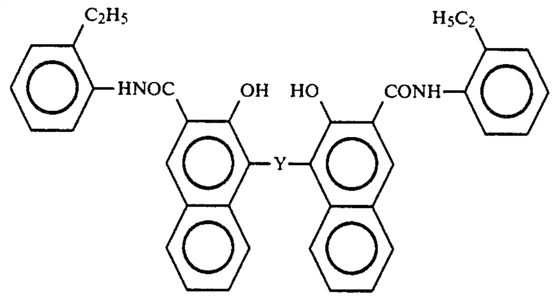
(28)-7
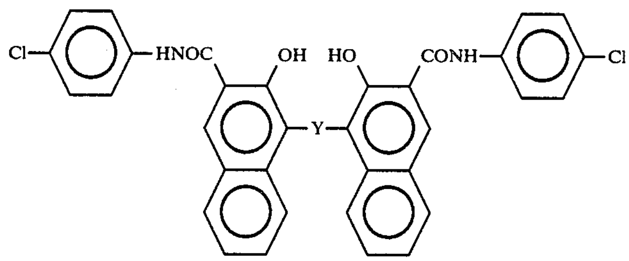
(28)-8
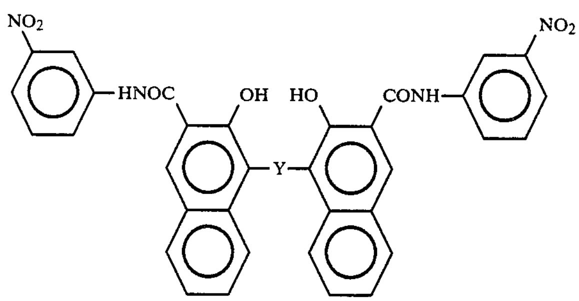
(28)-9
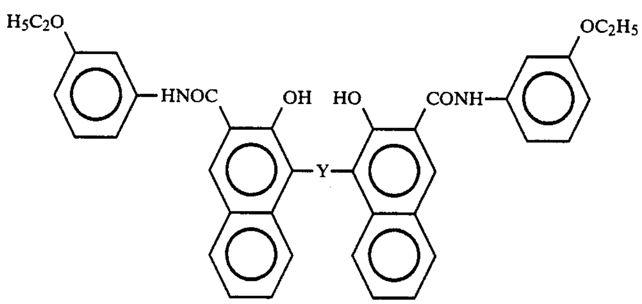
(28)-10
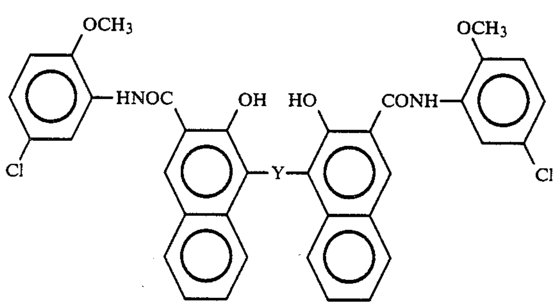

-continued
(28)-11
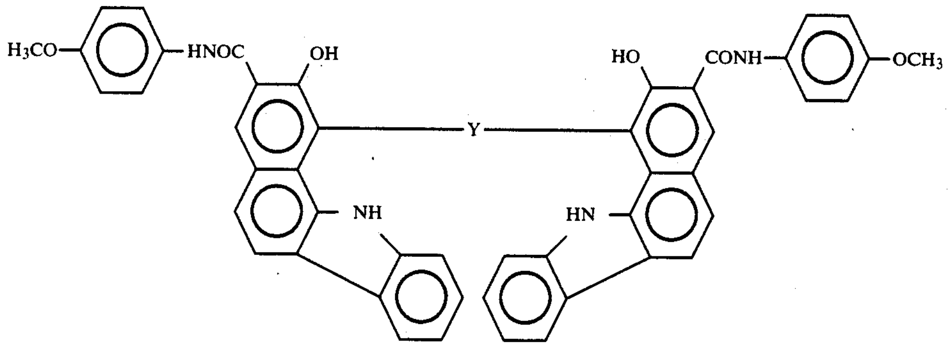
(28)-12
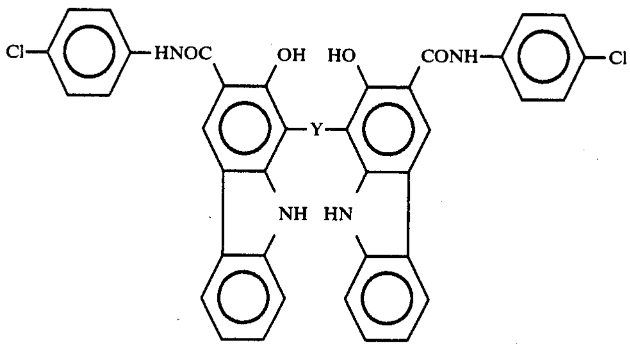
(28)-13
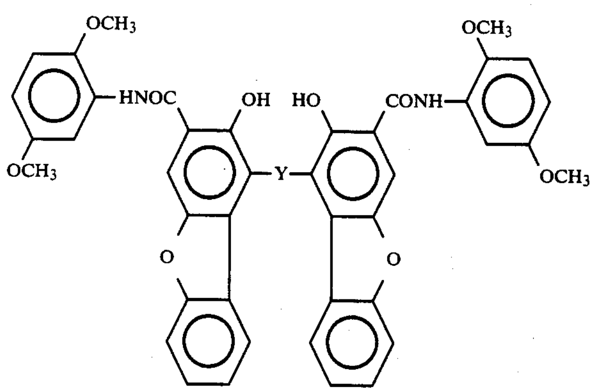
(28)-14
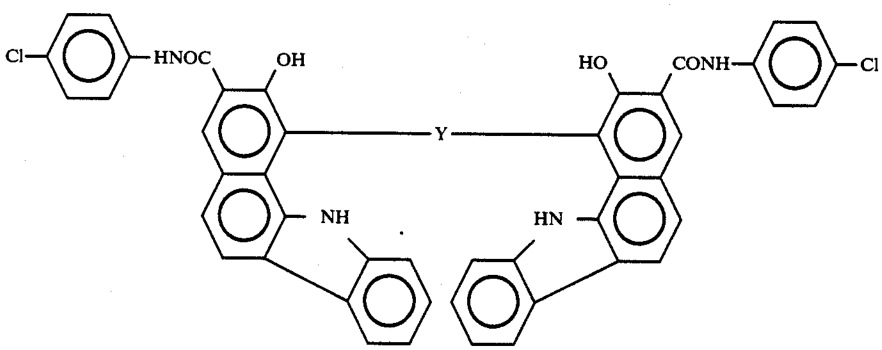

(29)-1
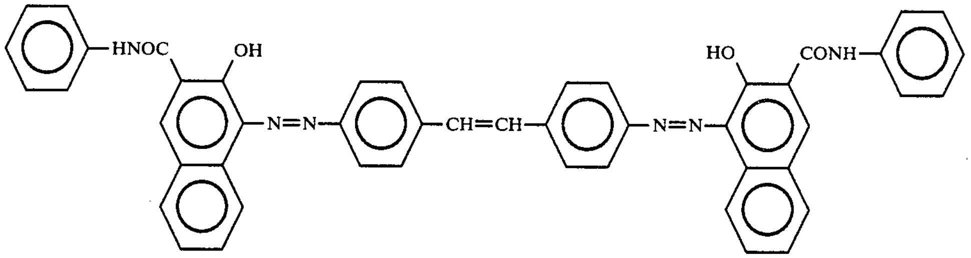
Hereinafter 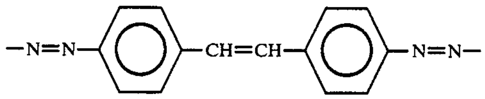 is represented by —Y—.
(29)-2
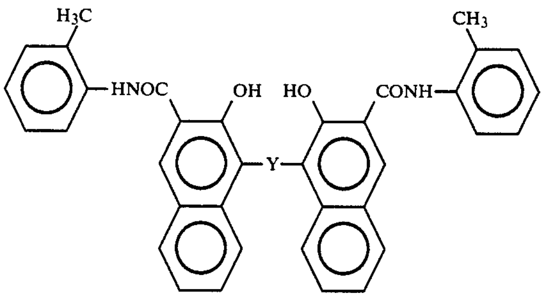
(29)-3
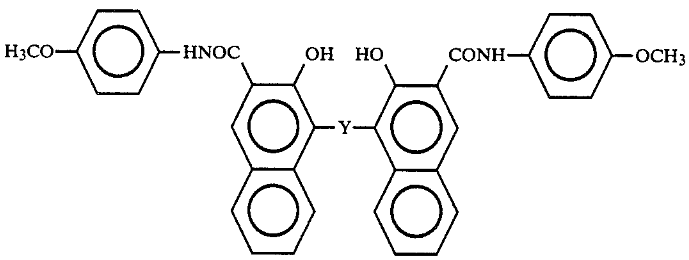
(29)-4
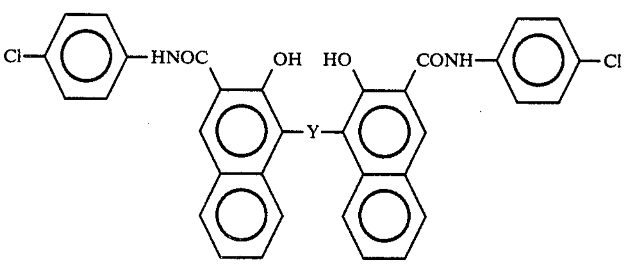
(29)-5
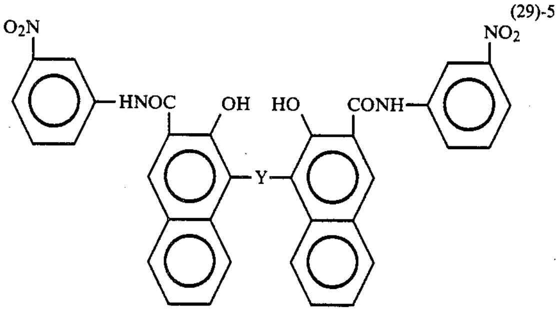
(29)-6
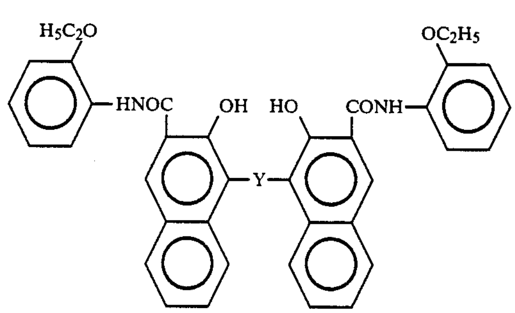

-continued
(29)-7
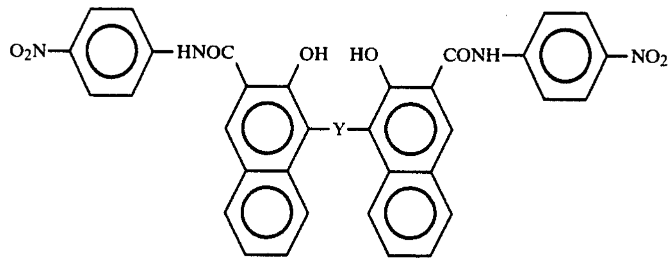
(29)-8
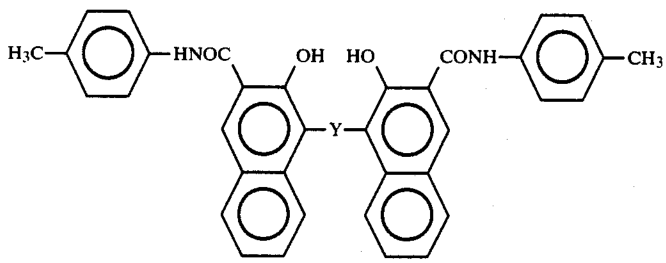
(29)-9
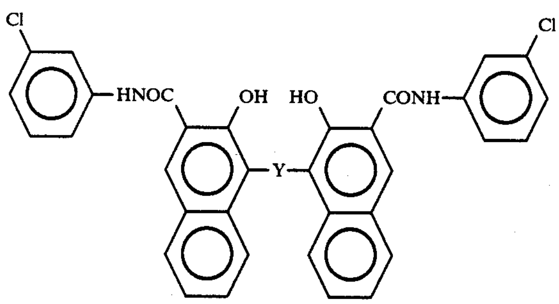
(29)-10
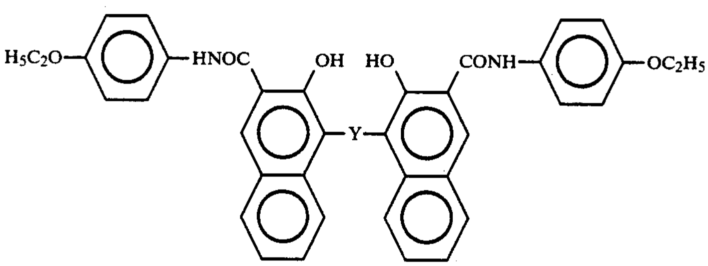
(29)-11
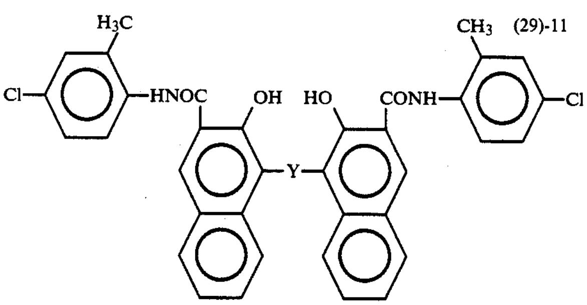
(29)-12
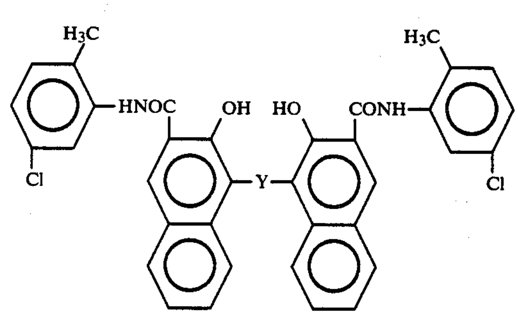

-continued
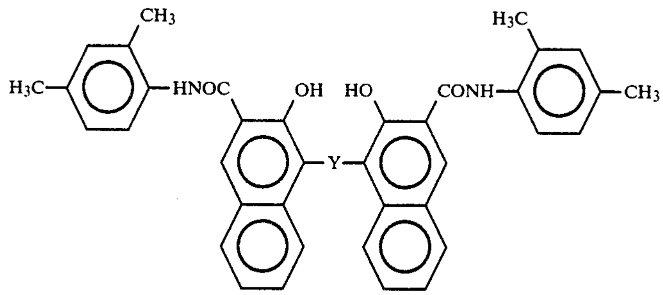
(29)-13
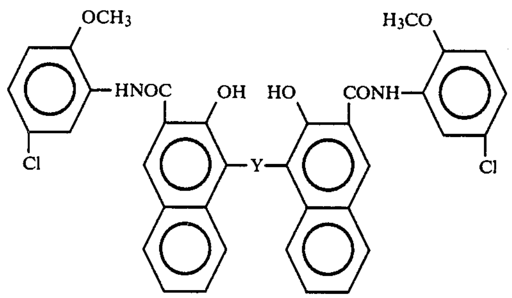
(29)-14
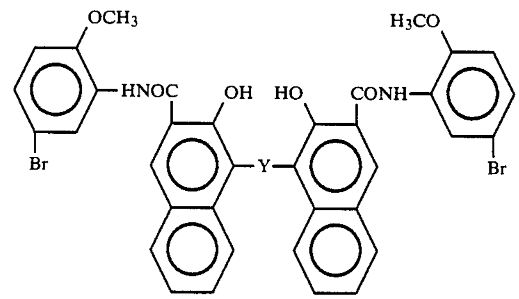
(29)-15
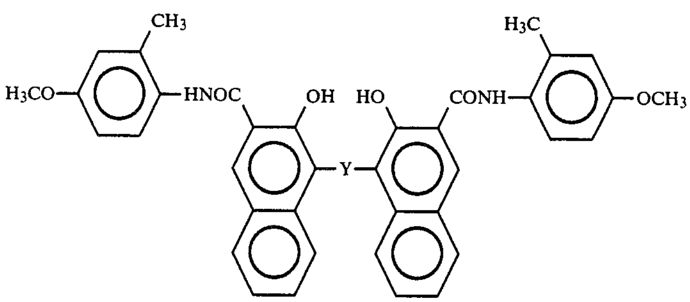
(29)-16
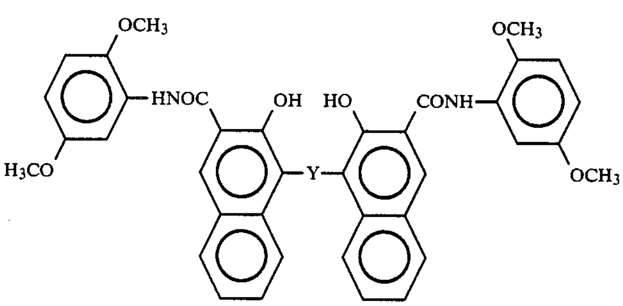
(29)-17
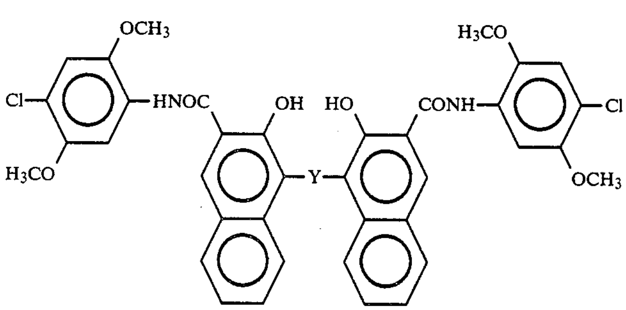
(29)-18

-continued
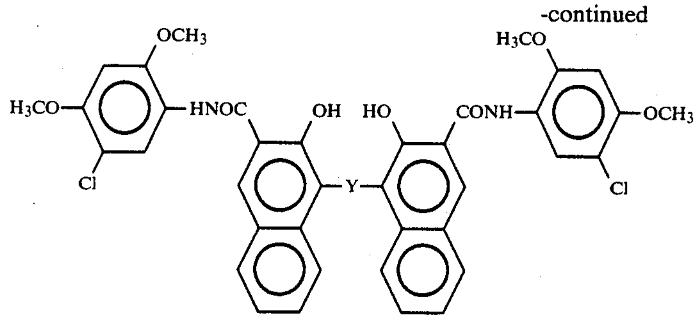
(29)-19
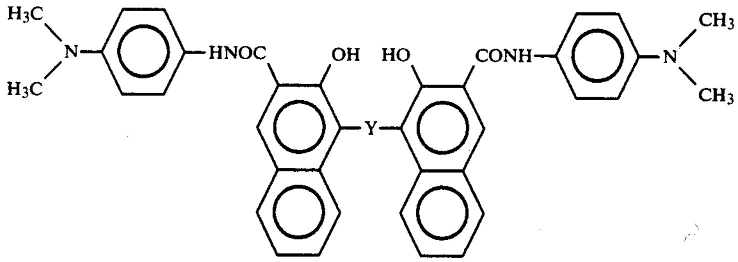
(29)-20
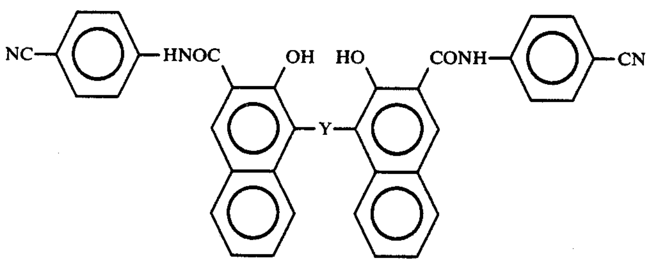
(29)-21
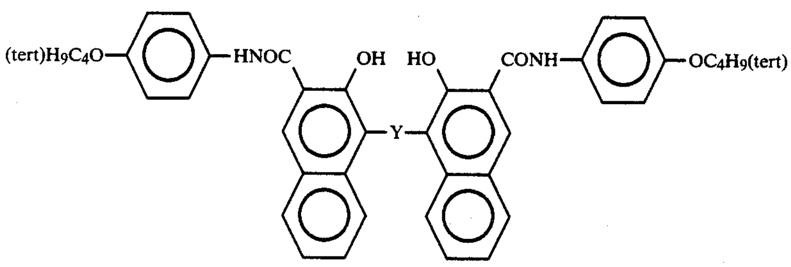
(29)-22
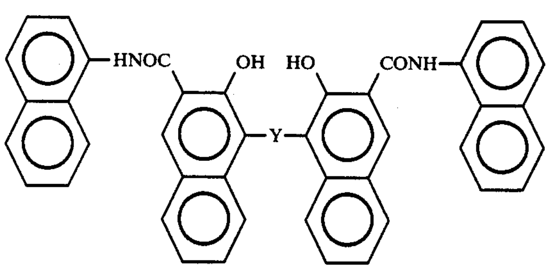
(29)-23
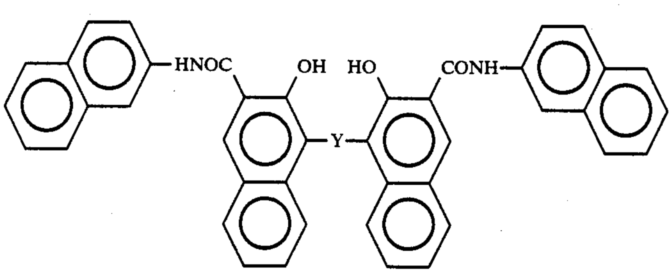
(29)-24

-continued
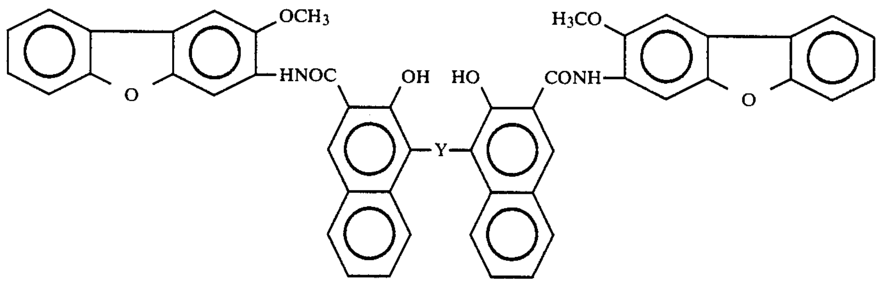
(29)-25
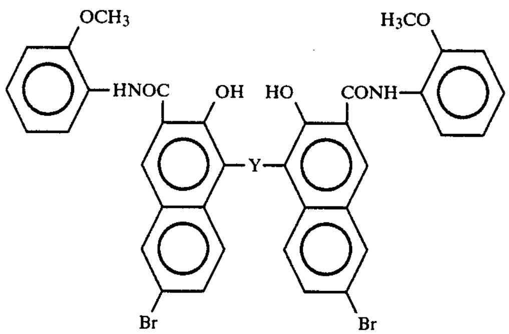
(29)-26
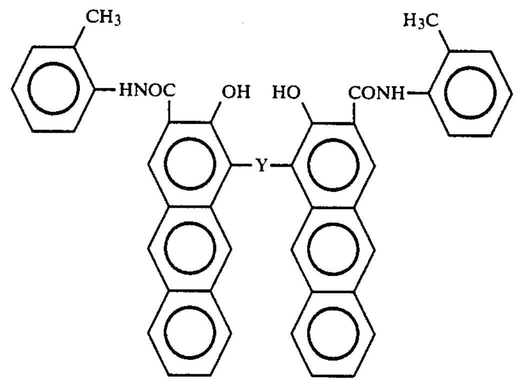
(29)-27
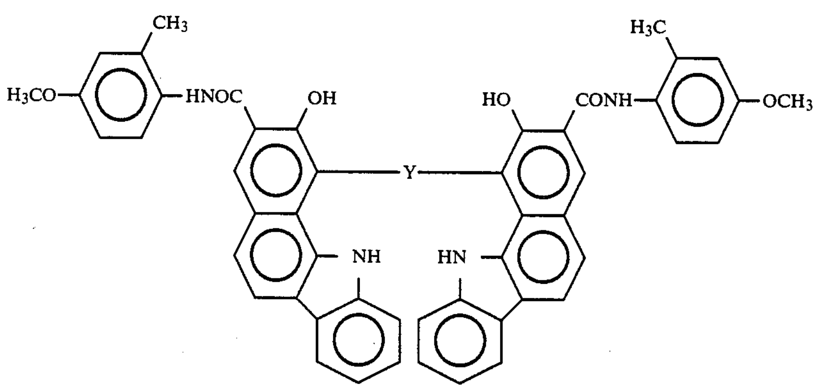
(29)-28
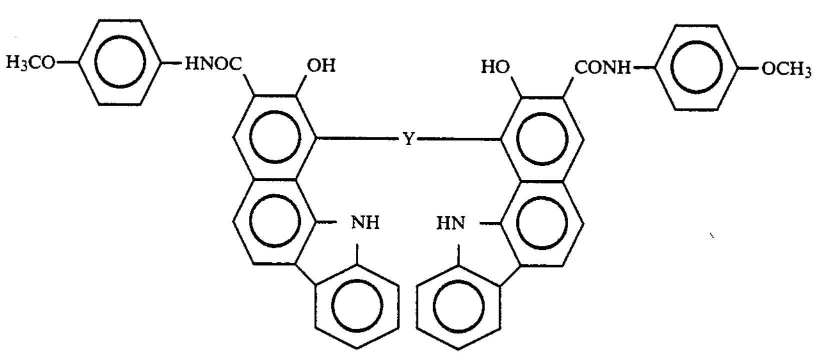
(29)-29

-continued
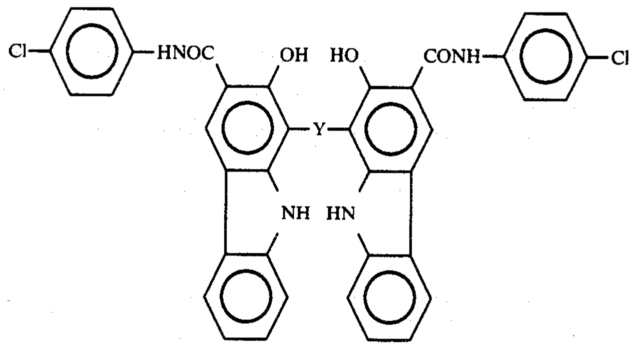
(29)-30
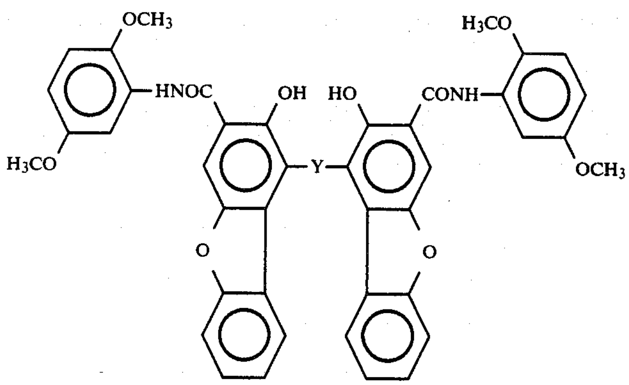
(29)-31
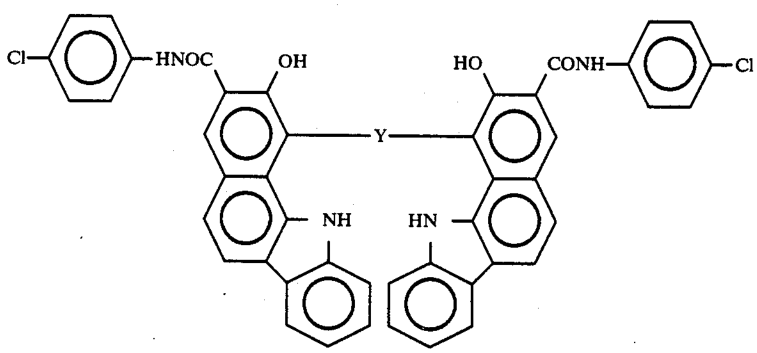
(29)-32
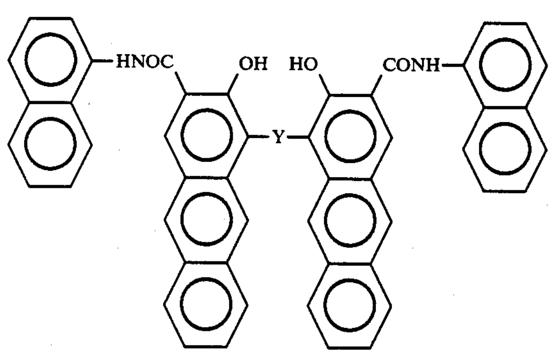
(29)-33

-continued
(30)-1
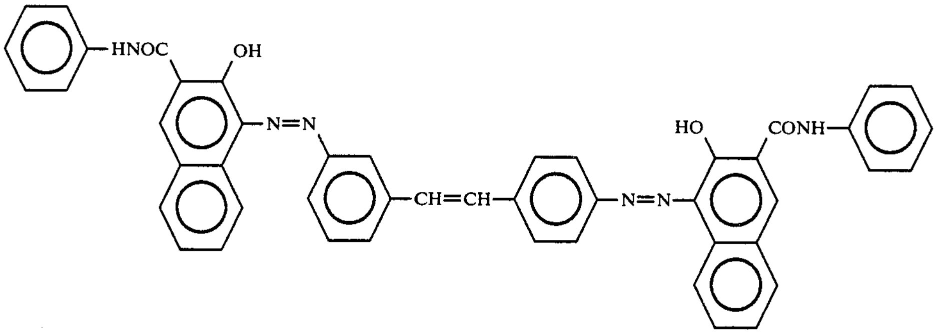
Hereinafter 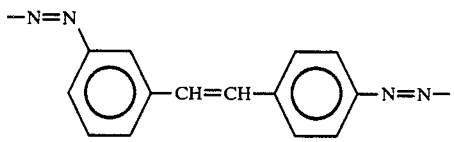 is represented by —Y—.
(30)-2
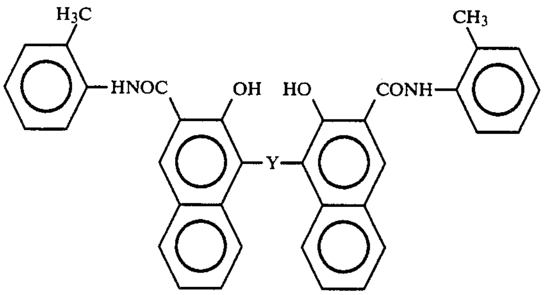
(30)-3
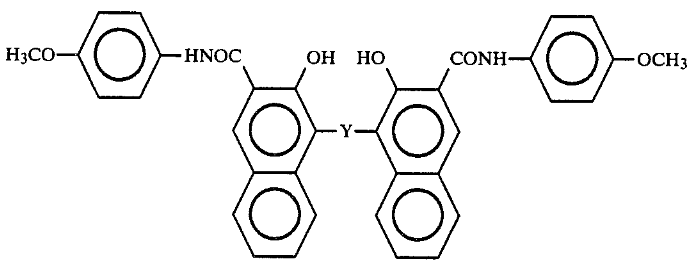
(30)-4
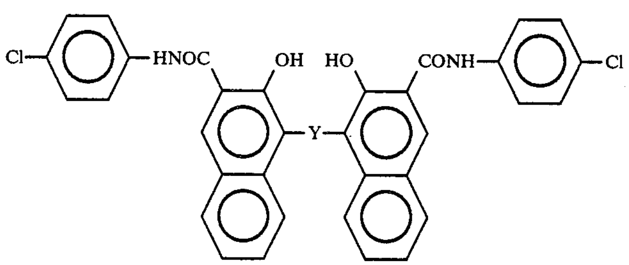
(30)-5
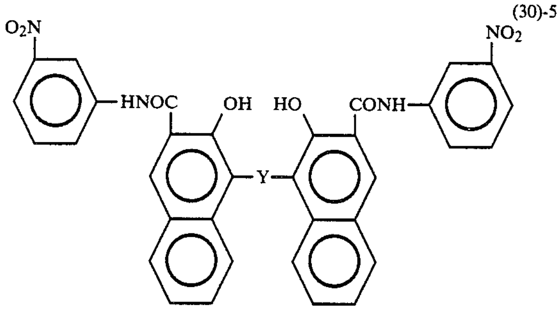
(30)-6
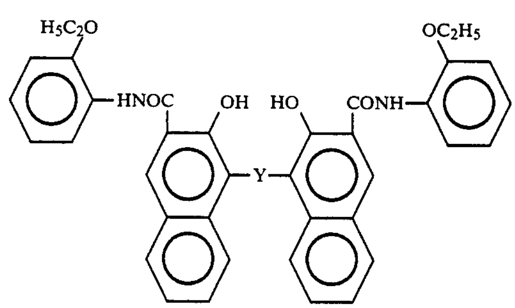

-continued
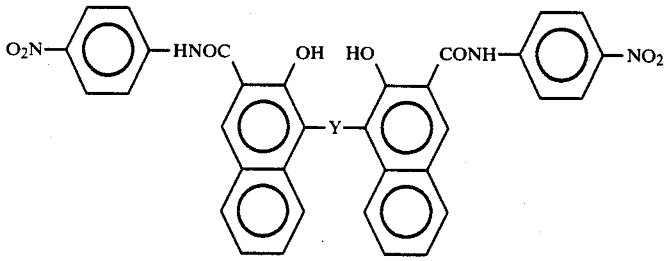
(30)-7
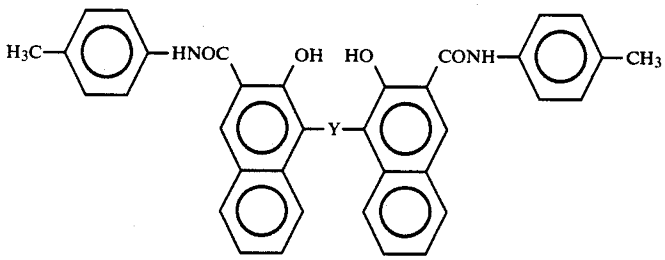
(30)-8
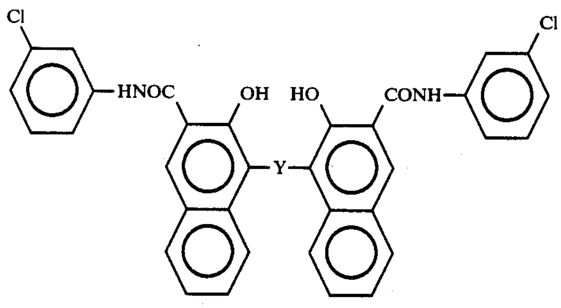
(30)-9
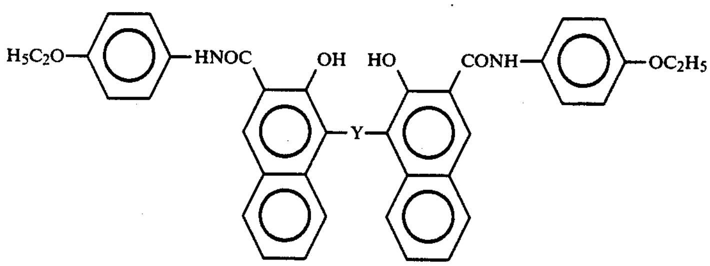
(30)-10
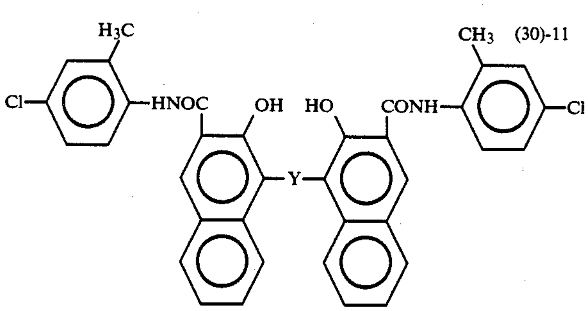
(30)-11
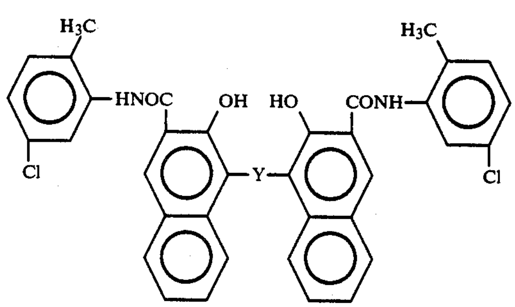
(30)-12

-continued
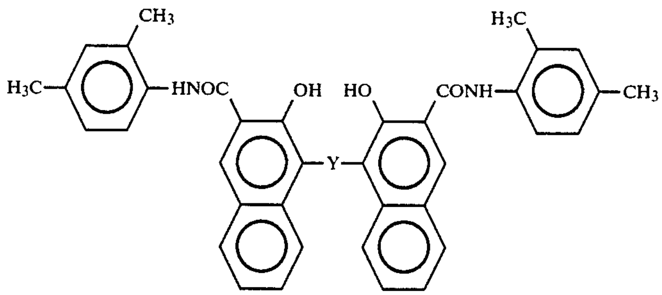
(30)-13
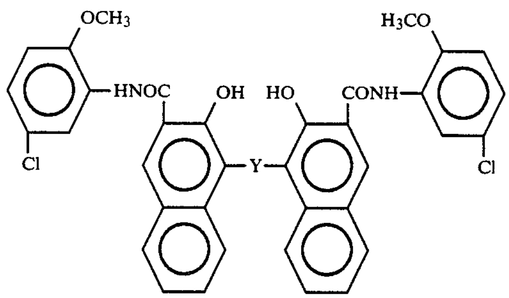
(30)-14
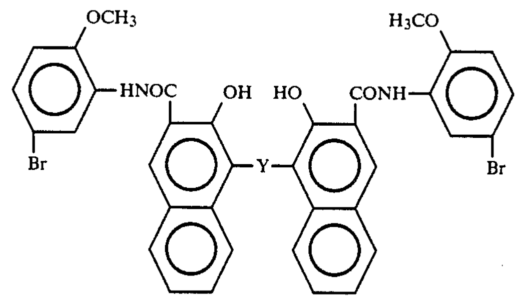
(30)-15
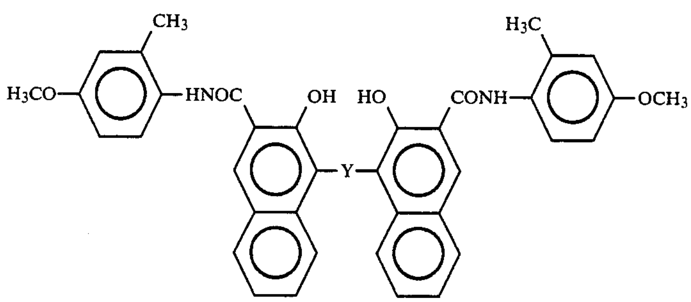
(30)-16
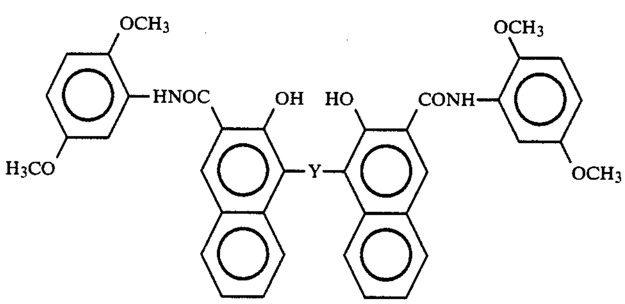
(30)-17
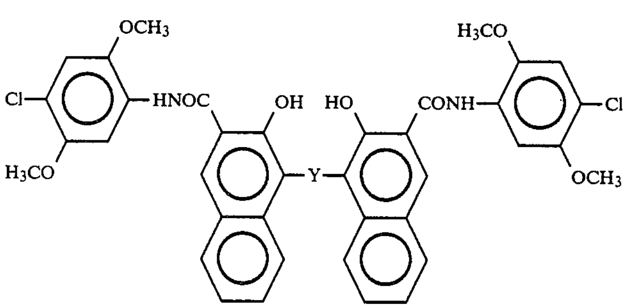
(30)-18

-continued
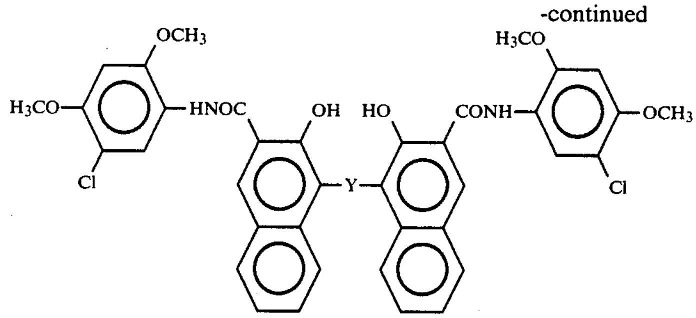
(30)-19
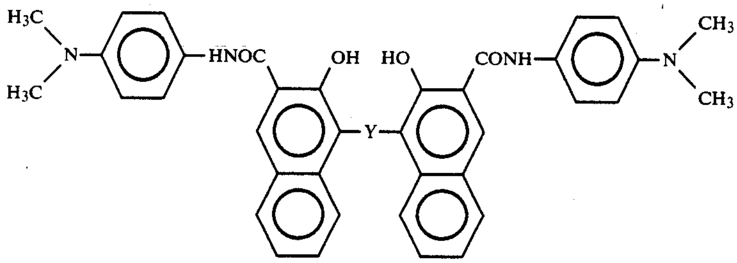
(30)-20
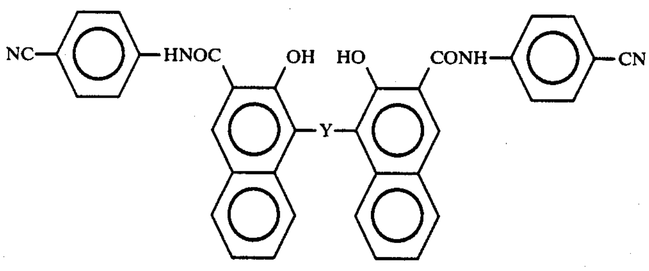
(30)-21
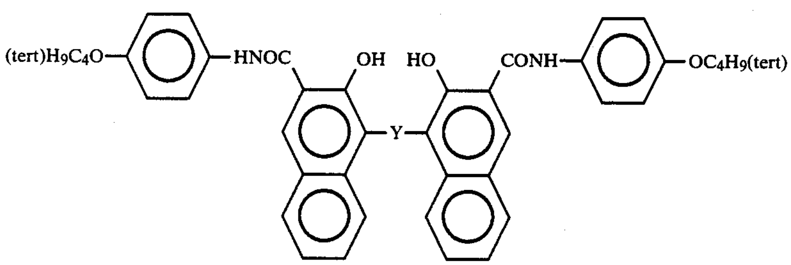
(30)-22
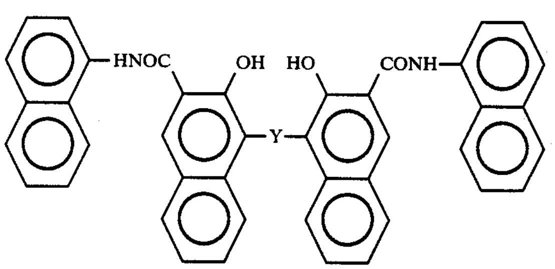
(30)-23
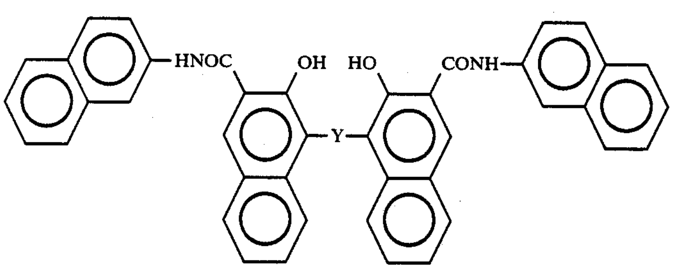
(30)-24

-continued
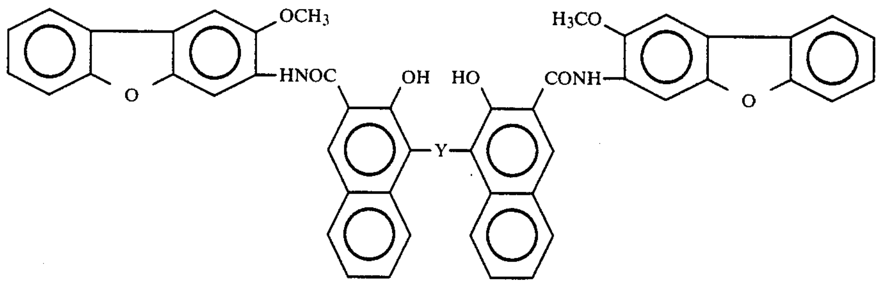
(30)-25
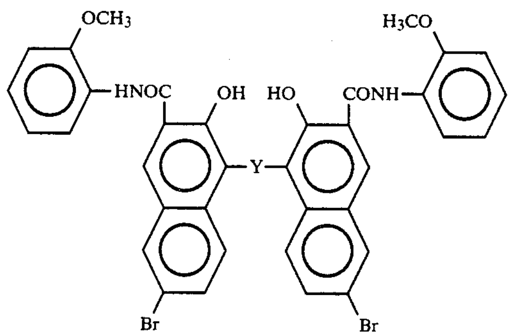
(30)-26
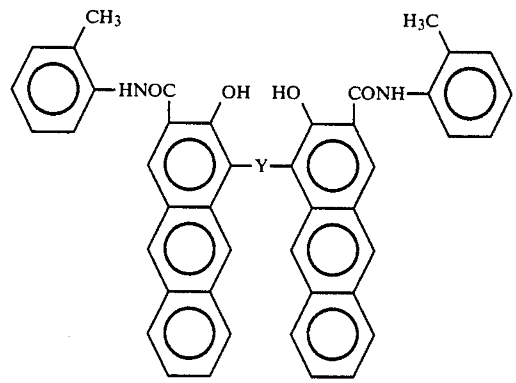
(30)-27
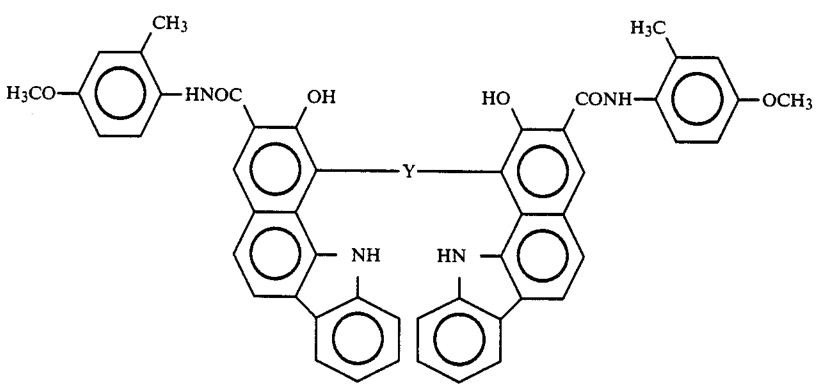
(30)-28
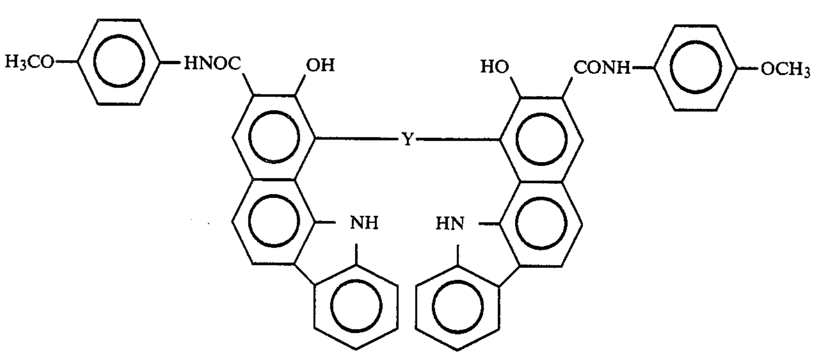
(30)-29

-continued
(30)-30
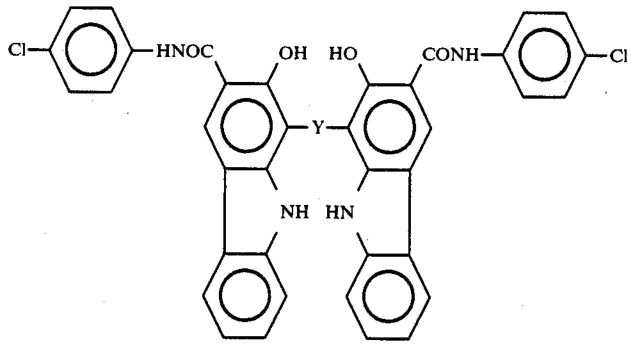
(30)-31
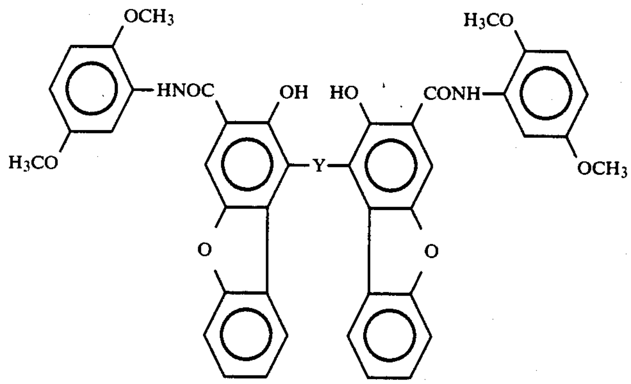
(30)-32
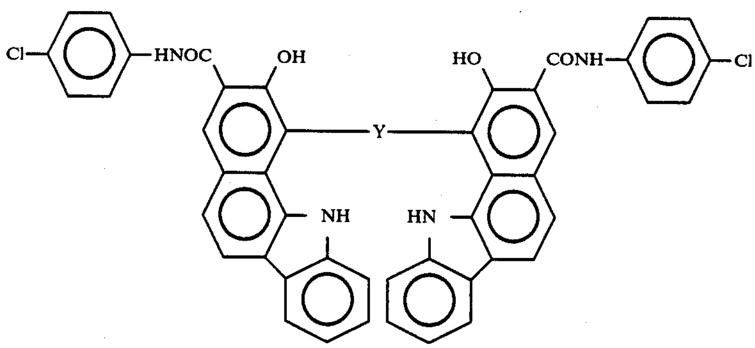
(30)-33
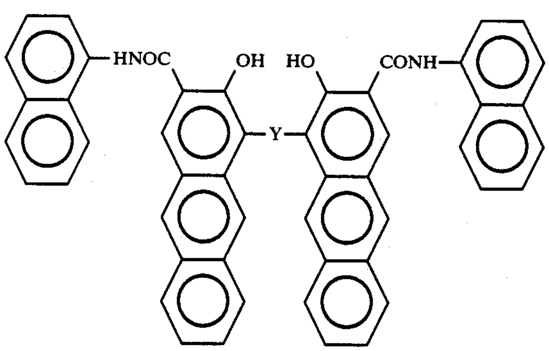

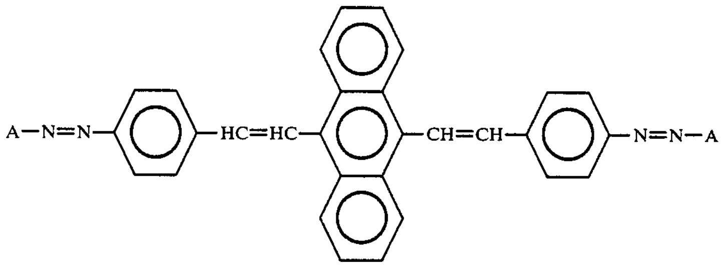
(31)
Hereinafter, only the moiety A in the above formula is shown.
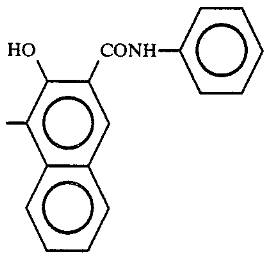
(31)-1
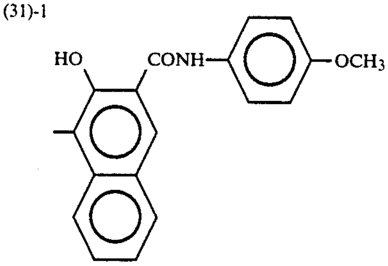
(31)-2
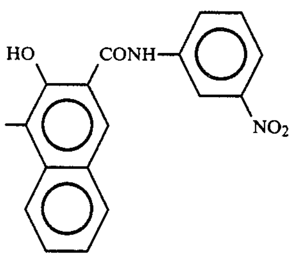
(31)-3
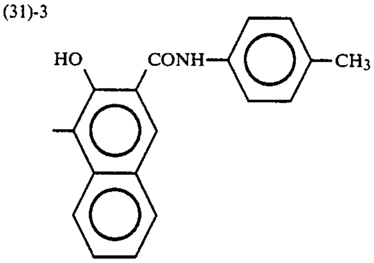
(31)-4
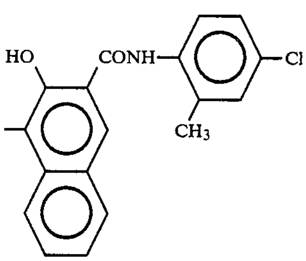
(31)-5
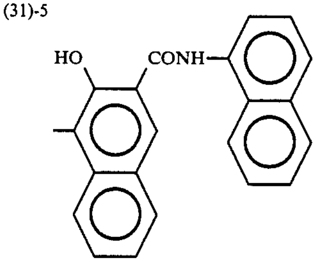
(31)-6
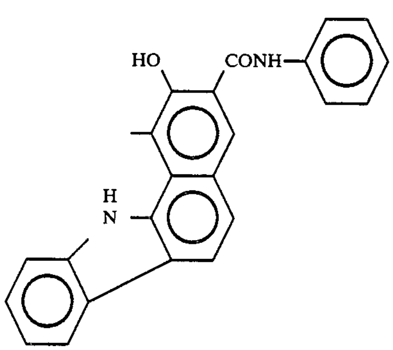
(31)-7
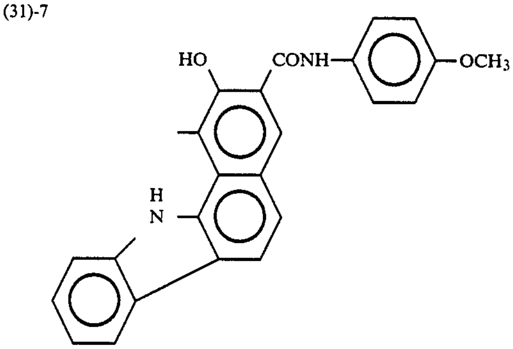
(31)-8

-continued
(31)-9
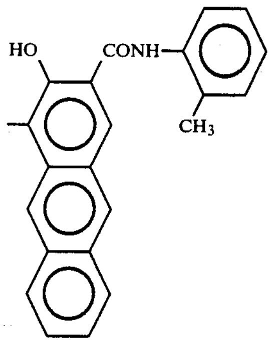
(31)-10
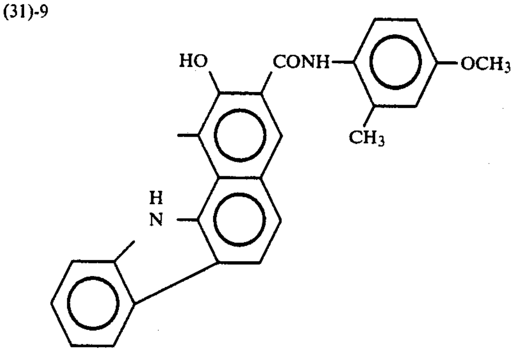
(31)-11
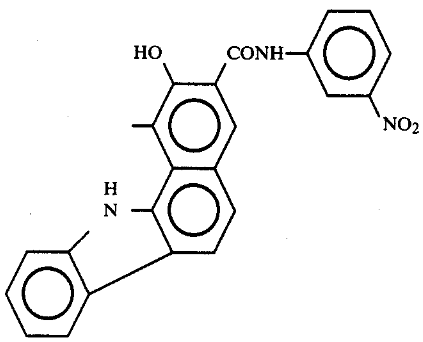
(31)-12
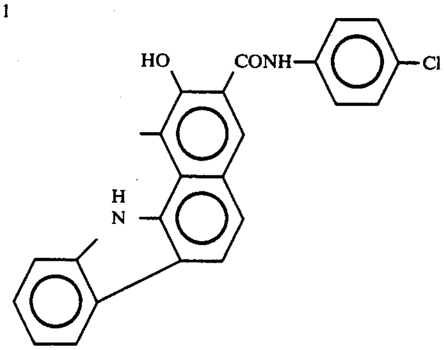
(32)
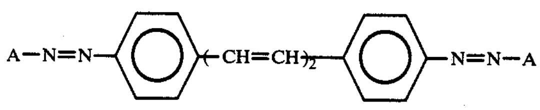
Hereinafter, only the moiety A in the above formula is shown.
(32)-1
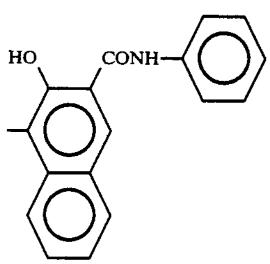
(32)-2
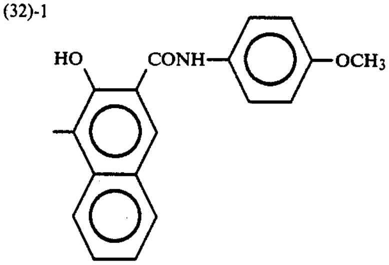
(32)-3
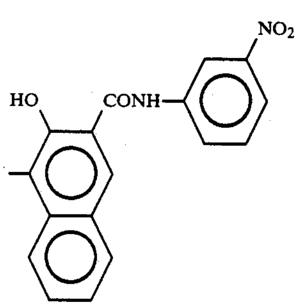
(32)-4
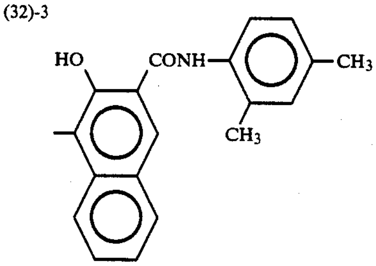

-continued
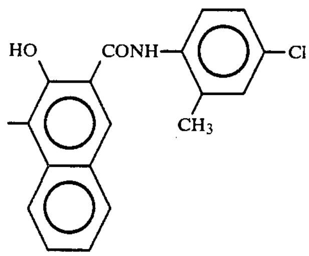
(32)-5
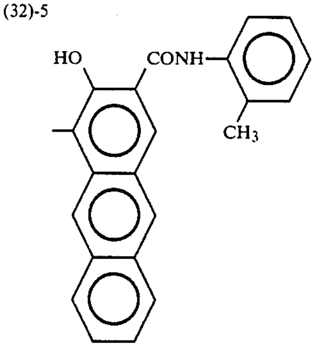
(32)-6
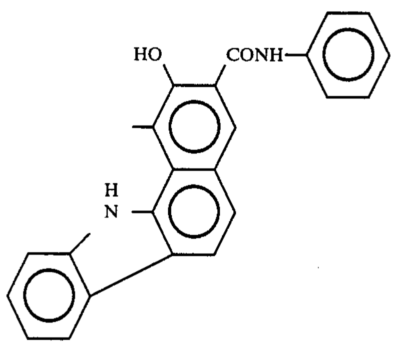
(32)-7
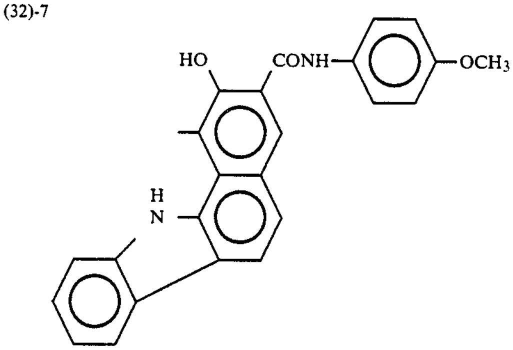
(32)-8
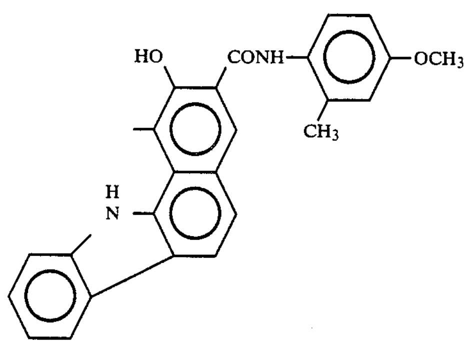
(32-9)
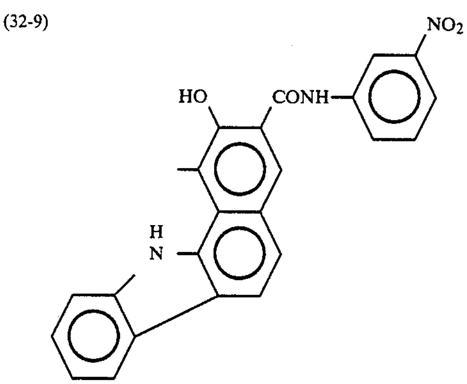
(32)-10
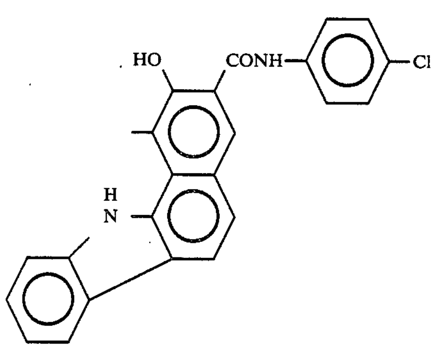
(32)-11
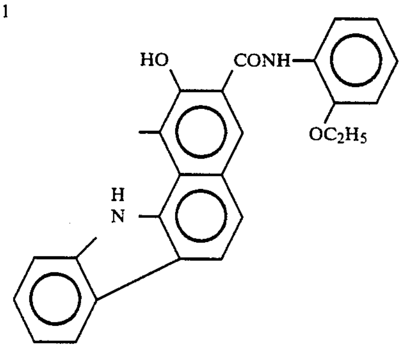
(32)-12

-continued
(32)-13
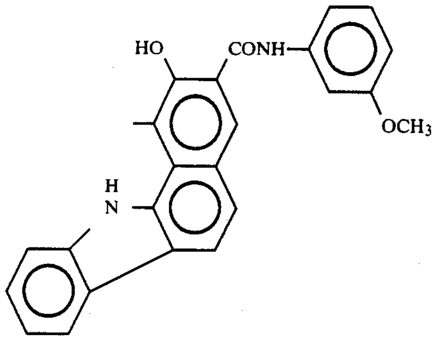
(33)-1
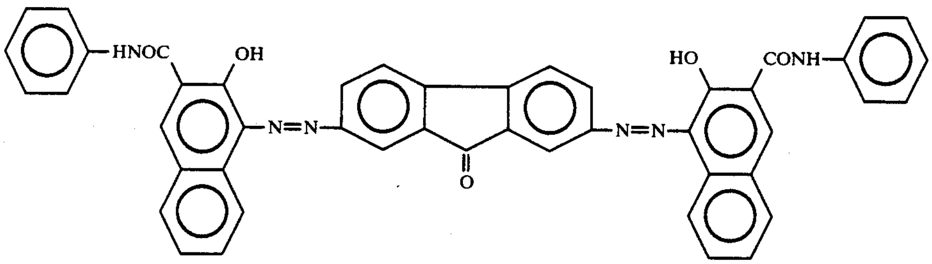
Hereinafter —N=N— 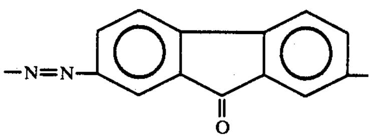 —N=N— is represented by —Y—.
(33)-2
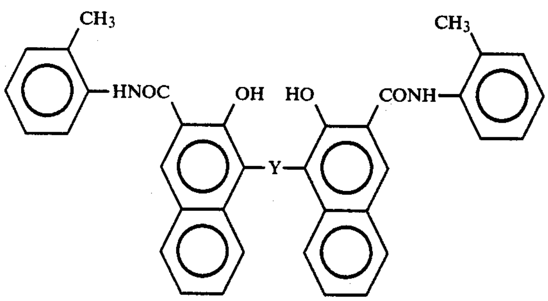
(33)-3
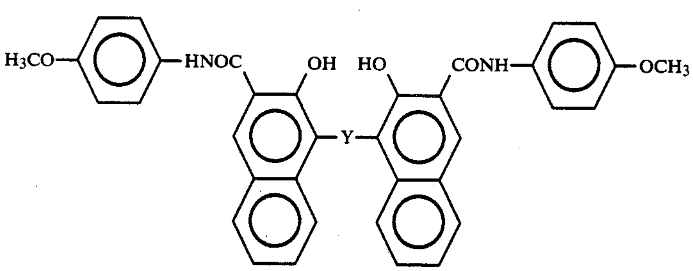
(33)-4
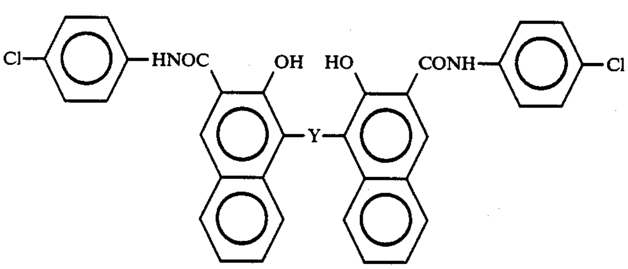

-continued
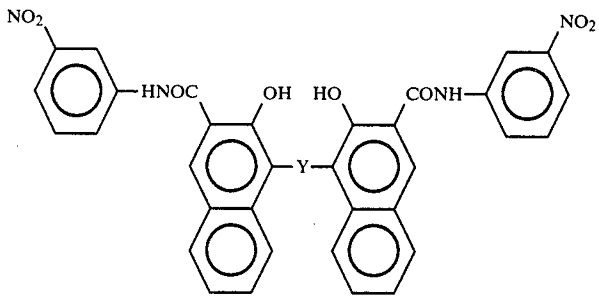
(33)-5
(33)-6
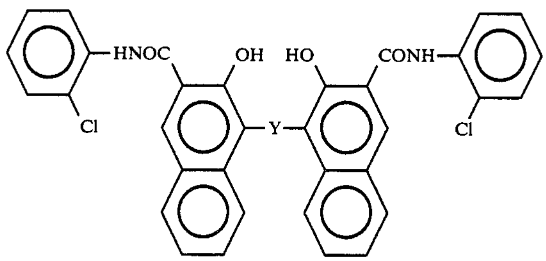
(33)-7
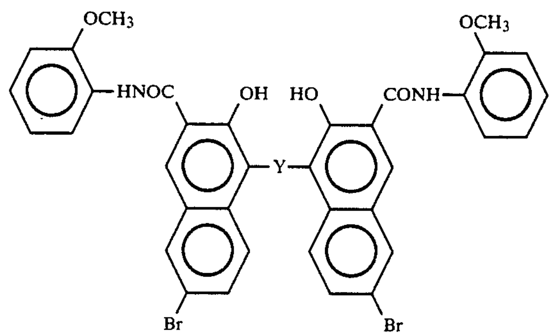
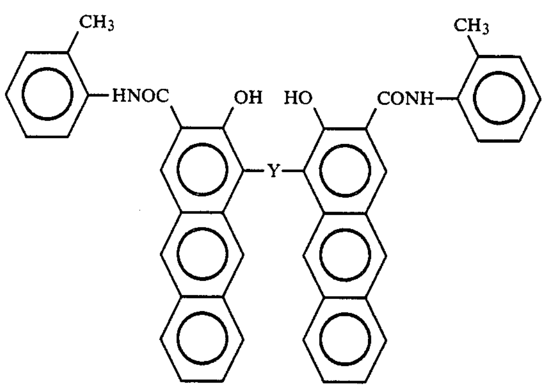
(33)-8
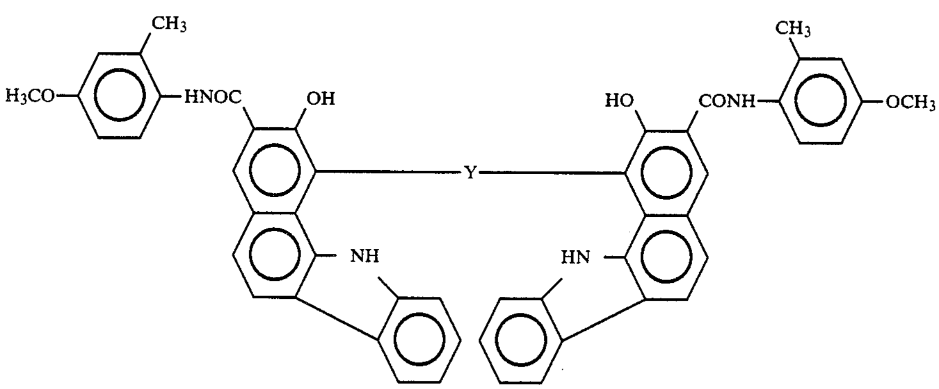
(33)-9

-continued
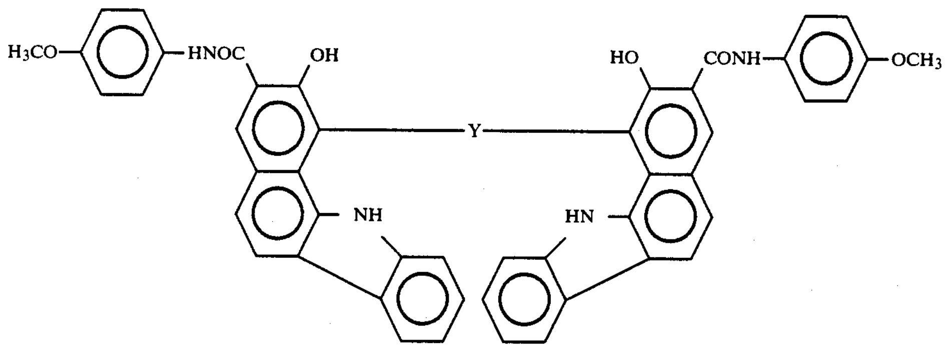
(33)-10
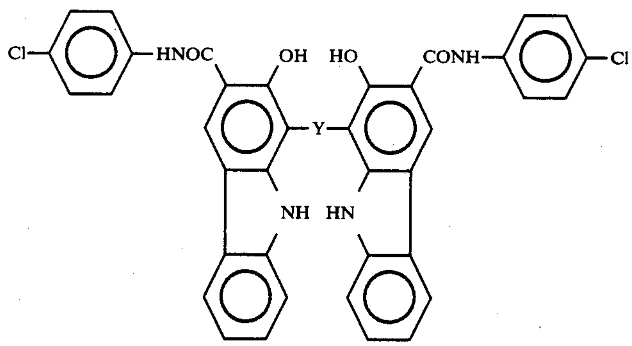
(33)-11
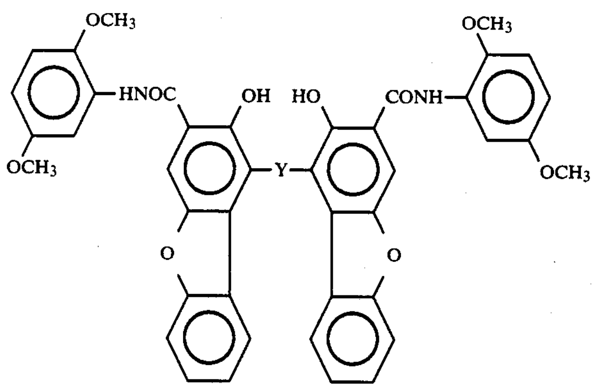
(33)-12
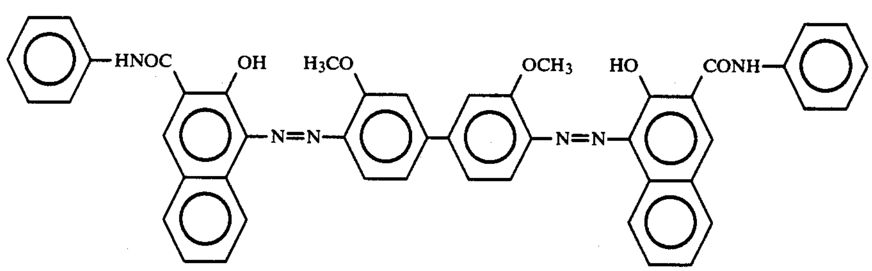
(34)-1
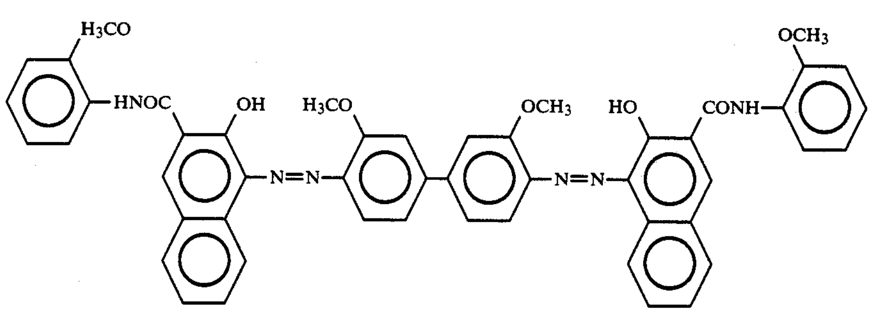
(34)-2

-continued
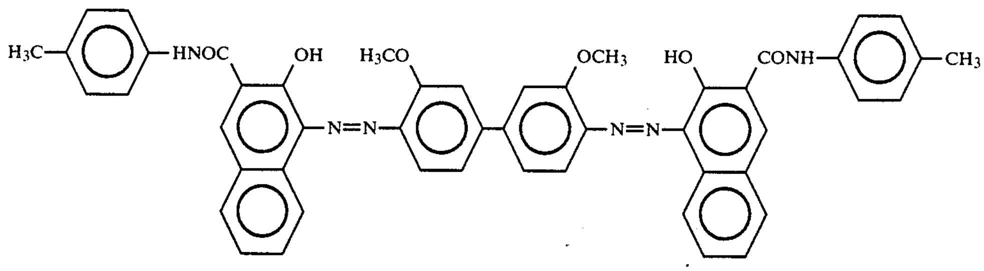
(34)-3
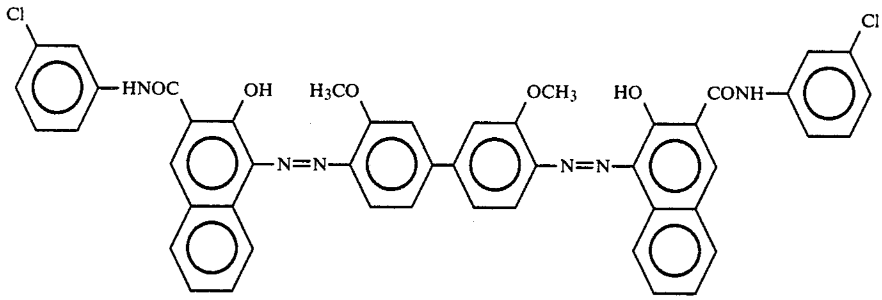
(34)-4
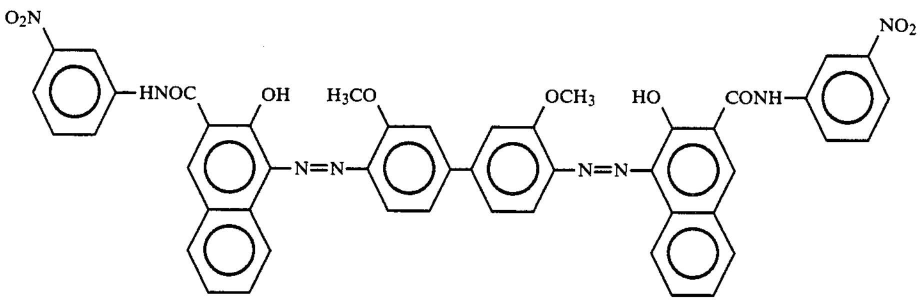
(34)-5
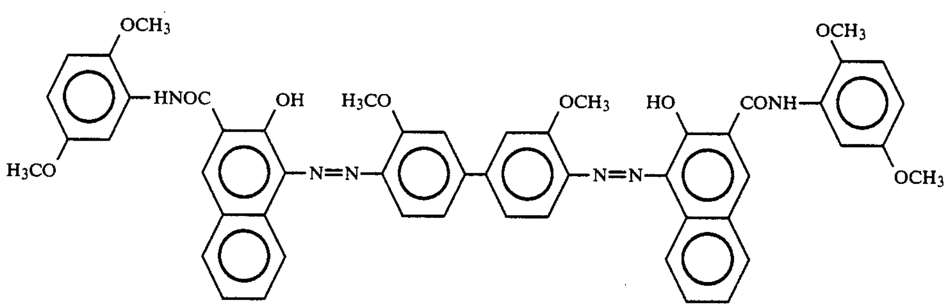
(34)-6
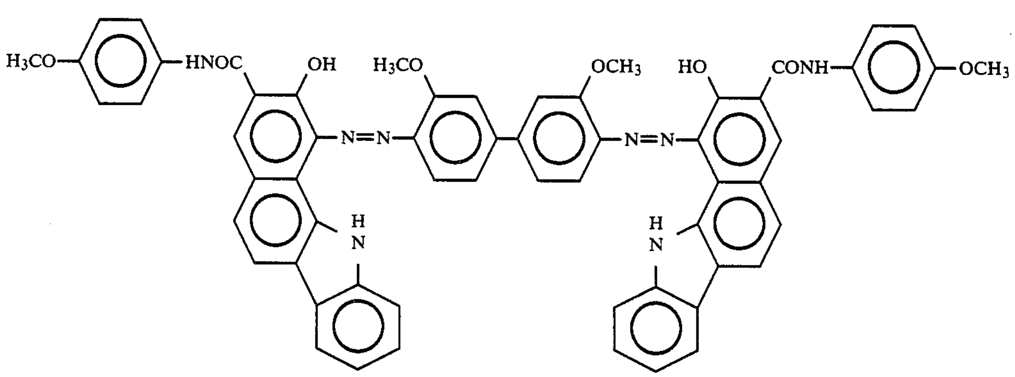
(34)-7

-continued
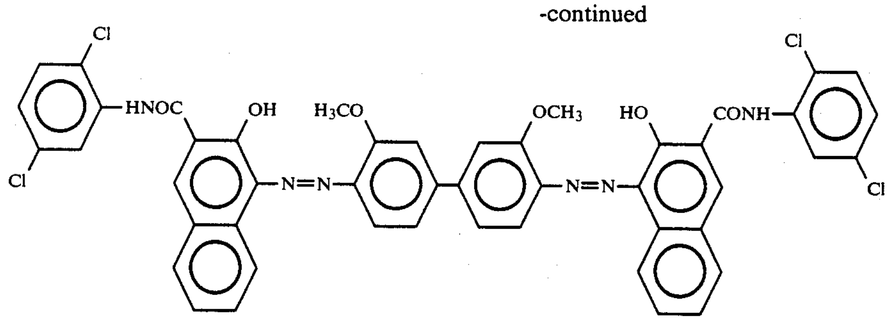
(34)-8
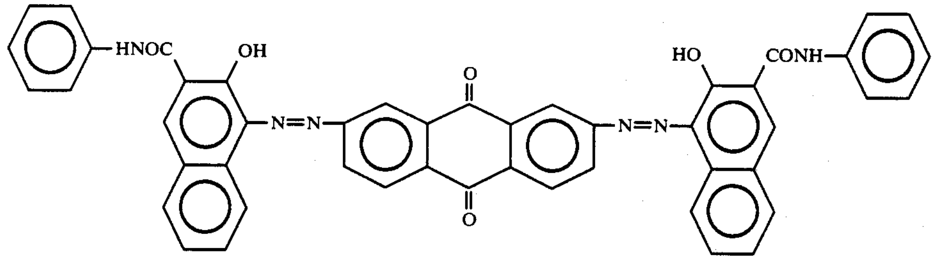
(35)-1
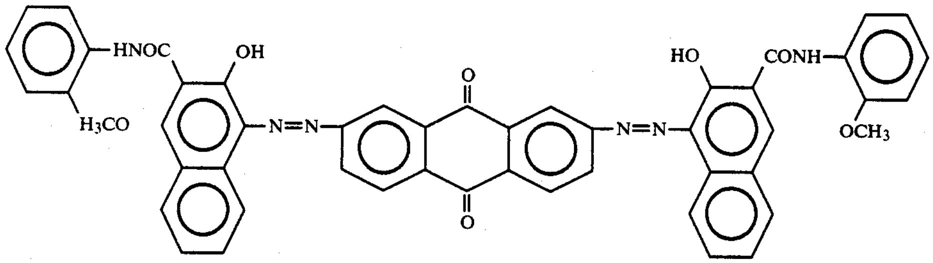
(35)-2
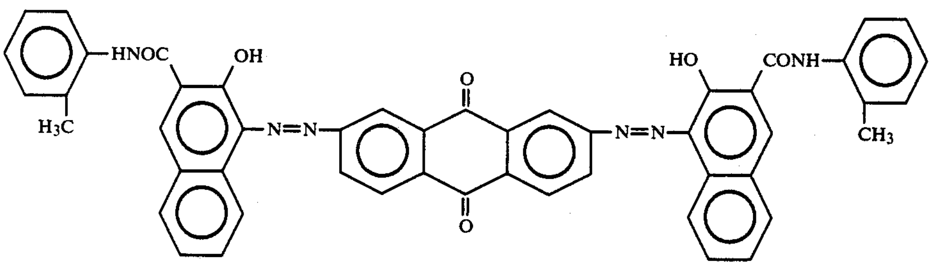
(35)-3
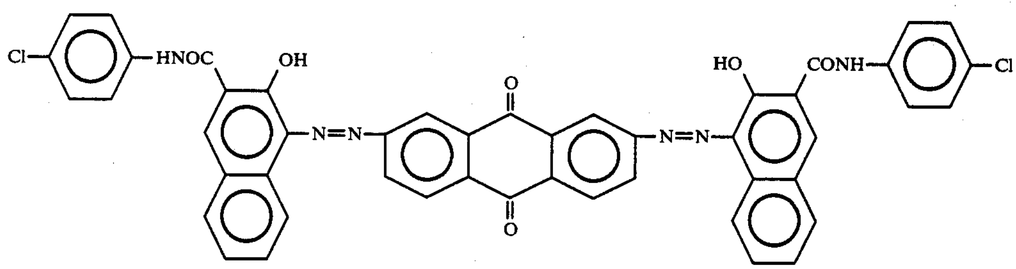
(35)-4
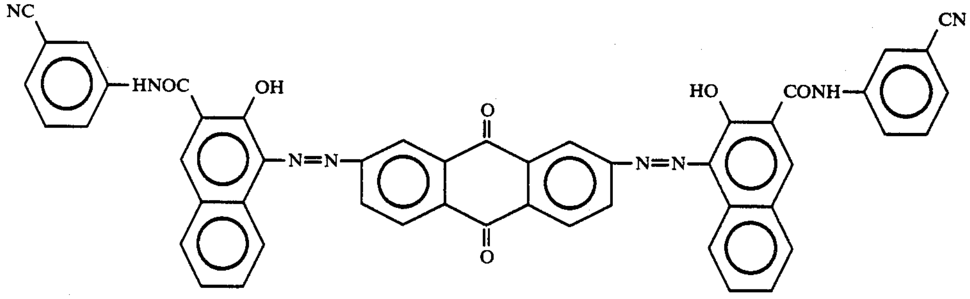
(35)-5

-continued
(35)-6
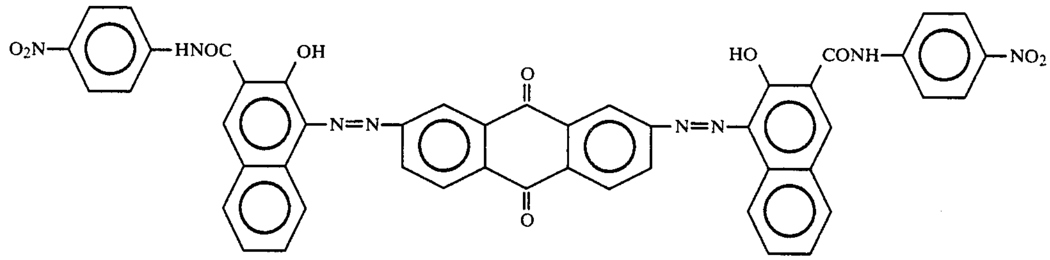
(35)-7
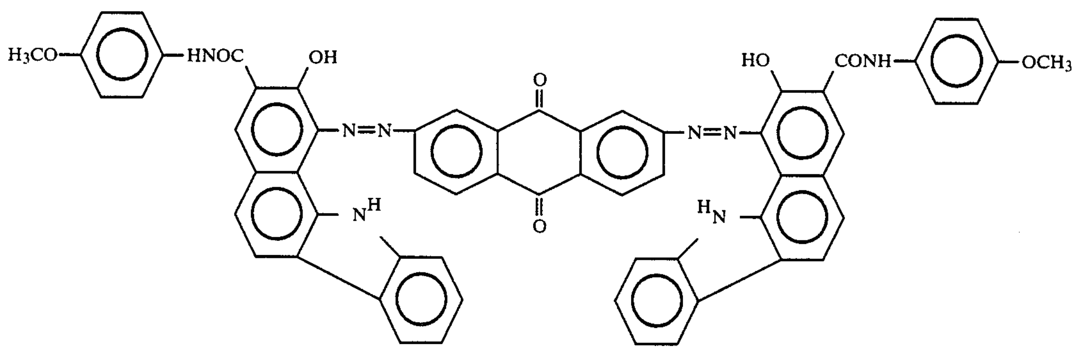
(35)-8
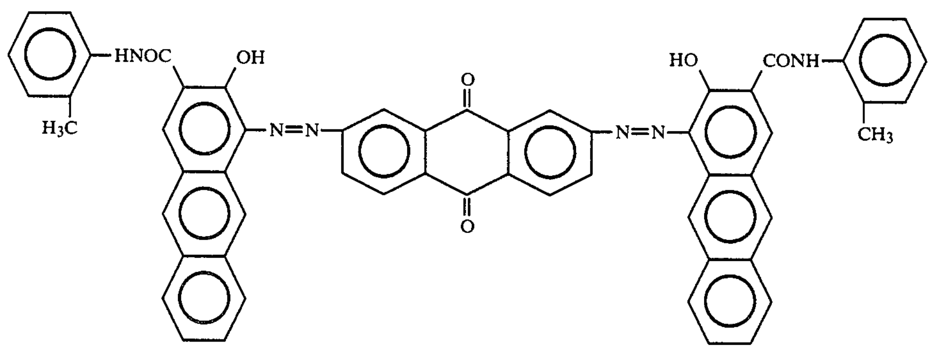
(36)-1
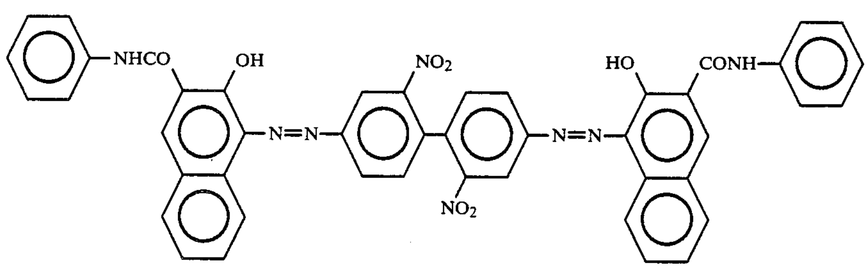
(36)-2
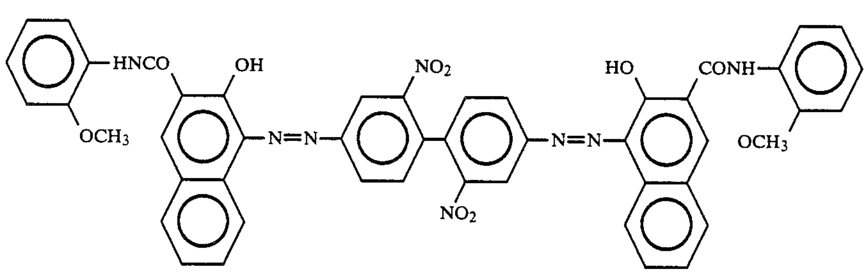

-continued
(36)-3
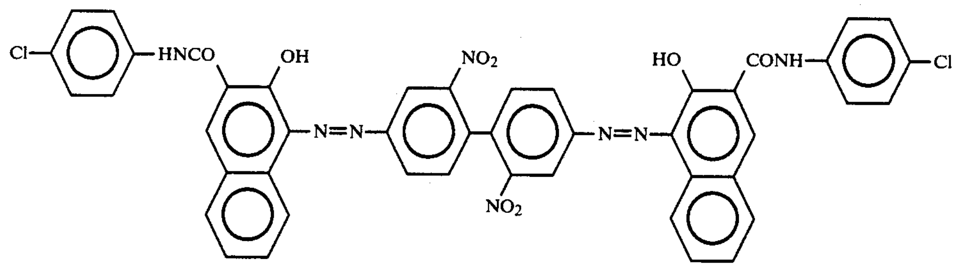
(36)-4
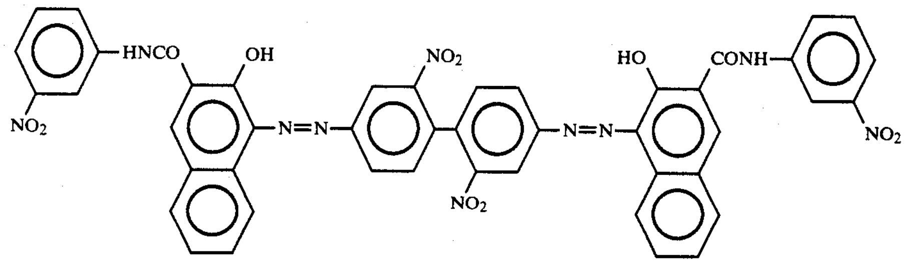
(36)-5
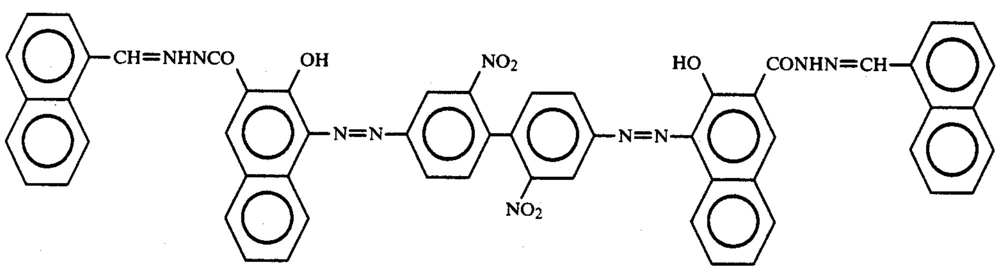
(36)-6
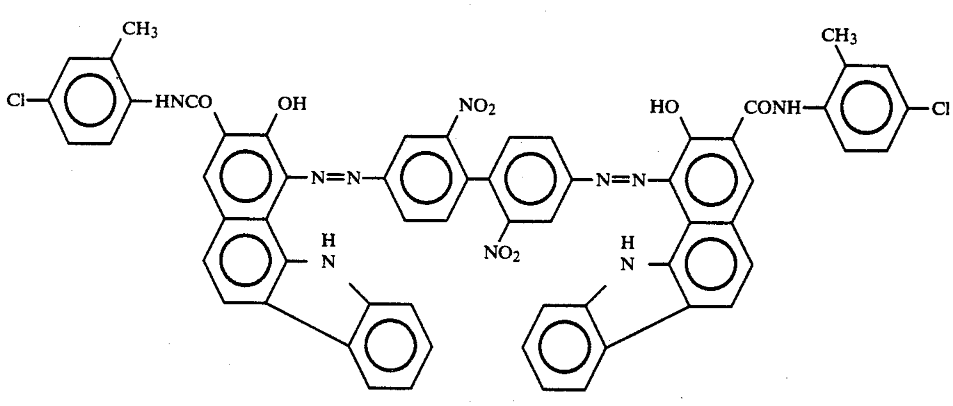
(36)-7
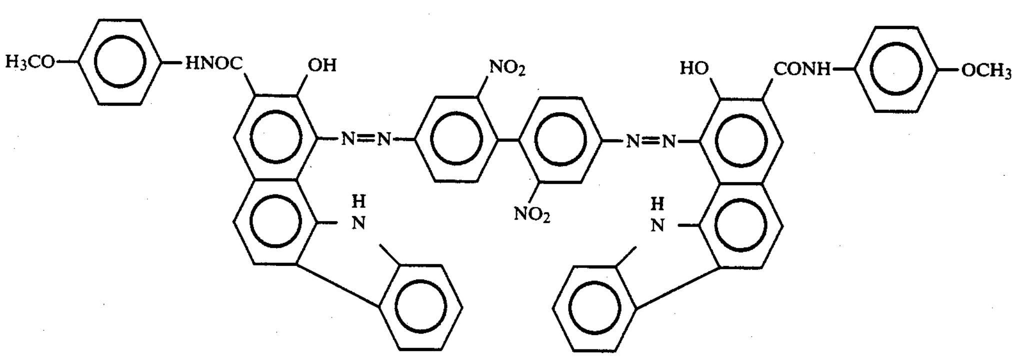

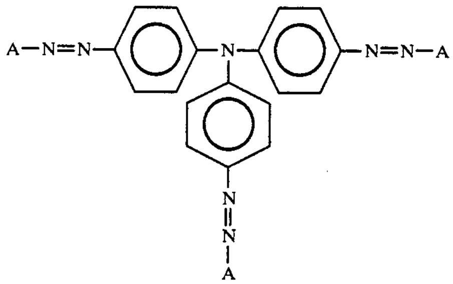
(37)
Hereinafter the above formula is shown by 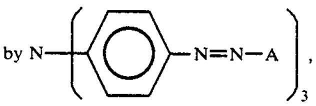,
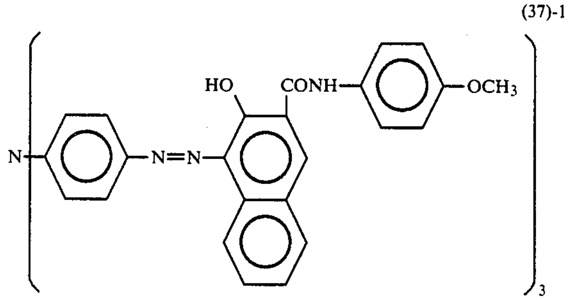
(37)-1
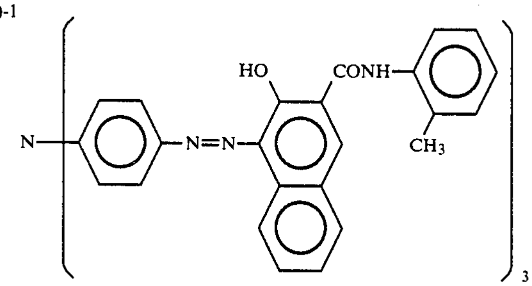
(37)-2
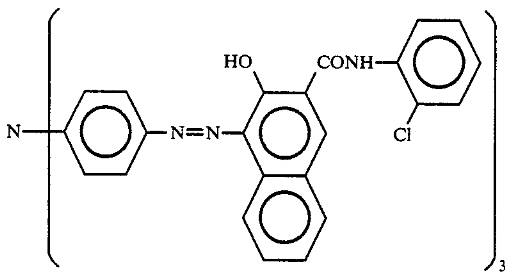
(37)-3
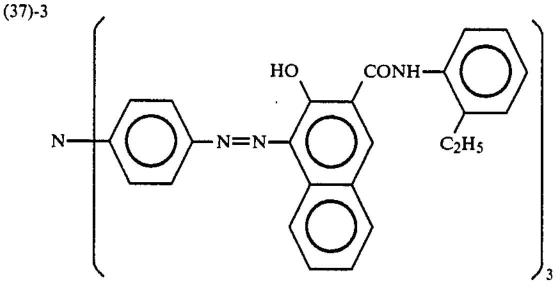
(37)-4
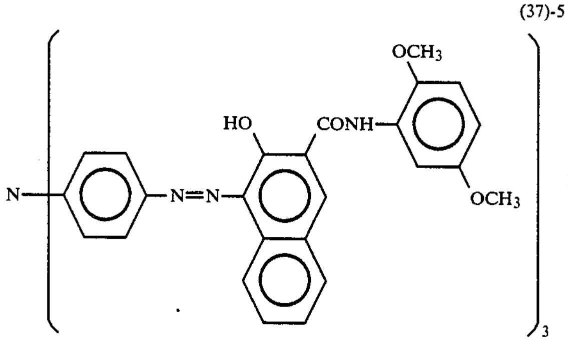
(37)-5
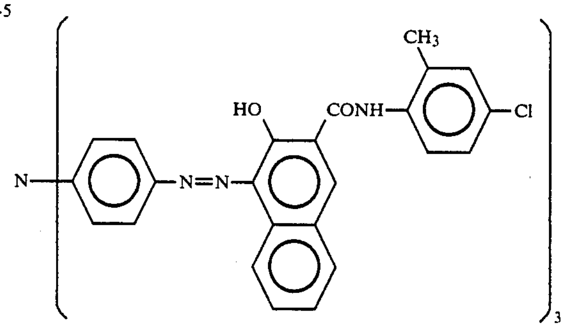
(37)-6
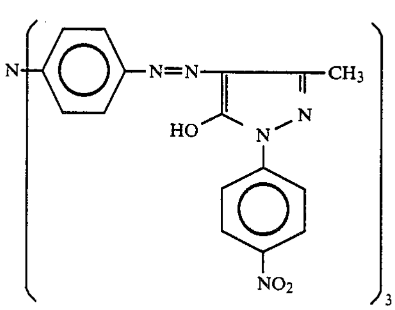
(37)-7
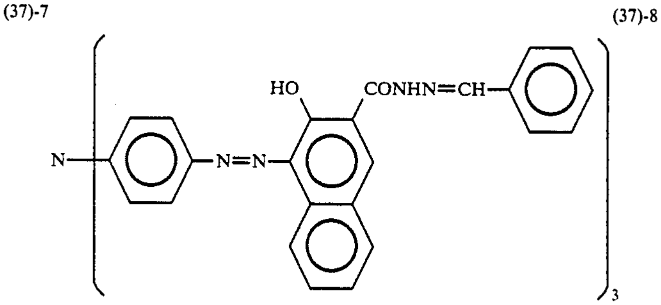
(37)-8

-continued
(37)-9
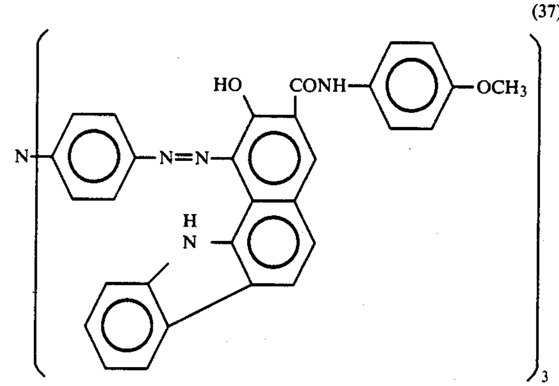
(37)-10
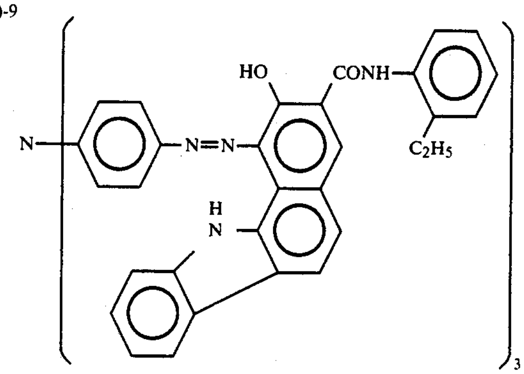
(37)-11
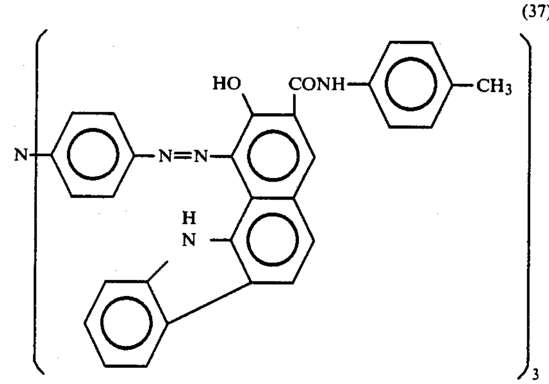
(37)-12
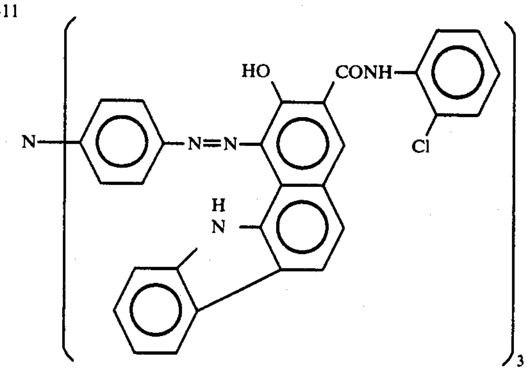
(37)-13
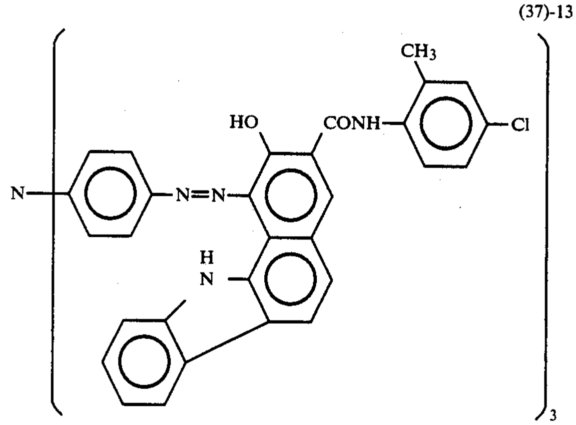
(37)-14
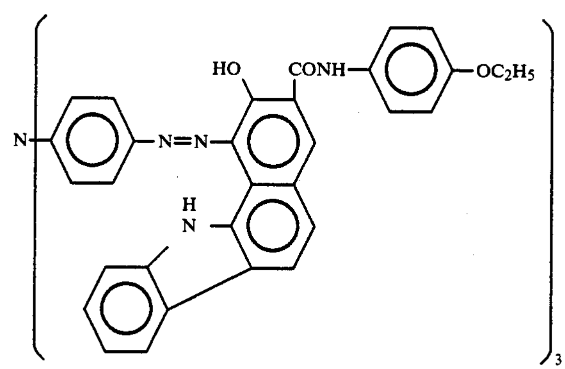
(37)-15
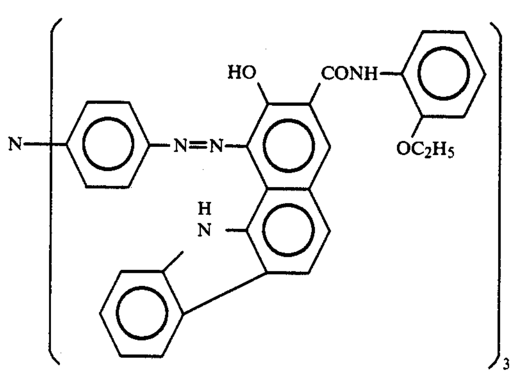
(37)-16
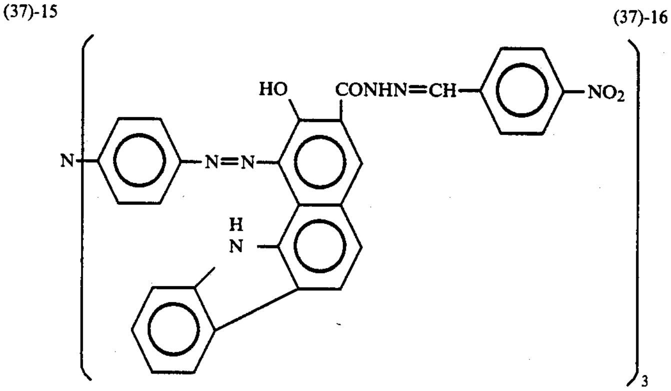

-continued
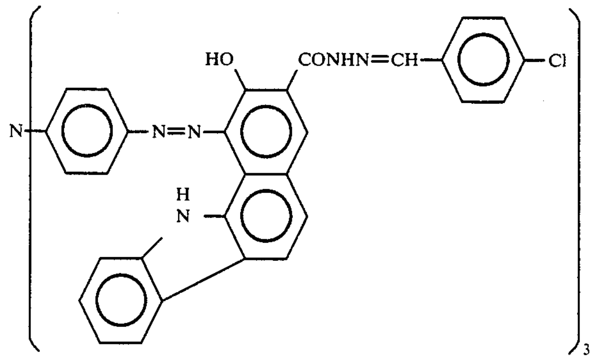
(37)-17
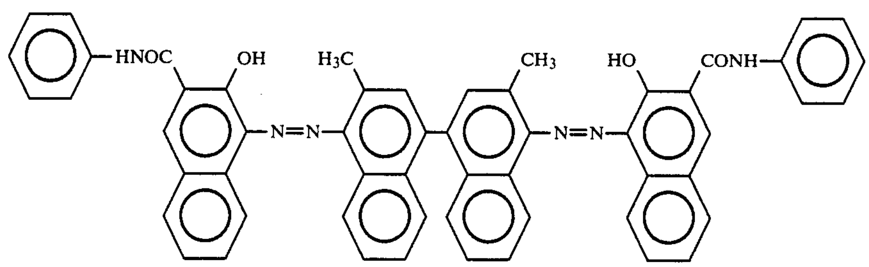
(38)-1
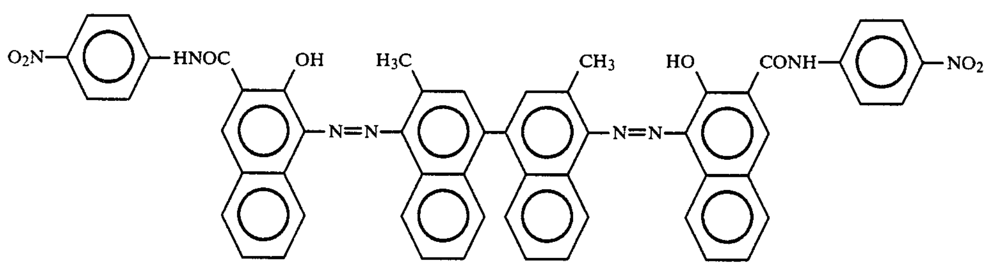
(38)-2
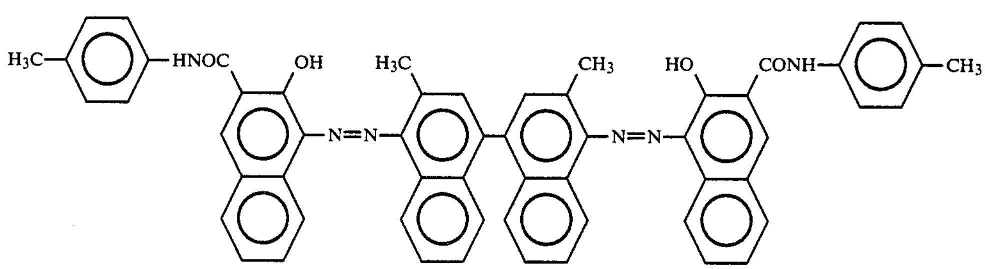
(38)-3
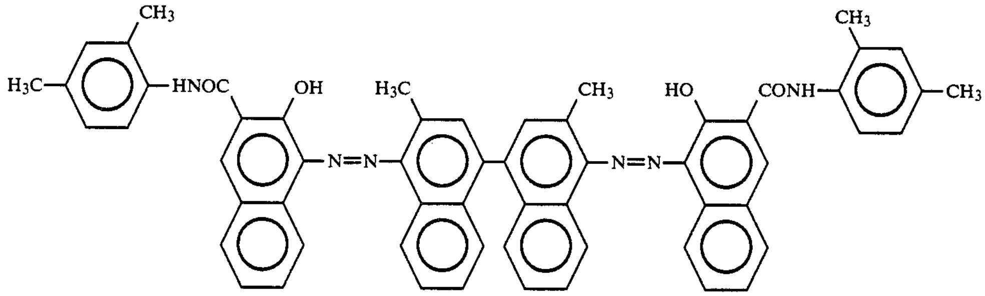
(38)-4

-continued
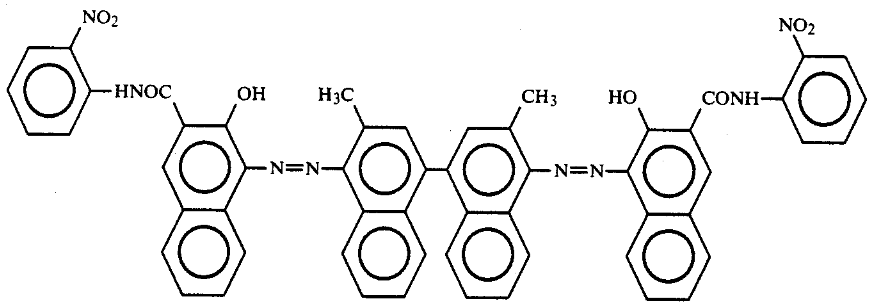
(38)-5
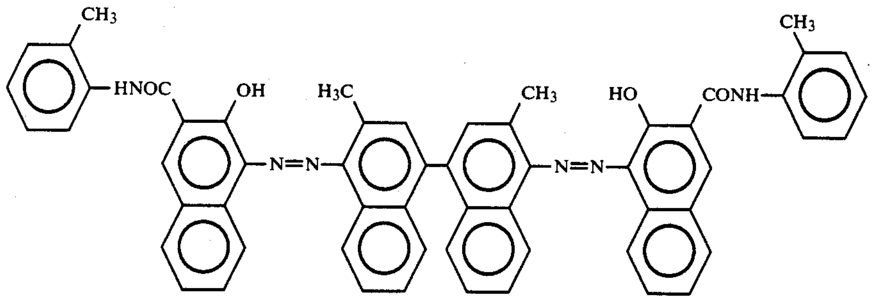
(38)-6
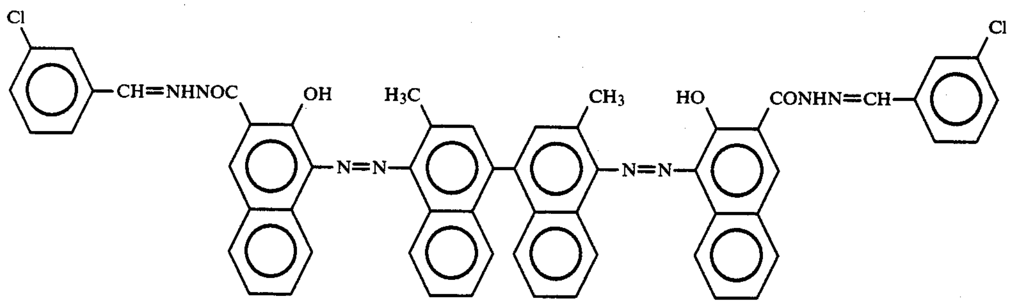
(38)-7
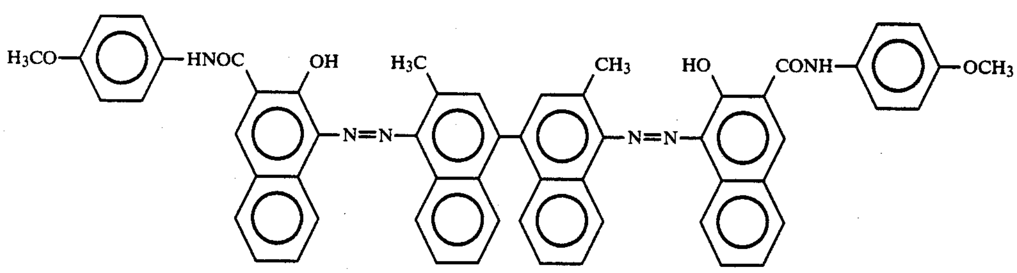
(38)-8
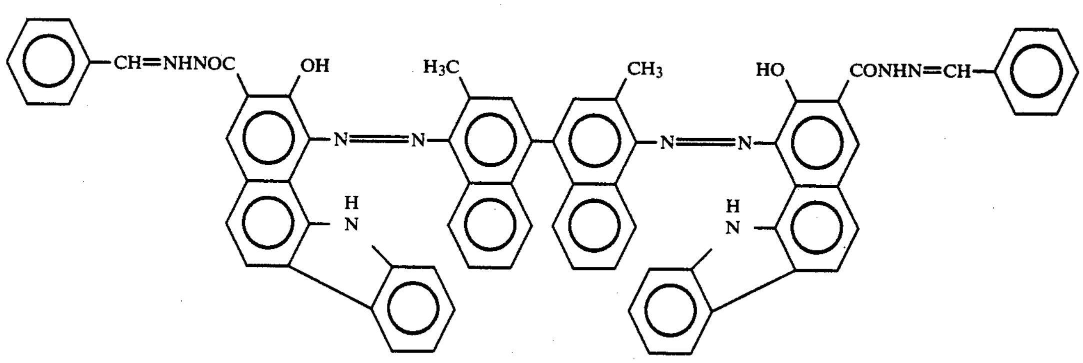
(38)-9

-continued
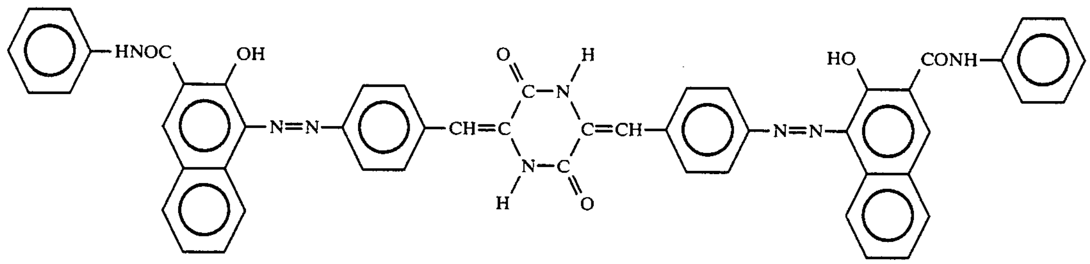
(39)-1
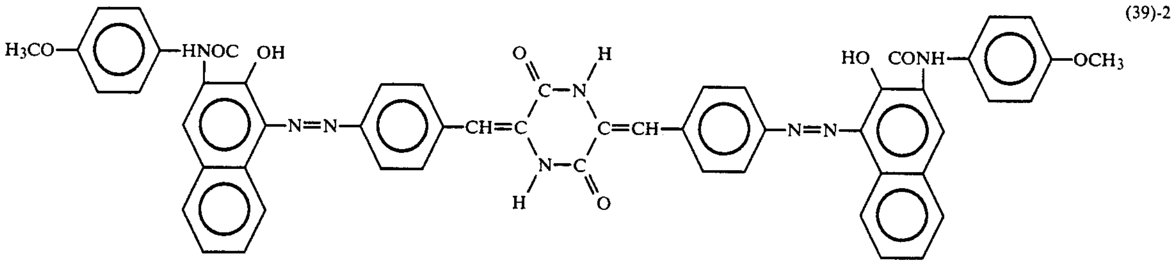
(39)-2
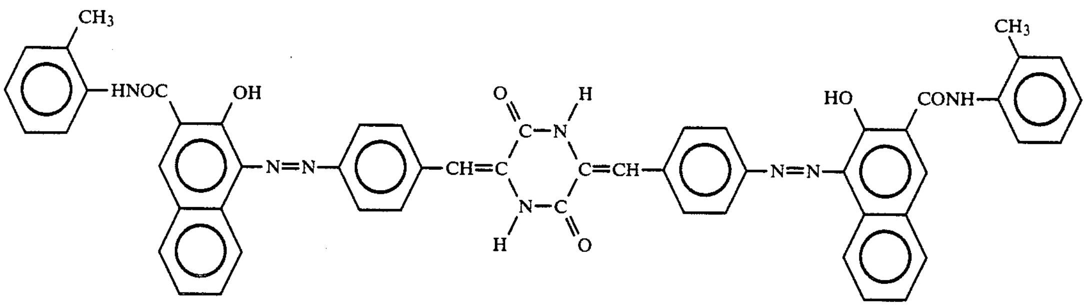
(39)-3
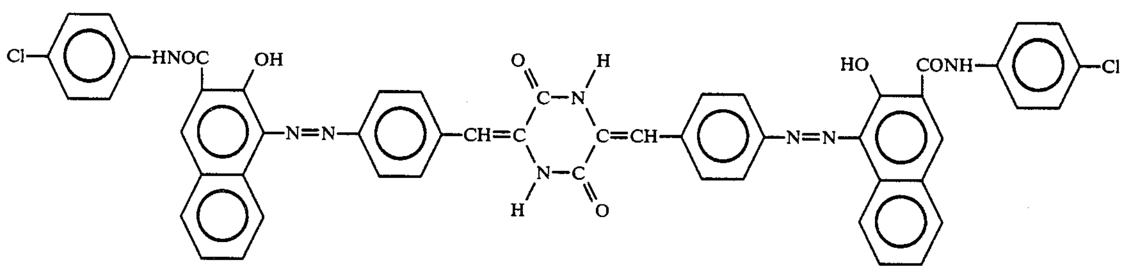
(39)-4
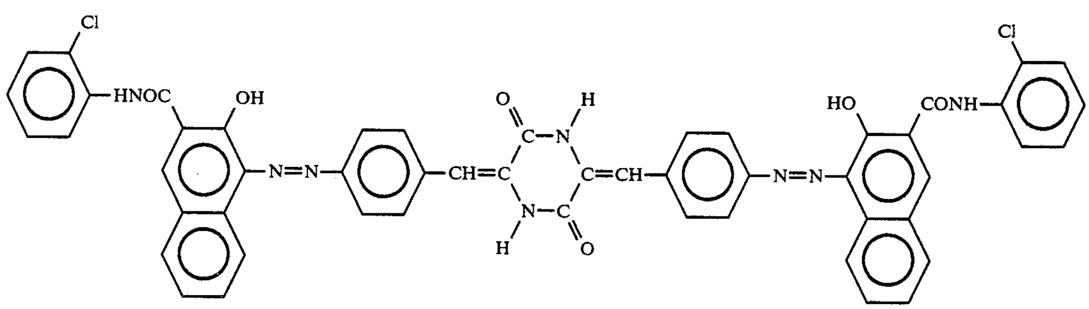
(39)-5
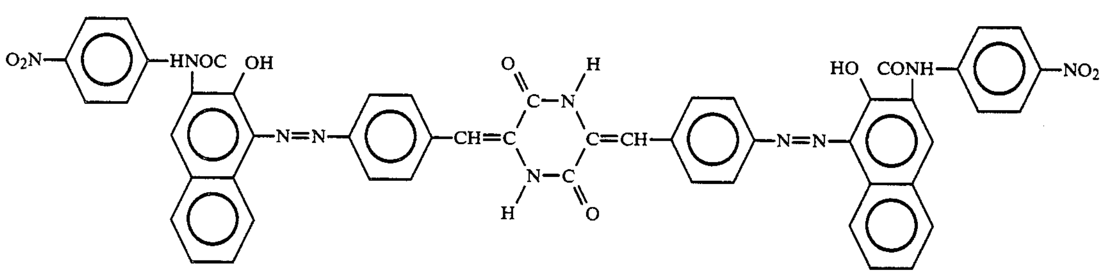
(39)-6

-continued
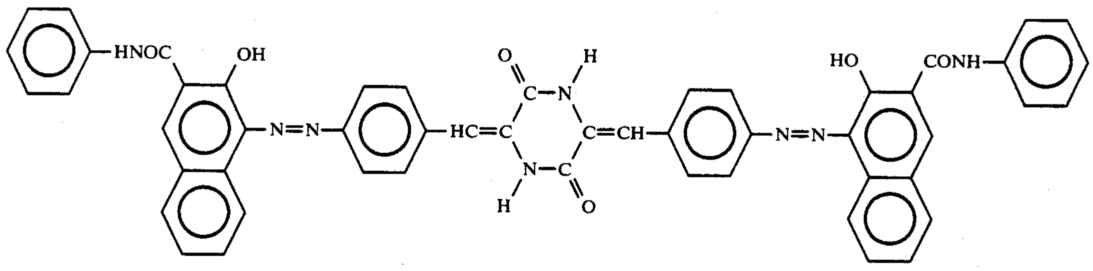
(39)-7
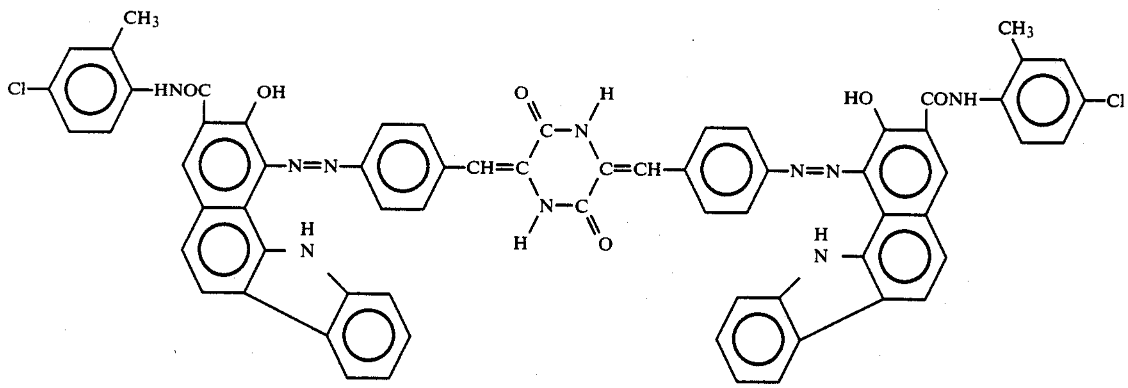
(39)-8
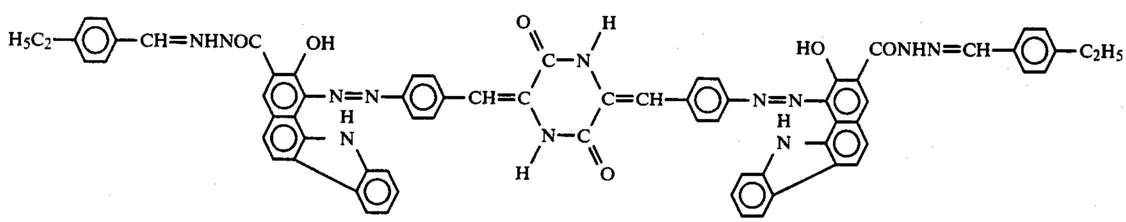
(39)-9
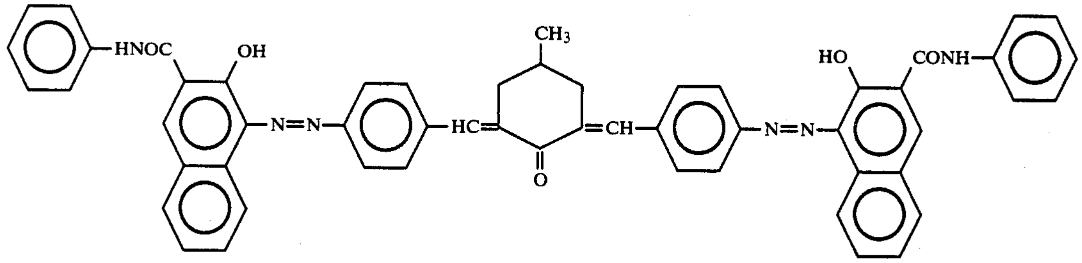
(40)-1
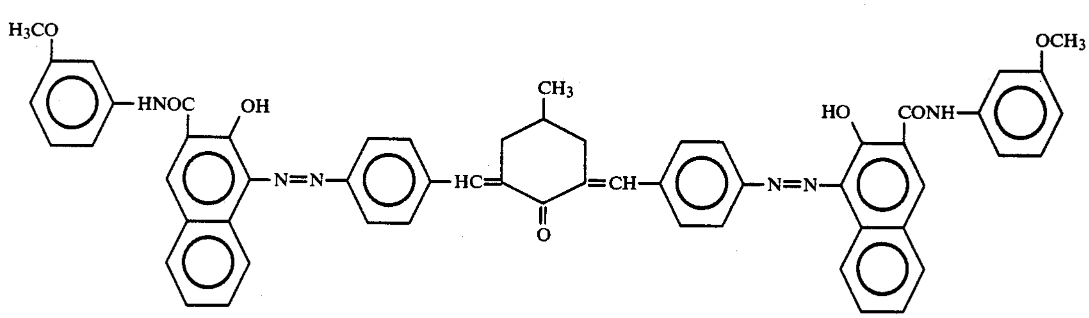
(40)-2

-continued
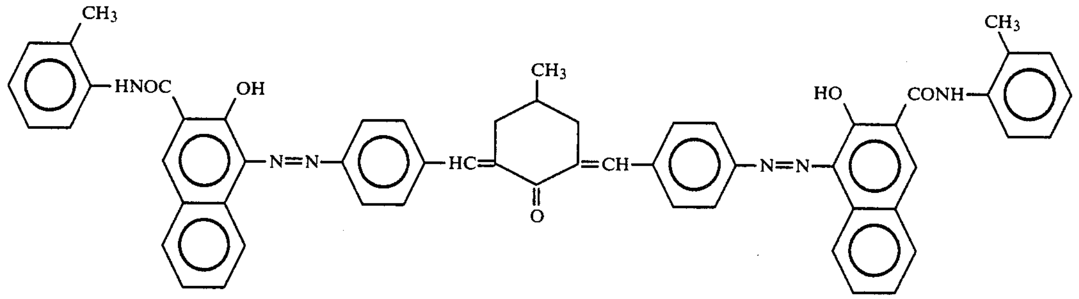
(40)-3
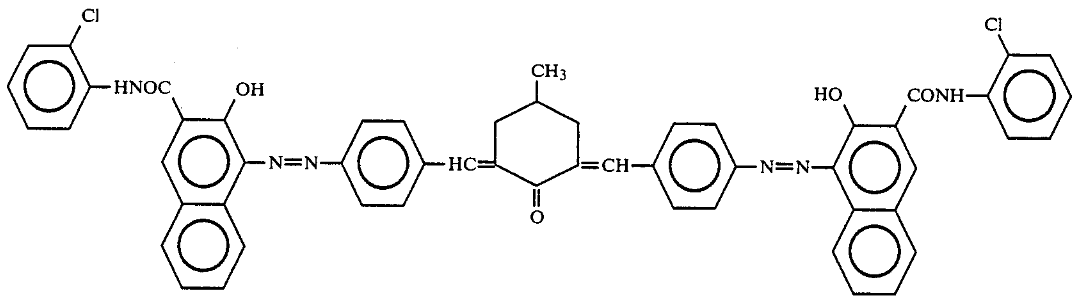
(40)-4
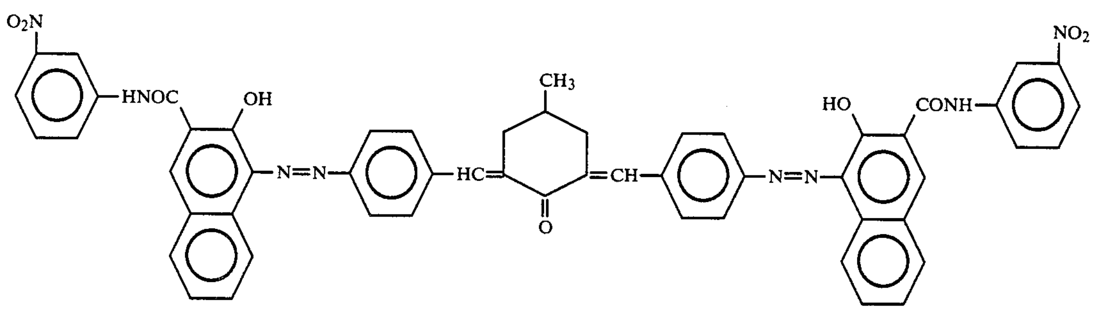
(40)-5
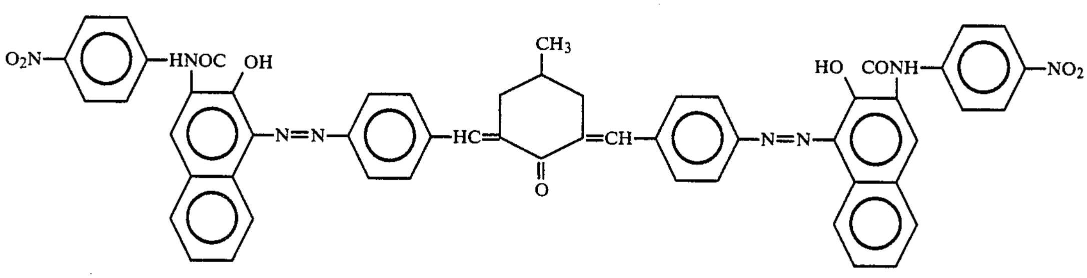
(40)-6
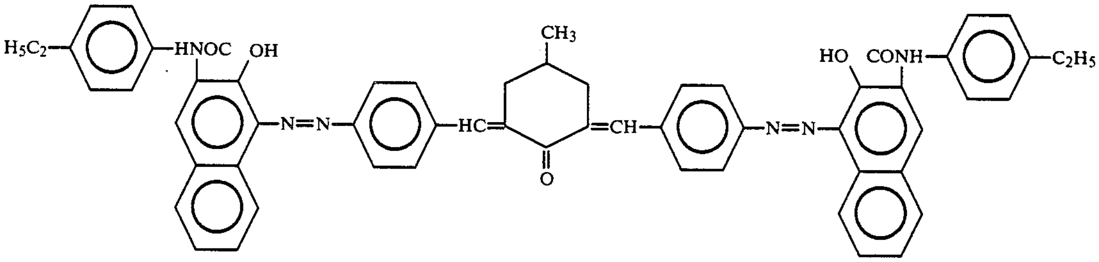
(40)-7

-continued
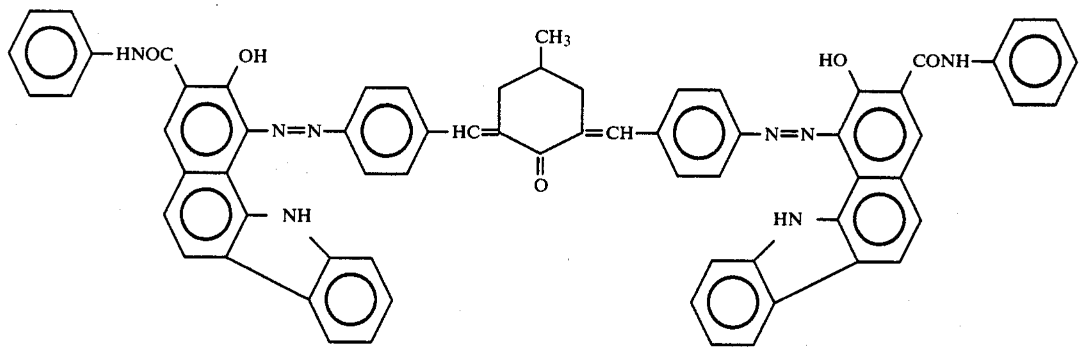
(40)-8
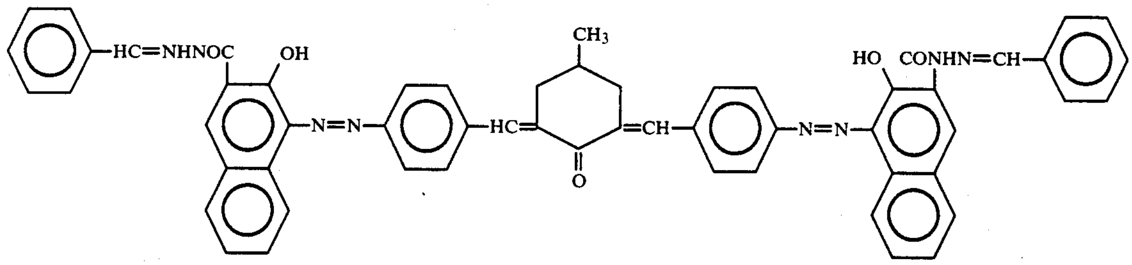
(40)-9
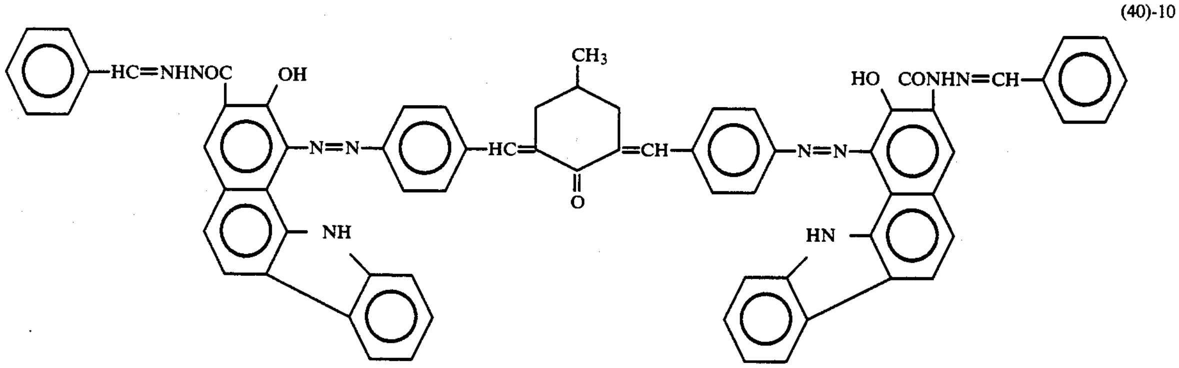
(40)-10
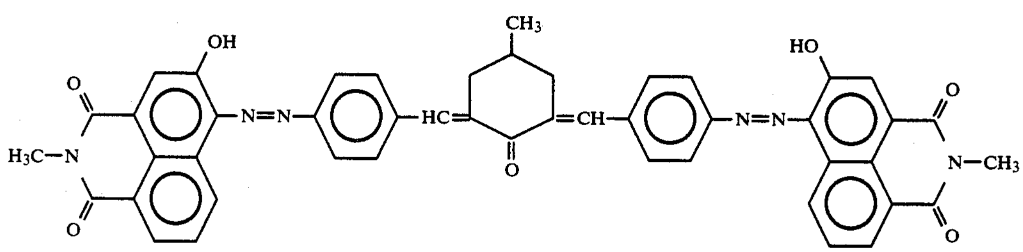
(40)-11
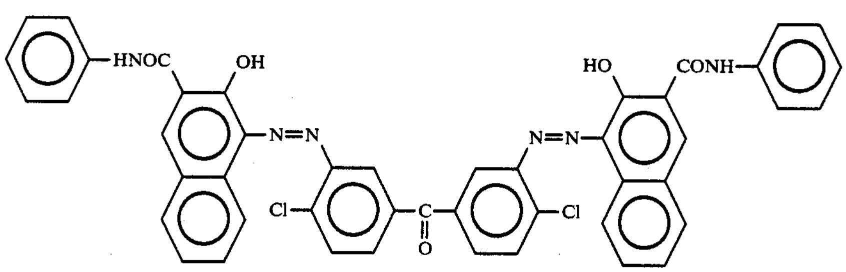
(41)-1

-continued
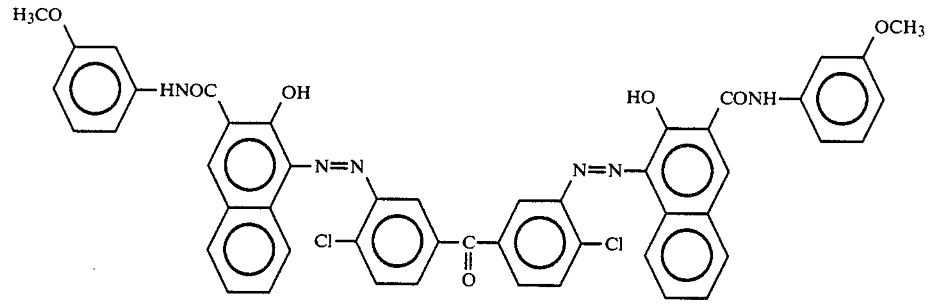
(41)-2
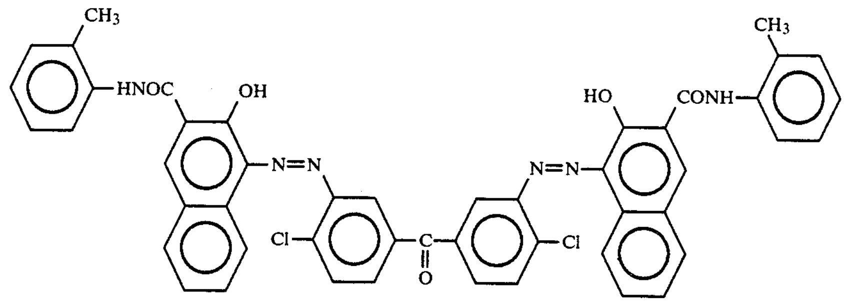
(41)-3
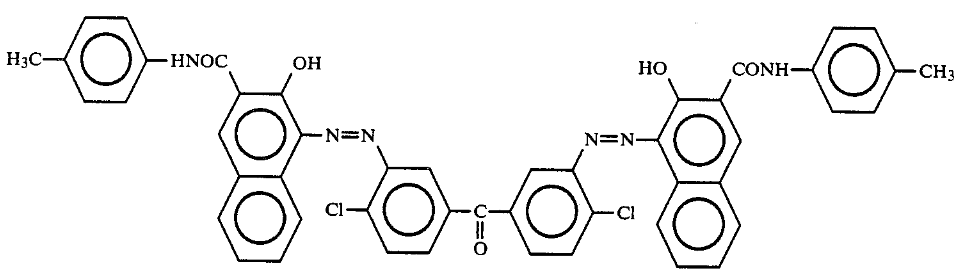
(41)-4
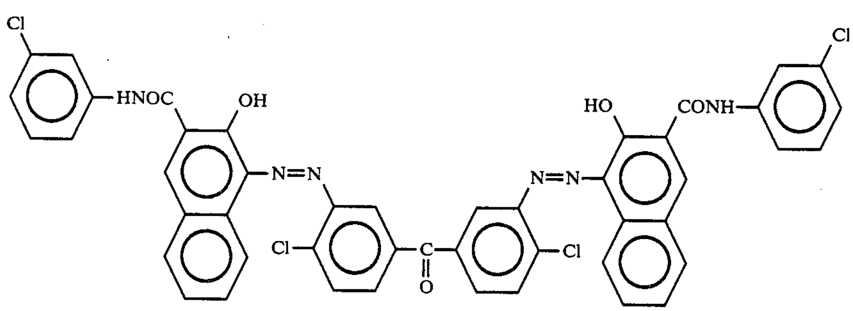
(41)-5
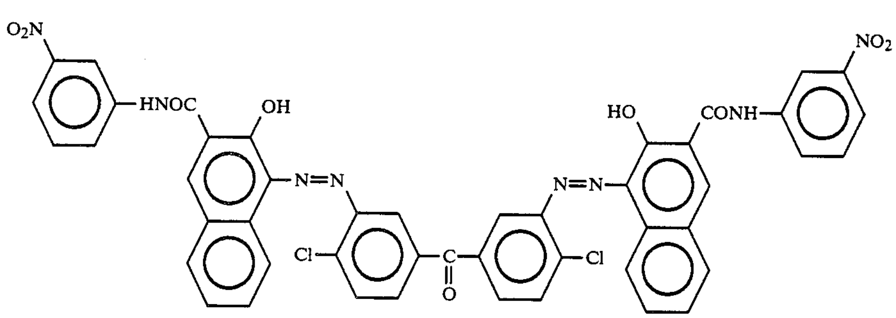
(41)-6

-continued
(41)-7
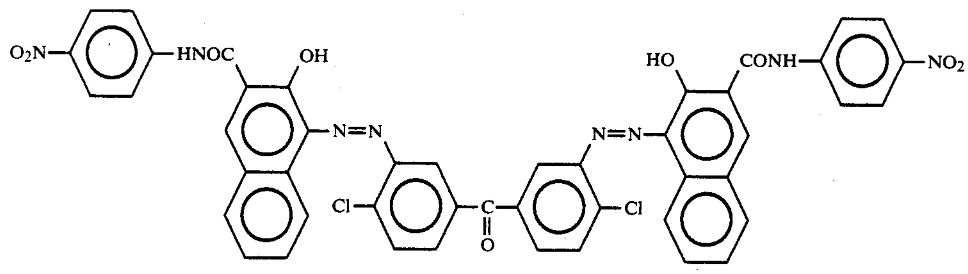
(41)-8
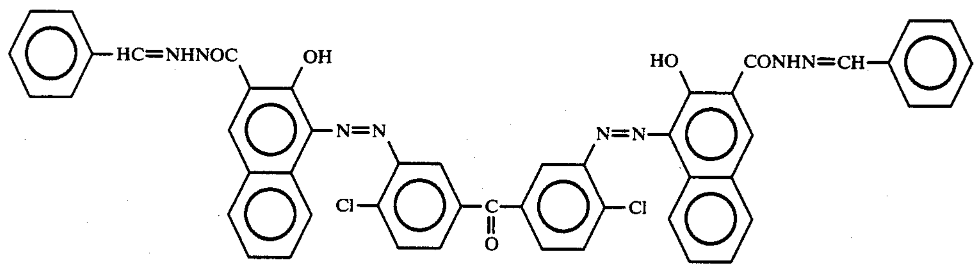
(41)-9
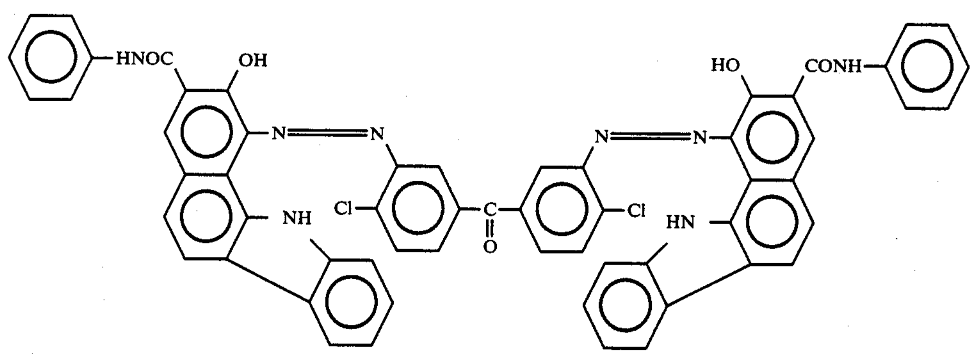
(41)-10
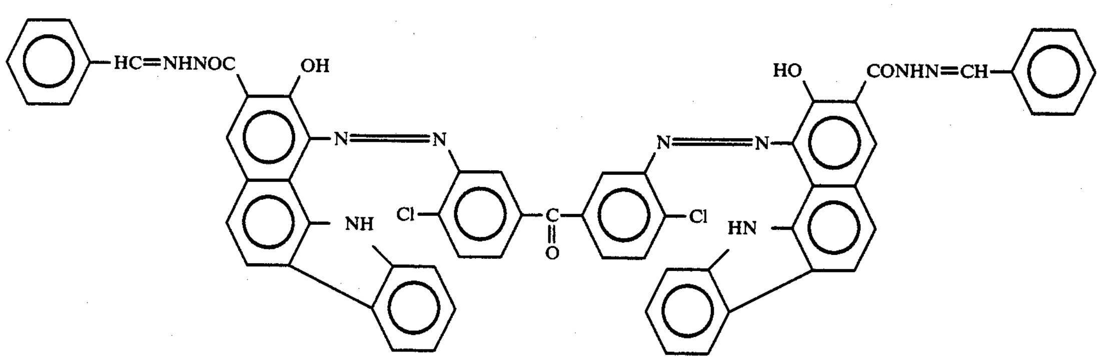
(42)-1
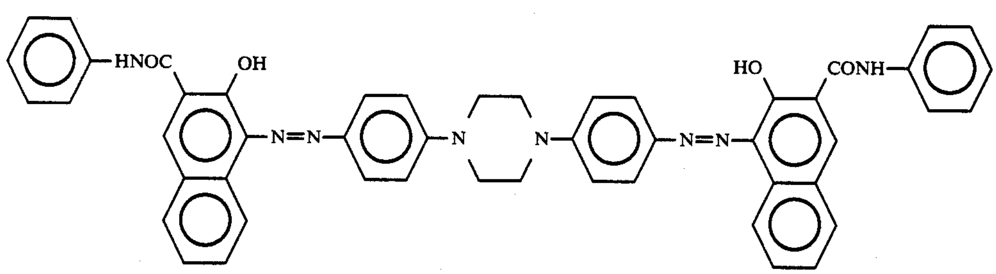

-continued
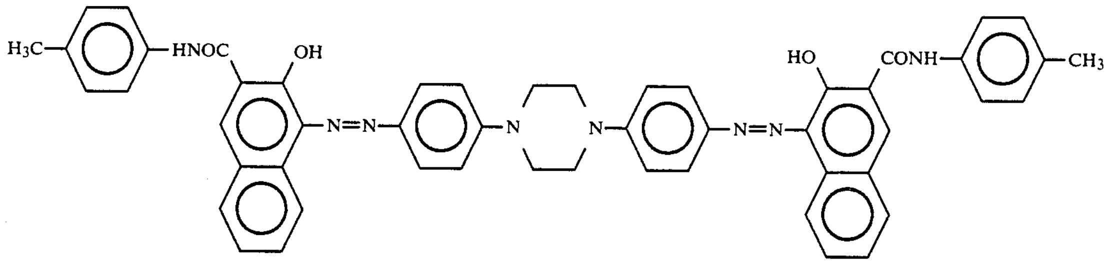
(42)-2
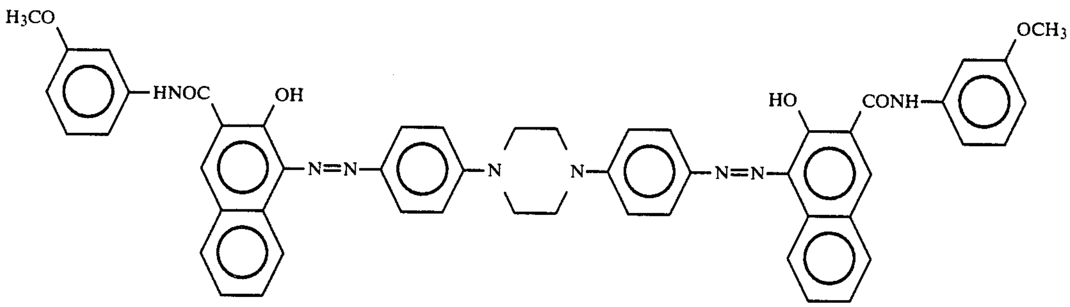
(42)-3
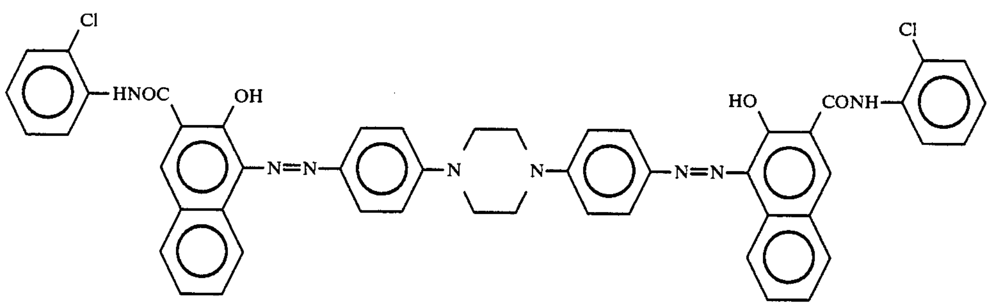
(42)-4
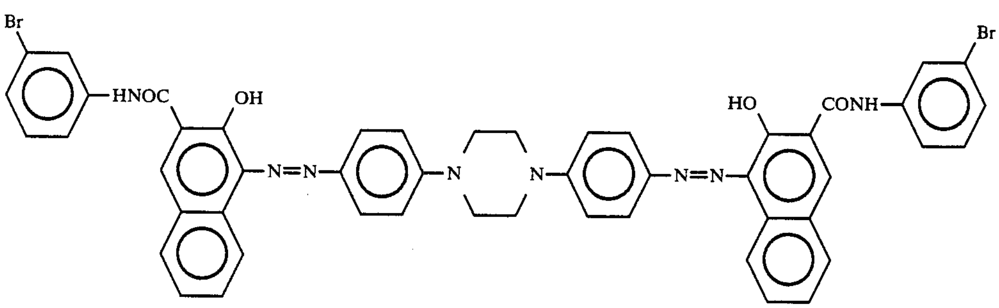
(42)-5
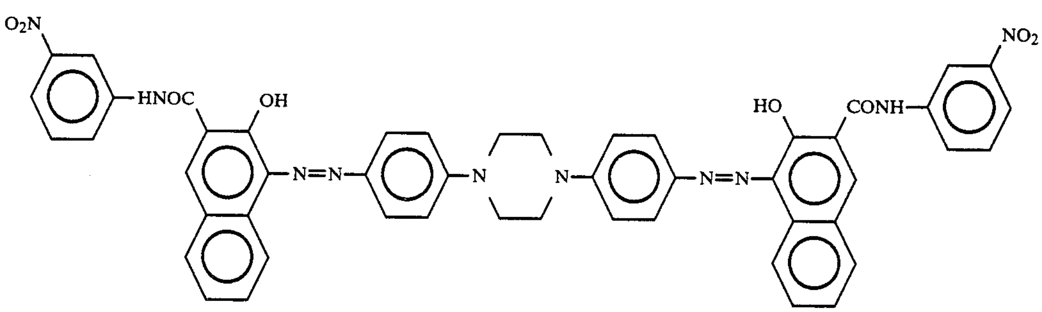
(42)-6

-continued
(42)-7
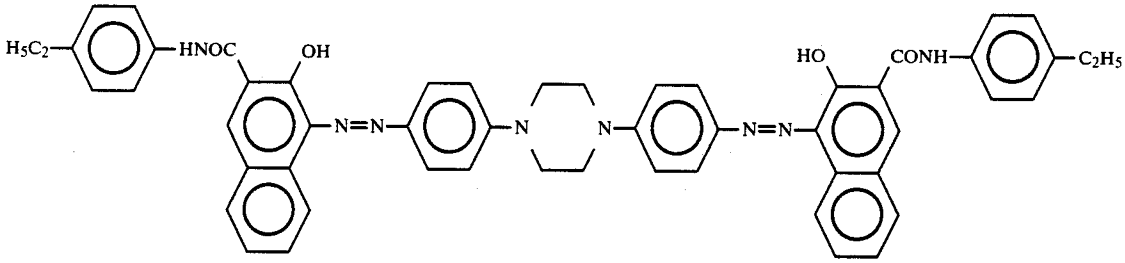
(42)-8
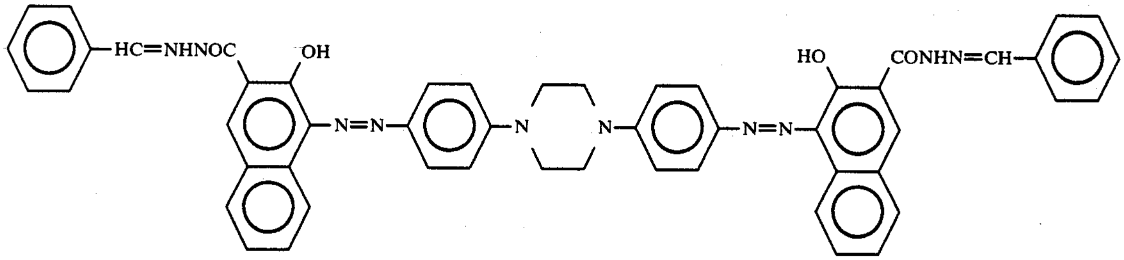
(42)-9
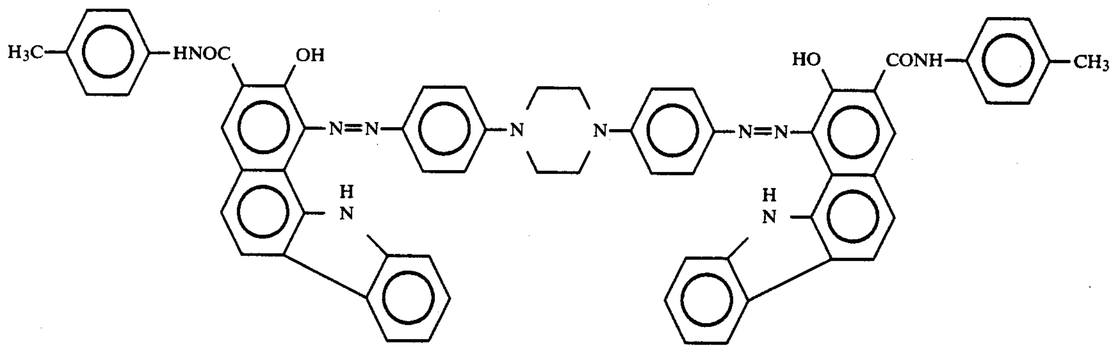
(42)-10
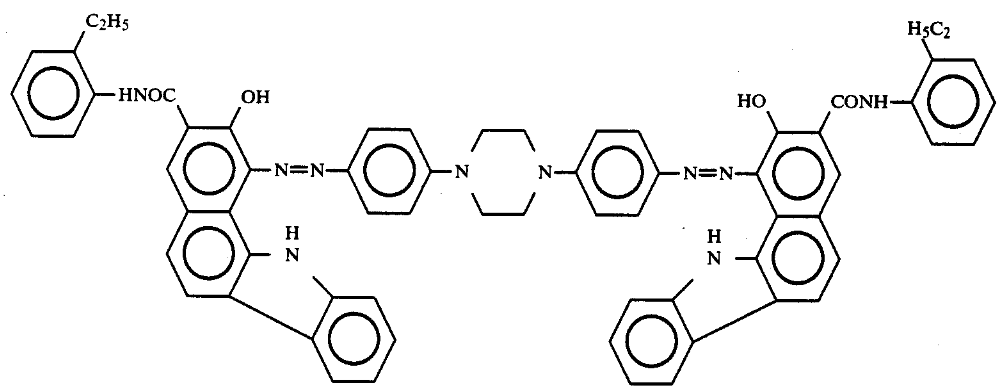
(42)-11
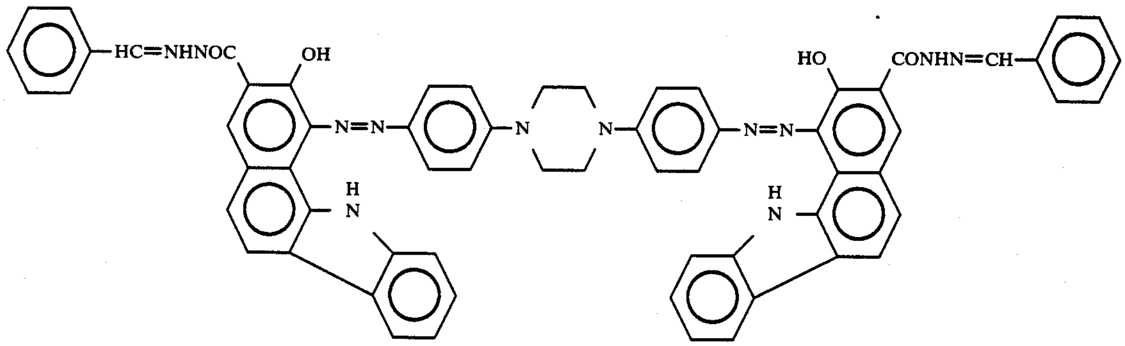

-continued
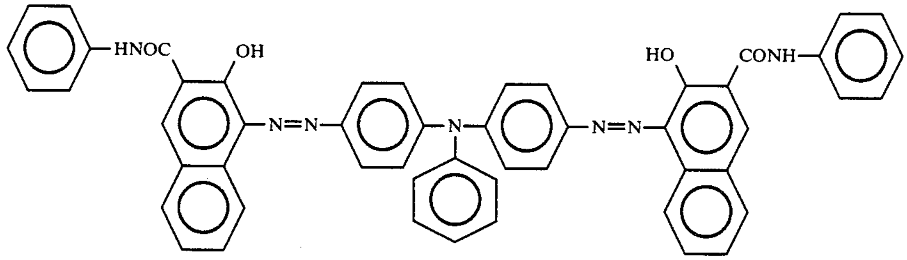
(43)-1
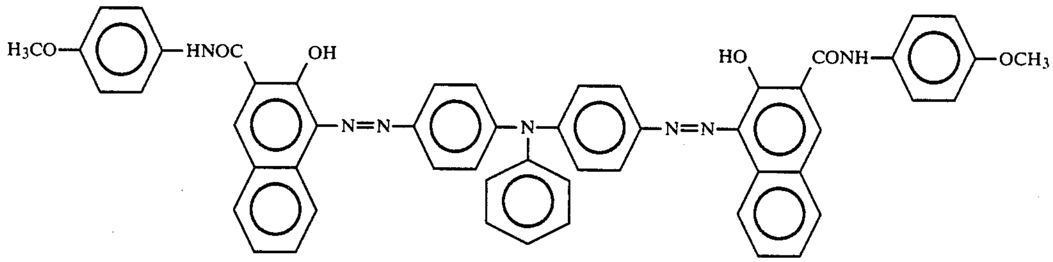
(43)-2
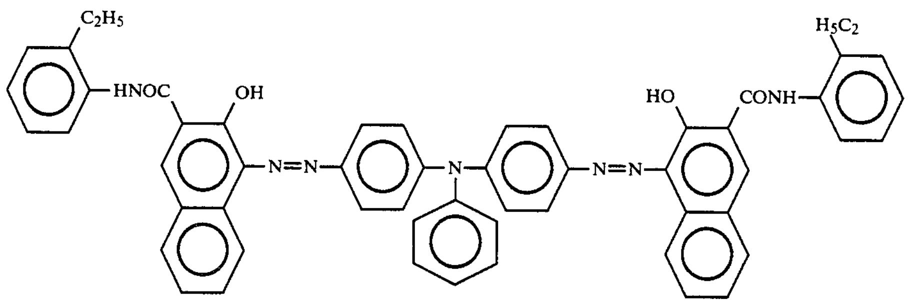
(43)-3
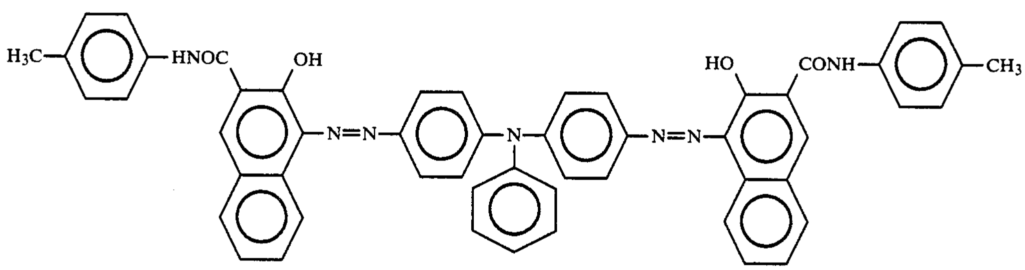
(43)-4
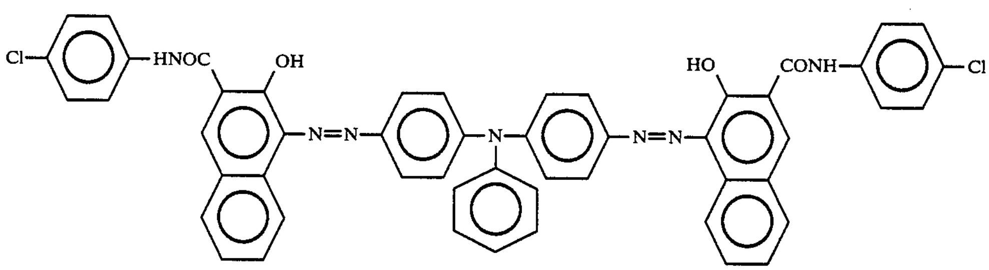
(43)-5
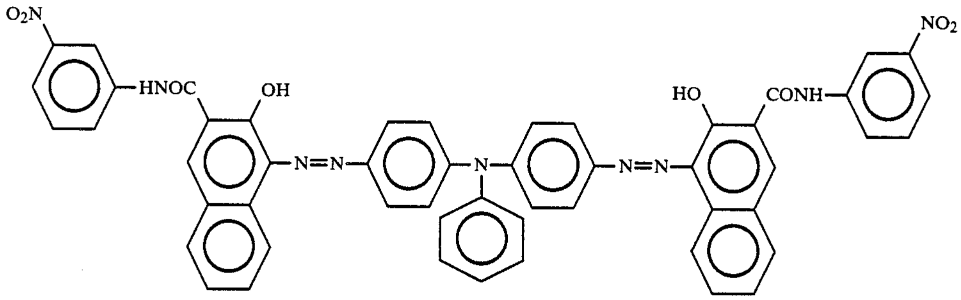
(43)-6

-continued
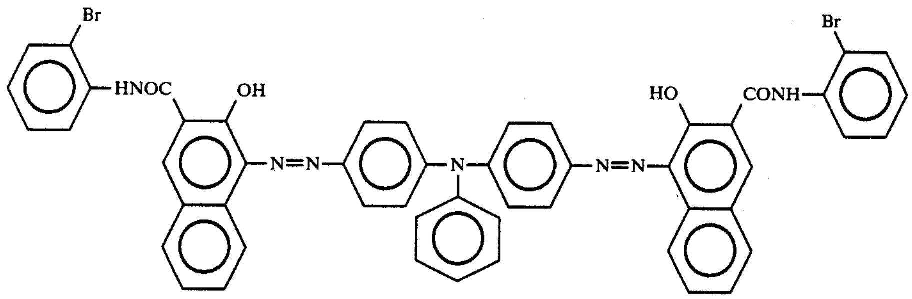
(43)-7
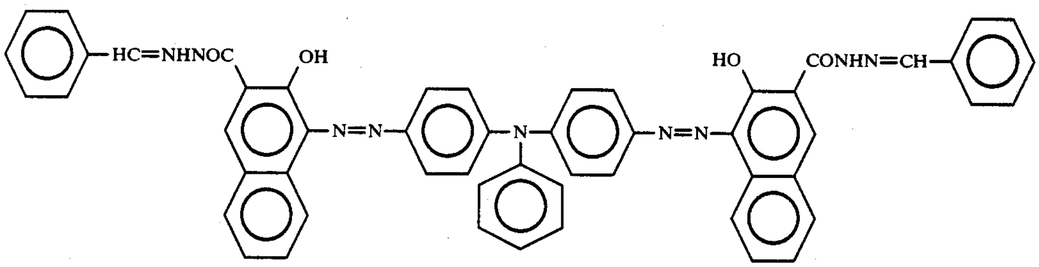
(43)-8
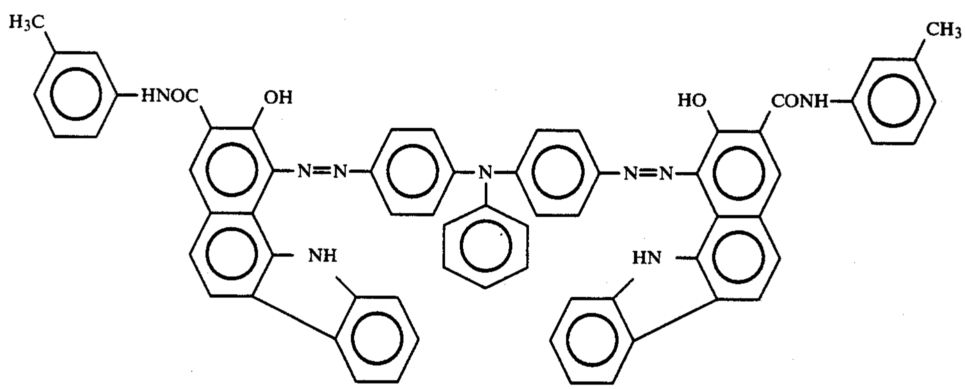
(43)-9
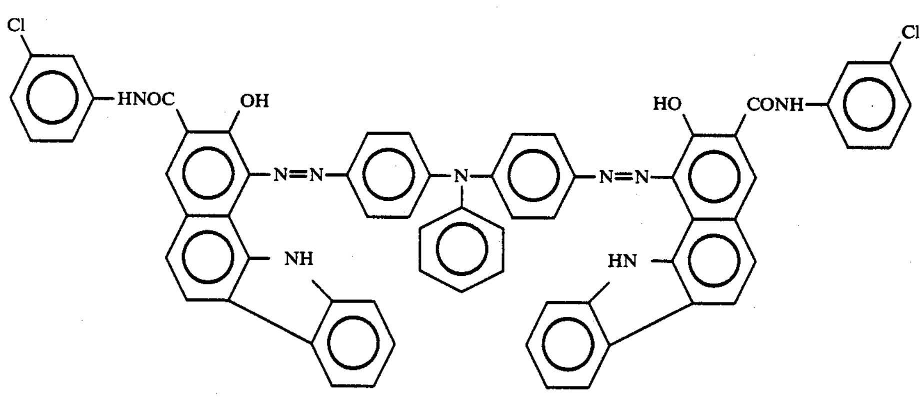
(43)-10

-continued
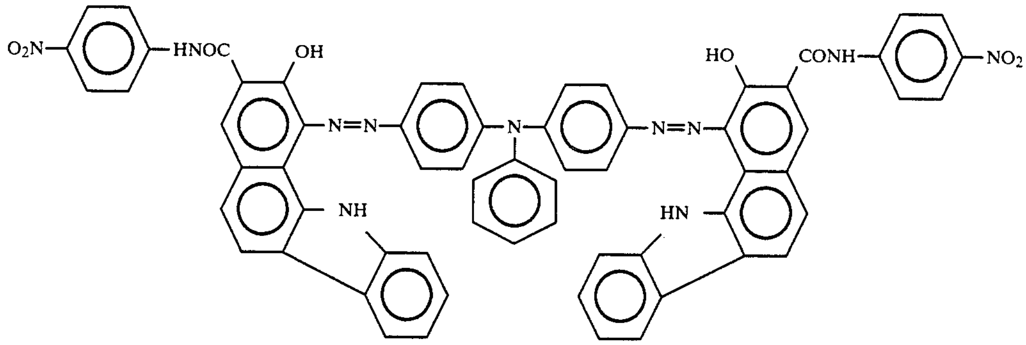
(43)-11
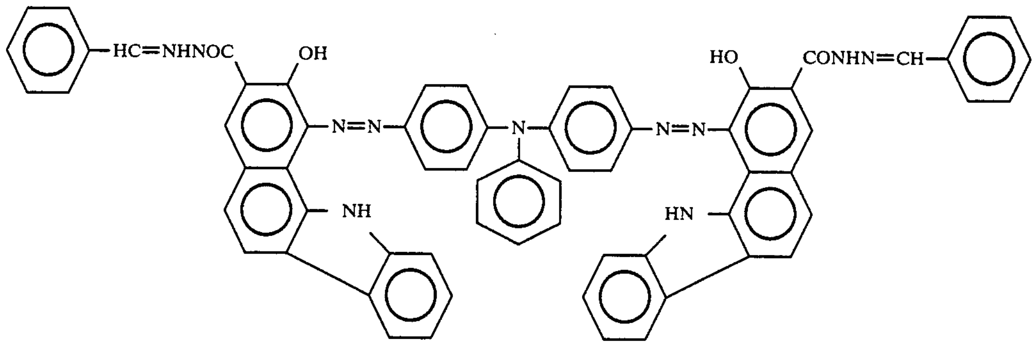
(43)-12
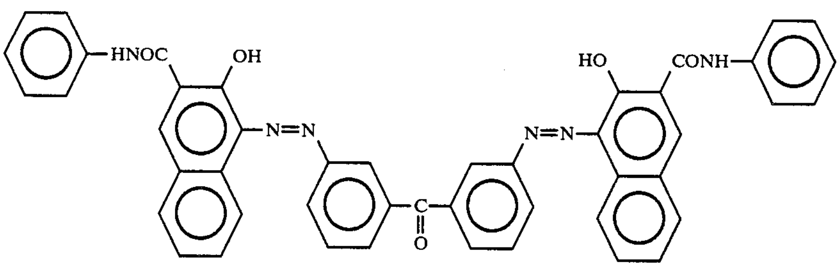
(44)-1
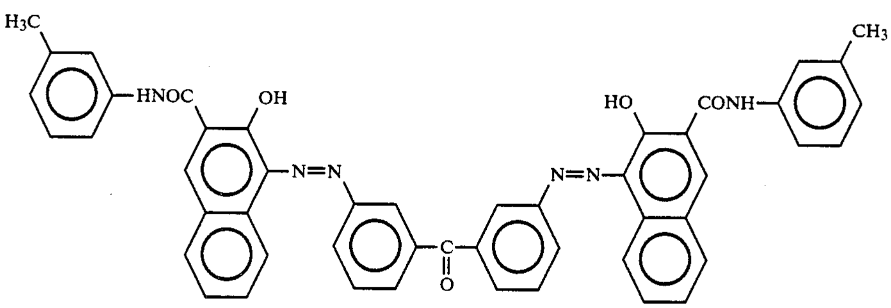
(44)-2
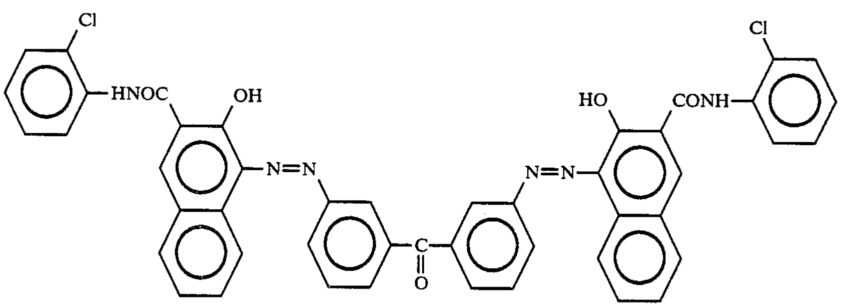
(44)-3

-continued
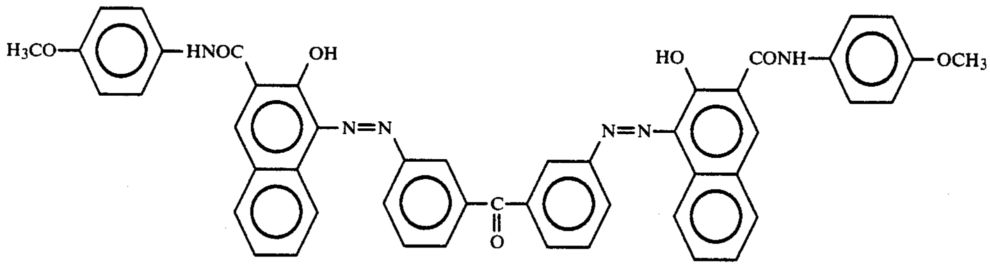
(44)-4
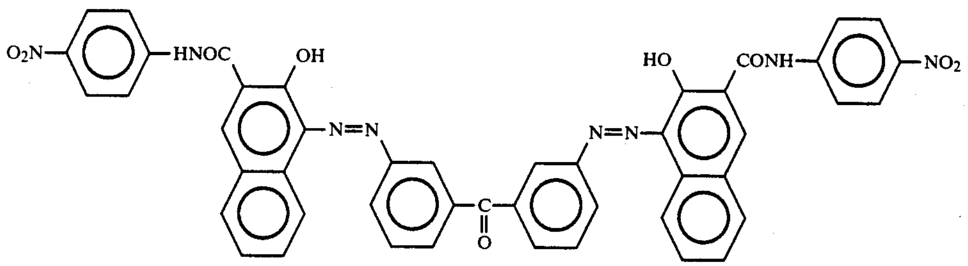
(44)-5
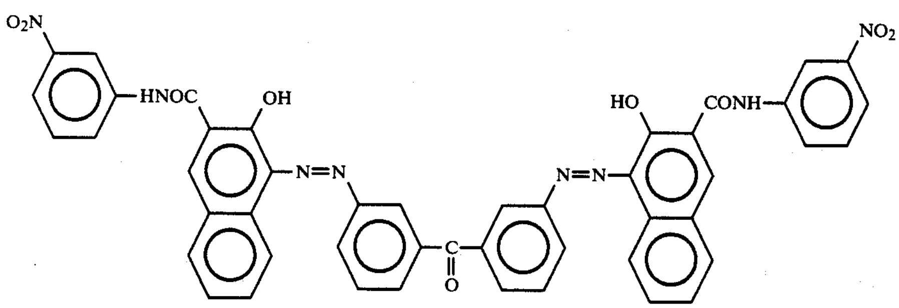
(44)-6
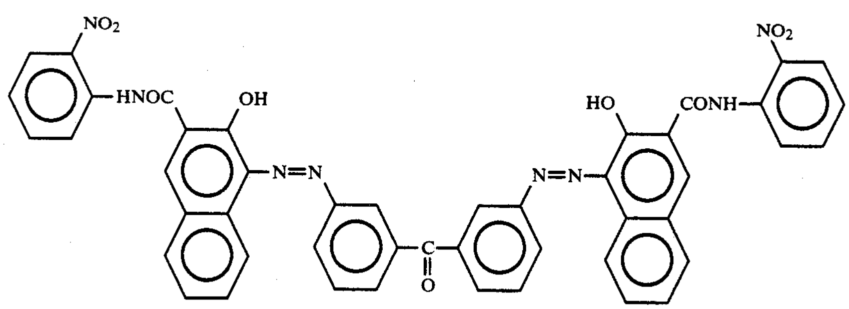
(44)-7
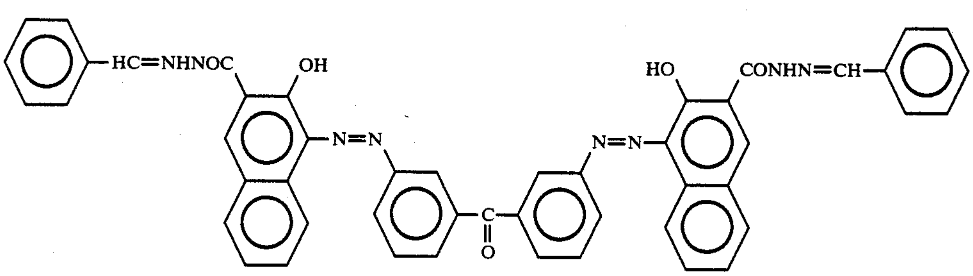
(44)-8

-continued

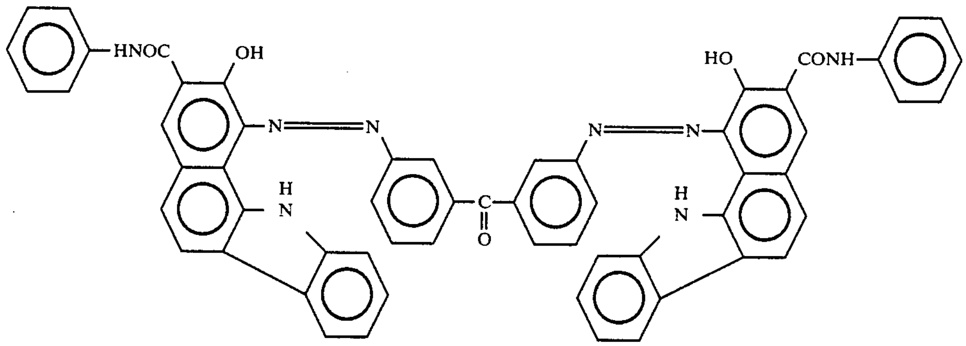

(44)-9

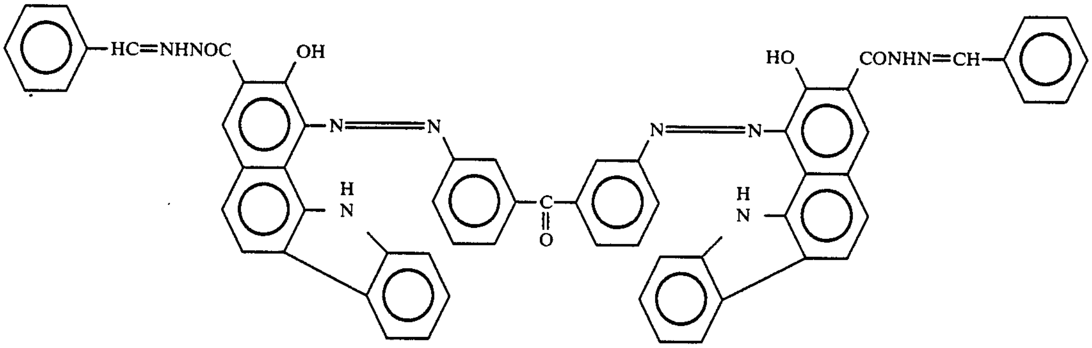

(44)-10

By referring to the following examples, the present invention will now be explained in detail.

EXAMPLE (1)-1

A charge generation layer formation liquid was prepared by dispersing the following components in a ball mill:

| | Parts by Weight |
|---|---|
| Azo Pigment (1)-8 (serving as charge generating material) | 1 |
| 0.74 wt. % tetrahydrofuran solution of a novolak resin (m-cresol-phenol copolymer, commercially available under the trade mark of MP-707 from Gun-ei Chemical Industry Co., Ltd.) | 66.7 |

The thus prepared charge generation layer formation liquid was coated on an grained aluminum plate having a thickness of 0.25 mm and dried at 80° C. for 10 minutes, whereby a charge generation layer having a thickness of about 1 μm was formed on the aluminum plate.

A charge transport layer formation liquid was prepared by dissolving the following components:

| | Parts by Weight |
|---|---|
| 2,5-bis(4-diethylaminophenyl)-1,3,4-oxadiazole (serving as charge transporting material) | 0.9 |
| Styrene-maleic anhydride copolymer (1:1) (commercially available from Aldrich Chemical Co., Ltd.) | 1.8 |
| Tetrahydrofuran | 13.2 |

The thus prepared charge transport layer formation liquid was coated on the charge generation layer and was dried at 80° C. for 20 minutes, so that a charge transport layer having a thickness of about 10 μm was formed on the charge generation layer. Thus, an electrophotographic printing original plate No. (1)-1 according to the present invention was prepared.

By use of a Paper Analyzer (commercially available under the trade mark of Model SP-428 from Kawaguchi Works, Co., Ltd.), the electrophotographic printing original plate No. (1)-1 was charged negatively in the dark under application of −6 kV of corona charge for 20 seconds, was then allowed to stand in the dark for 10 seconds without applying any charge thereto, and the surface potential Vo of the printing original plate was measured. The printing original plate was then illuminated by a tungsten lamp in such a manner that the illuminance on the illuminated surface of the plate was 4.5 lux, so that the exposure $E_{\frac{1}{2}}$ (lux second) required to reduce the initial surface potential Vo (Volt) to ½ the initial surface potential Vo (Volt) was measured. The results are shown in Table 1.

The printing original plate No. (1)-1 was mounted on a commercially available electrophotographic plate making machine (Type S-1 made by Ricoh Company, Ltd.), subjected to uniform electrical charging and exposure to an optical image to form a latent electrostatic image thereon. The latent electrostatic image was developed with toner to form a toner image on the printing original plate and the toner image was fixed thereto.

The toner-image-bearing printing original plate was immersed into a solution consisting of 70 g of sodium metasilicate, 140 ml of glycerine, 550 ml of ethylene glycol and 150 ml of ethanol for 1 minute, and then washed with light brushing in the flowing water, so that the electrophotographic photosensitive layer portions corresponding to the non-image areas which bore no toner were removed, whereby a printing plate was prepared.

This printing plate was mounted on a commercially available offset printing machine (Type AP-1310 made by Ricoh Company, Ltd.) and printing was carried out in a conventional manner. The result was that more than 50,000 sheets were printed with clear images.

EXAMPLES (1)-2 AND (1)-3

Example (1)-1 was repeated except that the azo pigment and the charge transporting material employed in Example (1)-1 were respectively replaced by those listed in Table 1, whereby electrophotographic printing original plates No. (1)-2 and (1)-3 according to the present invention were prepared.

The electrostatic characteristics Vo and $E_{\frac{1}{2}}$ of the printing original plates No. (1)-2 and (1)-3 were measured under the same conditions as in Example (1)-1. The results are shown in Table 1.

EXAMPLE (1)-4

A charge generation layer formation liquid was prepared by dispersing the following components in a ball mill:

| | Parts by Weight |
|---|---|
| Azo Pigment (1)-8 (serving as charge generating material) | 1 |
| 0.74 wt. % tetrahydrofuran solution of a novolak resin (m-cresol-phenol copolymer, commercially available under the trade mark of MP-707 from Gun-ei Chemical Industry Co., Ltd.) | 66.7 |

The thus prepared charge generation layer formation liquid was coated on an grained aluminum plate having a thickness of 0.25 mm and dried at 80° C. for 10 minutes, whereby a charge generation layer having a thickness of about 1 μm was formed on the aluminum plate.

A charge transport layer formation liquid was prepared by dissolving the following components:

| | Parts by Weight |
|---|---|
| 3-styryl-9-ethylcarbazole (serving as charge transporting material) | 1.5 |
| Novolak resin (m-cresol-phenol copolymer, commercially available under the trade mark of MP-707 from Gun-ei Chemical Industry Co., Ltd.) | 3.0 |
| Tetrahydrofuran | 12.0 |

The thus prepared charge transport layer formation liquid was coated on the charge generation layer and was dried at 80° C. for 2 minutes and then at 100° C. for 10 minutes, so that a charge transport layer having a thickness of about 10 μm was formed on the charge generation layer. Thus, an electrophotographic printing original plate No. (1)-4 according to the present invention was prepared.

The electrostatic characteristics Vo and $E_{\frac{1}{2}}$ of the thus prepared printing original plate No. (1)-4 were measured under the same conditions as in Example 1. The results are shown in Table 1.

A toner image was formed on the printing original plate No. (1)-4 in the same manner as in Example (1)-1 and the toner-image-bearing printing original plate No. (1)-4 was immersed into a solution consisting of 2.5 parts by weight of sodium metasilicate and 100 parts by weight of water for about 45 seconds and was then washed with light brushing in the flowing water, so that the electrophotographic photosensitive layer portions corresponding to the non-image areas which bore no toner were removed, whereby a printing plate was prepared.

This printing plate was mounted on a commercially available offset printing machine (Type AP-1310 made by Ricoh Company, Ltd.) and printing was carried out in a conventional manner. The result was that more than 50,000 sheets were printed with clear images.

EXAMPLES (1)-5 TO (1)-8

Example (1)-1 was repeated except that the azo pigment and the charge transporting material employed in Example (1)-1 were respectively replaced by those listed in Table 1, whereby electrophotographic printing original plates No. (1)-5 to (1)-8 according to the present invention were prepared.

The electrostatic characteristics Vo and $E_{\frac{1}{2}}$ of the printing original plates No. (1)-5 to (1)-8 were measured under the same conditions as in Example (1)-1. The results are shown in Table 1.

TABLE 1

| Example No. | Azo Pigment | Charge Transporting Material | Vo (Volt) | $E_{\frac{1}{2}}$ (lux · sec.) |
|---|---|---|---|---|
| (1)-1 | (1)-8 | 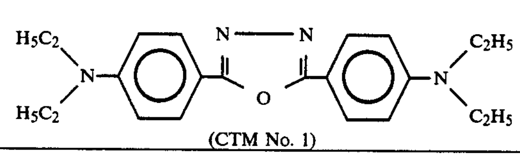 (CTM No. 1) | −830 | 2.5 |
| (1)-2 | (1)-4 | 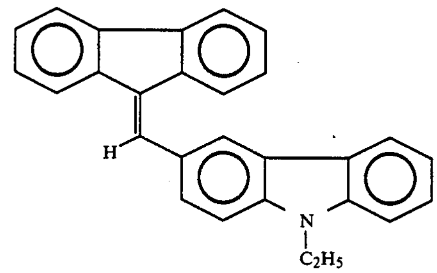 | −870 | 6.0 |

TABLE 1-continued

| Example No. | Azo Pigment | Charge Transporting Material | Vo (Volt) | $E_{\frac{1}{2}}$ (lux · sec.) |
|---|---|---|---|---|
| | | (CTM No. 2) | | |
| (1)-3 | (1)-6 | 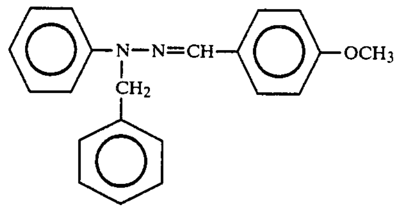 (CTM No. 3) | −1000 | 5.8 |
| (1)-4 | (1)-8 | 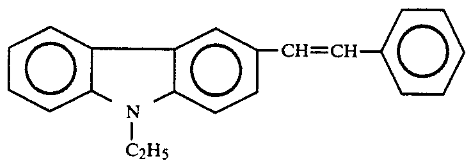 (CTM No. 4) | −1080 | 2.2 |
| (1)-5 | (1)-11 | 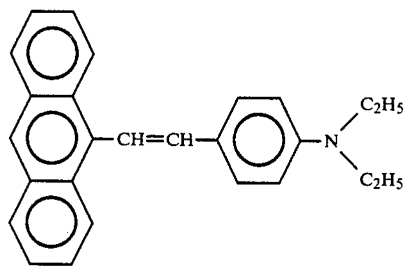 (CTM No. 5) | −870 | 8.1 |
| (1)-6 | (1)-8 | 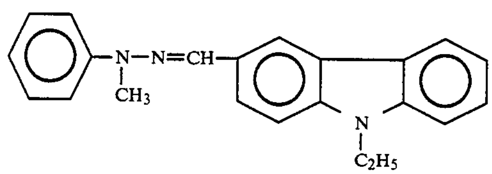 (CTM No. 6) | −780 | 1.8 |
| (1)-7 | (1)-2 | 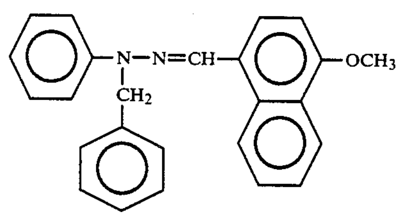 (CTM No. 3) | −1000 | 5.4 |
| (1)-8 | (1)-1 | 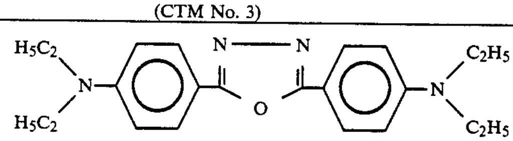 (CTM No. 1) | −960 | 7.1 |

EXAMPLES (2)-1-(2)-8 THROUGH (44)-1-(44)-8

Examples (1)-1 to (1)-8 were repeated except that the azo pigments and the charge transporting materials employed in Examples (1)-1 to (1)-8 were respectively replaced by those listed in Table 2, whereby electrophotographic printing original plates Nos. (2)-1-(2)-8 through (44)-1-(44)-8 according to the present invention were prepared.

The electrostatic characteristics Vo and $E_{\frac{1}{2}}$ of these printing original plates were measured under the same conditions as in Example (1)-1. The results are shown in Table 2.

TABLE 2

| Example No. | Azo Pigment | Charge Transporting Material | Vo (Volt) | $E_{\frac{1}{2}}$ (lux · sec) |
|---|---|---|---|---|
| (2)-1 | (2)-1 | CTM No. 1 | −780 | 2.0 |
| (2)-2 | (2)-3 | CTM No. 2 | −1020 | 4.0 |
| (2)-3 | (2)-2 | CTM No. 3 | −650 | 8.8 |
| (2)-4 | (2)-5 | CTM No. 4 | −740 | 11.0 |
| (2)-5 | (2)-6 | CTM No. 5 | −750 | 5.7 |
| (2)-6 | (2)-1 | CTM No. 6 | −870 | 1.8 |
| (2)-7 | (2)-8 | CTM No. 3 | −950 | 9.1 |
| (2)-8 | (2)-1 | CTM No. 1 | −1010 | 2.2 |
| (3)-1 | (3)-2 | CTM No. 1 | −850 | 9.9 |
| (3)-2 | (3)-8 | CTM No. 2 | −890 | 8.1 |
| (3)-3 | (3)-13 | CTM No. 3 | −1010 | 5.5 |
| (3)-4 | (3)-15 | CTM No. 4 | −920 | 6.9 |
| (3)-5 | (3)-1 | CTM No. 5 | −850 | 8.0 |
| (3)-6 | (3)-2 | CTM No. 6 | −720 | 10.0 |
| (3)-7 | (3)-7 | CTM No. 3 | −950 | 7.7 |
| (3)-8 | (3)-1 | CTM No. 1 | −1060 | 7.1 |
| (4)-1 | (4)-2 | CTM No. 1 | −720 | 7.7 |
| (4)-2 | (4)-3 | CTM No. 2 | −810 | 12.8 |
| (4)-3 | (4)-4 | CTM No. 3 | −880 | 11.6 |
| (4)-4 | (4)-6 | CTM No. 4 | −900 | 7.9 |
| (4)-5 | (4)-2 | CTM No. 5 | −760 | 9.0 |
| (4)-6 | (4)-3 | CTM No. 6 | −700 | 7.8 |
| (4)-7 | (4)-10 | CTM No. 3 | −810 | 9.2 |
| (4)-8 | (4)-4 | CTM No. 1 | −920 | 8.8 |
| (5)-1 | (5)-6 | CTM No. 1 | −780 | 1.6 |
| (5)-2 | (5)-29 | CTM No. 2 | −770 | 3.1 |
| (5)-3 | (5)-10 | CTM No. 3 | −960 | 10.2 |
| (5)-4 | (5)-22 | CTM No. 4 | −1090 | 3.8 |
| (5)-5 | (5)-4 | CTM No. 5 | −870 | 2.1 |
| (5)-6 | (5)-6 | CTM No. 6 | −730 | 1.3 |
| (5)-7 | (5)-7 | CTM No. 3 | −1030 | 4.7 |
| (5)-8 | (5)-11 | CTM No. 1 | −1150 | 7.6 |
| (6)-1 | (6)-1 | CTM No. 1 | −750 | 4.5 |
| (6)-2 | (6)-9 | CTM No. 2 | −890 | 4.1 |
| (6)-3 | (6)-10 | CTM No. 3 | −950 | 10.3 |
| (6)-4 | (6)-10 | CTM No. 4 | −1010 | 7.1 |
| (6)-5 | (6)-9 | CTM No. 5 | −840 | 3.9 |
| (6)-6 | (6)-11 | CTM No. 6 | −770 | 3.5 |
| (6)-7 | (6)-8 | CTM No. 3 | −830 | 8.3 |
| (6)-8 | (6)-1 | CTM No. 1 | −1120 | 9.5 |
| (7)-1 | (7)-5 | CTM No. 1 | −710 | 6.9 |
| (7)-2 | (7)-4 | CTM No. 2 | −800 | 11.2 |
| (7)-3 | (7)-3 | CTM No. 3 | −760 | 11.6 |
| (7)-4 | (7)-5 | CTM No. 4 | −830 | 6.7 |
| (7)-5 | (7)-3 | CTM No. 5 | −790 | 8.1 |
| (7)-6 | (7)-2 | CTM No. 6 | −720 | 8.6 |
| (7)-7 | (6)-6 | CTM No. 3 | −740 | 11.0 |
| (7)-8 | (7)-10 | CTM No. 1 | −810 | 10.3 |
| (8)-1 | (8)-9 | CTM No. 1 | −840 | 4.8 |
| (8)-2 | (8)-10 | CTM No. 2 | −770 | 10.2 |
| (8)-3 | (8)-15 | CTM No. 3 | −920 | 8.7 |
| (8)-4 | (8)-19 | CTM No. 4 | −1010 | 4.6 |
| (8)-5 | (8)-9 | CTM No. 5 | −820 | 4.4 |
| (8)-6 | (8)-12 | CTM No. 6 | −720 | 3.8 |
| (8)-7 | (8)-6 | CTM No. 3 | −1000 | 4.9 |
| (8)-8 | (8)-10 | CTM No. 1 | −1150 | 5.8 |
| (9)-1 | (9)-1 | CTM No. 1 | −830 | 5.3 |
| (9)-2 | (9)-8 | CTM No. 2 | −910 | 9.5 |
| (9)-3 | (9)-14 | CTM No. 3 | −970 | 10.5 |
| (9)-4 | (9)-1 | CTM No. 4 | −1080 | 7.5 |
| (9)-5 | (9)-8 | CTM No. 5 | −830 | 5.4 |
| (9)-6 | (9)-5 | CTM No. 6 | −930 | 9.5 |
| (9)-7 | (9)-3 | CTM No. 3 | −1050 | 11.0 |
| (9)-8 | (9)-10 | CTM No. 1 | −1130 | 8.9 |
| (10)-1 | (10)-1 | CTM No. 1 | −830 | 3.8 |
| (10)-2 | (10)-9 | CTM No. 2 | −1010 | 7.0 |
| (10)-3 | (10)-12 | CTM No. 3 | −1090 | 6.5 |
| (10)-4 | (10)-4 | CTM No. 4 | −1110 | 4.8 |
| (10)-5 | (10)-9 | CTM No. 5 | −820 | 2.5 |
| (10)-6 | (10)-12 | CTM No. 6 | −790 | 2.1 |
| (10)-7 | (10)-11 | CTM No. 3 | −980 | 3.0 |
| (10)-8 | (10)-1 | CTM No. 1 | −1050 | 2.9 |
| (11)-1 | (11)-1 | CTM No. 1 | −1080 | 2.9 |
| (11)-2 | (11)-8 | CTM No. 2 | −830 | 6.0 |
| (11)-3 | (11)-5 | CTM No. 3 | −940 | 7.5 |
| (11)-4 | (11)-10 | CTM No. 4 | −1080 | 3.5 |
| (11)-5 | (11)-8 | CTM No. 5 | −790 | 2.1 |
| (11)-6 | (11)-11 | CTM No. 6 | −850 | 1.9 |
| (11)-7 | (11)-4 | CTM No. 3 | −990 | 2.3 |
| (11)-8 | (11)-1 | CTM No. 1 | −1070 | 3.8 |

TABLE 2-continued

| Example No. | Azo Pigment | Charge Transporting Material | Vo (Volt) | $E_{\frac{1}{2}}$ (lux · sec) |
|---|---|---|---|---|
| (12)-1 | (12)-1 | CTM No. 1 | −870 | 4.8 |
| (12)-2 | (12)-2 | CTM No. 2 | −890 | 5.0 |
| (12)-3 | (12)-3 | CTM No. 3 | −980 | 6.7 |
| (12)-4 | (12)-4 | CTM No. 4 | −1020 | 3.0 |
| (12)-5 | (12)-5 | CTM No. 5 | −910 | 2.9 |
| (12)-6 | (12)-1 | CTM No. 6 | −760 | 3.4 |
| (12)-7 | (12)-10 | CTM No. 3 | −1040 | 5.9 |
| (12)-8 | (12)-1 | CTM No. 1 | −1100 | 4.5 |
| (13)-1 | (13)-1 | CTM No. 1 | −840 | 3.2 |
| (13)-2 | (13)-3 | CTM No. 2 | −770 | 5.0 |
| (13)-3 | (13)-5 | CTM No. 3 | −1000 | 6.7 |
| (13)-4 | (13)-10 | CTM No. 4 | −1020 | 9.1 |
| (13)-5 | (13)-1 | CTM No. 5 | −850 | 3.0 |
| (13)-6 | (13)-1 | CTM No. 6 | −790 | 4.0 |
| (13)-7 | (13)-29 | CTM No. 3 | −880 | 6.5 |
| (13)-8 | (13)-30 | CTM No. 1 | −1070 | 4.4 |
| (14)-1 | (14)-1 | CTM No. 1 | −820 | 11.0 |
| (14)-2 | (14)-2 | CTM No. 2 | −680 | 8.0 |
| (14)-3 | (14)-3 | CTM No. 3 | −920 | 7.9 |
| (14)-4 | (14)-4 | CTM No. 4 | −1080 | 5.7 |
| (14)-5 | (14)-29 | CTM No. 5 | −850 | 8.3 |
| (14)-6 | (14)-5 | CTM No. 6 | −750 | 3.8 |
| (14)-7 | (14)-30 | CTM No. 3 | −900 | 3.1 |
| (14)-8 | (14)-5 | CTM No. 1 | −1040 | 3.2 |
| (15)-1 | (15)-1 | CTM No. 1 | −840 | 6.6 |
| (15)-2 | (15)-4 | CTM No. 2 | −770 | 4.0 |
| (15)-3 | (15)-5 | CTM No. 3 | −930 | 6.2 |
| (15)-4 | (15)-2 | CTM No. 4 | −1040 | 2.9 |
| (15)-5 | (15)-1 | CTM No. 5 | −880 | 7.1 |
| (15)-6 | (15)-1 | CTM No. 6 | −660 | 4.3 |
| (15)-7 | (15)-3 | CTM No. 3 | −1050 | 5.5 |
| (15)-8 | (15)-4 | CTM No. 1 | −940 | 3.8 |
| (16)-1 | (16)-2 | CTM No. 1 | −880 | 8.5 |
| (16)-2 | (16)-4 | CTM No. 2 | −780 | 4.1 |
| (16)-3 | (16)-1 | CTM No. 3 | −1020 | 9.8 |
| (16)-4 | (16)-1 | CTM No. 4 | −1050 | 11.0 |
| (16)-5 | (16)-3 | CTM No. 5 | −830 | 8.5 |
| (16)-6 | (16)-5 | CTM No. 6 | −780 | 9.9 |
| (16)-7 | (16)-6 | CTM No. 3 | −900 | 7.0 |
| (17)-8 | (16)-2 | CTM No. 1 | −990 | 6.9 |
| (17)-1 | (17)-1 | CTM No. 1 | −830 | 11.0 |
| (17)-2 | (17)-11 | CTM No. 2 | −780 | 12.0 |
| (17)-3 | (17)-9 | CTM No. 3 | −1030 | 13.3 |
| (17)-4 | (17)-3 | CTM No. 4 | −1050 | 8.9 |
| (17)-5 | (17)-4 | CTM No. 5 | −810 | 10.0 |
| (17)-6 | (17)-1 | CTM No. 6 | −710 | 12.0 |
| (17)-7 | (17)-7 | CTM No. 3 | −900 | 15.0 |
| (17)-8 | (17)-6 | CTM No. 1 | −1020 | 11.3 |
| (18)-1 | (18)-3 | CTM No. 1 | −940 | 2.5 |
| (18)-2 | (18)-6 | CTM No. 2 | −970 | 5.1 |
| (18)-3 | (18)-1 | CTM No. 3 | −1060 | 4.8 |
| (18)-4 | (18)-5 | CTM No. 4 | −890 | 3.2 |
| (18)-5 | (18)-2 | CTM No. 5 | −1040 | 6.8 |
| (18)-6 | (18)-4 | CTM No. 6 | −710 | 2.2 |
| (18)-7 | (18)-8 | CTM No. 3 | −1140 | 7.2 |
| (18)-8 | (18)-7 | CTM No. 1 | −1030 | 4.9 |
| (19)-1 | (19)-6 | CTM No. 1 | −910 | 7.8 |
| (19)-2 | (19)-3 | CTM No. 2 | −810 | 8.6 |
| (19)-3 | (19)-1 | CTM No. 3 | −970 | 14.0 |
| (19)-4 | (19)-5 | CTM No. 4 | −1000 | 6.4 |
| (19)-5 | (19)-2 | CTM No. 5 | −800 | 11.9 |
| (19)-6 | (19)-3 | CTM No. 6 | −850 | 9.4 |
| (19)-7 | (19)-7 | CTM No. 3 | −960 | 8.9 |
| (19)-8 | (19)-4 | CTM No. 1 | −970 | 10.9 |
| (20)-1 | (20)-4 | CTM No. 1 | −1050 | 5.5 |
| (20)-2 | (20)-7 | CTM No. 2 | −930 | 5.1 |
| (20)-3 | (20)-5 | CTM No. 3 | −1100 | 8.4 |
| (20)-4 | (20)-1 | CTM No. 4 | −990 | 6.7 |
| (20)-5 | (20)-2 | CTM No. 5 | −860 | 5.2 |
| (20)-6 | (20)-6 | CTM No. 6 | −810 | 3.2 |
| (20)-7 | (20)-3 | CTM No. 3 | −1160 | 4.9 |
| (20)-8 | (20)-8 | CTM No. 1 | −1000 | 9.6 |
| (21)-1 | (21)-6 | CTM No. 1 | −830 | 2.9 |
| (21)-2 | (21)-7 | CTM No. 2 | −870 | 3.1 |
| (21)-3 | (21)-10 | CTM No. 3 | −1030 | 2.7 |
| (21)-4 | (21)-15 | CTM No. 4 | −1130 | 4.8 |
| (21)-5 | (21)-16 | CTM No. 5 | −860 | 3.0 |
| (21)-6 | (21)-10 | CTM No. 6 | −780 | 2.5 |
| (21)-7 | (21)-10 | CTM No. 3 | −990 | 2.4 |
| (21)-8 | (21)-18 | CTM No. 1 | −1050 | 3.5 |

TABLE 2-continued

| Example No. | Azo Pigment | Charge Transporting Material | Vo (Volt) | $E_{\frac{1}{2}}$ (lux · sec) |
|---|---|---|---|---|
| (22)-1 | (22)-3 | CTM No. 1 | −880 | 3.8 |
| (22)-2 | (22)-5 | CTM No. 2 | −830 | 5.3 |
| (22)-3 | (22)-11 | CTM No. 3 | −920 | 3.0 |
| (22)-4 | (22)-5 | CTM No. 4 | −950 | 3.6 |
| (22)-5 | (22)-3 | CTM No. 5 | −830 | 4.0 |
| (22)-6 | (22)-10 | CTM No. 6 | −780 | 2.8 |
| (22)-7 | (22)-11 | CTM No. 3 | −920 | 2.3 |
| (22)-8 | (22)-8 | CTM No. 1 | −900 | 4.9 |
| (23)-1 | (23)-1 | CTM No. 1 | −870 | 8.0 |
| (23)-2 | (23)-3 | CTM No. 2 | −900 | 9.1 |
| (23)-3 | (23)-6 | CTM No. 3 | −1120 | 7.5 |
| (23)-4 | (23)-2 | CTM No. 4 | −1020 | 10.3 |
| (23)-5 | (23)-4 | CTM No. 5 | −930 | 12.0 |
| (23)-6 | (23)-8 | CTM No. 6 | −760 | 7.7 |
| (23)-7 | (23)-11 | CTM No. 3 | −1000 | 8.1 |
| (23)-8 | (23)-12 | CTM No. 1 | −1010 | 6.1 |
| (24)-1 | (24)-1 | CTM No. 1 | −930 | 3.0 |
| (24)-2 | (24)-2 | CTM No. 2 | −870 | 5.0 |
| (24)-3 | (24)-3 | CTM No. 3 | −1010 | 3.9 |
| (24)-4 | (24)-4 | CTM No. 4 | −1070 | 7.8 |
| (24)-5 | (24)-5 | CTM No. 5 | −870 | 5.4 |
| (24)-6 | (24)-6 | CTM No. 6 | −760 | 6.1 |
| (24)-7 | (24)-7 | CTM No. 3 | −1100 | 7.5 |
| (24)-8 | (24)-9 | CTM No. 1 | −1070 | 7.7 |
| (25)-1 | (25)-1 | CTM No. 1 | −730 | 2.5 |
| (25)-2 | (25)-3 | CTM No. 2 | −620 | 5.5 |
| (25)-3 | (25)-9 | CTM No. 3 | −930 | 6.8 |
| (25)-4 | (25)-1 | CTM No. 4 | −1050 | 3.0 |
| (25)-5 | (25)-13 | CTM No. 5 | −860 | 7.4 |
| (25)-6 | (25)-14 | CTM No. 6 | −730 | 8.8 |
| (25)-7 | (25)-7 | CTM No. 3 | −1010 | 9.1 |
| (25)-8 | (25)-1 | CTM No. 1 | −1050 | 2.8 |
| (26)-1 | (26)-1 | CTM No. 1 | −880 | 3.1 |
| (26)-2 | (26)-12 | CTM No. 2 | −730 | 2.9 |
| (26)-3 | (26)-14 | CTM No. 3 | −1040 | 4.5 |
| (26)-4 | (26)-16 | CTM No. 4 | −1090 | 8.1 |
| (26)-5 | (26)-12 | CTM No. 5 | −820 | 2.0 |
| (26)-6 | (26)-14 | CTM No. 6 | −790 | 1.7 |
| (26)-7 | (26)-15 | CTM No. 3 | −910 | 5.0 |
| (26)-8 | (26)-7 | CTM No. 1 | −1020 | 7.0 |
| (27)-1 | (27)-1 | CTM No. 1 | −820 | 4.8 |
| (27)-2 | (27)-12 | CTM No. 2 | −910 | 8.5 |
| (27)-3 | (27)-3 | CTM No. 3 | −1030 | 10.2 |
| (27)-4 | (27)-12 | CTM No. 4 | −1070 | 4.1 |
| (27)-5 | (27)-1 | CTM No. 5 | −850 | 3.8 |
| (26)-6 | (27)-5 | CTM No. 6 | −710 | 3.2 |
| (27)-7 | (27)-13 | CTM No. 3 | −940 | 7.0 |
| (27)-8 | (26)-14 | CTM No. 1 | −1090 | 4.8 |
| (28)-1 | (28)-6 | CTM No. 1 | −870 | 8.0 |
| (28)-2 | (28)-2 | CTM No. 2 | −930 | 8.5 |
| (28)-3 | (28)-9 | CTM No. 3 | −1050 | 10.7 |
| (28)-4 | (28)-3 | CTM No. 4 | −1010 | 7.7 |
| (28)-5 | (28)-6 | CTM No. 5 | −820 | 6.9 |
| (28)-6 | (28)-8 | CTM No. 6 | −770 | 6.1 |
| (28)-7 | (28)-2 | CTM No. 3 | −780 | 9.2 |
| (28)-8 | (28)-11 | CTM No. 1 | −1000 | 6.0 |
| (29)-1 | (29)-1 | CTM No. 1 | −950 | 3.0 |
| (29)-2 | (29)-2 | CTM No. 2 | −850 | 3.7 |
| (29)-3 | (29)-3 | CTM No. 3 | −1000 | 5.9 |
| (29)-4 | (29)-4 | CTM No. 4 | −1020 | 6.0 |
| (29)-5 | (29)-5 | CTM No. 5 | −810 | 5.0 |
| (29)-6 | (29)-27 | CTM No. 6 | −790 | 6.1 |
| (29)-7 | (29)-1 | CTM No. 3 | −900 | 3.3 |
| (29)-8 | (29)-28 | CTM No. 1 | −1040 | 8.0 |
| (30)-1 | (30)-1 | CTM No. 1 | −820 | 8.0 |
| (30)-2 | (30)-3 | CTM No. 2 | −890 | 9.3 |
| (30)-3 | (30)-4 | CTM No. 3 | −980 | 10.0 |
| (30)-4 | (30)-5 | CTM No. 4 | −1020 | 9.5 |
| (30)-5 | (30)-10 | CTM No. 5 | −830 | 8.8 |
| (30)-6 | (30)-1 | CTM No. 6 | −660 | 11.0 |
| (30)-7 | (30)-11 | CTM No. 3 | −1010 | 9.5 |
| (30)-8 | (30)-1 | CTM No. 1 | −1050 | 10.2 |
| (31)-1 | (31)-1 | CTM No. 1 | −810 | 3.3 |
| (31)-2 | (31)-2 | CTM No. 2 | −880 | 6.2 |
| (31)-3 | (31)-12 | CTM No. 3 | −960 | 7.5 |
| (31)-4 | (31)-1 | CTM No. 4 | −1090 | 4.1 |
| (31)-5 | (31)-4 | CTM No. 5 | −840 | 2.9 |
| (31)-6 | (31)-7 | CTM No. 6 | −790 | 2.7 |
| (31)-7 | (31)-10 | CTM No. 3 | −970 | 3.9 |
| (31)-8 | (31)-9 | CTM No. 1 | −1020 | 4.8 |

TABLE 2-continued

| Example No. | Azo Pigment | Charge Transporting Material | Vo (Volt) | $E_{\frac{1}{2}}$ (lux · sec) |
|---|---|---|---|---|
| (32)-1 | (32)-1 | CTM No. 1 | −820 | 5.3 |
| (32)-2 | (32)-7 | CTM No. 2 | −1000 | 7.5 |
| (32)-3 | (32)-8 | CTM No. 3 | −930 | 8.0 |
| (32)-4 | (32)-1 | CTM No. 4 | −1210 | 11.3 |
| (32)-5 | (32)-7 | CTM No. 5 | −830 | 5.0 |
| (32)-6 | (32)-9 | CTM No. 6 | −810 | 3.0 |
| (32)-7 | (32)-13 | CTM No. 3 | −1030 | 4.4 |
| (32)-8 | (32)-5 | CTM No. 1 | −970 | 4.9 |
| (33)-1 | (33)-6 | CTM No. 1 | −850 | 2.5 |
| (33)-2 | (33)-7 | CTM No. 2 | −850 | 2.5 |
| (33)-3 | (33)-6 | CTM No. 3 | −1120 | 5.2 |
| (33)-4 | (33)-8 | CTM No. 4 | −1050 | 8.0 |
| (33)-5 | (33)-1 | CTM No. 5 | −880 | 6.7 |
| (33)-6 | (33)-6 | CTM No. 6 | −760 | 1.5 |
| (33)-7 | (33)-10 | CTM No. 3 | −1010 | 2.5 |
| (33)-8 | (33)-6 | CTM No. 1 | −1040 | 2.3 |
| (34)-1 | (34)-1 | CTM No. 1 | −730 | 3.5 |
| (34)-2 | (34)-1 | CTM No. 2 | −860 | 2.8 |
| (34)-3 | (34)-2 | CTM No. 3 | −930 | 4.8 |
| (34)-4 | (34)-7 | CTM No. 4 | −950 | 3.0 |
| (34)-5 | (34)-3 | CTM No. 5 | −890 | 6.8 |
| (34)-6 | (34)-1 | CTM No. 6 | −820 | 2.5 |
| (34)-7 | (34)-4 | CTM No. 3 | −1000 | 3.0 |
| (34)-8 | (34)-5 | CTM No. 1 | −950 | 2.5 |
| (35)-1 | (35)-1 | CTM No. 1 | −840 | 8.5 |
| (35)-2 | (35)-2 | CTM No. 2 | −770 | 4.1 |
| (35)-3 | (35)-3 | CTM No. 3 | −930 | 6.0 |
| (35)-4 | (35)-6 | CTM No. 4 | −1050 | 2.5 |
| (35)-5 | (35)-4 | CTM No. 5 | −820 | 3.0 |
| (35)-6 | (35)-7 | CTM No. 6 | −700 | 4.5 |
| (35)-7 | (35)-6 | CTM No. 3 | −900 | 2.8 |
| (35)-8 | (35)-6 | CTM No. 1 | −1030 | 3.1 |
| (36)-1 | (36)-5 | CTM No. 1 | −870 | 8.2 |
| (36)-2 | (36)-6 | CTM No. 2 | −980 | 11.4 |
| (36)-3 | (36)-1 | CTM No. 3 | −860 | 7.1 |
| (36)-4 | (36)-2 | CTM No. 4 | −1120 | 5.2 |
| (36)-5 | (36)-4 | CTM No. 5 | −930 | 7.9 |
| (36)-6 | (36)-6 | CTM No. 6 | −820 | 9.8 |
| (36)-7 | (36)-3 | CTM No. 3 | −910 | 13.4 |
| (36)-8 | (36)-7 | CTM No. 1 | −1050 | 7.5 |
| (37)-1 | (37)-1 | CTM No. 1 | −760 | 5.5 |
| (37)-2 | (37)-2 | CTM No. 2 | −930 | 3.8 |
| (37)-3 | (37)-8 | CTM No. 3 | −800 | 7.5 |
| (37)-4 | (37)-4 | CTM No. 4 | −1080 | 4.7 |
| (37)-5 | (37)-7 | CTM No. 5 | −1000 | 8.4 |
| (37)-6 | (37)-10 | CTM No. 6 | −900 | 1.1 |
| (37)-7 | (37)-17 | CTM No. 3 | −1140 | 4.7 |
| (37)-8 | (37)-13 | CTM No. 1 | −1030 | 1.5 |
| (38)-1 | (38)-6 | CTM No. 1 | −900 | 3.1 |
| (38)-2 | (38)-7 | CTM No. 2 | −1030 | 7.0 |
| (38)-3 | (38)-1 | CTM No. 3 | −800 | 7.5 |
| (38)-4 | (38)-4 | CTM No. 4 | −970 | 5.5 |
| (38)-5 | (38)-3 | CTM No. 5 | −810 | 4.7 |
| (38)-6 | (38)-8 | CTM No. 6 | −720 | 11.1 |
| (38)-7 | (38)-9 | CTM No. 3 | −1000 | 9.1 |
| (38)-8 | (38)-5 | CTM No. 1 | −920 | 7.0 |
| (39)-1 | (39)-1 | CTM No. 1 | −840 | 4.6 |
| (39)-2 | (39)-3 | CTM No. 2 | −740 | 8.1 |
| (39)-3 | (39)-4 | CTM No. 3 | −950 | 4.5 |
| (39)-4 | (39)-2 | CTM No. 4 | −1020 | 3.7 |
| (39)-5 | (39)-6 | CTM No. 5 | −890 | 5.1 |
| (39)-6 | (39)-5 | CTM No. 6 | −800 | 4.3 |
| (39)-7 | (39)-9 | CTM No. 3 | −1010 | 8.9 |
| (39)-8 | (39)-8 | CTM No. 1 | −980 | 4.0 |
| (40)-1 | (40)-5 | CTM No. 1 | −850 | 5.0 |
| (40)-2 | (40)-1 | CTM No. 2 | −770 | 10.5 |
| (40)-3 | (40)-8 | CTM No. 3 | −790 | 7.0 |
| (40)-4 | (40)-4 | CTM No. 4 | −920 | 4.3 |
| (40)-5 | (40)-2 | CTM No. 5 | −960 | 11.5 |
| (40)-6 | (40)-5 | CTM No. 6 | −900 | 5.8 |
| (40)-7 | (40)-6 | CTM No. 3 | −1010 | 10.1 |
| (40)-8 | (40)-11 | CTM No. 1 | −720 | 6.3 |
| (41)-1 | (41)-6 | CTM No. 1 | −980 | 7.2 |
| (41)-2 | (41)-9 | CTM No. 2 | −710 | 6.8 |
| (41)-3 | (41)-1 | CTM No. 3 | −750 | 13.5 |
| (41)-4 | (41)-9 | CTM No. 4 | −880 | 6.0 |
| (41)-5 | (41)-4 | CTM No. 5 | −760 | 14.3 |
| (41)-6 | (41)-6 | CTM No. 6 | −870 | 6.9 |
| (41)-7 | (41)-4 | CTM No. 3 | −710 | 12.1 |
| (41)-8 | (41)-7 | CTM No. 1 | −900 | 8.0 |

TABLE 2-continued

| Example No. | Azo Pigment | Charge Transporting Material | Vo (Volt) | $E_{\frac{1}{2}}$ (lux · sec) |
|---|---|---|---|---|
| (42)-1 | (42)-6 | CTM No. 1 | −870 | 5.6 |
| (42)-2 | (42)-1 | CTM No. 2 | −760 | 14.0 |
| (42)-3 | (42)-4 | CTM No. 3 | −890 | 8.9 |
| (42)-4 | (42)-1 | CTM No. 4 | −920 | 13.8 |
| (42)-5 | (42)-3 | CTM No. 5 | −810 | 11.0 |
| (42)-6 | (42)-6 | CTM No. 6 | −720 | 7.1 |
| (42)-7 | (42)-2 | CTM No. 3 | −850 | 12.3 |
| (42)-8 | (42)-5 | CTM No. 1 | −800 | 10.8 |
| (43)-1 | (43)-10 | CTM No. 1 | −780 | 2.9 |
| (43)-2 | (43)-9 | CTM No. 2 | −960 | 4.3 |
| (43)-3 | (43)-1 | CTM No. 3 | −1020 | 10.3 |
| (43)-4 | (43)-9 | CTM No. 4 | −880 | 3.9 |
| (43)-5 | (43)-6 | CTM No. 5 | −810 | 9.3 |
| (43)-6 | (43)-10 | CTM No. 6 | −900 | 3.3 |
| (43)-7 | (43)-4 | CTM No. 3 | −930 | 11.1 |
| (43)-8 | (43)-11 | CTM No. 1 | −810 | 2.8 |
| (44)-1 | (44)-5 | CTM No. 1 | −690 | 4.5 |
| (44)-2 | (44)-9 | CTM No. 2 | −720 | 6.9 |
| (44)-3 | (44)-7 | CTM No. 3 | −980 | 6.0 |
| (44)-4 | (44)-6 | CTM No. 4 | −760 | 4.0 |
| (44)-5 | (44)-8 | CTM No. 5 | −1080 | 15.0 |
| (44)-6 | (44)-5 | CTM No. 6 | −830 | 6.6 |
| (44)-7 | (44)-1 | CTM No. 3 | −990 | 23.0 |
| (44)-8 | (44)-9 | CTM No. 1 | −800 | 6.7 |

What is claimed is:

1. An electrophotographic printing original plate which comprises:

a. an electroconductive support material, and b. an electrophotographic photosensitive layer formed thereon, said electrophotographic photosensitive layer comprising (i) a charge generating layer consisting essentially of an azo pigment serving as a charge generating material and (ii) a charge transport layer consisting essentially of a charge transporting material and an alkali-soluble resin, said azo pigment being selected from the group consisting of the azo pigments having the following formulas (1) through (44):

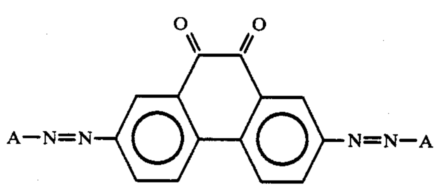
(1)

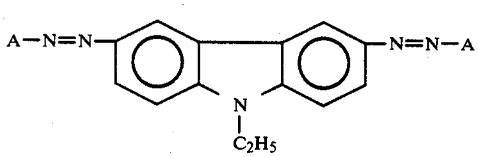
(2)

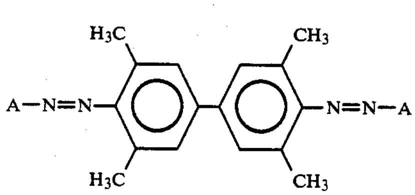
(3)

-continued

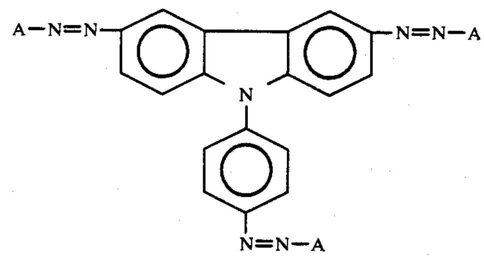
(4)

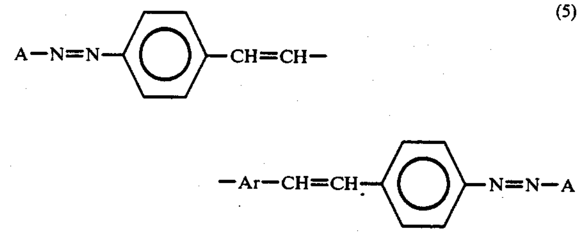
(5)

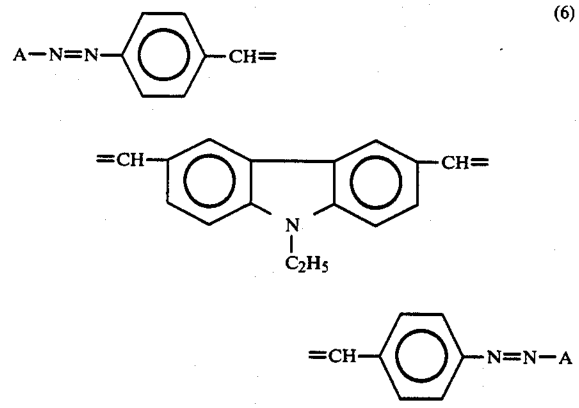
(6)

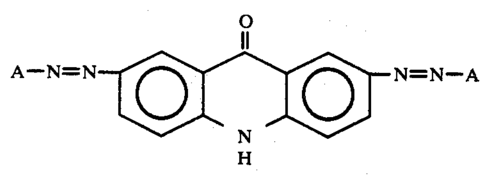
(7)

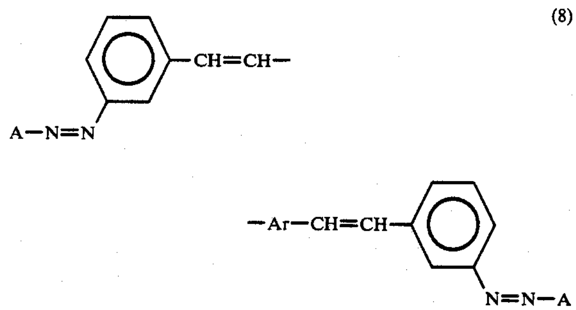
(8)

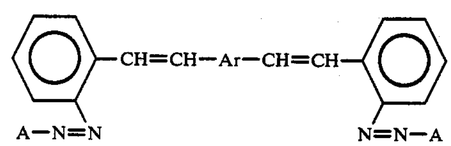
(9)

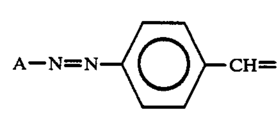
(10)

-continued
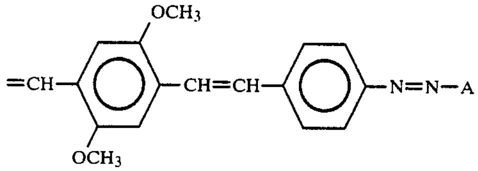
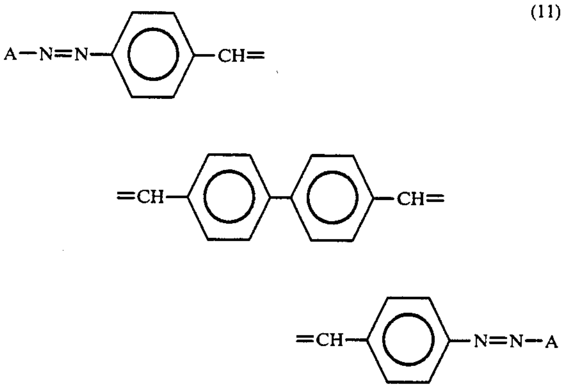
(11)
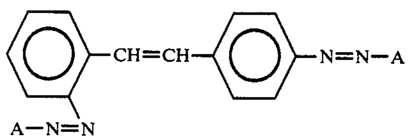
(12)
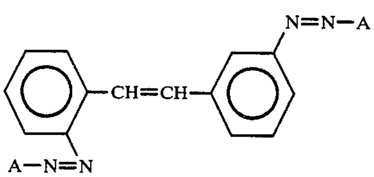
(13)
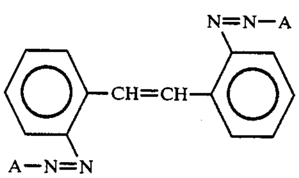
(14)
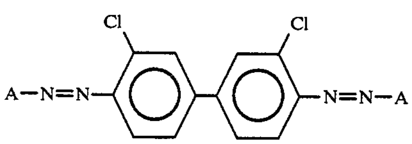
(15)
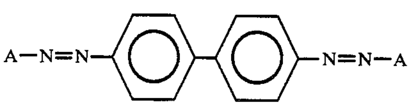
(16)
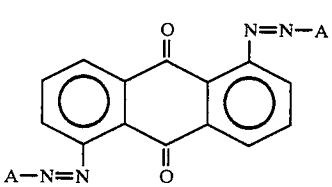
(17)
-continued
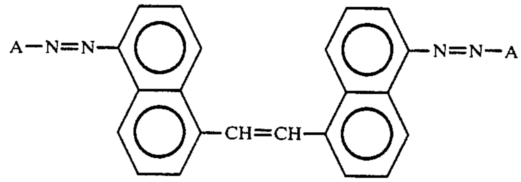
(18)
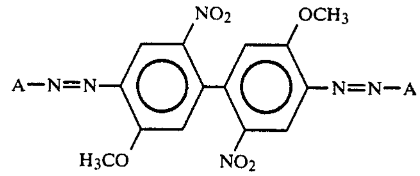
(19)
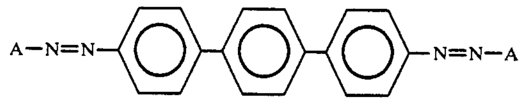
(20)
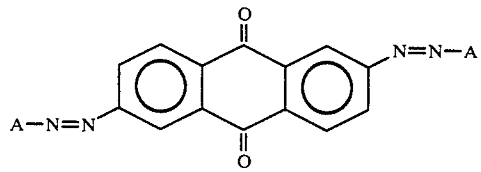
(21)
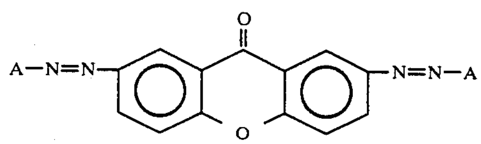
(22)
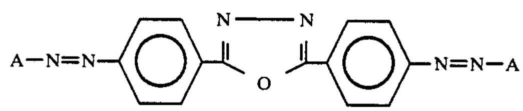
(23)
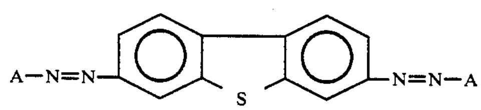
(24)
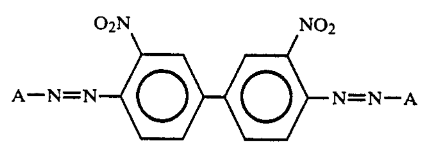
(25)
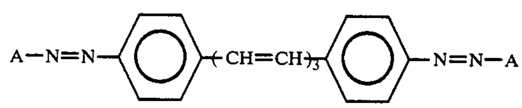
(26)
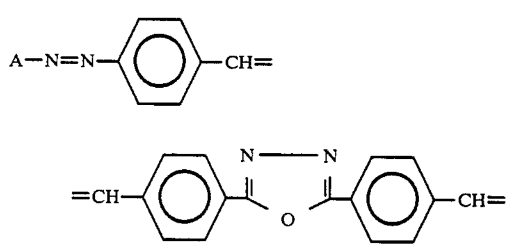
(27)

-continued
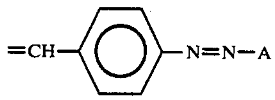
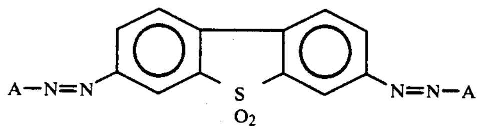
(28)
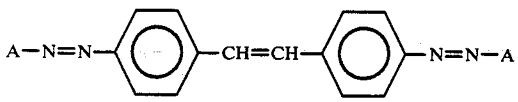
(29)
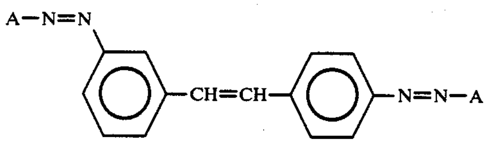
(30)
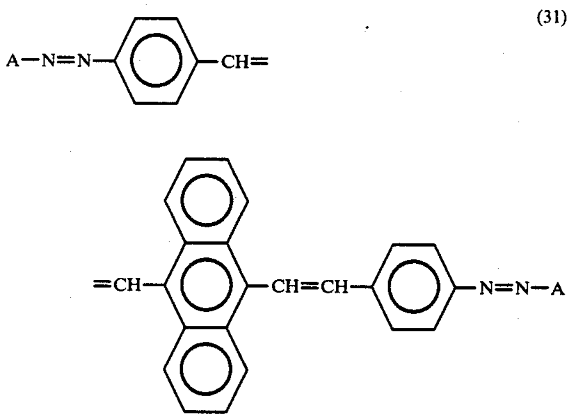
(31)
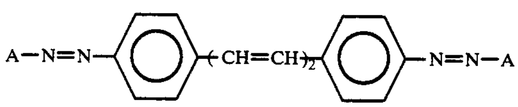
(32)
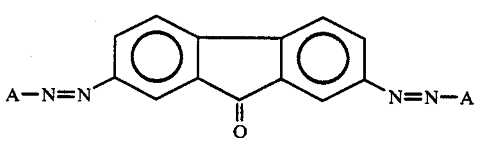
(33)
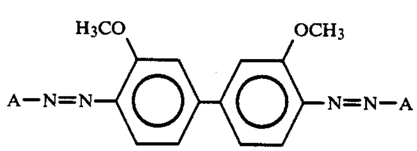
(34)
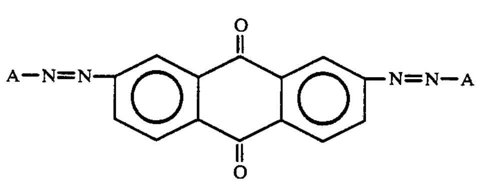
(35)
-continued
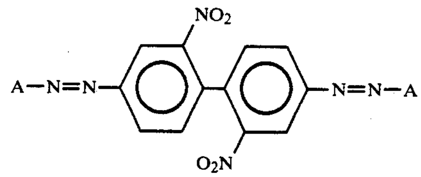
(36)
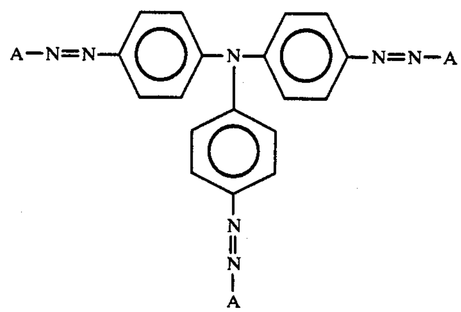
(37)
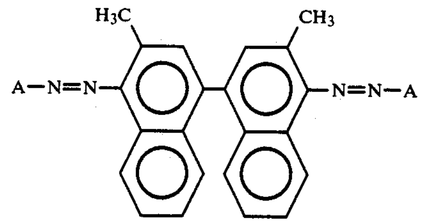
(38)
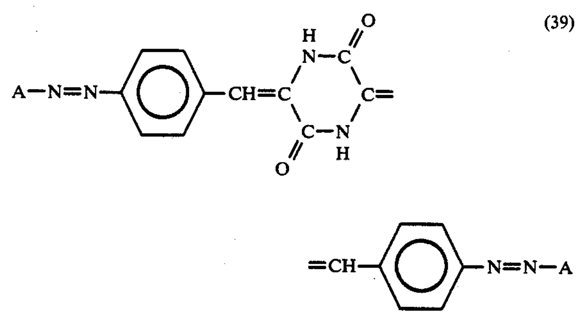
(39)
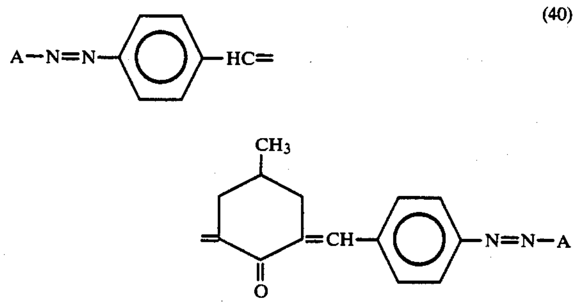
(40)
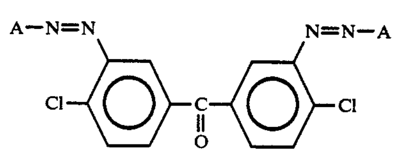
(41)
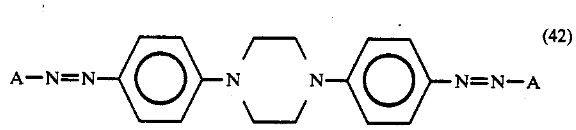
(42)

-continued

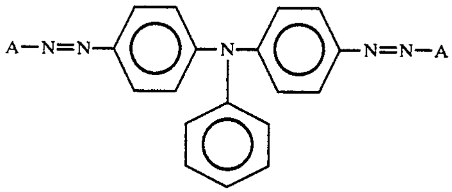

(43)

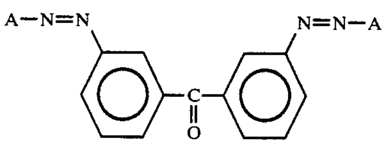

(44)

wherein A represents a coupler residue selected from the group consisting of the coupler residues having the formulas (A-1) through (A-6):

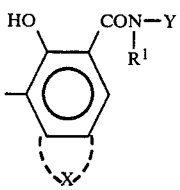

(A-1)

wherein $R^1$ is hydrogen, an alkyl group, an unsubstituted or substituted phenyl group; X is an unsubstituted or substituted cyclic hydrocarbon group, or an unsubstituted or substituted heterocyclic group; Y is an unsubstituted or substituted cyclic hydrocarbon group, an unsubstituted or substituted heterocyclic group, or

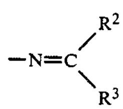

(in which $R^2$ is an unsubstituted or substituted cyclic hydrocarbon group, an unsubstituted or substituted heterocyclic group, an unsubstituted or substituted styryl group; $R^3$ is hydrogen, an alkyl group, an unsubstituted or substituted phenyl group; or $R^2$ and $R^3$ can form a ring in combination with carbon atoms bonded to $R^2$ and $R^3$),

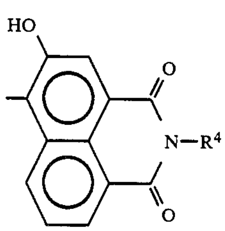

(A-2)

wherein $R^4$ is an unsubstituted or substituted hydrocarbon group,

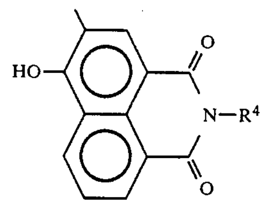

(A-3)

wherein $R^4$ is an unsubstituted or substituted hydrocarbon group,

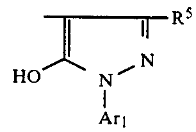

(A-4)

wherein $R^5$ is an alkyl group, a carbamoyl group, a carboxyl group or an ester group thereof; $Ar_1$ is an unsubstituted or substituted cyclic hydrocarbon group,

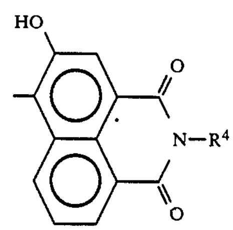

(A-5)

and

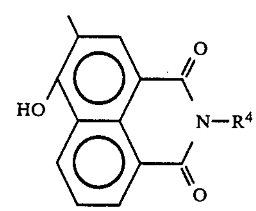

(A-6)

wherein $R^6$ is an unsubstituted or substituted hydrocarbon group and $Ar_2$ is an unsubstituted or substituted cyclic hydrocarbon group; and Ar in the formulas (5), (8) and (9) represents

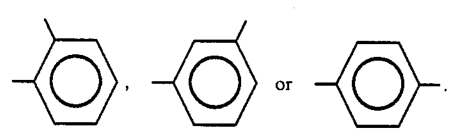

2. An electrophotographic printing original plate as claimed in claim 1, wherein said charge generation layer further comprises an alkali-soluble resin and the amount of said azo pigment is 30 wt.% or more.

3. An electrophotographic printing original plate as claimed in claim 1, wherein the thickness of said charge generation layer is in the range of from 0.05 μm to 5 μm.

4. An electrophotographic printing original plate as claimed in claim 1, wherein said charge transporting material in said charge transport layer is selected from the group consisting of a positive hole transporting material and an electron transporting material and is in an amount ranging from 10 wt.% to 70 wt.%.

5. An electrophotographic printing original plate as claimed in claim 1, wherein said positive hole transporting material is selected from the group consisting of:

2,5-bis(4-diethylaminophenyl)-1,3,4-oxadiazole,
2,5-bis 4-(4-diethylaminostyryl)phenyl-1,3,4-oxadiazole,
2-(9-ethylcarbazolyl-3-)-5-(4-diethylaminophenyl)-1,3,4-oxadiazole,
2-vinyl-4-(2-chlorophenyl)-5-(4-diethylamino)oxazole,
2-(4-diethylaminophenyl)-4-phenyloxazole,
1-phenyl-3-(4-diethylaminostyryl)-5-(4-diethylaminophenyl)pyrazoline,
1-phenyl-3-(4-dimethylaminostyryl)-5-(4-dimethylaminophenyl)pyrazoline,
2,2'-dimethyl-4,4'-bis(diethylamino)triphenylmethane,
1,1-bis(4-dibenzylaminophenyl)propane,
tris(4-diethylaminophenyl)methane,
9-(4-dimethylaminobenzylidene)fluorene,
3-(9-fluorenylidene)-9-ethylcarbazole,
9-(4-diethylaminostyryl)anthracene,
9-bromo-10-(4-diethylaminostyryl)anthracene,
1,2-bis(4-diethylaminostyryl)benzene,
1,2-bis(2,4-dimethoxystyryl)benzene,
9-ethylcarbazole-3-aldehyde 1-methyl-1-phenylhydrazone,
9-ethylcarbazole-3-aldehyde 1-benzyl-1-phenylhydrazone,
4-diethylaminobenzaldehyde 1,1-diphenylhydrazone,
2,4-dimethoxybenzaldehyde 1-benzyl-1-phenylhydrazone,
4-diphenylaminobenzaldehyde 1-methyl-1-phenylhydrazone,
4-diphenylaminostilbene,
4-dibenzylaminostilbene,
4-ditolylaminostilbene,
1-(4-diphenylaminostyryl)naphthalene,
1-(4-dibenzylaminostyryl)naphthalene,
4'-diphenylamino-α-phenylstilbene,
4'-methylphenylamino-α-phenylstilbene,
3-styryl-9-ethylcarbazole, and
3-(4-diethylamino)styryl-9-ethylcarbazole.

6. An electrophotographic printing original plate as claimed in claim 4, wherein said electron transporting material is selected from the group consisting of chloranil, bromanil, tetracyanoethylene, tetracyanoquinonedimethane, 2,4,7-trinitro-9-fluorenone, 2,4,5,7-tetranitro-9-fluorenone, 2,4,5,7-tetranitroxanthone, 2,4,8-trinitrothioxanthone, 2,6,8-trinitro-4H-indeno[2,4-b]thiophene-4-one, and 1,3,7-trinitrodibenzothiophene-5,5-dioxide.

7. An electrophotographic printing original plate as claimed in claim 1, wherein said alkali-soluble resin in said charge transport layer is selected from the group consisting of a styrene-maleic anhydride copolymer, styrene-methacrylic acid-methacrylate copolymer, a methacrylic acid-methacrylate copolymer and phenolic resin.

8. An electrophotographic printing original plate as claimed in claim 1, wherein the thickness of said charge transport layer is in the range of from 2 μm to 50 μm.

9. An electrophotographic printing original plate as claimed in claim 1, wherein said charge transport layer further comprises a plasticizer selected from the group consisting of dimethyl phthalate, diethyl phthalate, dibutyl phthalate, dimethyl glycol phthalate and ethylphthalyl ethyl glycolate.

10. An electrophotographic printing original plate as claimed in claim 1, wherein said electroconductive support material has a hydrophilic surface.

11. An electrophotographic printing original plate as claimed in claim 1, wherein said electroconductive support material is made of a material selected from the group consisting of an aluminum plate, a zinc plate, a copper-aluminum bimetal plate, a copper-stainless steel bimetal plate, a chrome-copper bimetal plate, a chrome-copper-aluminum trimetal plate, a chrome-lead-iron trimetal plate, and a chrome-copper-stainless steel trimetal plate.

12. An electrophotographic printing plate making process comprising the steps of:

a. electrically charging uniformly an electrophotographic printing original plate comprising an electroconductive support material and an electrophotographic photosensitive layer formed thereon, which electrophotographic photosensitive layer comprises (i) a charge generation layer consisting essentially of an azo pigment serving as a charge generating material and (ii) a charge transport layer consisting essentially of a charge transporting material and an alkali-soluble resin,
b. exposing said charged printing original plate to optical images to form latent electrostatic images thereon,
c. developing the latent electrostatic images with toner,
d. fixing the toner images to said printing original plate, and
e. removing the electrophotographic photosensitive layer portions which bear no toner image, corresponding to the non-image areas of the printing original plate, by dissolving the photosensitive layer portions in a dissolving liquid capable of dissolving said alkali-soluble resin.

* * * * *